(12) United States Patent
Ofek et al.

(10) Patent No.: US 7,170,906 B2
(45) Date of Patent: Jan. 30, 2007

(54) TIME-BASED GROOMING AND DEGROOMING METHODS WITH COMMON TIME REFERENCE FOR OPTICAL NETWORKS

(75) Inventors: Yoram Ofek, Riverdale, NY (US); Mario Baldi, Cuneo (IT)

(73) Assignee: Synchrodyne Networks, Inc., Riverdale, NY (US)

( * ) Notice: Subject to any disclaimer, the term of this patent is extended or adjusted under 35 U.S.C. 154(b) by 991 days.

(21) Appl. No.: 09/961,081

(22) Filed: Sep. 21, 2001

(65) Prior Publication Data
US 2002/0051468 A1   May 2, 2002

Related U.S. Application Data

(63) Continuation-in-part of application No. 09/120,700, filed on Jul. 22, 1998.
(60) Provisional application No. 60/261,133, filed on Jan. 10, 2001, provisional application No. 60/235,765, filed on Sep. 27, 2000.

(51) Int. Cl.
*H04J 3/00* (2006.01)
(52) U.S. Cl. ............... 370/498; 370/535; 370/537; 370/542
(58) Field of Classification Search ......... 370/498, 370/503, 535, 537, 464, 458
See application file for complete search history.

(56) References Cited

U.S. PATENT DOCUMENTS

| 6,430,201 B1 * | 8/2002 | Azizoglu et al. | 370/535 |
| 6,496,519 B1 * | 12/2002 | Russell et al. | 370/465 |
| 6,498,794 B1 * | 12/2002 | Tsukamoto et al. | 370/395.1 |
| 6,608,844 B1 * | 8/2003 | Teodorescu et al. | 370/512 |

* cited by examiner

*Primary Examiner*—Ricky Q. Ngo
*Assistant Examiner*—Richard Chang
(74) *Attorney, Agent, or Firm*—Sitrick & Sitrick

(57) ABSTRACT

Time-based grooming and degrooming methods and systems of data units that utilize a common time reference is disclosed. Time is divided into a plurality of contiguous periodic time frames with a plurality of time frame durations. The system and method enable the grooming and switching of data units from a plurality of low speed links into one or more high-speed links. The system and method further enable the grooming and switching of data units from one or more high-speed links into a plurality of low speed links. The plurality of data units that are contained in each of the time frames are forwarded in a pipelined manner through the network switches. The system operates with high-speed wavelength division multiplexing (WDM) links, i.e., with multiple lambdas. The outcome of this method is called fractional lambda grooming.

61 Claims, 65 Drawing Sheets

$c = \text{High\_capacity/Low\_capacity}$

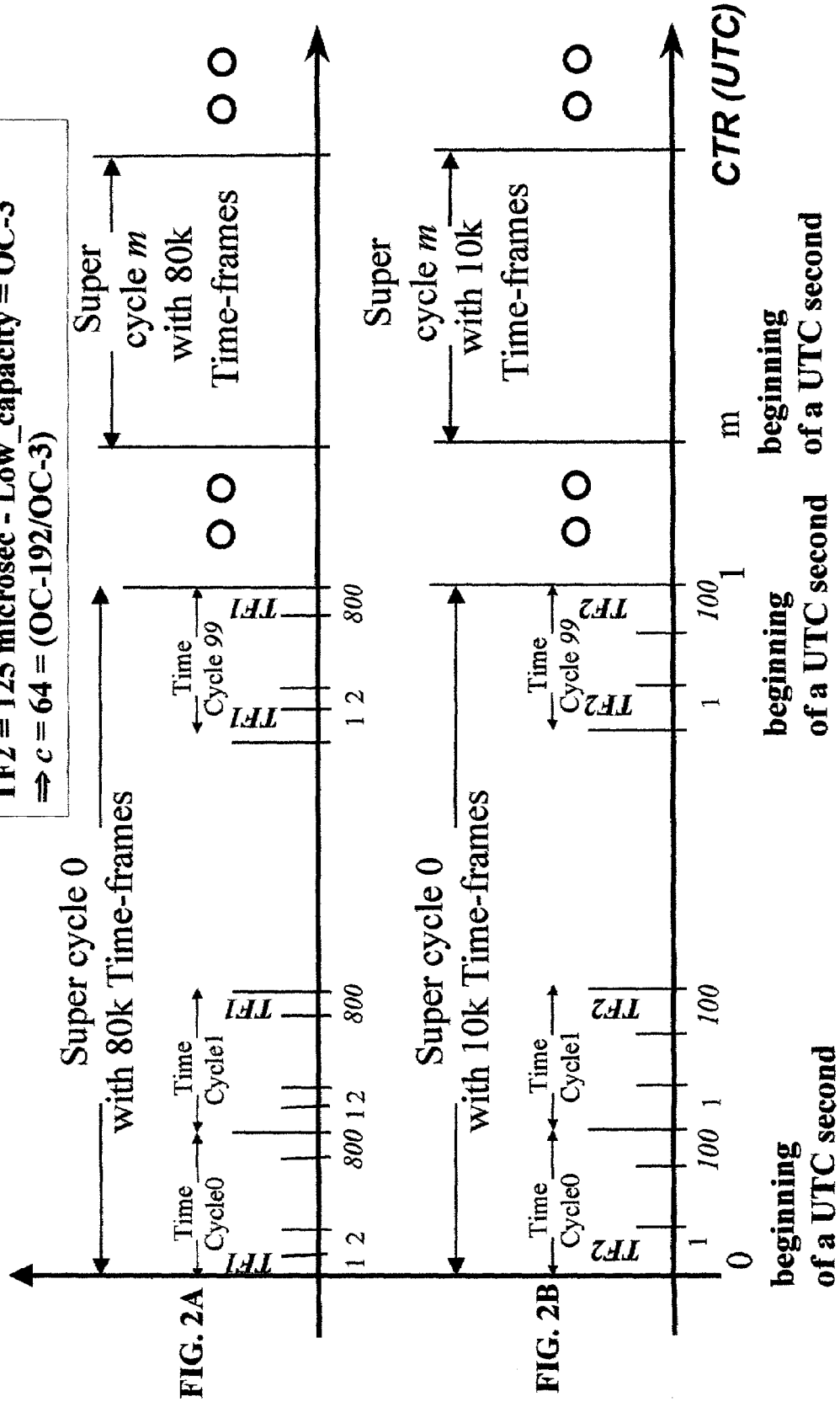

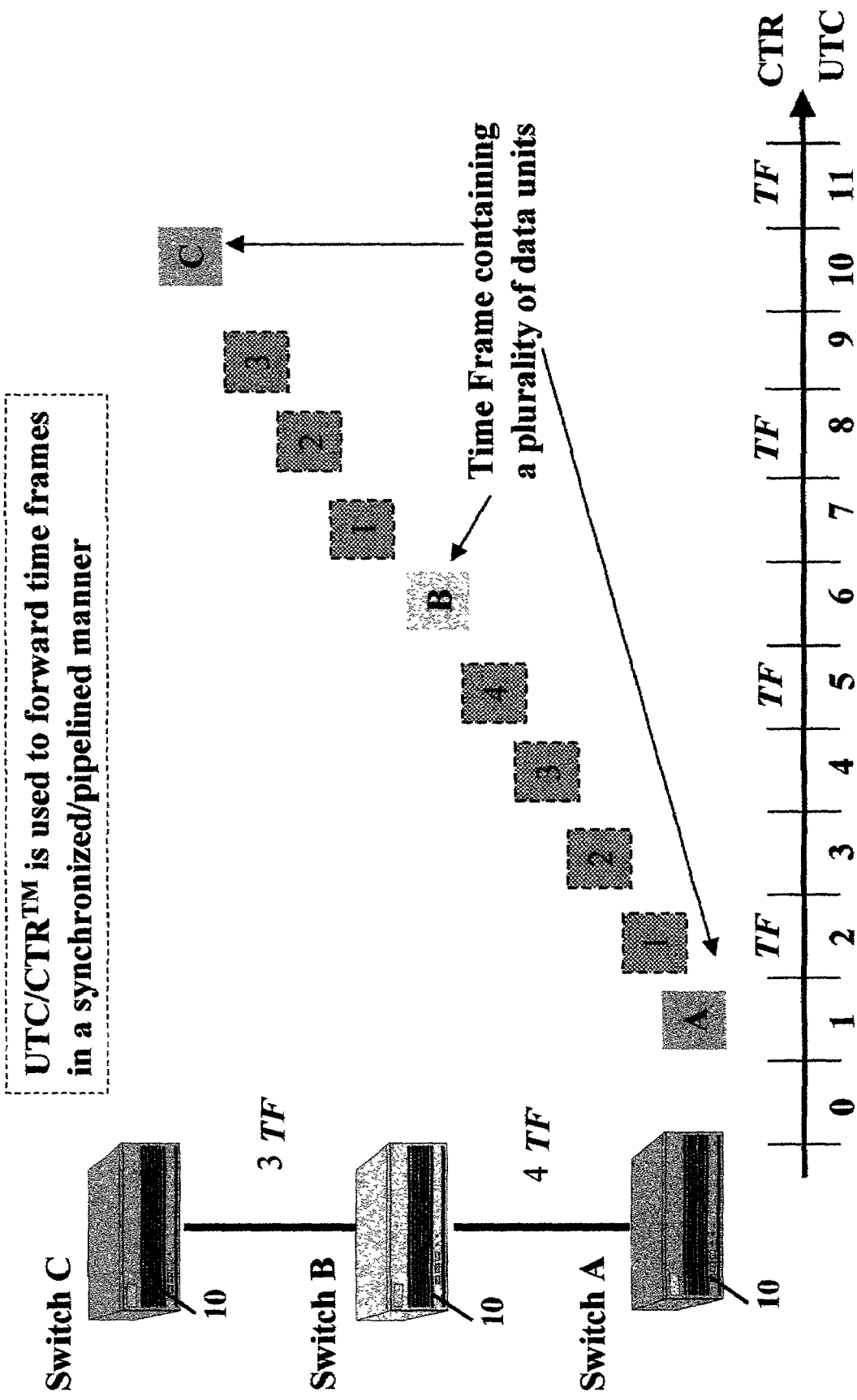

Alignment Subsystem for *high capacity* Channel $j$ at Input Interface $i$ with a Plurality of *Sub-Time Frame Queues*

FIG. 20  TFi_j: Time frame duration on channel j at Input Interface i.
UTRi: UTR on link connected to Input Interface i Rate Matching Buffer for Channel j at Output Interface i with a Plurality of Time Frame Queues
(Also single buffer with dual access memory with single phase switching and forwarding)

FIG. 32

| Channel Capacity | | TF Duration | TF Size | | STS-1s | TFs/s |
|---|---|---|---|---|---|---|
| 51.84 | STS-1 | 250 | 1620 | 1512 | 2 | 4000 |
|  |  | 500 | 3240 | 3024 | 4 | 2000 |
|  |  | 1000 | 6480 | 6048 | 8 | 1000 |
| 155.52 | STS-3 | 125 | 2430 | 2268 | 3 | 8000 |
|  |  | 250 | 4860 | 4536 | 6 | 4000 |
|  |  | 500 | 9720 | 9072 | 12 | 2000 |
| 622.08 | STS-12 | 62.5 | 4860 | 4536 | 6 | 16000 |
|  |  | 125 | 9720 | 9072 | 12 | 8000 |
|  |  | 250 | 19440 | 18144 | 24 | 4000 |
| 2488.32 | STS-48 | 62.5 | 19440 | 18144 | 24 | 16000 |
|  |  | 31.25 | 9720 | 9072 | 12 | 32000 |
|  |  | 15.625 | 4860 | 4536 | 6 | 64000 |
| 9953.28 | STS-192 | 7.8125 | 9720 | 9072 | 12 | 128000 |
|  |  | 15.625 | 19440 | 18144 | 24 | 64000 |
| 1000 | GE | 125 | 15625 | 15625 | 19.3 | 8000 |
|  |  | 100 | 12500 | 12500 | 15.4 | 10000 |
|  |  | 80 | 10000 | 10000 | 12.3 | 12500 |
| 10000 | 10GE | 15.625 | 19531.25 | 19531.3 | 24.1 | 64000 |
|  |  | 12.5 | 15625 | 15625 | 19.3 | 80000 |
|  |  | 10 | 12500 | 12500 | 15.4 | 100000 |

FIG. 33

| Ch Capacity | | TF Dur. | TF Size | GE TFs | TFs/s |
|---|---|---|---|---|---|
| 1000 | GE | 80 | 10000 | 1.0 | 12500 |
| 51.84 | STS-1 | 250 | 1512 | 0.15 | 4000 |
| | | 500 | 3024 | 0.30 | 2000 |
| | | 1000 | 6048 | 0.60 | 1000 |
| 155.5 | STS-3 | 125 | 2268 | 0.23 | 8000 |
| | | 250 | 4536 | 0.45 | 4000 |
| | | 500 | 9072 | 0.91 | 2000 |
| 622.1 | STS-12 | 62.5 | 4536 | 0.45 | 16000 |
| | | 125 | 9072 | 0.91 | 8000 |
| | | 250 | 18144 | 1.81 | 4000 |
| 2488 | STS-48 | 62.5 | 18144 | 1.81 | 16000 |
| | | 31.25 | 9072 | 0.91 | 32000 |
| | | 15.625 | 4536 | 0.45 | 64000 |
| 9953 | STS-192 | 7.8125 | 9072 | 0.91 | 128000 |
| | | 15.625 | 18144 | 1.81 | 64000 |
| 10000 | 10GE | 8 | 10000 | 1.00 | 125000 |
| | | 16 | 20000 | 2.00 | 62500 |

| Ch Capacity | | TF Dur. | TF Size | GE TFs | TFs/s |
|---|---|---|---|---|---|
| 1000 | GE | 62.5 | 7812.5 | 1.0 | 16000 |
| 51.84 | STS-1 | 250 | 1512 | 0.19 | 4000 |
| | | 500 | 3024 | 0.39 | 2000 |
| | | 1000 | 6048 | 0.77 | 1000 |
| 155.52 | STS-3 | 125 | 2268 | 0.29 | 8000 |
| | | 250 | 4536 | 0.58 | 4000 |
| | | 500 | 9072 | 1.16 | 2000 |
| 622.08 | STS-12 | 62.5 | 4536 | 0.58 | 16000 |
| | | 125 | 9072 | 1.16 | 8000 |
| | | 250 | 18144 | 2.32 | 4000 |
| 2488.32 | STS-48 | 62.5 | 18144 | 2.32 | 16000 |
| | | 31.25 | 9072 | 1.16 | 32000 |
| | | 15.625 | 4536 | 0.58 | 64000 |
| 9953.28 | STS-192 | 7.8125 | 9072 | 1.16 | 128000 |
| | | 15.625 | 18144 | 2.32 | 64000 |
| 10000 | 10GE | 12.5 | 15625 | 2.00 | 80000 |
| | | 25 | 31250 | 4.00 | 40000 |

FIG. 34

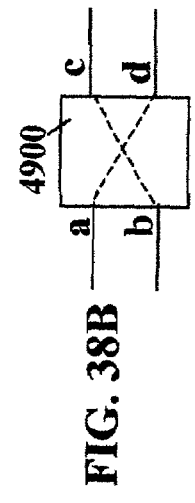
FIG. 38A
Straight Connection of a
2-by-2 Optical Switching Block
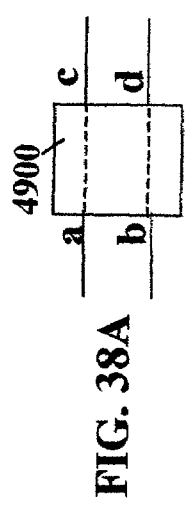
FIG. 38B
Cross Connection of a
2-by-2 Optical Switching Block
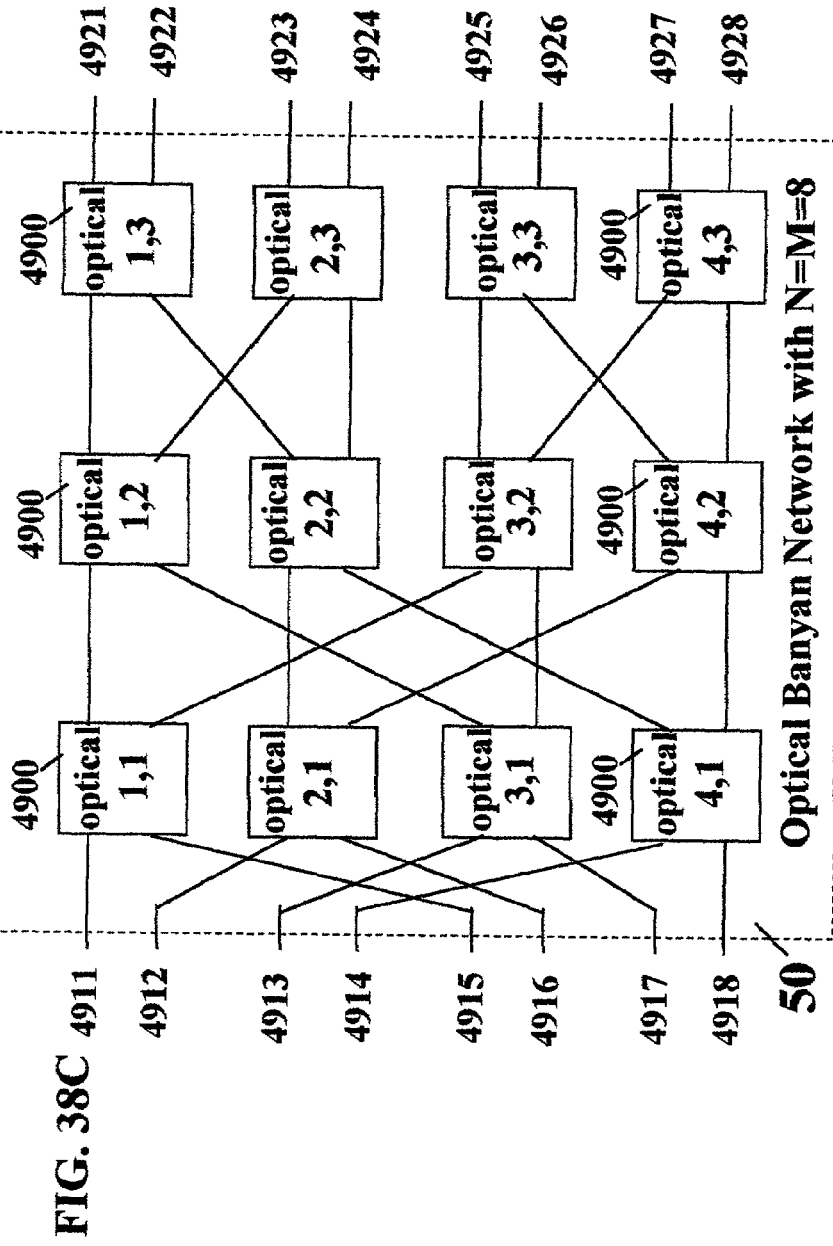
FIG. 38C   Optical Banyan Network with N=M=8

- $CC1\_length \cdot TF1 = CC2\_length \cdot TF2 = CC3\_length \cdot TF2$
- $TF2 = (SC1\_length / SC2\_length) \cdot TF1 = k \cdot TF1$, where the common cycles of $TF1$ and $TF2$ are aligned with respect to UTC.

For $k = 2$ and $c = 4$ (e.g., High_capacity=OC-192, Low_capacity=OC-48):

- $CC1\_length \cdot TF1 = CC2\_length \cdot TF2 = CC3\_length \cdot TF2$
- $TF2 = (SC1\_length / SC2\_length) \cdot TF1 = k \cdot TF1$, where the common cycles of TF1 and TF2 are aligned with respect to UTC.

For $k = 2$ and $c = 4$ (e.g., High_capacity=OC-192, Low_capacity=OC-48):

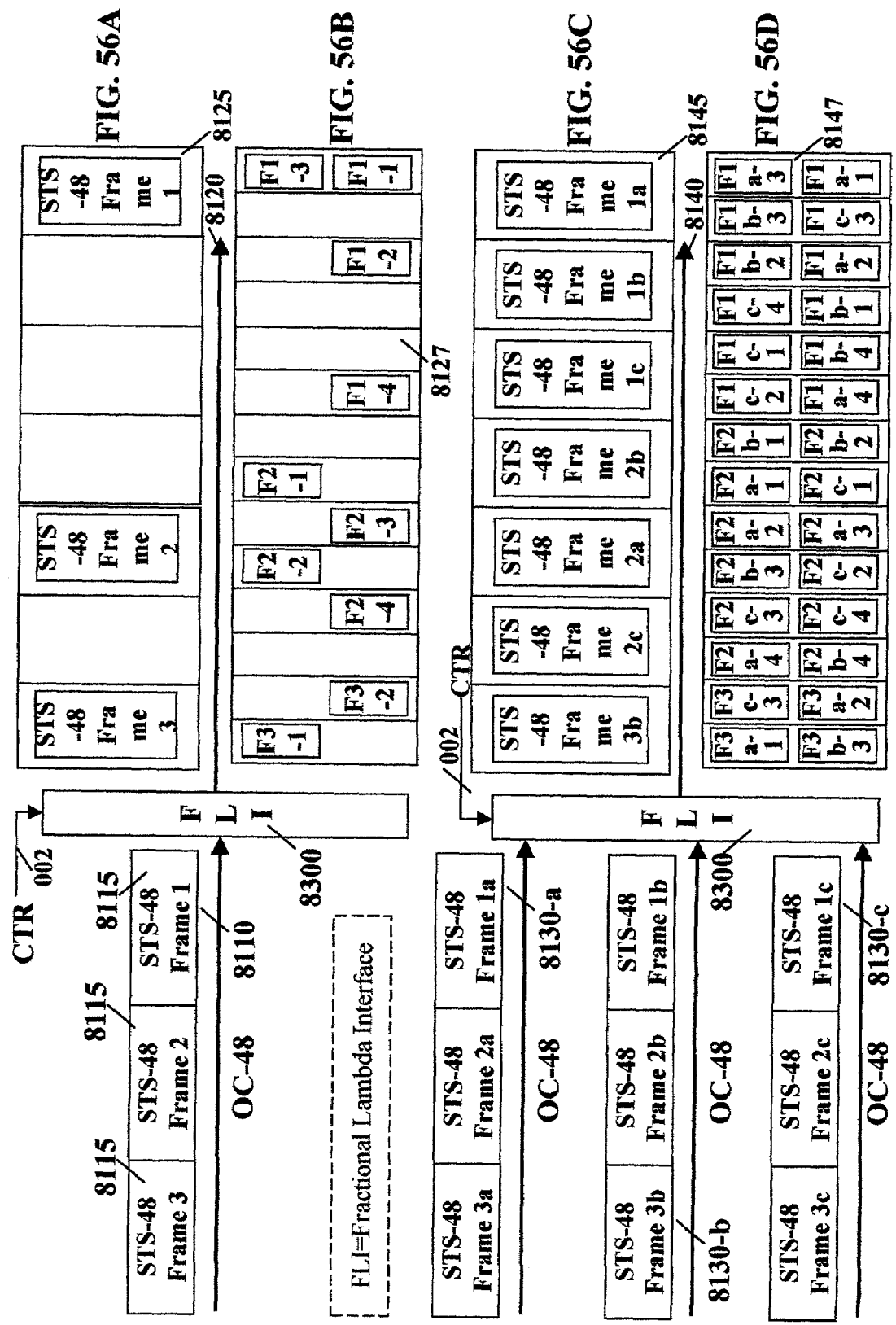

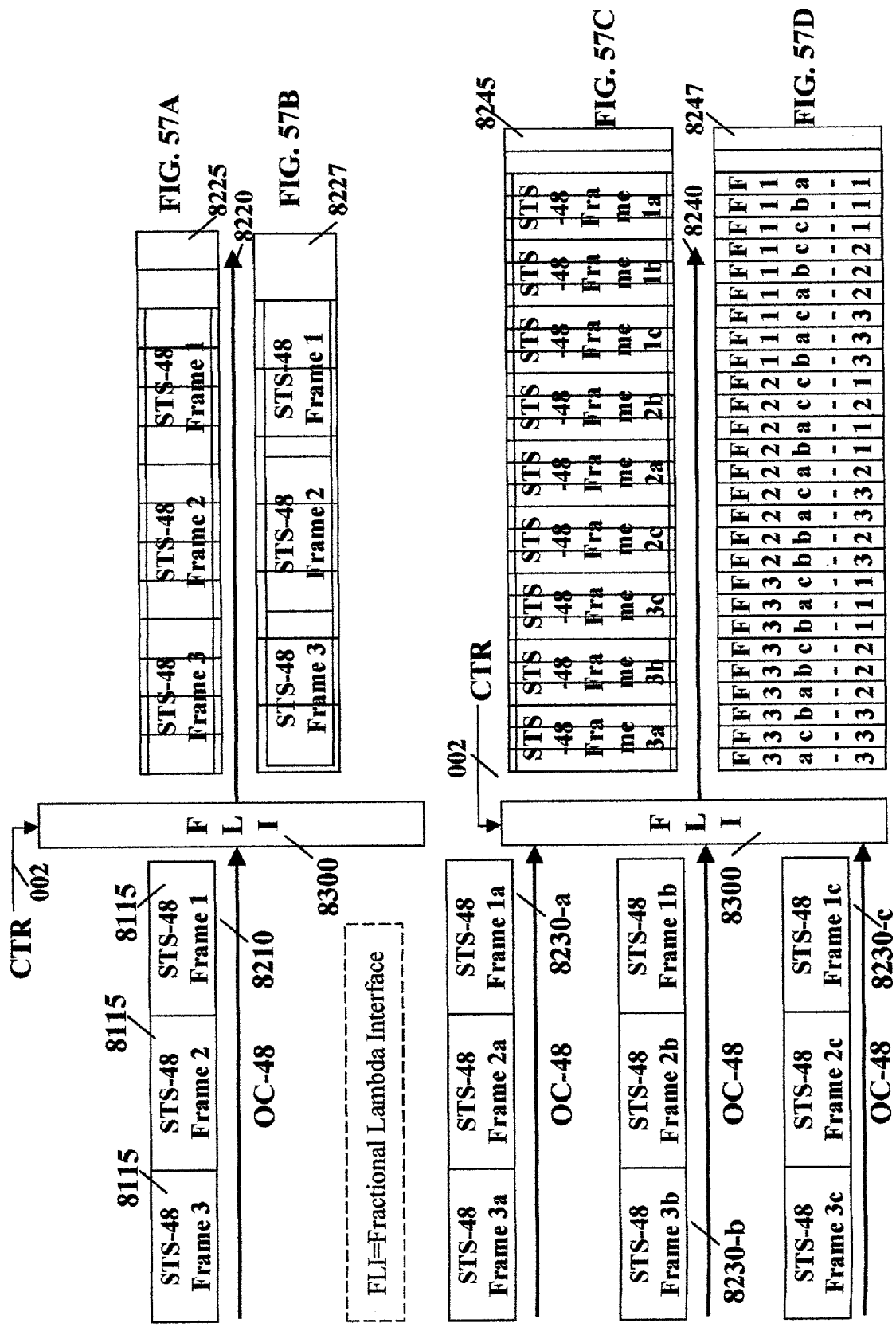

- SONET - synchronous optical network
- Multiplexing method: byte interleaving
- Signal hierarchy: OC-N (STS-N)
  — STS-N rate: N*51.84 Mb/s
  — Frame format: 9 rows by 90*N columns
    • capacity: N*810 bytes in 125 microsecond.
    • overhead: N*27 bytes
    • payload: N*783 bytes STS-1
SPE - Synchronous Payload Environment
TOH - Transport Overhead
POH - Path Overhead

TIME-BASED GROOMING AND DEGROOMING METHODS WITH COMMON TIME REFERENCE FOR OPTICAL NETWORKS

RELATED APPLICATIONS

This is a continuation-in-part application, under 37 C.F.R. §1.53, of pending prior application Ser. No. 09/120,700, filed on Jul. 22, 1998, for "INTERCONNECTING A SYNCHRONOUS SWITCHING NETWORK THAT UTILIZES A COMMON TIME REFERENCE WITH AN SYNCHRONOUS SWITCHING NETWORK," and further claims priority of provisional application Ser. No. 60/235,765, filed on Sep. 27, 2000, for "SWITCHING, GROOMING, AND DEGROOMING METHODS AND LINK TRANSMISSION CONTROL WITH COMMON TIME REFERENCE," and of provisional application Ser. No. 60/261,133, filed on Jan. 10, 2001, for "SWITCHING METHODS WITH COMMON TIME REFERENCE AND PLURALITY OF TIME FRAME DURATIONS."

FEDERALLY SPONSORED RESEARCH OR DEVELOPMENT

Not Applicable.

BACKGROUND OF THE INVENTION

This invention relates generally to a method and apparatus for switching and grooming data units in a communications network in a timely manner while providing low switching complexity and performance guarantees, over a plurality of communications links with a plurality of transmission rates.

Circuit-switching networks are still the main carrier for real-time traffic, are designed for telephony service, and cannot be easily enhanced to support multiple services and carry multimedia traffic in their native packet formats. Circuit-switching is based on extremely accurate clock frequencies needed for byte-by-byte switching. This enables circuit-switching networks to transport data streams at constant rates with a small delay jitter. Finally, the clock accuracy for SONET requires a heightened amount of accuracy as line transmission speed increases.

Due to the statistical multiplexing of packet streams, packet switching networks handle bursty data more efficiently than do circuit-switching networks. However, current packet switches and routers operate asynchronously, and only provide "best effort" service in which end-to-end delay and jitter can be neither guaranteed nor bounded. Furthermore, statistical variations of traffic intensity in packet switching networks often lead to congestion that results in excessive delays and loss of packets, thereby significantly reducing the fidelity of real-time streams at their respective points of reception. Finally, since current packet switches and routers electronically process the header of each packet to be routed and switched, a high processing power is required and the scalability of the packet switching network is limited.

In circuit switches routing is time-based. A time period, called frame, is divided into very small slices of time, called slots, that contain only one byte of information. The absolute position of each time slice within each time period determines where its respective byte is routed.

Time-driven switching/routing, in accordance with some aspects of the present invention, supports more sophisticated and flexible timing than circuit switching. Consequently, time-driven switching provides better support of video-based multimedia applications. In accordance with the present invention, the size of time frames used for time-driven switching is larger than the size of time slots used in circuit switching; consequently, time-driven switching is far less complicated than circuit switching. In accordance with the present invention, time-driven routing is based on control information included in at least one of the headers and trailers of selected ones of the time frames, which current circuit switching cannot provide for.

In accordance with the present invention, time-driven switching/routing uses a Common Time Reference (CTR). The CTR, though used in time-driven switching, is not used in circuit switching. The above discrepancy between time-driven switching and circuit switching has far reaching implications during comparison of the two. For example, use of a CTR in a network deterministically ensures that time frames as defined by different nodes do not slip, thus enabling the deterministic pipeline forwarding of time frames. The above assurances of a CTR exist in contrast to the properties of a circuit switching network, where (1) there are time slot slips, and (2) deterministic pipeline forwarding is not possible.

In U.S. Pat No. 5,418,779 Yemini et al. disclose a switched network architecture that uses time. Time is used in order to determine when a plurality of switches can transmit over a predefined routing tree to one destination. This kind of tree is known as "sink" tree since the destination switch functions as a "sink" for the transmission from all switches. The time interval in which the plurality of switches transmits to a selected "sink" destination switch is called time band. In different time bands the plurality of switches are transmitting to a different single "sink" destination switch. Network switches change their configuration between time bands in order to build the proper "sink" tree during each time band. The present invention does use neither "sink" trees nor time bands for transmission over "sink" trees.

Yemini's invention may not be realizable in communications networks with end-to-end propagation delays that are not much smaller than the time band durations. In general, in Yemini's invention the end-to-end propagation delays introduce a non-trivial scheduling problem that may or may not have a solution. Furthermore, Yemini's invention does not discuss or specify how to take into consideration the link propagation delays and the end-to-end propagation delays. Consequently, general topology switched network cannot be built the way it is taught by Yemini's et al. invention.

Yemini's invention has another problem, which is congestion, that is the direct result of using "sink" trees. Data units received from different upstream switches contend for a single outgoing link towards the root of the "sink" tree. The present invention does not have any congestion. This is a direct consequence of using in the current invention completely different system operation principles and methods.

For example, in Yemini's et al. patent there is no pipeline forwarding: data units do not proceed in a lock-step fashion through the communications network, as it is the case in the present invention. The lack of pipeline forwarding leads to the above mentioned scheduling and congestion problems. Such problems are due to the fact that incoming time bands of Yemini's invention are not aligned in different input ports of the network's switches. Furthermore, it was not specified what are the temporal relationship of the same and different time bands on different "sink" tree switches when the link propagation delay and the end-to-end propagation delay are not zero. In contrast, time frames in the present invention are aligned with a Common Time Reference (CTR) on every switch.

Optical data communications using a single wavelength consist of the transduction of a single data stream into a series of pulses of light that are carried over an optical fiber. These pulses of light are of a single wavelength. Use of a single wavelength vastly under-utilizes the capacity of an optical fiber, which is capable of carrying a large number of signals each at a unique wavelength. Due to the nature of propagation of light signals, an optical fiber can carry multiple wavelengths simultaneously. The process of carrying multiple discrete signals via separate wavelengths of light on the same optical fiber is known in the art as wavelength division multiplexing (WDM). Many optical components, including, but not limited to, WDM multiplexers, WDM de-multiplexers, star couplers, tunable lasers, filters, waveguide grating routers (WGRs) are deployed in optical networks featuring WDM, and consequently used in the embodiments presented in this disclosure. [T. E. Stern and K. Bala, "Multiwavelength Optical Networks: a Layered Approach," Prentice Hall PTR, Upper Saddle River, N.J., USA, ISBN 020130967X. R. Ramaswami and K. N. Sivarajan, "Optical Networks: a Practical Perspective," Morgan Kaufmann Publishers, San Francisco, Calif., USA, ISBN 1-55860-445-6. H. J. R. Dutton, "Understanding Optical Communications," Prentice Hall PTR, Upper Saddle River, N.J., USA, ISBN 0-13-020141-3].

The present invention contains the novel combination of: (1) time-based switching and routing and (2) WDM technology. WDM includes the capabilities for (1) dynamic tunable wavelength transmission, (2) dynamic and static wavelength switching, and (3) tunable wavelength reception.

The increasing demand for communications capacity has led to general deployment of Wavelength Division Multiplexing (WDM), which requires extremely high capacity switches. Lambda or static wavelength switches address this need for extremely high switching capacity by switching a whole wavelength from an input optical fiber link to an output optical fiber link without requiring any processing of the transmitted data units. In accordance with the present invention, WDM with whole lambda_switching will be deployed in the network's optical core. However, switching of whole lambdas (e.g., lambdas of OC-192) is inefficient and costly because of three inherent problems it causes:

1. N square problem: the number of lambdas needed to accommodate all the possible connections among all access points is on the order of the square of the number of such access points. This will limit the size of the optical core.
2. Bandwidth mismatch problem: there is a substantial bandwidth mismatch when extremely high capacity backbone networks feed low capacity access links. As data leaves the core and is moved by packet switches towards the edge, buffers at access links frequently become congested, causing increased delays and dropped packets.
3. Traffic unbalancing problem: the traffic load across the network is not evenly distributed, i.e., it is not balanced. Thus, trying to satisfy the traffic load requirements using whole lambda_switching remains both inflexible and inefficient.

Adding the capability of switching_fractions of lambdas, or Fractional Lambda Pipes (FLPs), solves the above three problems. This approach, also called Fractional Lambda Switching (FLSw), will permit the optical core to be extended far closer to the network edges while reaching the lower speed network access devices with a bandwidth that matches their operation capability.

FLSw dynamically switches lambda fractions while carrying data units (e.g., IP data packets, and SONET STS1 frames), in a heterogeneous (mix of very high speed and very low speed links) meshed network, while providing deterministic performance guarantees. The size of fractional lambda pipes can be dynamically allocated to satisfy the specific needs of the access networks to which a fractional lambda pipe is connected. Small capacity FLPs can be used at the periphery to access low speed sub-networks, such as, cable modems, TDSL, VoIP gateways and wireless.

Fractional Lambda Switching (FLSw) combines the advantages of circuit switching and packet switching. FLSw is used for constructing a Fractional Lambda Pipe (FLP). A FLP is equivalent to a leased line in circuit switching. A FLP is realized by two simple elements:
1. A Common Time Reference (CTR™) throughout the network that is globally aligned with Coordinated Universal Time (UTC); and
2. Pipeline Forwarding (PF™) of time frames (logical containers of data packets) across FLPs.

The CTR is a reference clock used to realize pipeline forwarding of time frames, both within switches and across FLPs. The CTR™ is received via either the Global Positioning System (GPS), which is globally available at a low cost with an accuracy of 10–20 nanoseconds, or any other UTC (Coordinated Universal Time) distribution system such as the GLONASS (Russia) and, in the future, Galileo (Europe).

The common time reference or more specifically, the UTC second, is partitioned into time frames. The duration of a time frame is a link parameter—fast links might use shorter time frames, while slow links might use longer time frames. Contiguous time frames are grouped into time cycles, and contiguous time cycles are grouped together into contiguous super cycles. The duration of a super cycle is one UTC second, as shown in FIG. 2, and both the duration of time frames and the number of time frames in a cycle can be chosen for convenience. For example, a 1 Gb/s link might use time cycles of 100 time frames, each time frame having a duration of 125 µs; while a 10 Gb/s link might use time cycles of 1000 time frames, each time frame having a duration of 12.5 microseconds. For both links, each time frame will carry the same 15,625-byte payload, and there will be 80 time cycles in each super cycle or one UTC second, as shown in FIG. 2.

The common time reference can be realized by using UTC (Coordinated Universal Time), which is globally available via, for example GPS (Global Positioning System). By international agreement, UTC is the same all over the world. UTC is the scientific name for what is commonly called GMT (Greenwich Mean Time), the time at the 0 (root) line of longitude at Greenwich, England. In 1967, an international agreement established the length of a second as the duration of 9,192,631,770 oscillations of the cesium atom. The adoption of the atomic second led to the coordination of clocks around the world and the establishment of UTC in 1972. The Time and Frequency Division of the National Institute of Standards and Technologies (NIST) is responsible for coordinating UTC with the International Bureau of Weights and Measures (BIPM) in Paris.

FIG. 3 shows an example of the pipeline forwarding of time frames—i.e., the data units transmitted and received during a time frame—, for a FLP™, through switches A, B, and C. The path through switches A, B, and C has been previously scheduled and no header processing is necessary once data units enter the FLP. The link between Switch A and B has a propagation delay of four time frames, i.e., data units transmitted by Switch A during time frame 1 take until time frame 5 (time frames 2 through 5) to reach the other end of the link between Switch A and Switch B. The data units are automatically switched to the proper output port of Switch B and then forwarded to Switch C during time frame 6, arriving at Switch C after three additional time frames (time frames 7 through 9). All data units are guaranteed to arrive at the end of their FLP at the same predetermined rate at which they entered the FLP.

Each FLP's switching schedule is simple, and repeats every time cycle and/or super cycle. Thus, FLPs, together with the predictability provided by the CTR and pipeline forwarding, eliminate the complexity of data packet header processing. Each FLP™ transports data packets of one protocol, such as IP, MPLS, ATM, FR, or FC. However, different FLPs may carry data units of different protocols, i.e., data units of different protocols can travel across a selected link.

Fractional lambda switches have significantly lower complexity than both packet switches and circuit switches with comparable switching capability for the following reasons:
1. Minimum switch fabric complexity is implemented using a Banyan network, which has the complexity of $a.N.lg_a N$ switching elements, where N is the total number of optical channels and 'a' is the size (number of inputs/outputs) of each switching element.
2. Optimal speed-up of the switch fabric that operates at the same speed as the optical channels (e.g., 10 Gb/s with OC-192 links).
3. Optimal memory access bandwidth is equal to the optical channel bandwidth—the switch architecture enables that, with only 3 input queues, a queue is never used for reading and writing at the same time, i.e., memory access with a speedup of 1.
4. (Very) small input memory for each optical channel (e.g., a 10 Gb/s channel requires 3 input queues with a total of 48 Kbytes of memory) and no buffering at the output port are needed.
5. (Very) simple control of the switch fabric suffices, since its configuration changes at a relatively low frequency (e.g., 80,000 times per second) and it is known in advance. This operation complexity is comparable to that of a T1 multiplexer.

Though highly efficient, a Banyan Network is subject to what is known as switch blocking: it may be impossible to connect an idle input with an idle output because a switching element is not available on the path between input and output. An interesting attribute of fractional lambda switching is the nearly complete elimination of blocking through Banyan-based switches.

Advances in optical transport have led to the realization of high-speed optical channels (e.g., OC-192 at 10 Gb/s); however, a single source transmitting to a single destination will not utilize the capacity of such channels. In accordance with the present invention, the following two basic requirements have been formed to enable the full utilization of such high capacity channels: (i) Grooming and degrooming: the need to aggregate (i.e., grooming) traffic from multiple sources into one optical channel and to separate (i.e., degrooming) an optical channel traffic to different destinations; (ii) Dynamic optical switching: the need to route portions from one optical channel (i.e., a lambda or a wavelength) on different optical paths to different destinations.

Dynamic all-optical switching is appealing for a number of reasons, stemming from the transparency of the transported data stream to the switching system itself; such reasons being: (i) intrinsically protocol independent (multi-protocol) transport; (ii) high scalability, since the transmission rate of each optical channel is transparent to the optical switching system; and (iii) no processing performed on switched data units, thus eliminating processing bottlenecks. Dynamic all-optical switching is possible when the optical switch reconfiguration time is significantly smaller than the time between two successive switch configuration changes.

The latest advances in optical switching have resulted in decreasing reconfiguration times of optical switch fabrics. However, taking full advantage of such advances for dynamic optical switching is not obvious, for several reasons: (i) Processing of in band control information, e.g., packet headers, is not possible; (ii) Dynamic optical storage is not available to assist in coping with output port contention and switch control and reconfiguration time; (iii) Optical switch reconfiguration time should be significantly smaller than the time between two successive reconfigurations.

Due to the above limitations it is not possible to realize an asynchronous packet switching system, and therefore, using time is necessary. However, time-based techniques deployed in circuit switching (e.g., SONET, based on byte switching, i.e., byte de-multiplexing and byte multiplexing) are not applicable to all-optical switches.

The most comprehensive solution to the above-mentioned problems is use of a common time reference (CTR™) for pipeline forwarding (PF™) in order to facilitate dynamic all-optical switching. CTR™ provides the synchronization needed to orchestrate the control of network switches while eliminating the need for optical storage and processing.

Dynamic All-optical Switching of Time Frames

Time is divided into time frames and any time frame of a sequence of incoming time frames over one optical channel can be optically switched to any outgoing optical channel. Such time frame switching is the basis of fractional lambda switching (FLSw). FLSw is used for constructing Fractional lambda pipes (FLPs), i.e., fractions of a wavelength. Each FLP™ transports data units of one protocol—such as, IP, MPLS, ATM, FR, FC, and SONET frames (e.g., STS1 frame)—, thereby realizing the desired protocol independent property of all-optical switching.

An all-optical switch realizes PF™ in two operational phases. Data units belonging to a whole time frame received from each of the optical channels during the first phase, Phase 1, are switched through the switch in the second phase, Phase 2. In a possible embodiment, if Phase 1 begins in time frame t, Phase 2 takes place in time frame t+1. In another embodiment, if Phase 1 ends in time frame t, Phase 2 takes place in time frame t+1. The 2 phase operation ensures that data units received from the various optical channels are aligned with the CTR before being switched. Phase 2 can be performed during either the time frame immediately following Phase 1, during time frame t+1— immediate forwarding operation, or at a later time frame— non-immediate forwarding operation.

Alignment involves aligning the beginning and end of each time frame from each optical channel with the beginning and end of the CTR™ time frames. Alignment can be performed either independently on each one of the channels carried by an optical link, or collectively on all of the channels carried by an optical link.

Alignment is needed because the propagation delay on optical links between switches is not an integer multiple of time frames. An optical alignment subsystem is part of the all-optical fractional lambda switch, operates on all the wavelengths carried by each optical fiber, and contributes to the realization of Phase 1 of the PF™. The optical alignment subsystem is based on a programmable optical delay line guaranteeing that the overall delay experienced through the optical fiber and the delay line is an integer number of time frames. Data units leave the switch at the transmitting end of a selected optical fiber aligned with the CTR™. When they arrive at the output of the optical alignment subsystem at the receiving end of the selected optical fiber, they are still aligned with the CTR™. The alignment system is comprised of a controller that detects time frame delimiters and adjusts the delay by using a programmable optical delay line (note: the alignment changes only when the propagation delay on the optical link changes).

The availability of a common time reference (CTR™) on a global scale for all network nodes enables the implementation of dynamic optical switches with a simple architecture. This architecture is used to realize fractional lambda switching (FLSw). FLSw is based on a common time reference (CTR™) for pipeline forwarding (PF™) of time frames. In FLSw, the synchronization provided by the CTR is leveraged to orchestrate the operation of subsystems within a switch and across the whole network.

SUMMARY OF THE INVENTION

Some aspects of the present invention utilize an alignment feature within an input port for aligning incoming data units to a time frame boundary prior to the entry to a switch fabric. In a possible embodiment the alignment feature is designed using electrical components, such as random access memory (RAM) and digital circuitry. In another embodiment the alignment feature is designed using optical components, such as optical delay lines.

According to one aspect of the invention disclosed herein, the switching method can be applied to the switching of data units between optical channels wherein the time frame duration on one optical channel is different from the time frame duration on the other optical channels. Moreover, the switching method can be applied to the switching of data units between optical channels wherein capacity of one optical channel is different from the capacity of the other optical channels.

Advances in optical transport have lead to the realization of ever larger optical channels (40 Gb/s trials are being conducted) whose capacity is utilized by many traffic sources. The increasing amount of optical channel capacity has resulted in the need for the following: (i) grooming—the aggregation of traffic from a large number of sources into one optical channel; (ii) degrooming—the separation of traffic from one optical channel to many different destinations.

For example, when considering a 10 Gb/s high-speed optical channel and a 1 Mb/s "high-speed" residential access, such as the one provided through TDSL services, the traffic from 10,000 such accesses will be groomed in order to fill up a single optical channel. This creates the demand for a large amount of grooming and degrooming equipment with high interface density and low cost per interface.

Grooming of data units from a large number of low speed sources to fin up a high capacity optical channel is a major challenge for network designers. Grooming and degrooming of optical channels cannot be performed in the all-optical domain (i.e., it should be done electronically with either a packet-based or a time-based approach for multiplexing and demultiplexing).

This patent discloses that the availability of a common time reference (CTR™) enables the implementation of simple and scalable time-based grooming and degrooming equipment that will interface to various optical core networks.

In accordance with the present invention, the synchronization requirements are independent of the physical link transmission speed while in circuit switching the synchronization becomes more and more difficult as the link speed increases. In accordance with some aspects of the present invention routing is performed based on timing information; in accordance with some aspects of the present invention routing is to be additionally based on information contained in at least one of an header and a trailer of time frames.

A control mode is provided by the present invention where at least one time frame or a fraction of a time frame—called control time frame and control sub-time frame, respectively—comprises signal information to establish, maintain, and dis-establish (or destroy) a reserved traffic channel. The system decodes and is responsive to the control information in the time frame or time frame fraction. The switches of the present invention respond, when able, by at least one of establishing a reserved data channel, establishing a reserved transfer bandwidth, and reserving capacity for the traffic associated with the control information. Analogously, terminating control signals to each switch in a plurality of connected switches causes the switches of the present invention to respond by at least one of destroying, reallocating, and reclaiming the data transfer capacity or bandwidth that had been made available to the traffic channel.

A method is provided for coupling control information to each time frame. Such control information is used by coupled transmitting systems and receiving systems to identify at least one of: the boundaries of the time frames, the ordinal number of the time frame within the ordinal number of the time cycle within the super cycle. Deployment of this method enables the requirement on the accuracy of the common time reference to be relaxed which thereby increases the robustness and reliability of the switching systems operating responsive to the common time reference.

A system design and a method is provided for switching time frames using control information, such as a label, coupled with each time frame. In one aspect of the disclosed invention the label is contained within a header associated with each time frame. A method and system is provided for mapping a time frame onto the proper switching time and forwarding time, wherein the method for mapping is responsive to the control information, such as a label, coupled with the time frame, wherein switching and forwarding is responsive to the common time reference.

Coupling control information with each time frame enables an increase of reliability of the switching system and a reduction of accuracy requirement on the common time reference signal. In addition, one aspect of this invention comprises methods for providing protection switching by pre-allocating protection channels. In a possible embodiment, the protection channel is idle while the corresponding primary channel is carrying traffic. In an alternative embodiment, the protection channel carries the same traffic as the primary channel, while the latter is working properly. In another possible embodiment, the same protection channel is shared by a plurality of primary channels. In an alternative embodiment, a protection channel carries low priority traffic while the primary channel operates normally.

One aspect of the invention described in the present disclosure is a method and system for switching time frames using different time references in different switches. One aspect of the invention is a method for a switching system to derive the common time reference from neighboring switches in the event that the common time reference is not available through an external signal, such as the GPS. A method is also provided for enabling a plurality of switching systems to operate with the time reference generated by one of the switching systems called a reference node. The invention encompasses a method for electing the reference node in a distributed fashion.

The method for switching with different time references provides the switching systems with increased robustness and independence with regards to the availability of an external common time reference signal.

In accordance with some aspects of the present invention, a novel time frame switch fabric controller is provided which stores a predefined sequence of switch fabric configurations that are responsive to a high level controller coordinating multiple switching systems. The high level controller applies the stored predefined sequence of switch fabric configurations on a cyclical basis, having at least one of both simple periodicity and complex periodicity. The application of the stored predefined switch fabric configurations permits the switches of the present invention to relay data over predefined, scheduled, and/or reserved data channels sans the computational overhead of computing those schedules ad infinitum within each switch. This frees the switch computation unit to operate relatively autonomously so that it can handle new traffic reservation requests without changing the predefined switch fabric configurations at large, due to the fact that the switch computation unit provides for finding routes for such new requests by determining how to utilize unused switch bandwidth. The computational requirements of determining a small incremental change to a switch fabric are far less than the computational requirements when having to re-compute the entire switch fabric configuration. Moreover, the bookkeeping operations associated with the incremental changes are significantly less timeconsuming to track than tracking the entire state of the switch fabric as it changes over time.

A switching method is disclosed for designing multi-terabit SONET/SDH (Synchronous Optical NETwork/Synchronous Digital Hierarchy) switches. A method is provided for encapsulating SONET/SDH frames within time frames that are groomed, switched, and degroomed responsive to the common time reference. Transforming SONET/SDH frame switching into time frame switching provides for the scalability needed to design switches with aggregated switching capacity of multiple terabits/second.

Electronic components are one of the limiting factors in designing switching systems operating at very high switching rates. Optical components are independent of the bit rate of information carried by the optical signal upon which they operate. Thus, optical switch fabrics, optical filters, and waveguide grating routers enable the design of very high capacity switching systems. Components of the above listed types are changing from being static, i.e., their configuration can be changed on a long time scale, to dynamic wherein their configuration can be changed on a very short time scale.

When designing dynamic optical switching, an unresolved issue is the control of the switching configuration. Due to the lack of flexible and simple optical storage capability, optical packet switching—which provides a way of controlling the switching configuration responsive to the control information contained in the packet header—is impractical. Switching of time frames responsive to the common time reference provides a solution to the control of dynamic reconfigurable optical components.

Quickly tunable lasers are being implemented and are going to be commercially available in the near future. Switch designs based on tunable lasers and a method to control them responsive to the common time reference are disclosed in the present invention.

The present invention also discloses switch designs based on wavelength conversion and a method to control the wavelength conversion responsive to the common time reference. Optical components such as wavelength converters, tunable lasers, tunable receivers, tunable filters, passive star couplers, and passive waveguide grating routers are utilized in the disclosed designs.

Some of the disclosed embodiments are based exclusively on optical components (i.e., the disclosed systems are all-optical dynamic switching systems). The designs and methods disclosed in the present invention provide a unique path to prompt deployment and utilization of such dynamic optical components.

These and other aspects and attributes of the present invention will be discussed with reference to the following drawings and accompanying specification.

BRIEF DESCRIPTION OF THE DRAWINGS

FIG. 2A contains a timing diagram of a common time reference (CTR) that is aligned with the coordinated universal time (UTC) standard, as utilized by the present invention, wherein the CTR is divided into a plurality of contiguous periodic super cycles each comprised of 100 contiguous time cycles which are then each comprised of 800 contiguous time frames;

FIG. 2B contains a timing diagram of a common time reference (CTR) that is aligned with the coordinated universal time (UTC) standard, as utilized by the present invention, wherein the CTR is divided into a plurality of contiguous periodic super cycles each comprised of 100 contiguous time cycles which are then each comprised of 100 contiguous time frames;

FIG. 3 shows how data units within time frames are forwarded in a synchronized, or pipelined, manner responsive to UTC/CTR™;

Figure 11:
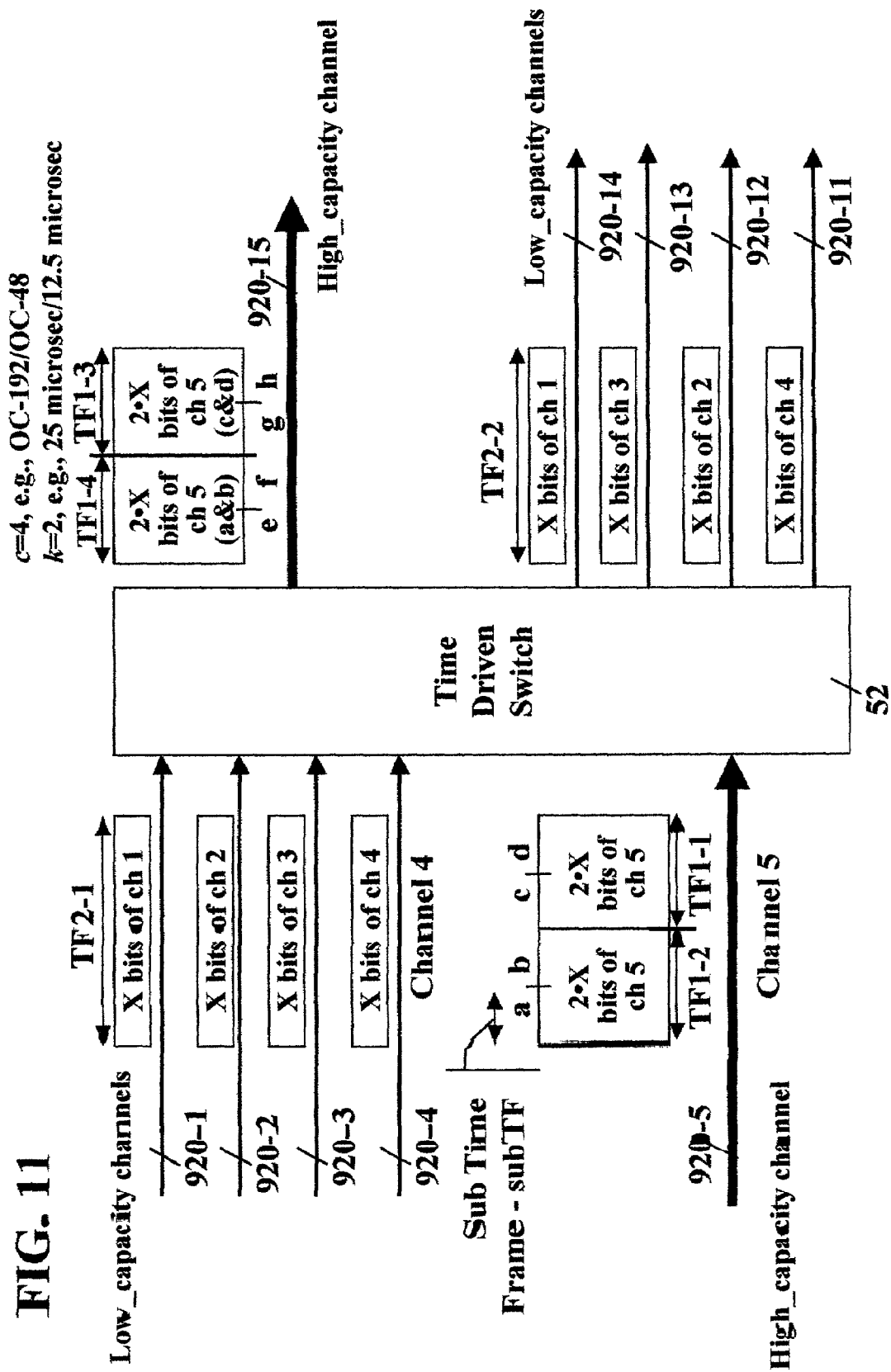
Figure 13:
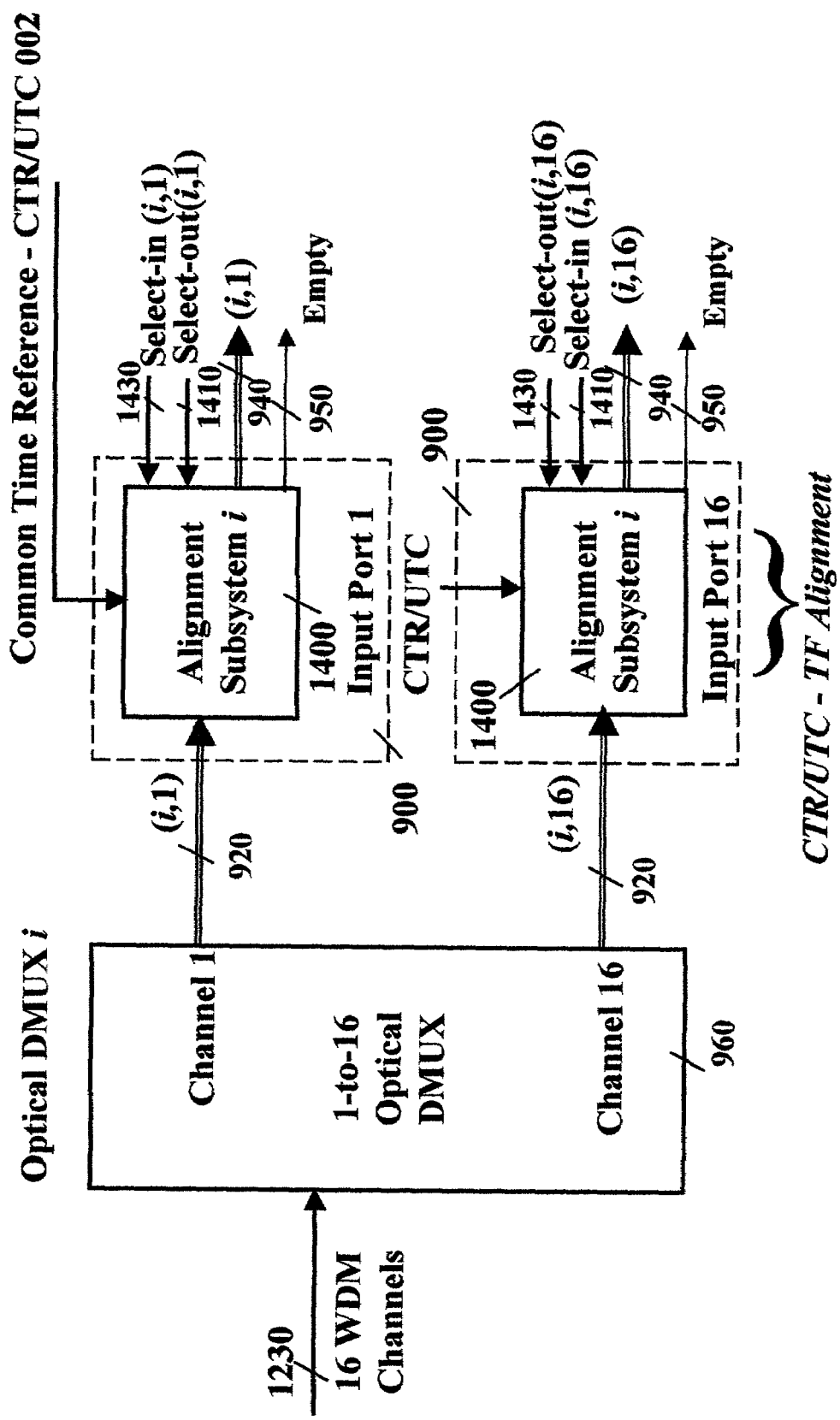
Figure 14:
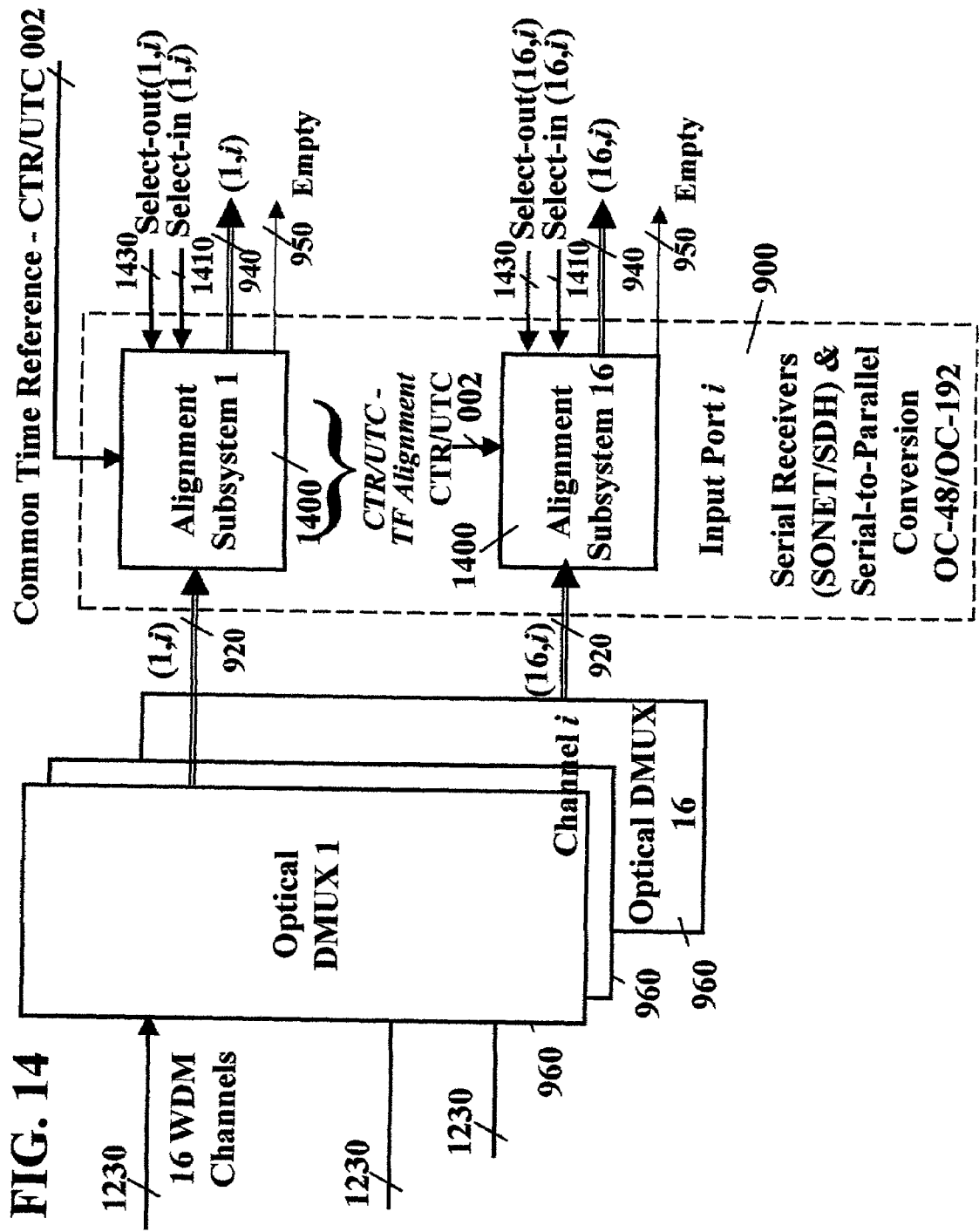
Figure 15:
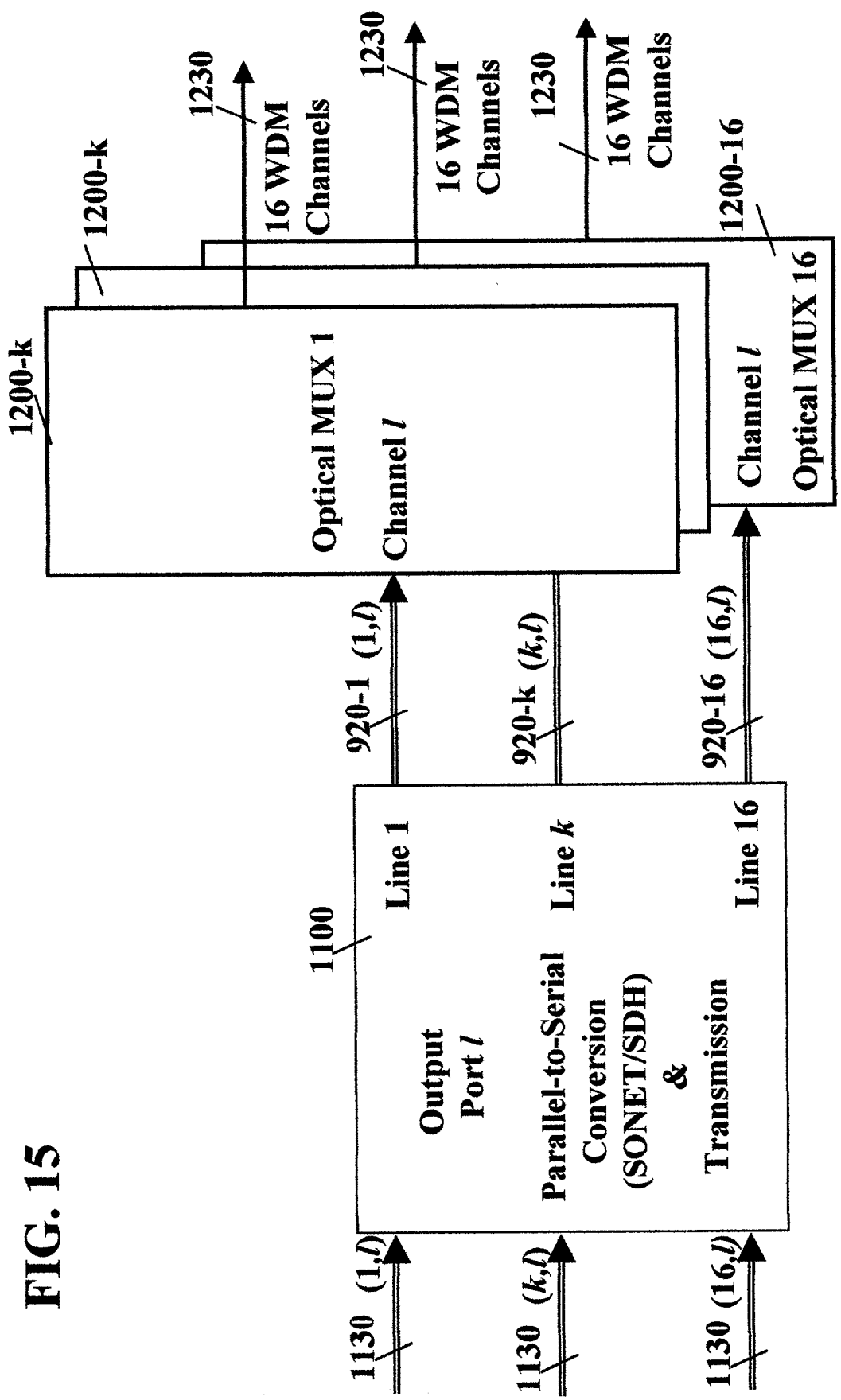
Figure 16:
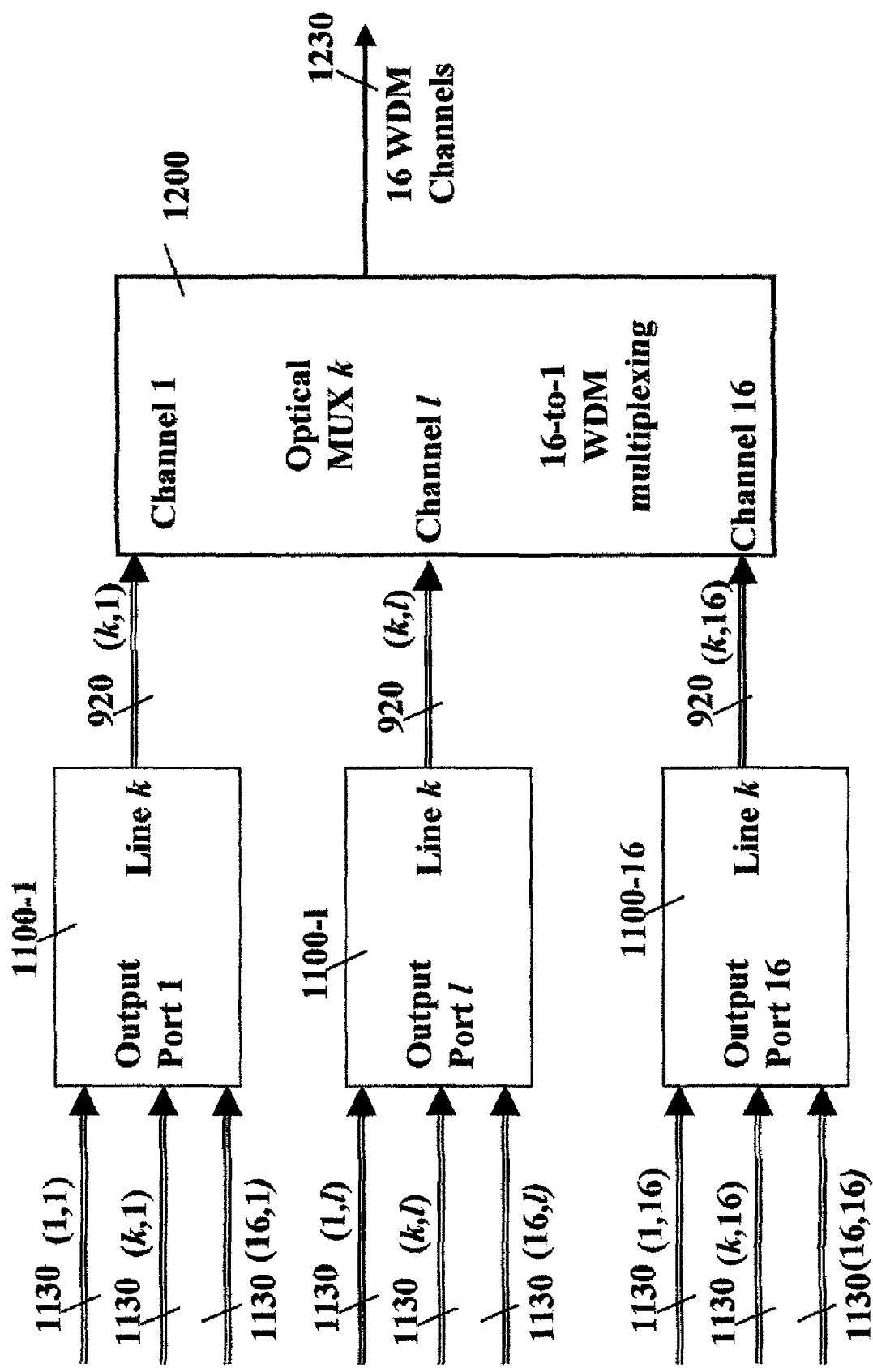
Figure 17:
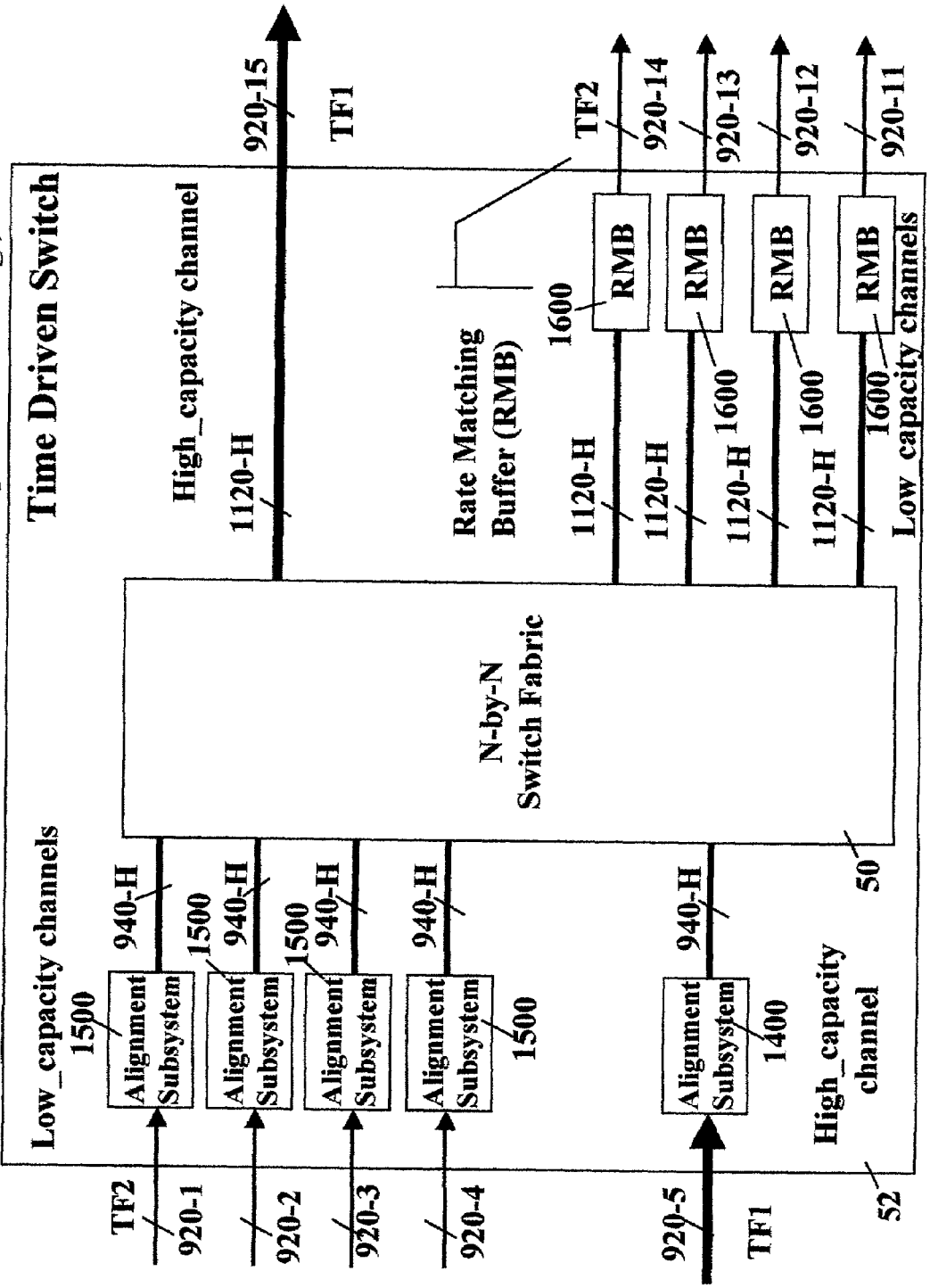
Figure 18:
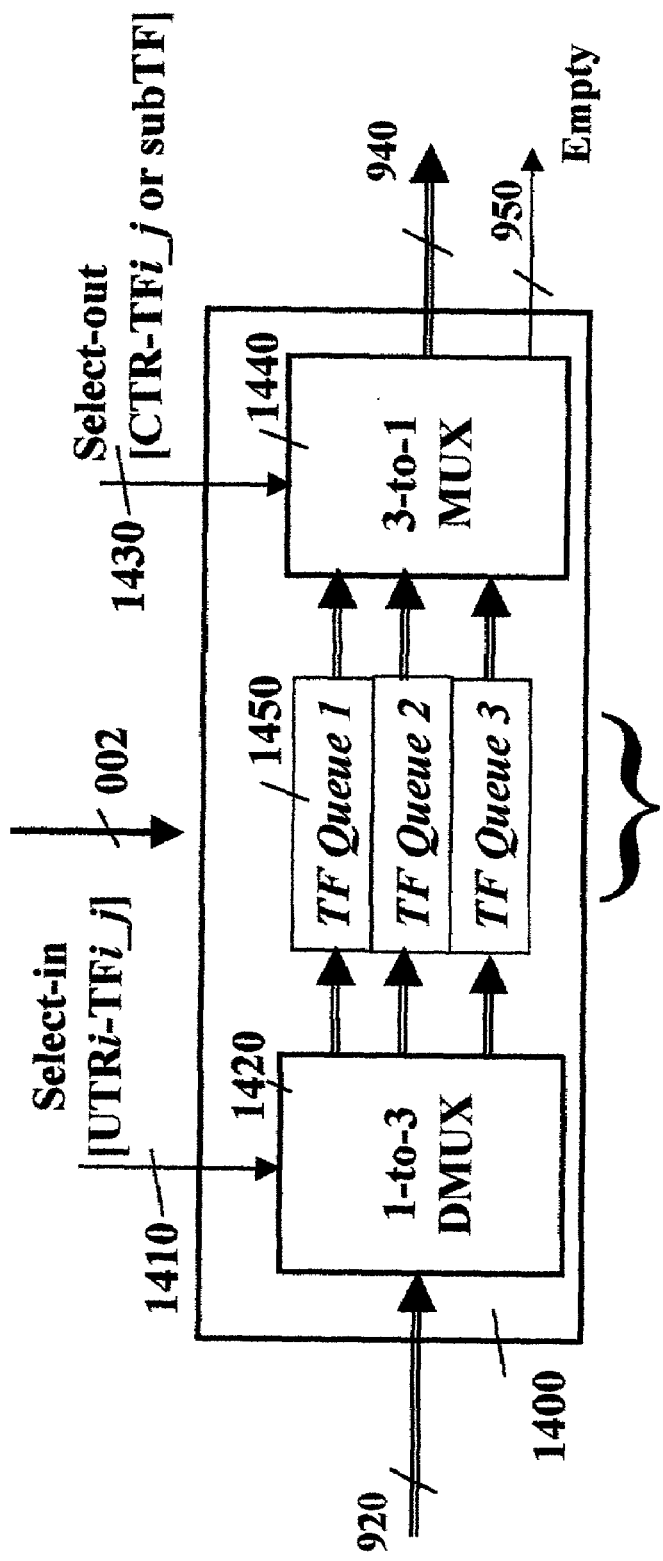
Figure 19:
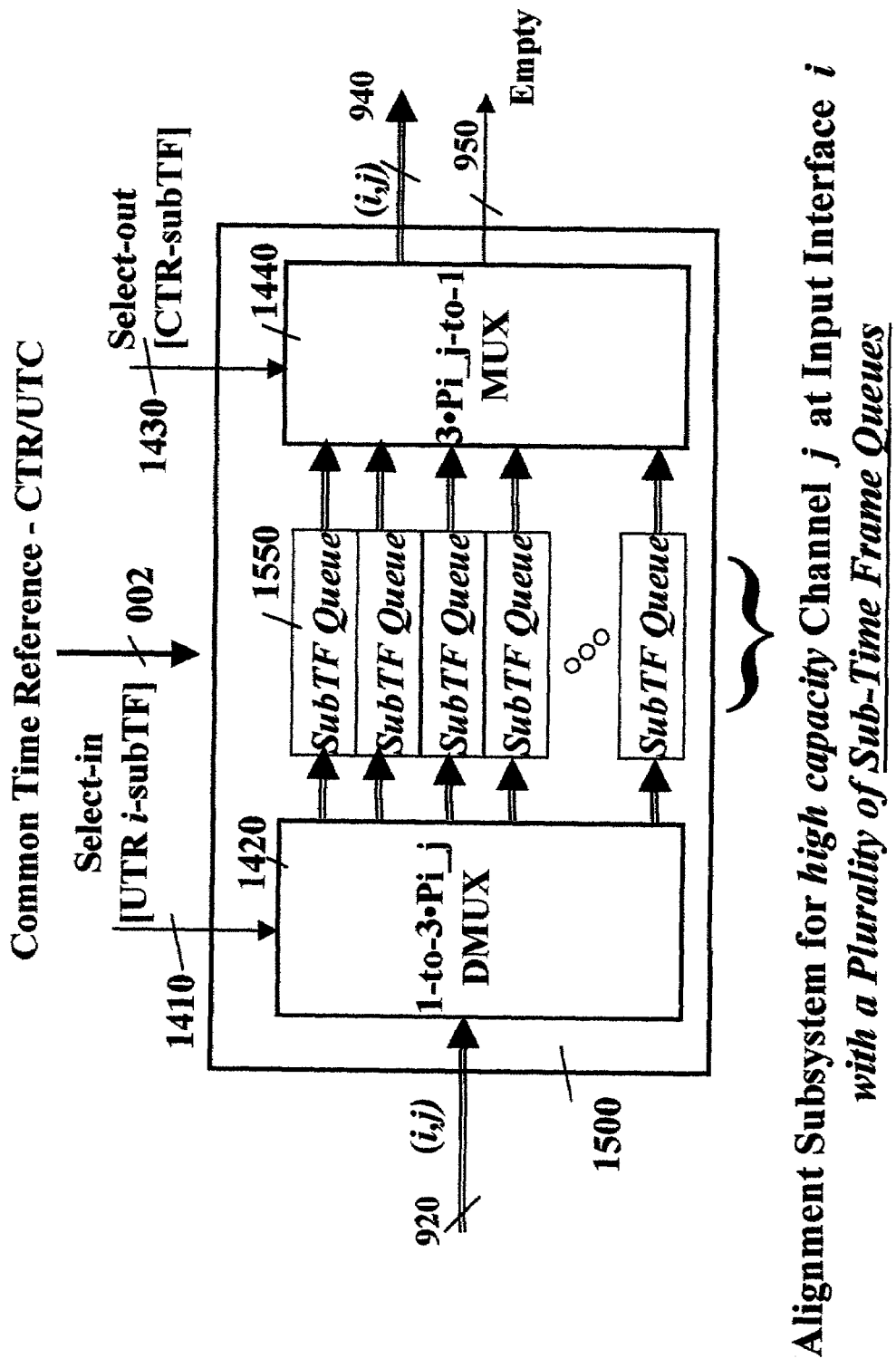
Figure 20:
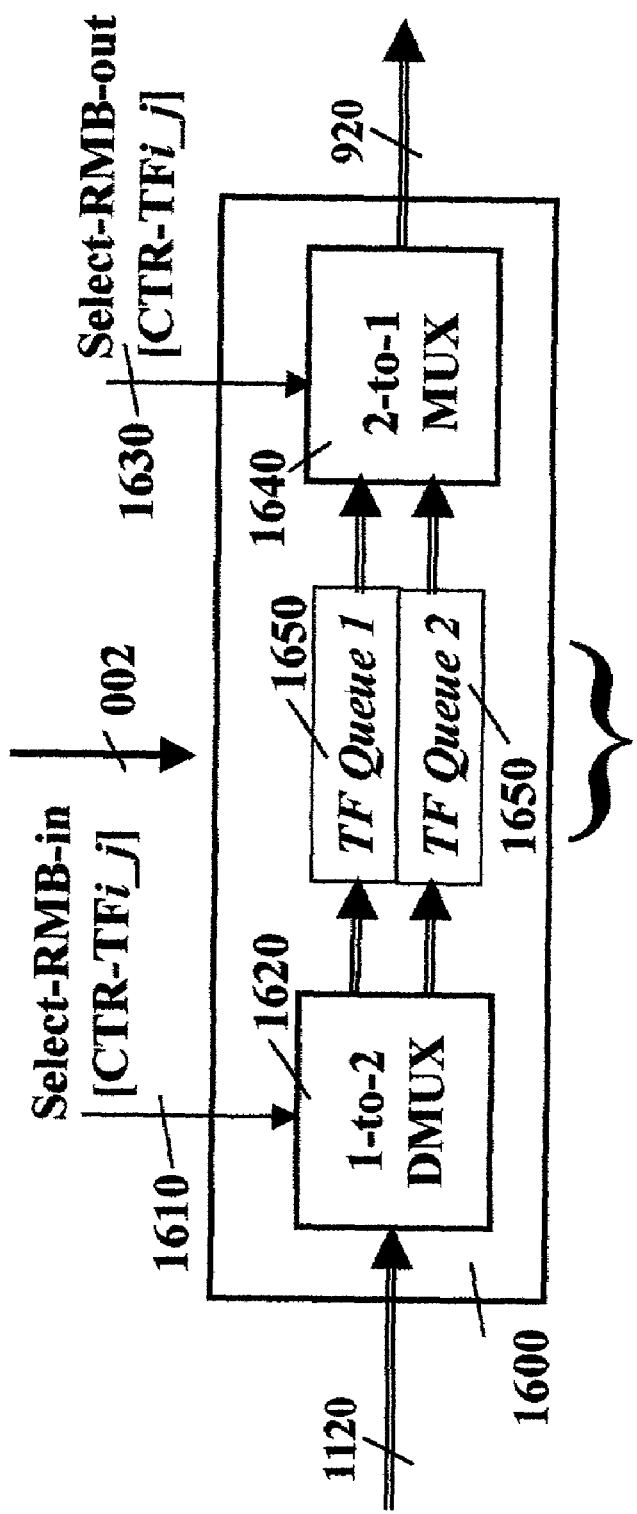
Figure 21:
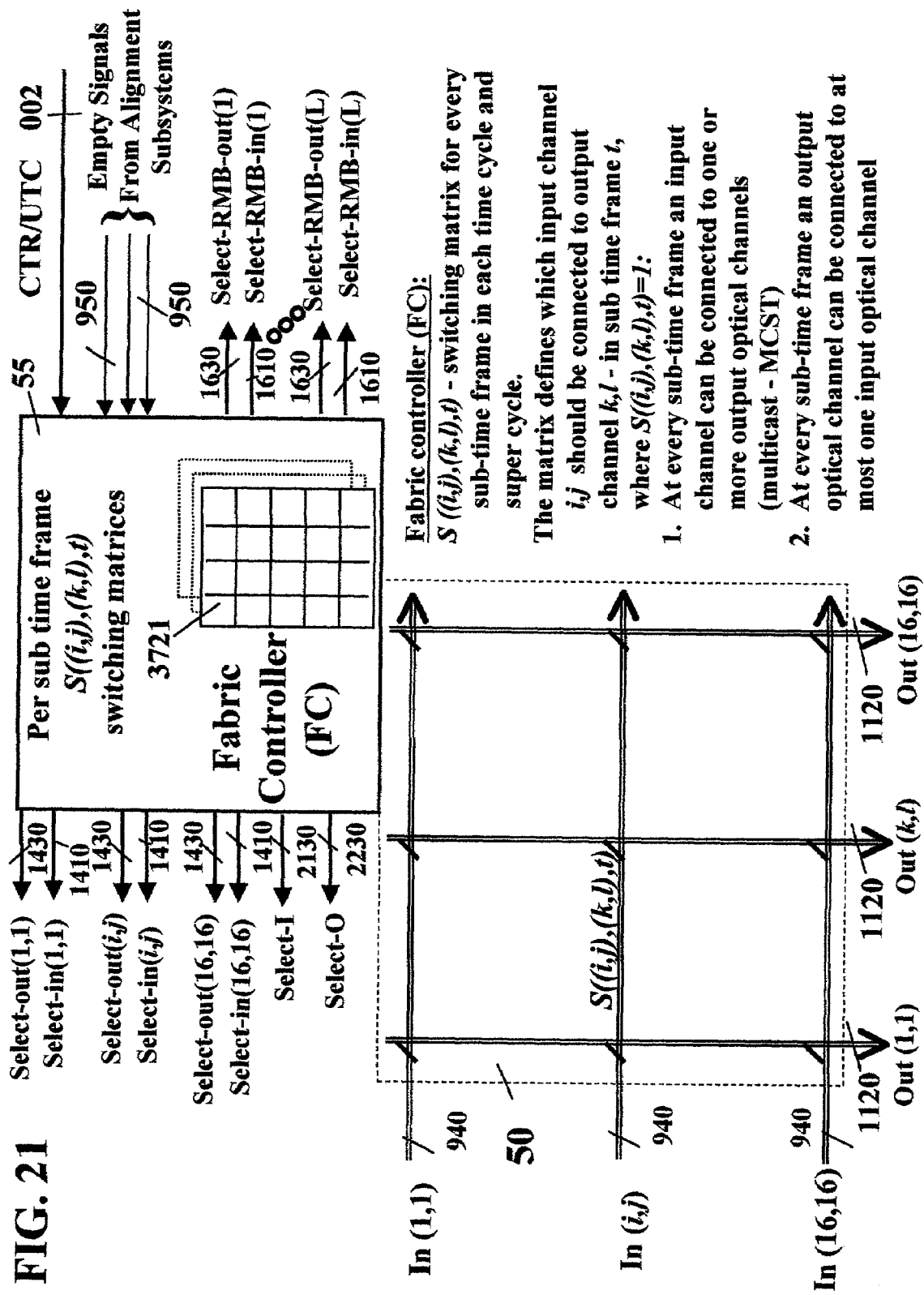
Figure 22:
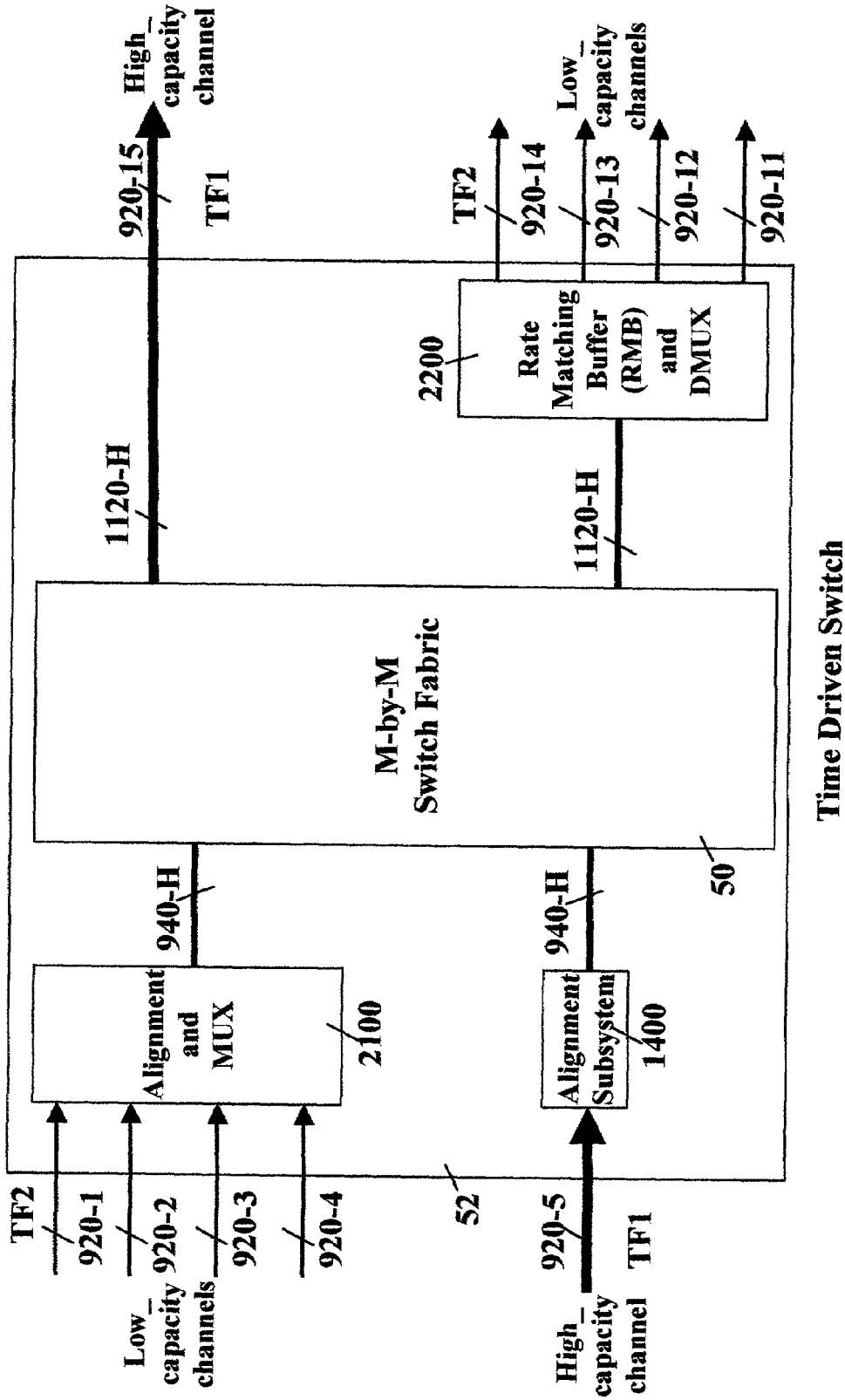
Figure 23:
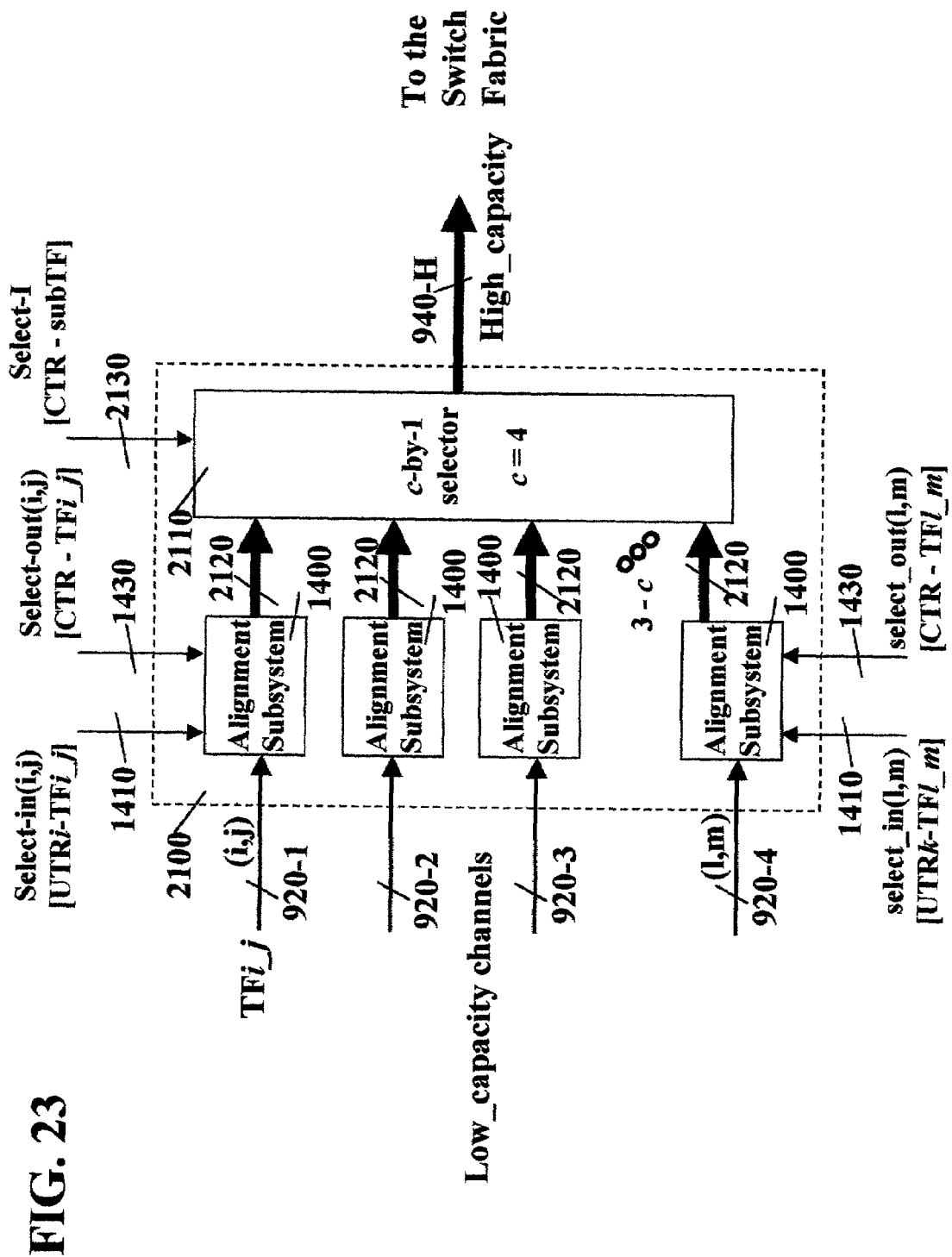
Figure 24:
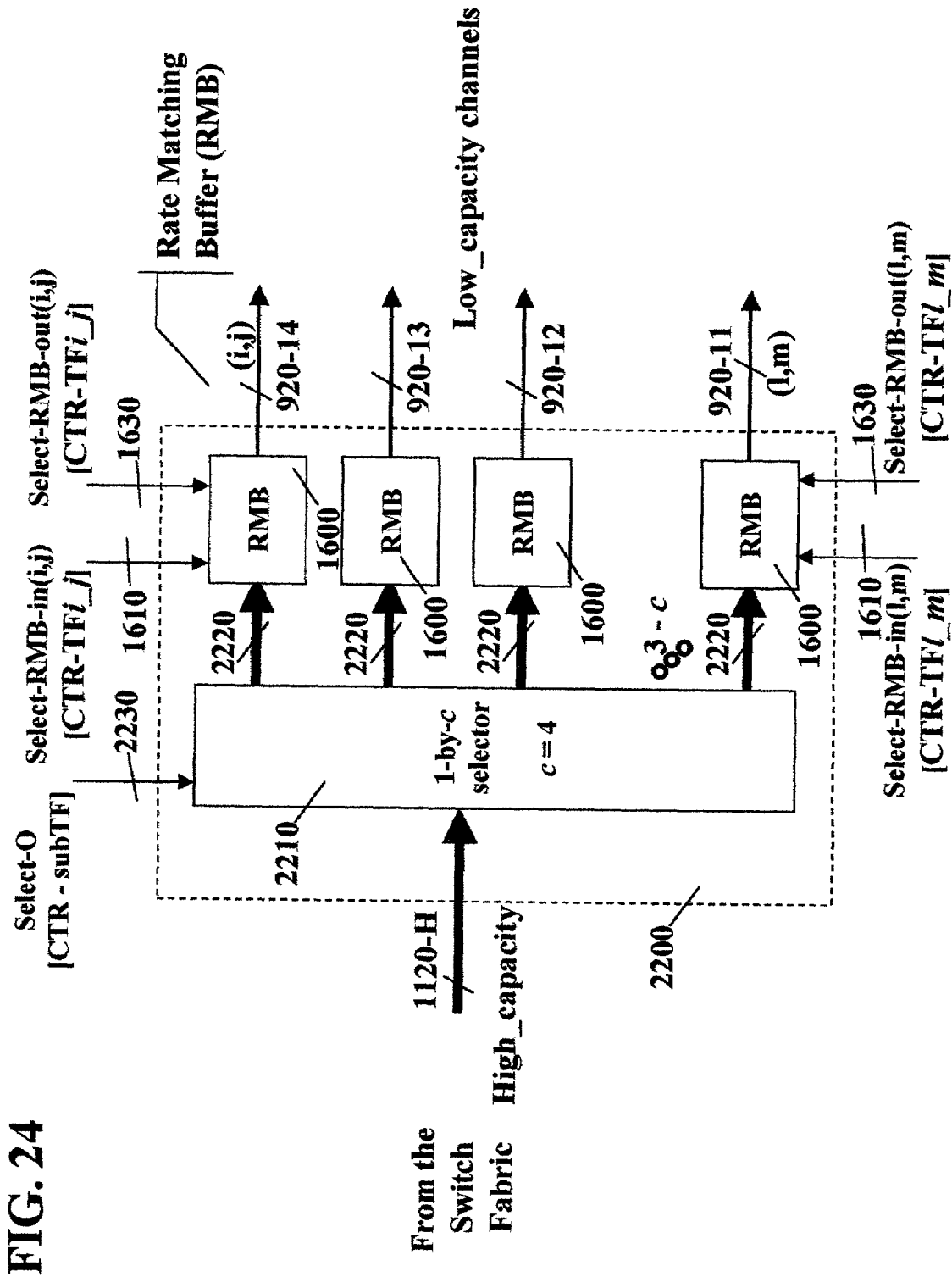
Figure 25:
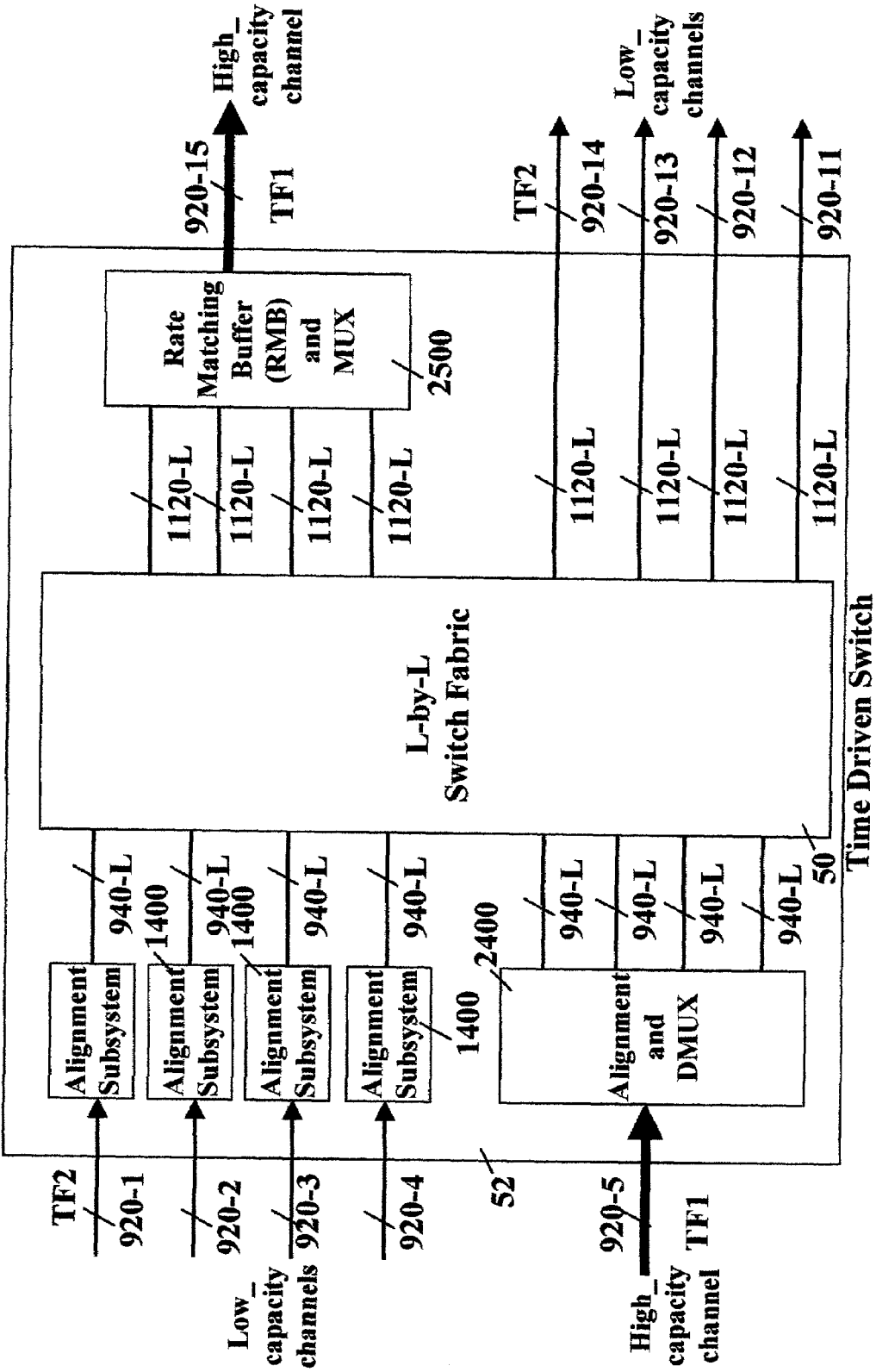
Figure 26:
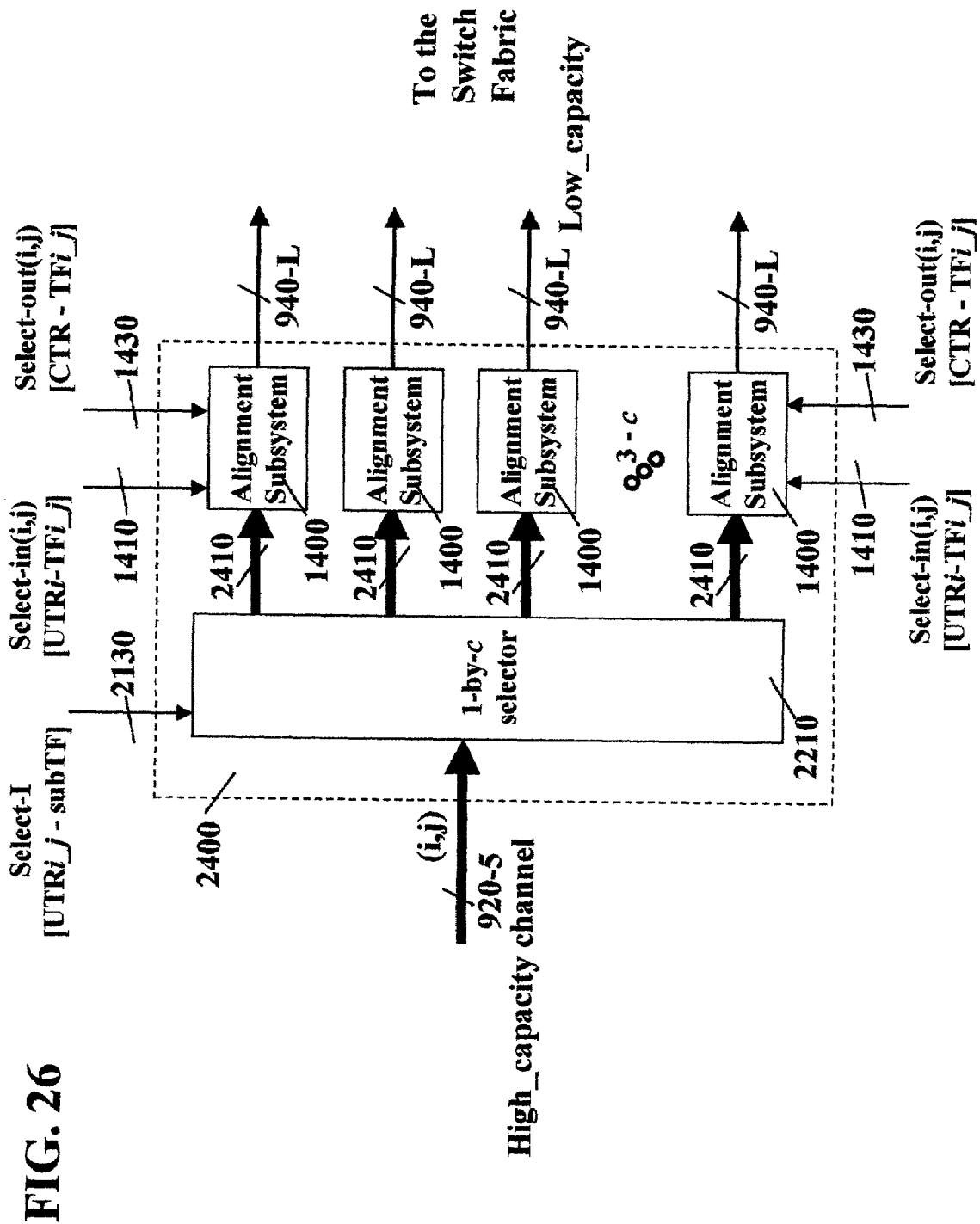
Figure 27:
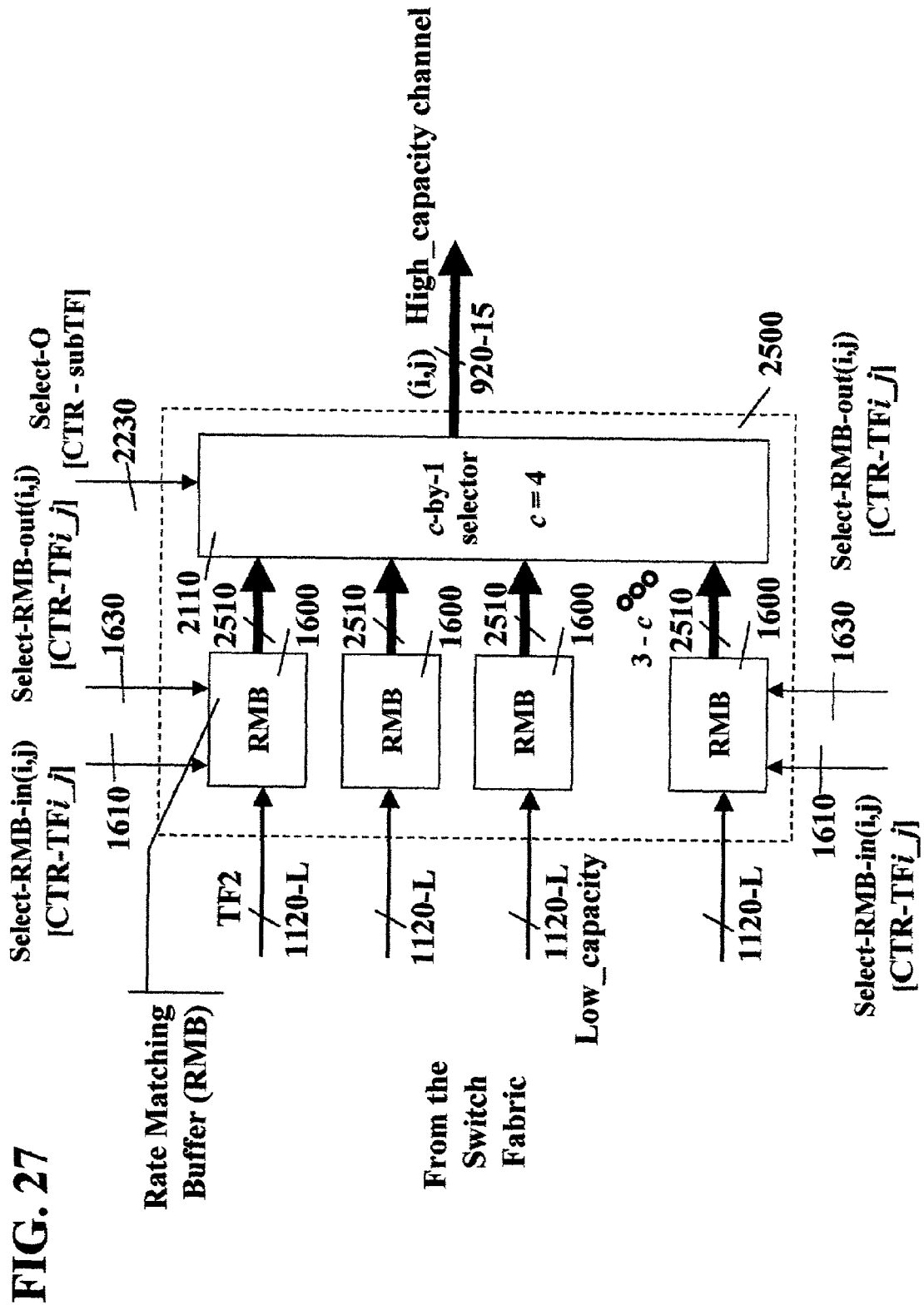
Figure 28:
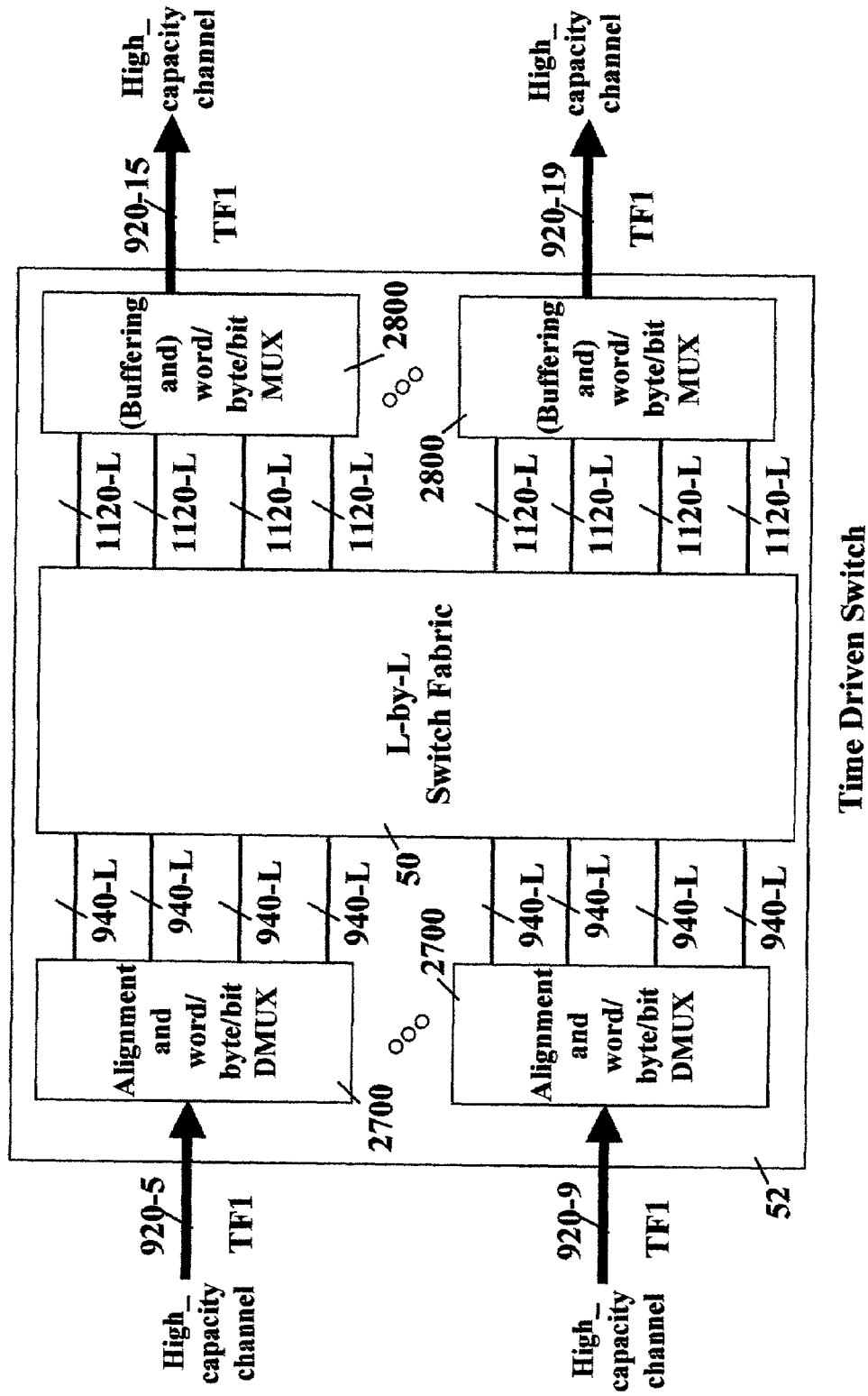
Figure 29:
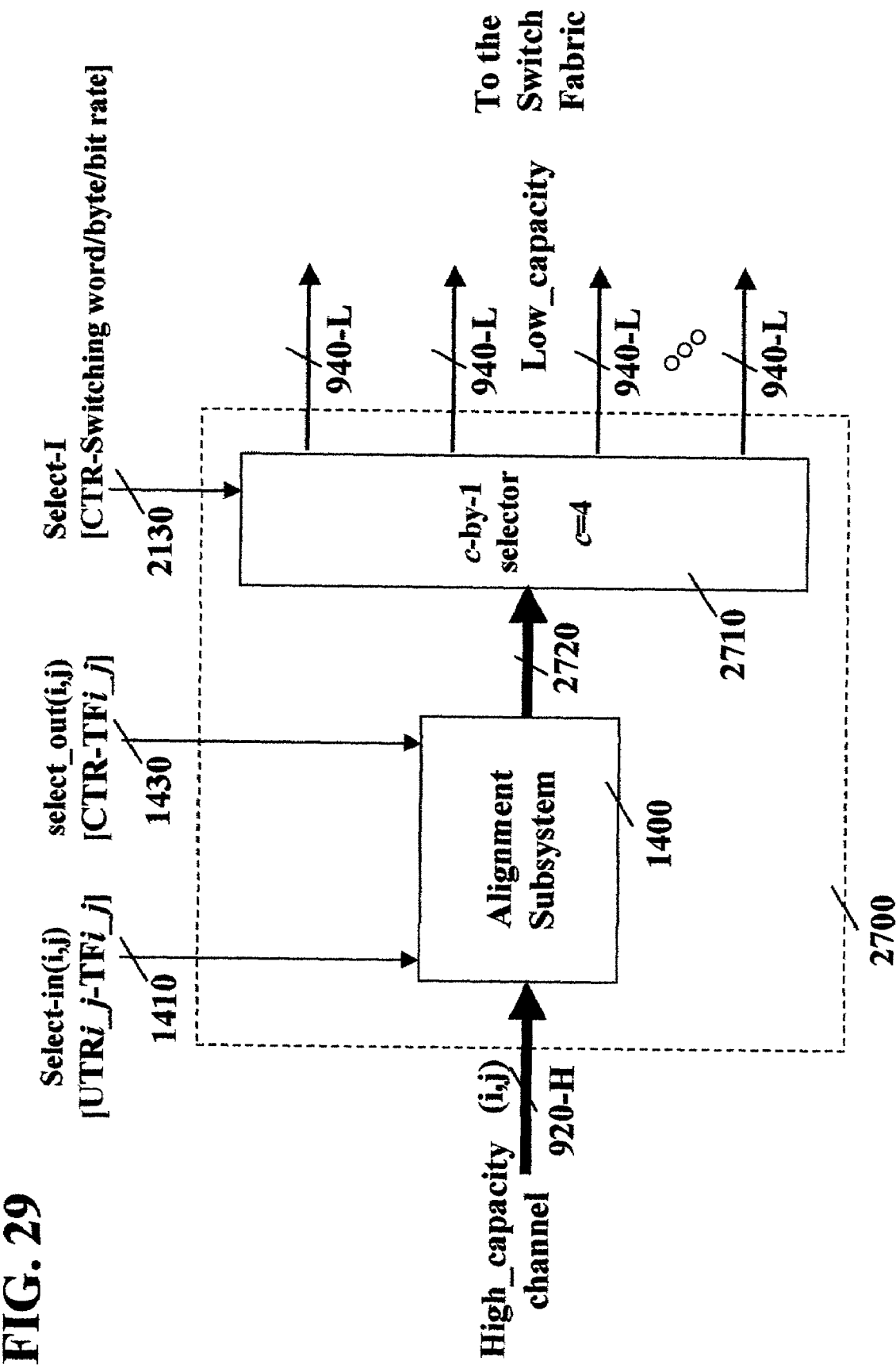
Figure 30:
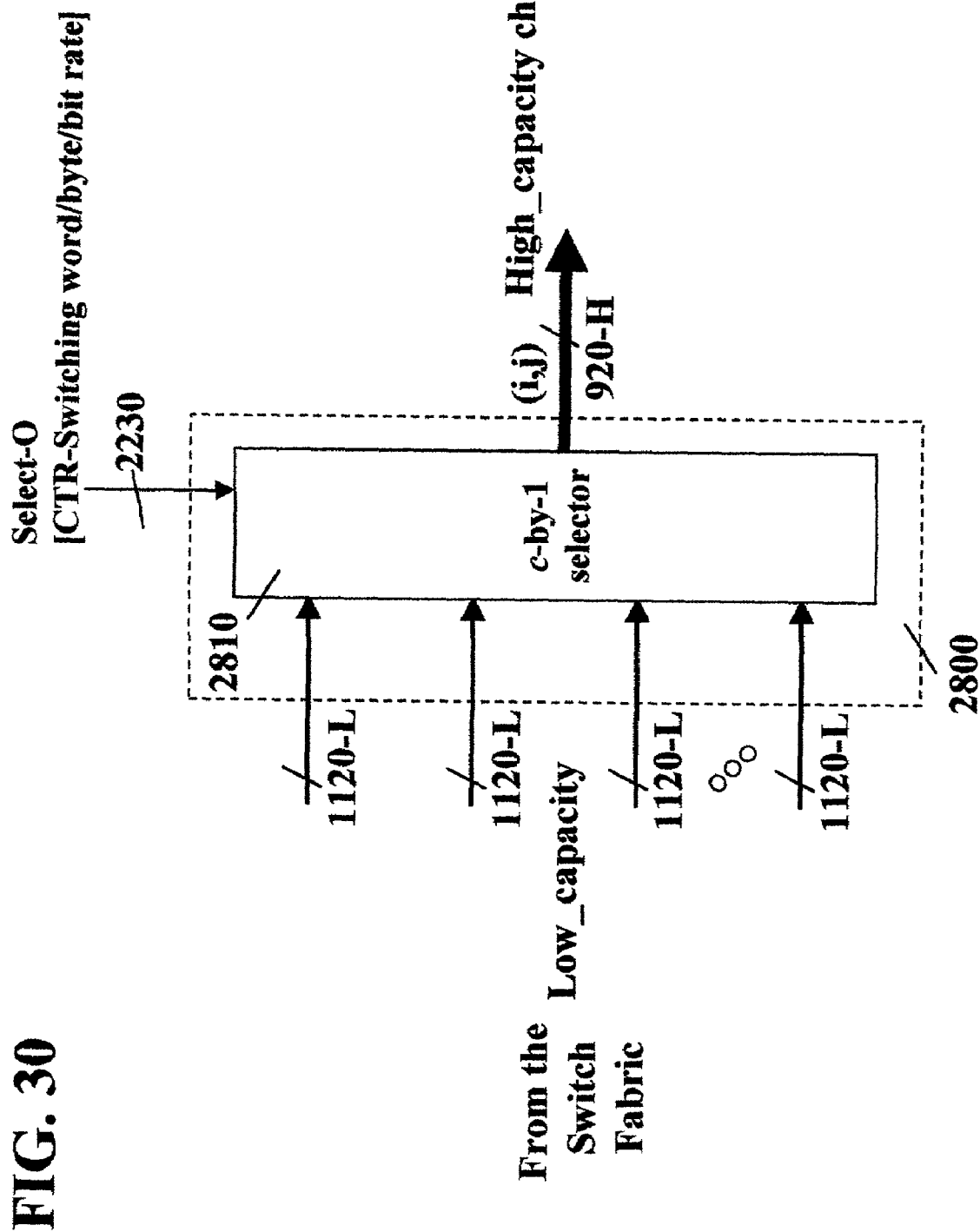
Figure 31:
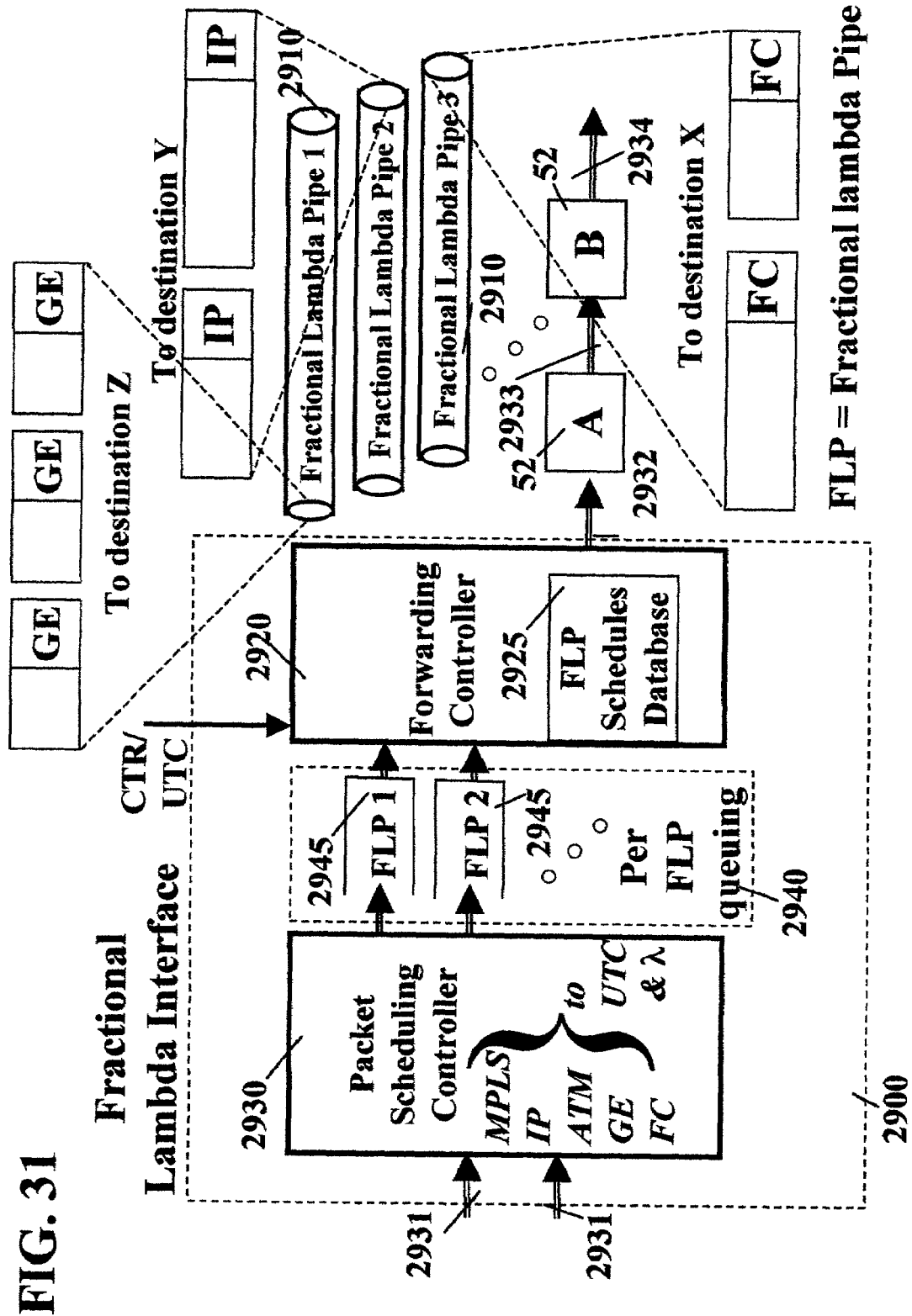

PIG. 9 shows a switching system operating according to the disclosed invention wherein data units arriving during one time frame over a plurality of low capacity input channels are switched and forwarded over one high capacity output channel during a plurality of time frames, wherein the data units received during a plurality of time frames over one high capacity input channel are switched and forwarded over a plurality of low capacity output channels during one time frame;

PIG. 10 shows a switching system operating according to the disclosed invention wherein data units arriving during one time frame, over a plurality of low capacity input channels, are switched and forwarded over one high capacity output channel, during a plurality of time frames and over a plurality of low capacity output channels, during one time frame, wherein data units received, during a plurality of time frames over one high capacity input channel, are switched and forwarded, over a plurality of low capacity output channels, during one time frame and over one high capacity output channel, during a plurality of time frames;

FIG. 11 shows a switching system operating according to the disclosed invention wherein data units arriving during one time frame, over a plurality of low capacity input channels, are switched and forwarded, over a plurality of low capacity output channels, during one time frame, wherein the data units received, during one time frame over one high capacity input channel, are switched and forwarded, over one high capacity output channel, during one corresponding time frame;

FIG. 12A is a functional description of a switch with 16 ports—each with 16-wavelength division multiplexing optical channels, such that it is possible to transfer data units as follows: From (any subTF of any Channel at any Input) To (a predefined subTF of any Channel at any Output);

FIG. 12B is a timing diagram of a switching operation that is responsive to the common time reference, with two pipeline forwarding and transmitting phases;

FIG. 12C is a timing diagram of a switching operation that is responsive to the common time reference, with three pipeline forwarding and transmitting phases;

FIG. 13 shows how a plurality of optical channels carried on a wavelength division multiplexing (WDM) optical link (optical fiber) are separated by an optical de-multiplexer (DMUX) and then fed into a plurality of input ports of the switch;

FIG. 14 shows how a plurality of optical channels carried on a plurality of optical links are separated by a plurality of optical de-multiplexers (DMUX) and fed in one input port of one (optical) switching system;

FIG. 15 depicts the feed of a plurality of optical channels from an output port into a plurality of respective optical MUXes, which combine each respective optical channel with optical channels from other output ports, for transmission on a plurality of respective optical links;

FIG. 16 shows one channel from each of a plurality of output ports being fed into an optical MUX to be combined for transmission on a single optical link;

FIG. 17 shows the high level architecture of a time driven switch capable of multiplexing and de-multiplexing data units received and transmitted over channels with different capacity, wherein the architecture includes one alignment subsystem for each input channel, one switch fabric with a transfer rate equal to the transmission rate of the highest capacity channel, as many inputs as the number of input channels of the switch, and one rate matching buffer for each low capacity output channel;

FIG. 18 is a block diagram of an alignment subsystem comprising a plurality of queues in which incoming data units are stored responsive to both the input channel unique time reference (UTR) and time structure (time frame subdivision) in use on the input channel, wherein data units are retrieved from the queues responsive to both the common time reference (CTR) and one of the time structure (time frame subdivision) used on the input channel, and the time structure deployed within the switch (sub-time frame subdivision);

FIG. 19 is a block diagram of an alignment subsystem comprising a plurality of queues in which incoming data units are stored responsive to the input channel unique time reference (UTR) and the time structure (with sub-time frame subdivision) in use within the switch, wherein data units are retrieved from the queues responsive to both the common time reference (CTR) and the time structure deployed within the switch (with sub-time frame subdivision);

FIG. 20 depicts the block diagram of a rate matching buffer (RMB) comprising at least one of a plurality of queues in which incoming data units are stored responsive to both the common time reference (CTR) and the time structure (time frame subdivision) in use on the channel coupled with the RMB, wherein data units are retrieved from the queues responsive to both the common time reference (CTR) and the time structure (time frame subdivision) in use on the channel coupled to the RMB;

FIG. 21 is a schematic structure of a switch and a fabric controller capable of storing a plurality of switching matrices;

FIG. 22 is the high level architecture of a time driven switch capable of multiplexing and de-multiplexing data units received and transmitted on channels with different capacities, wherein the architecture includes one alignment subsystem for each high capacity input channel, one alignment and multiplexing subsystem for a plurality of low capacity input channels, one switch fabric with a transfer rate equal to the transmission rate of the highest capacity channel and less inputs than the number of input channels of the switch, and one rate matching buffer and de-multiplexing subsystem for each low capacity output channel;

FIG. 23 depicts an alignment and multiplexing subsystem comprising a plurality of alignment subsystems and a selector;

FIG. 24 shows the architecture of a rate matching buffer and multiplexer comprising a selector and a plurality of rate matching buffers (RMBs);

FIG. 25 is a high level architecture of a time driven switch capable of multiplexing and de-multiplexing data units received and transmitted on channels with different capacities, wherein the architecture includes one alignment subsystem for each low capacity input channel, one alignment and de-multiplexing subsystem for each high capacity input channel, one switch fabric with a transfer rate equal to the transmission rate of the lowest capacity channel and more inputs than the number of input channels of the switch, and one rate matching buffer and multiplexing subsystem for each high capacity output channel;

FIG. 26 depicts an alignment and de-multiplexing subsystem comprising a selector feeding a plurality of alignment subsystems;

FIG. 27 shows the architecture of a rate matching buffer and multiplexer comprising a plurality of rate matching buffers (RMBs) and a selector;

FIG. 28 is a high level architecture of a time driven switch capable of multiplexing and de-multiplexing data units received and transmitted on channels with different capacity, wherein the architecture includes one alignment and de-multiplexing subsystem for each input channel, one switch fabric, and one multiplexing subsystem for each output channel;

FIG. 29 depicts an alignment and de-multiplexing subsystem comprising one alignment subsystem and a selector;

FIG. 30 shows a multiplexing subsystem responsible for multiplexing at least one of bits, bytes, words, and slots incoming from a plurality of input channels for transmission over one output channel;

FIG. 31 is the architecture of a possible implementation of a Fractional Lambda Interface. The fractional lambda interface is installed at the ingress of a network that deploys time driven switching from a networks that does not deploy time driven switching. The fractional lambda interface is responsible for mapping incoming data units on fractional lambda pipes;

FIG. 32 contains a table providing the time frame size and the time frame frequency for various configurations each one characterized by a specific time frame duration and channel capacity. The size of the Synchronous Payload Environment (SPE) of an STS-1 SONET channel is used as a measurement unit for the time frame size.

Figure 35:
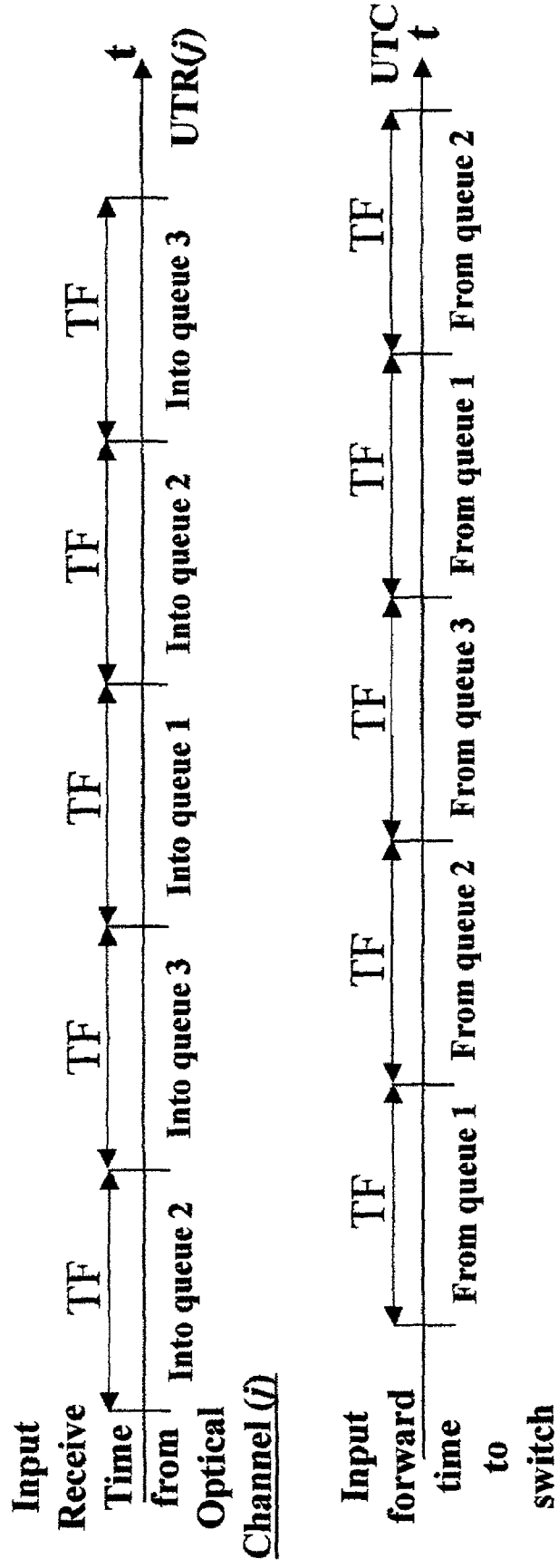
Figure 36:
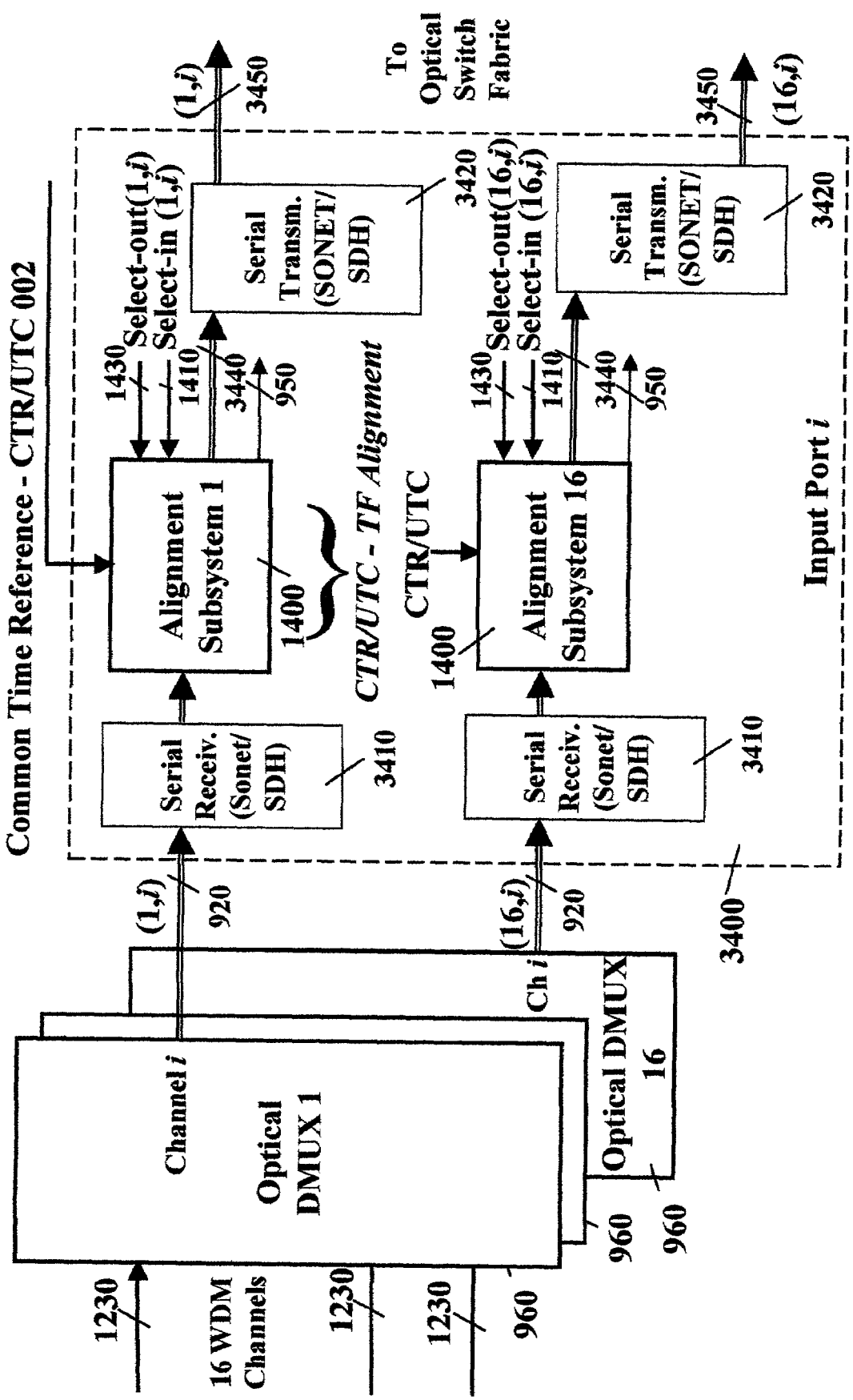
Figure 37:
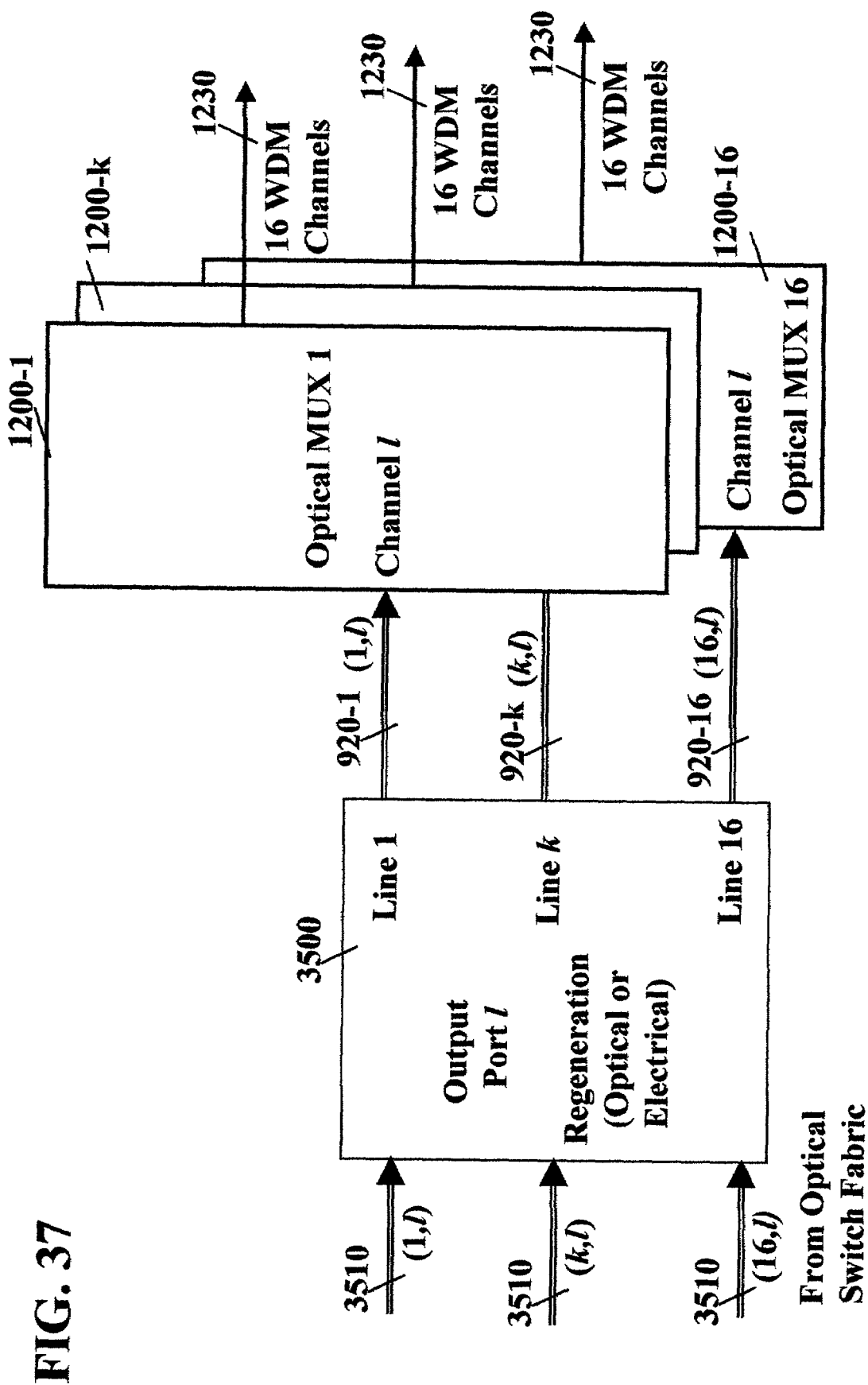
Figure 39:
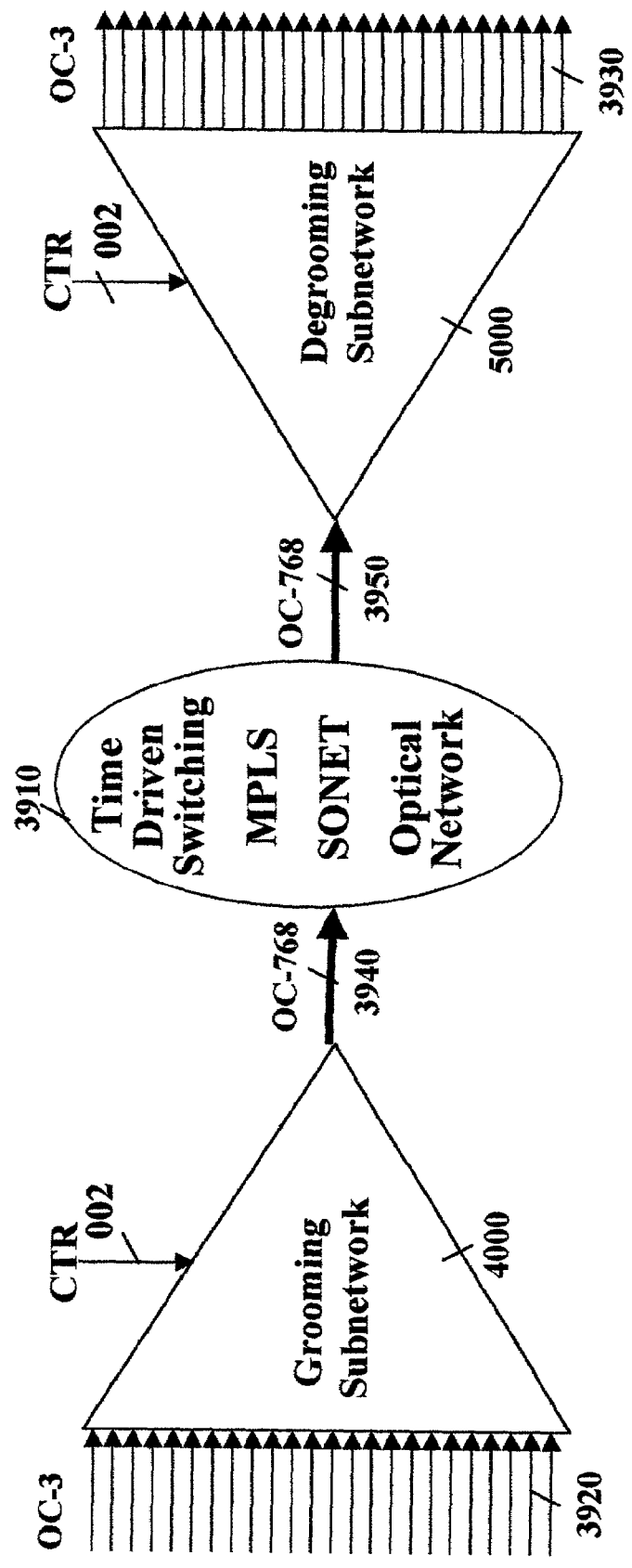
Figure 40:
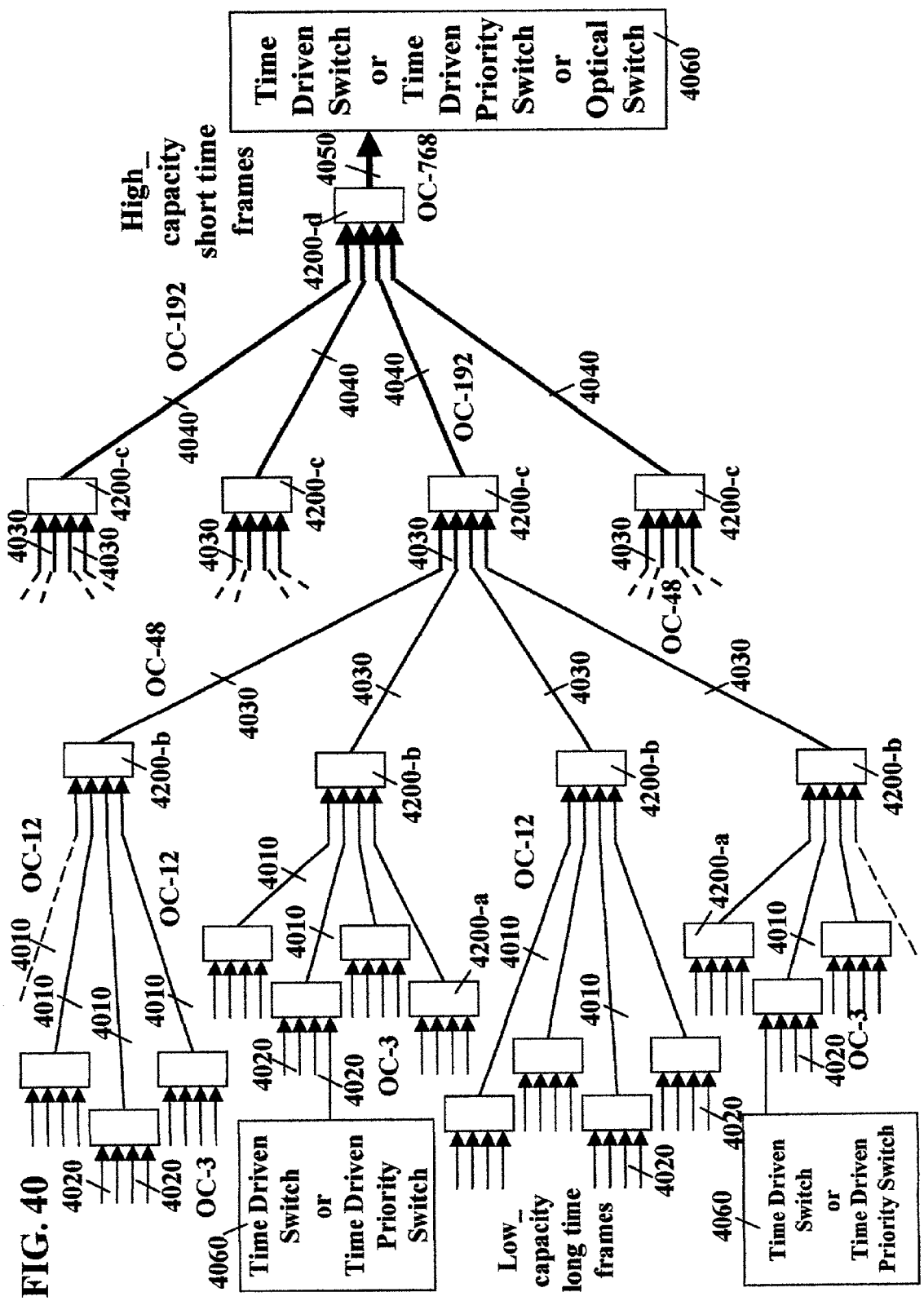
Figure 41:
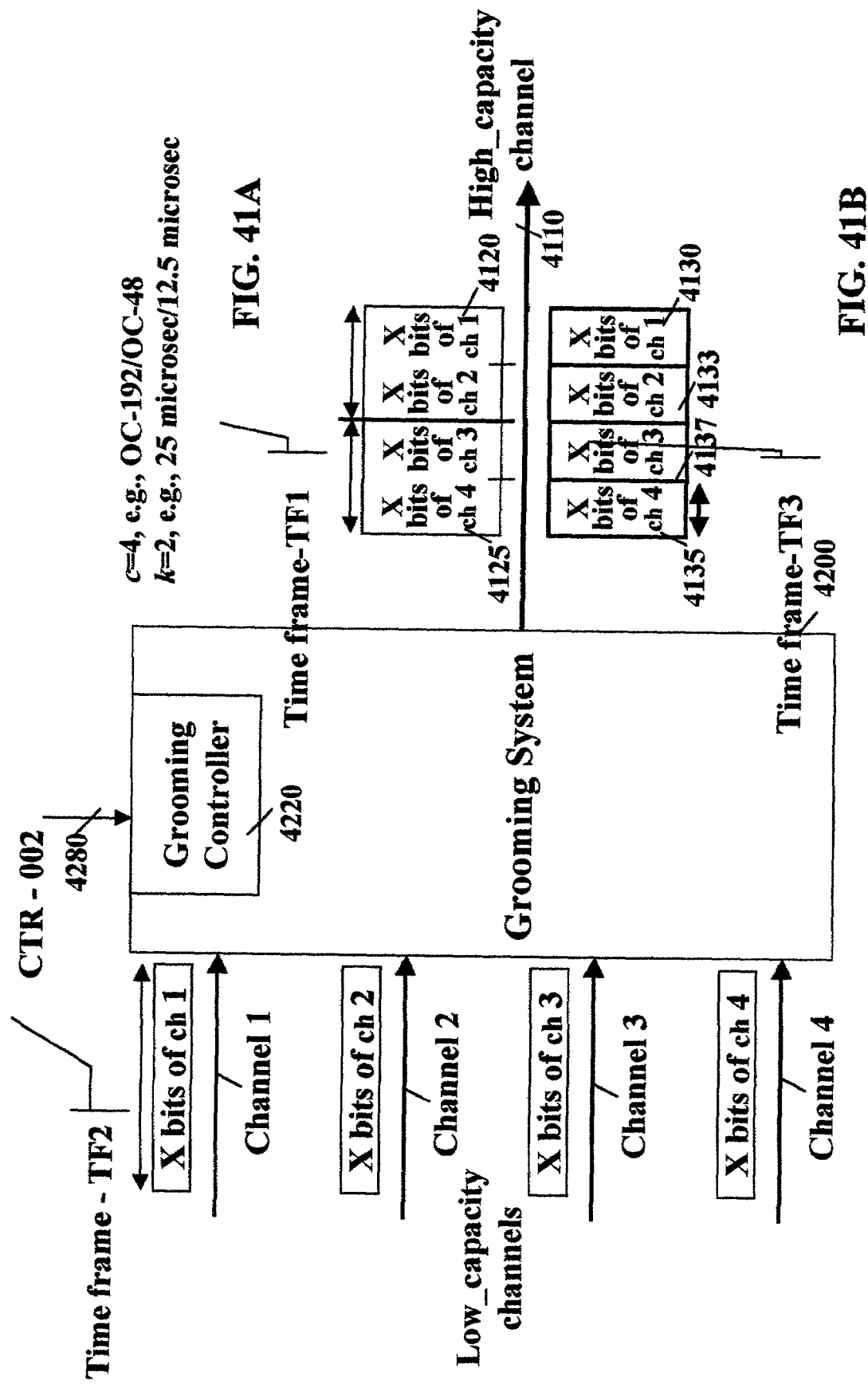
Figure 42:
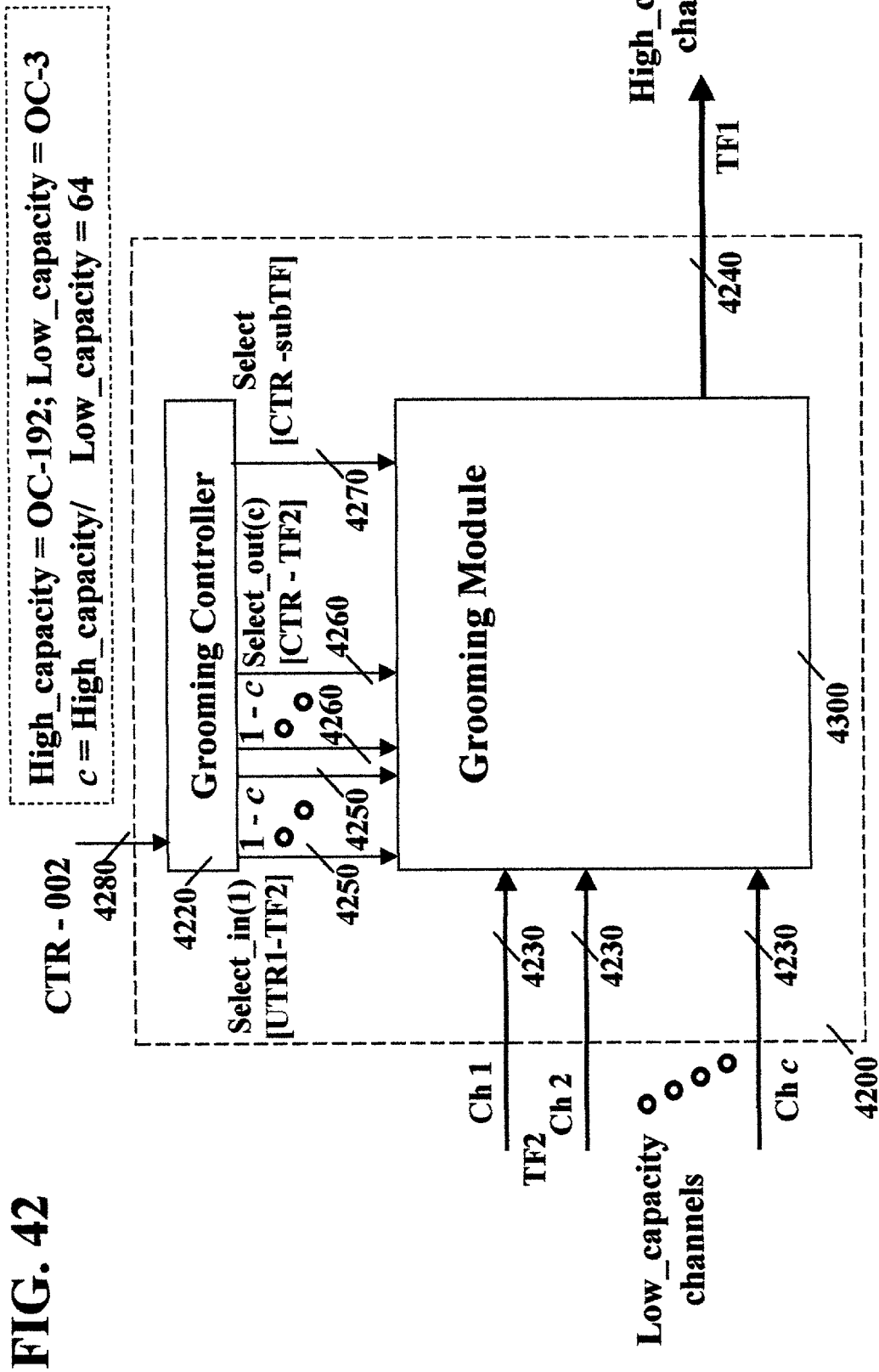
Figure 43:
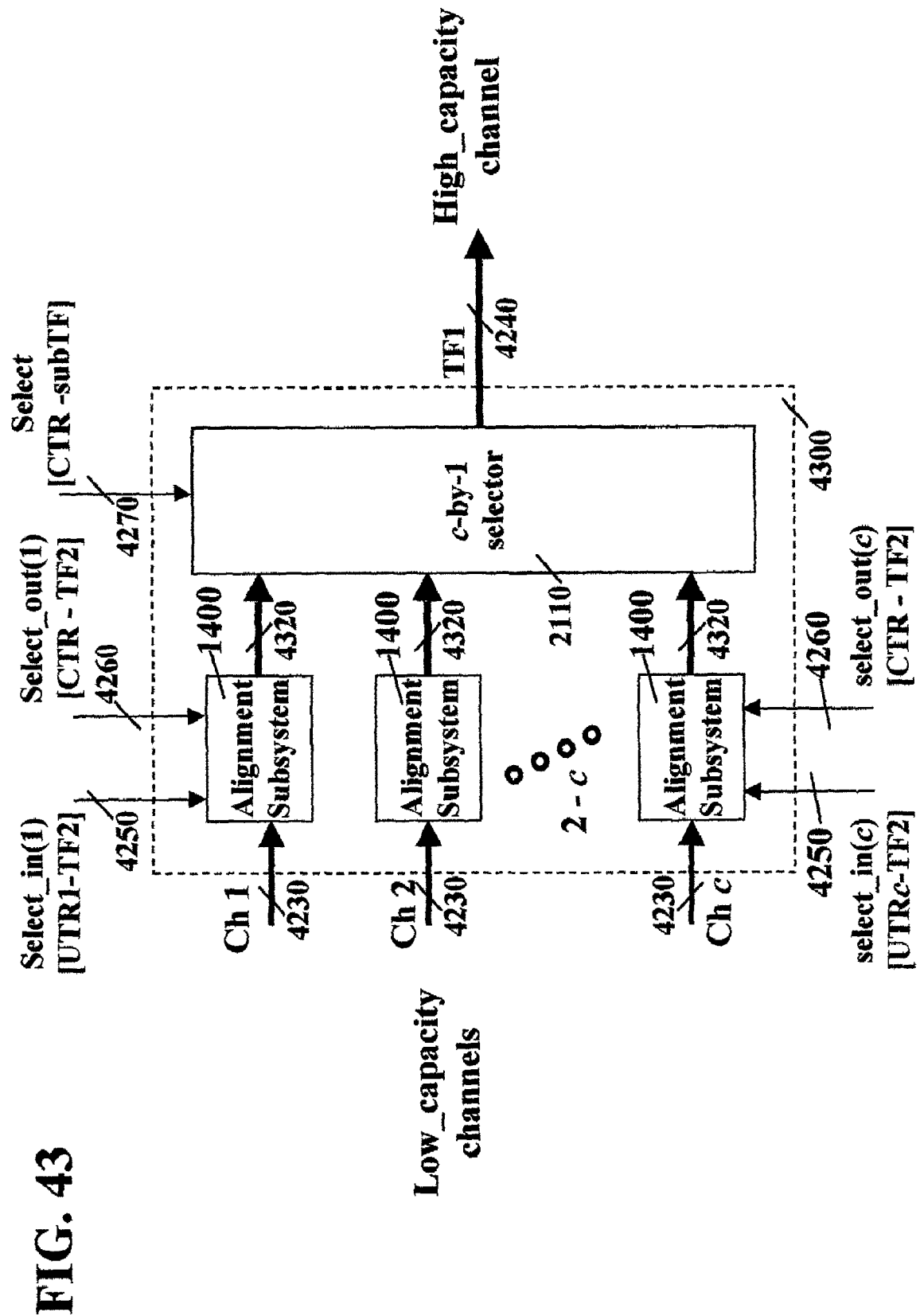
Figure 44:
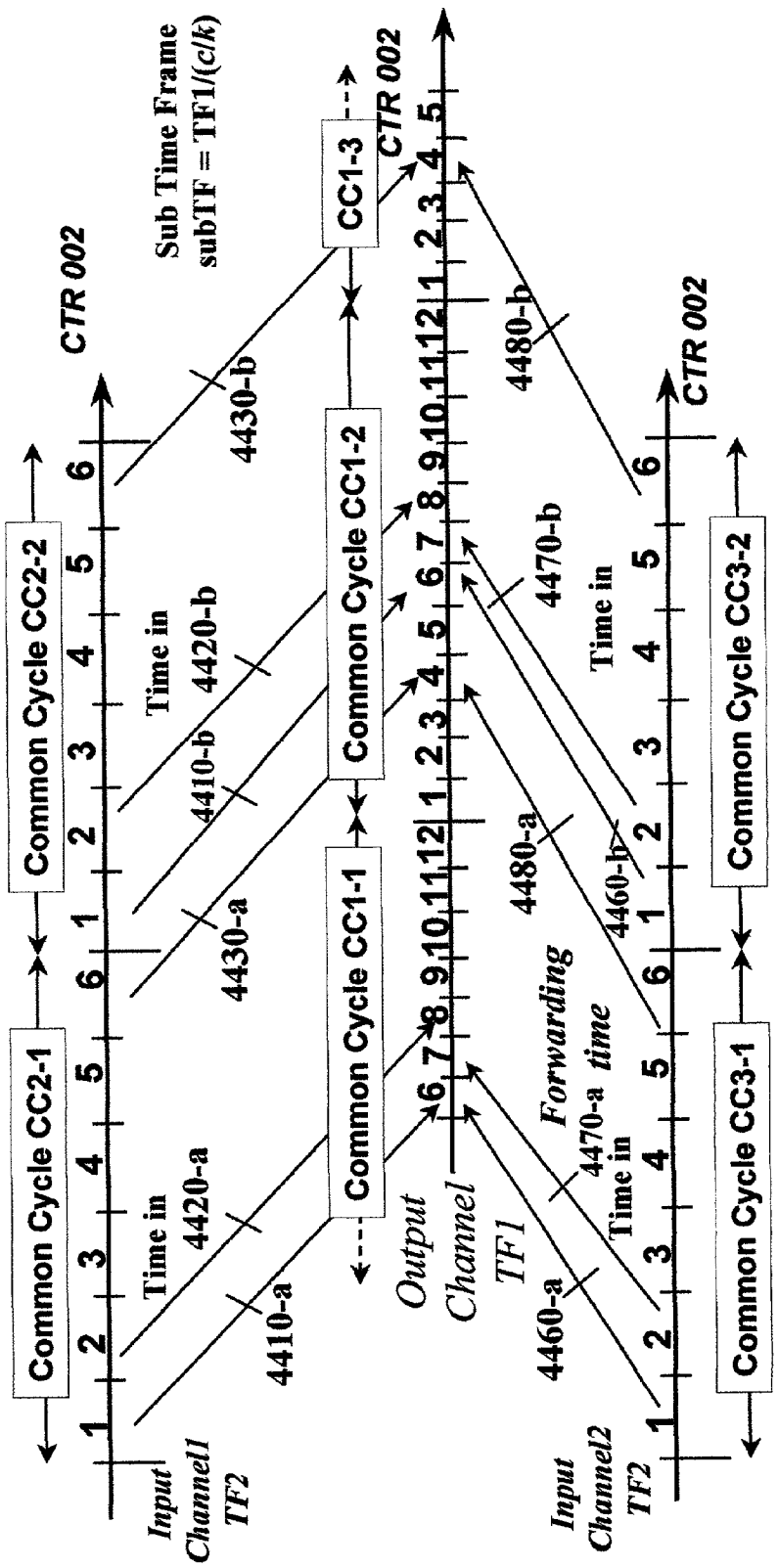
Figure 45:
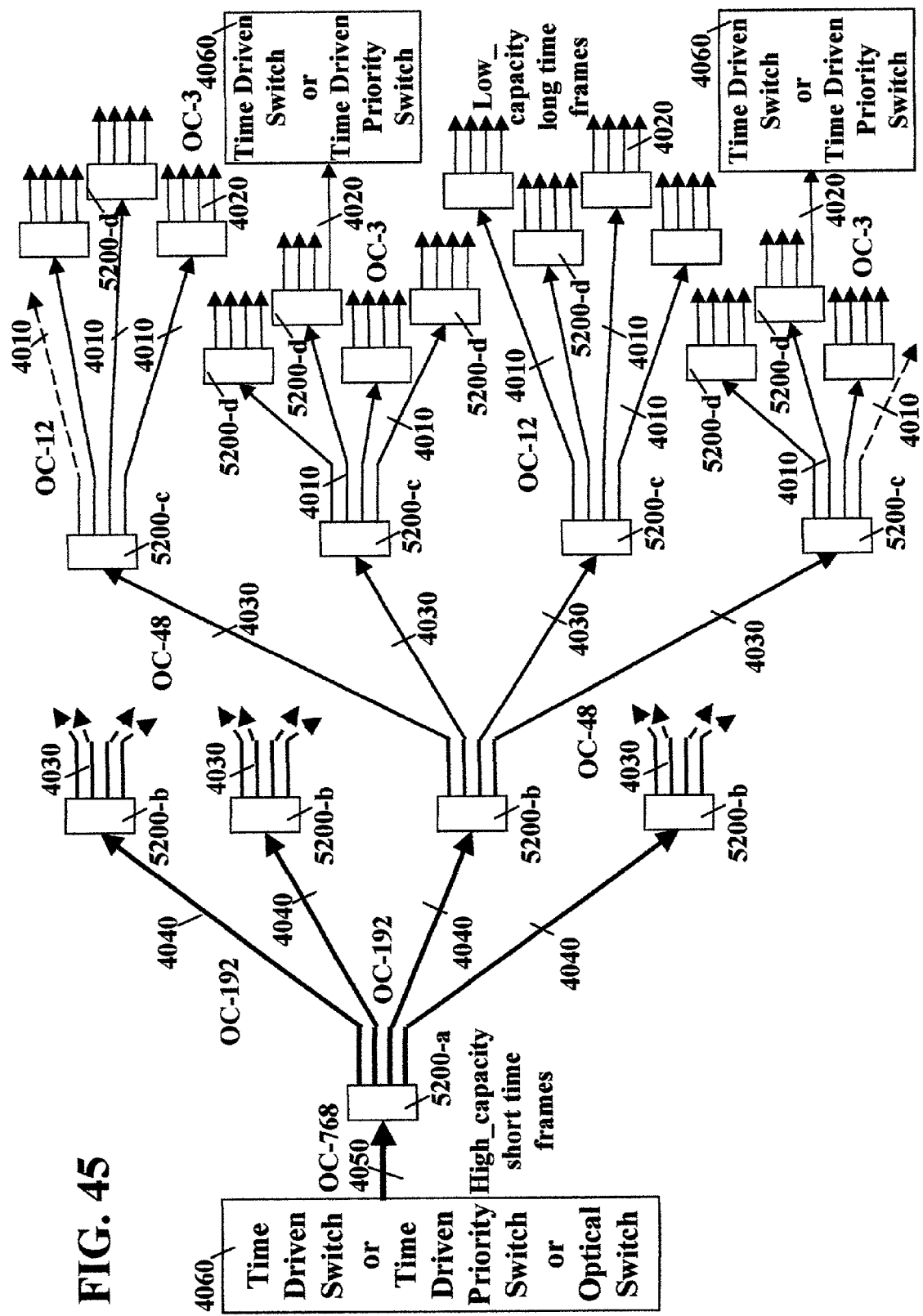
Figure 46:
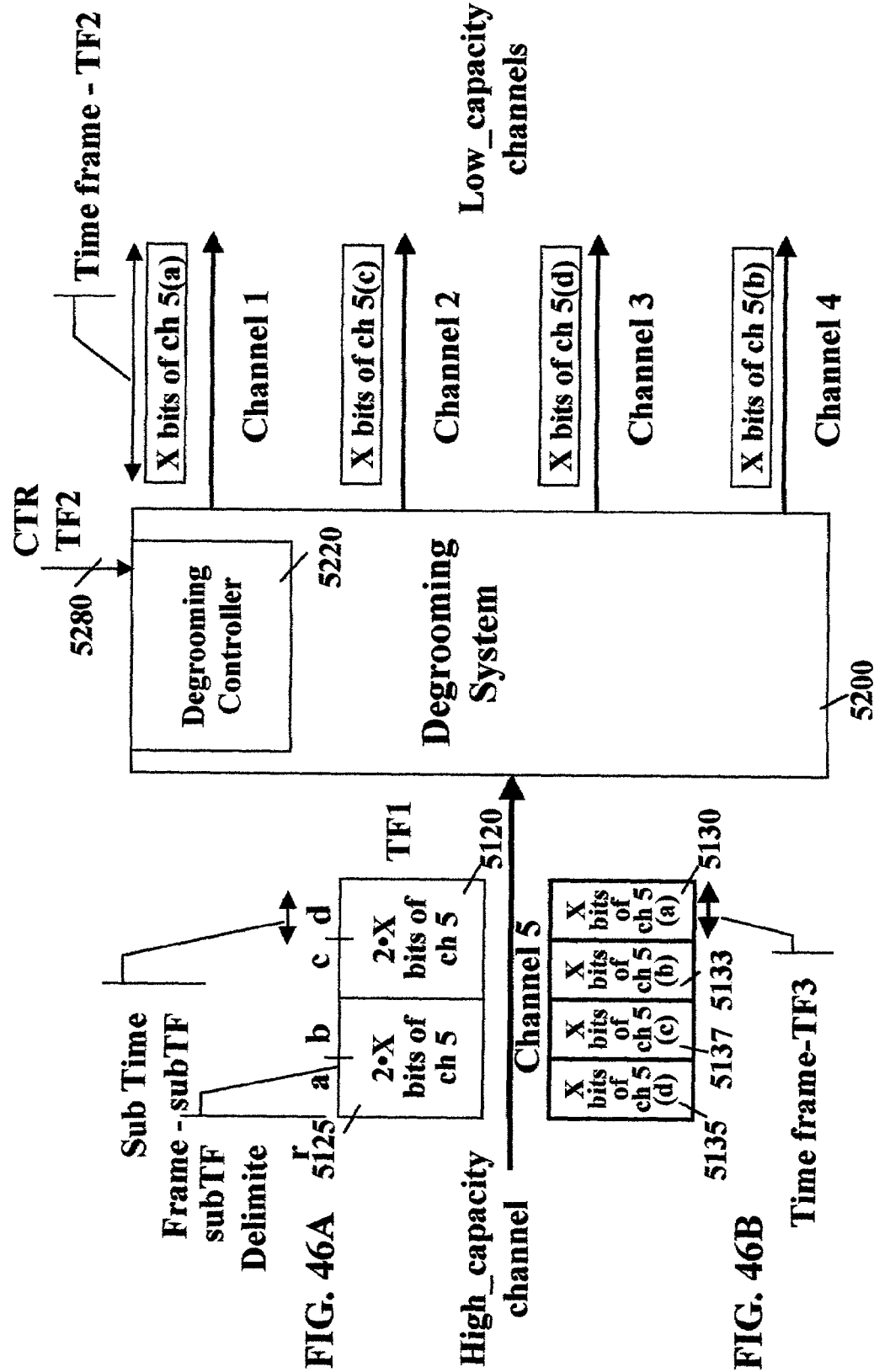
Figure 47:
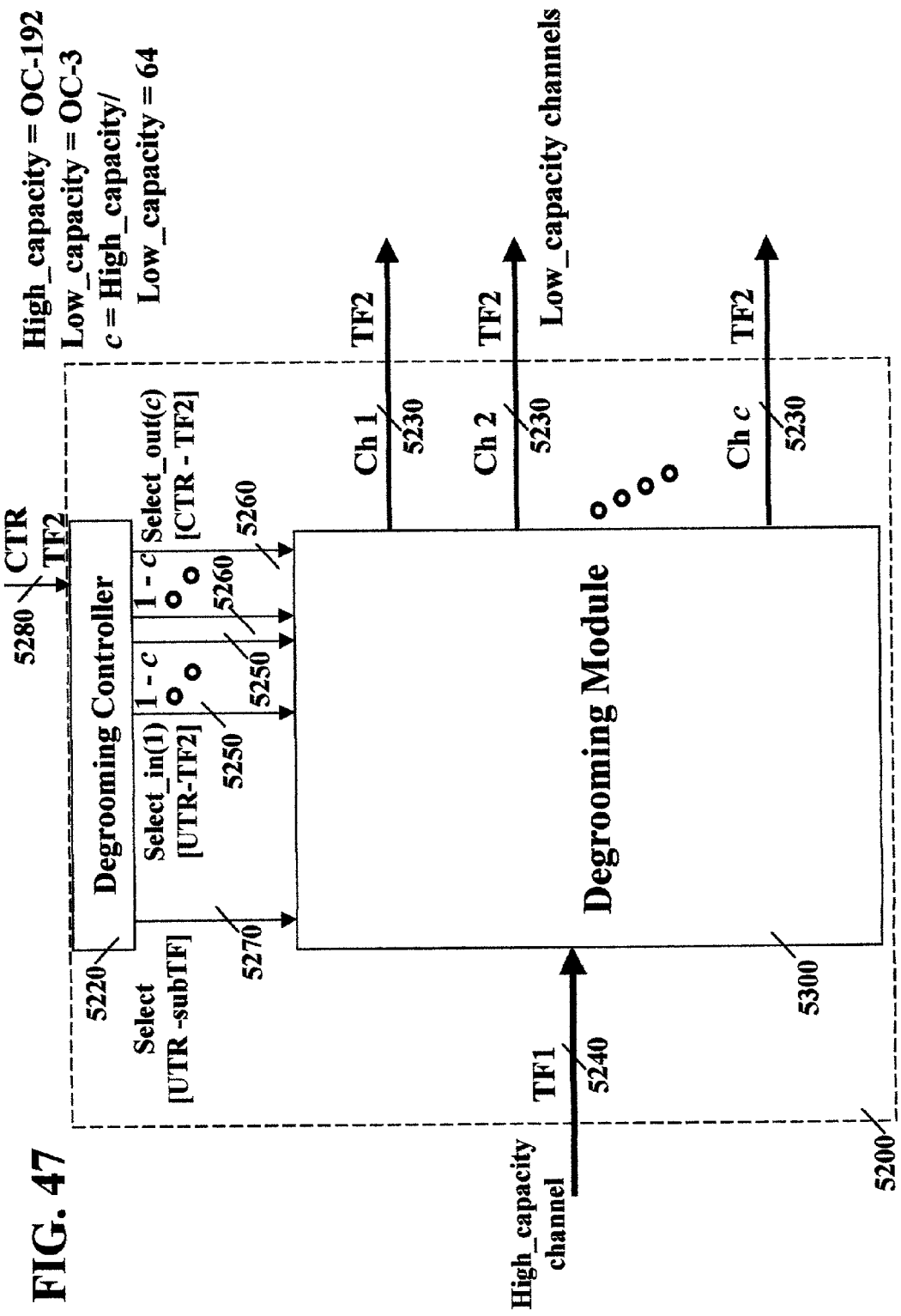
Figure 48:
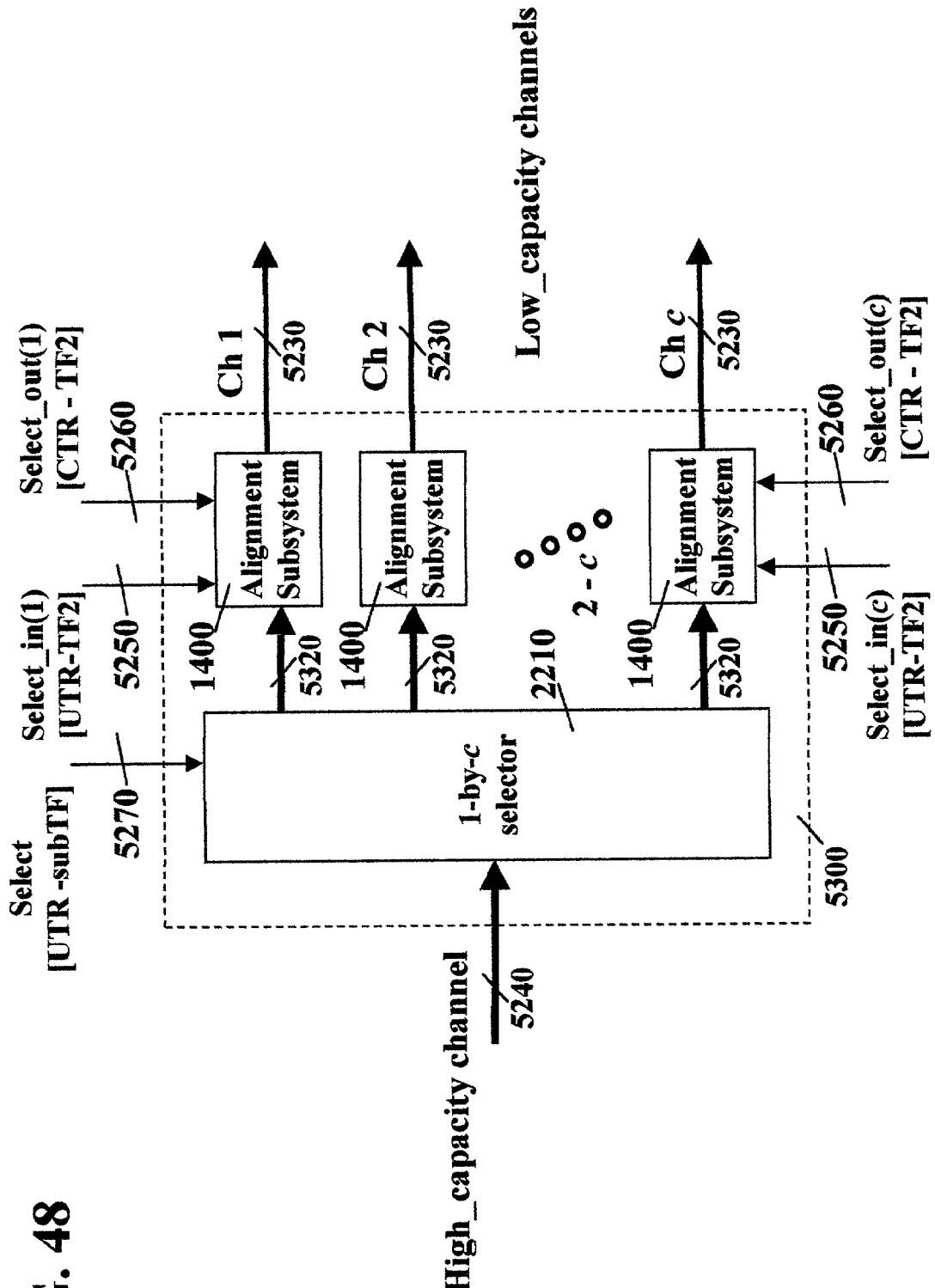
Figure 49:
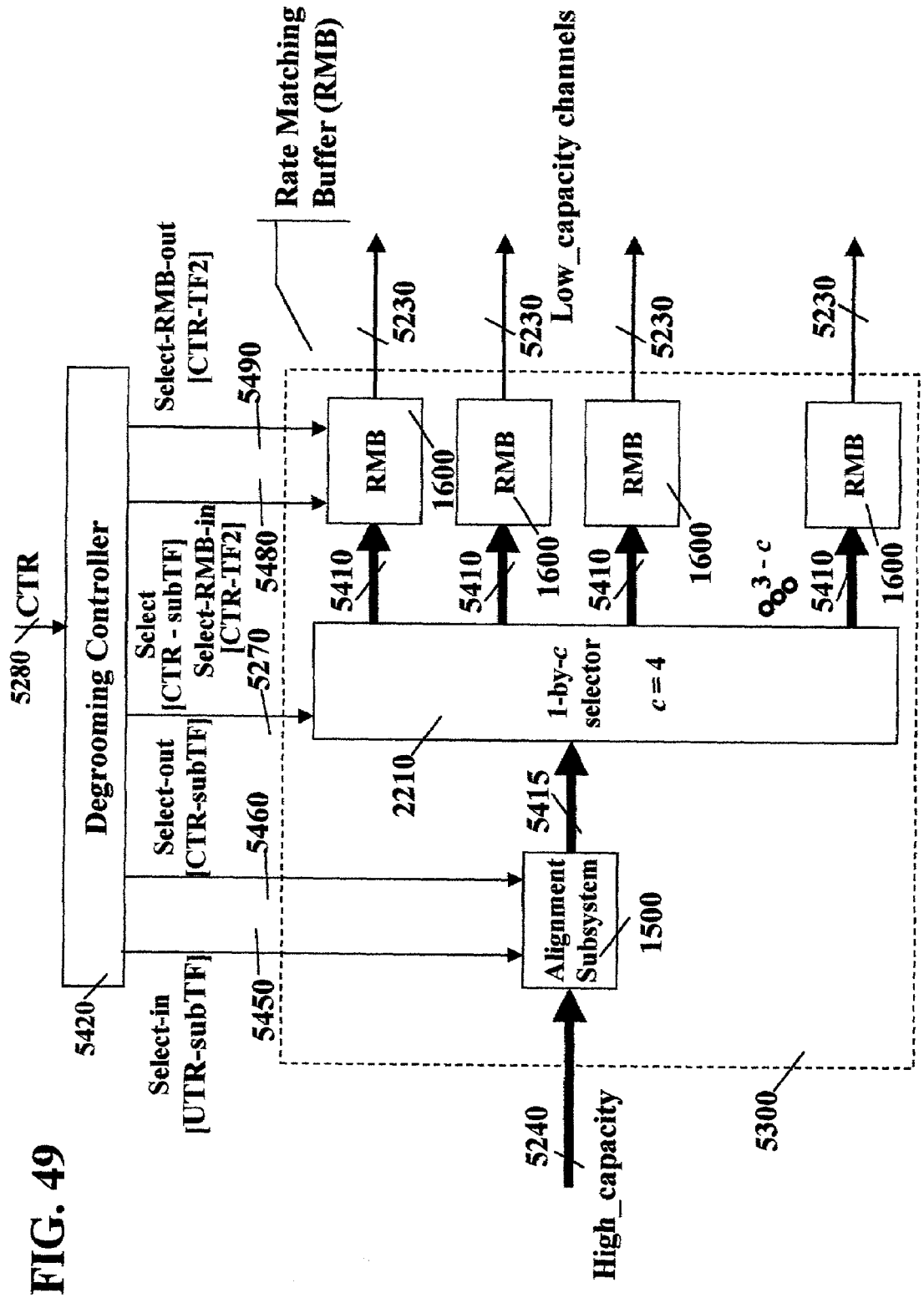
Figure 50:
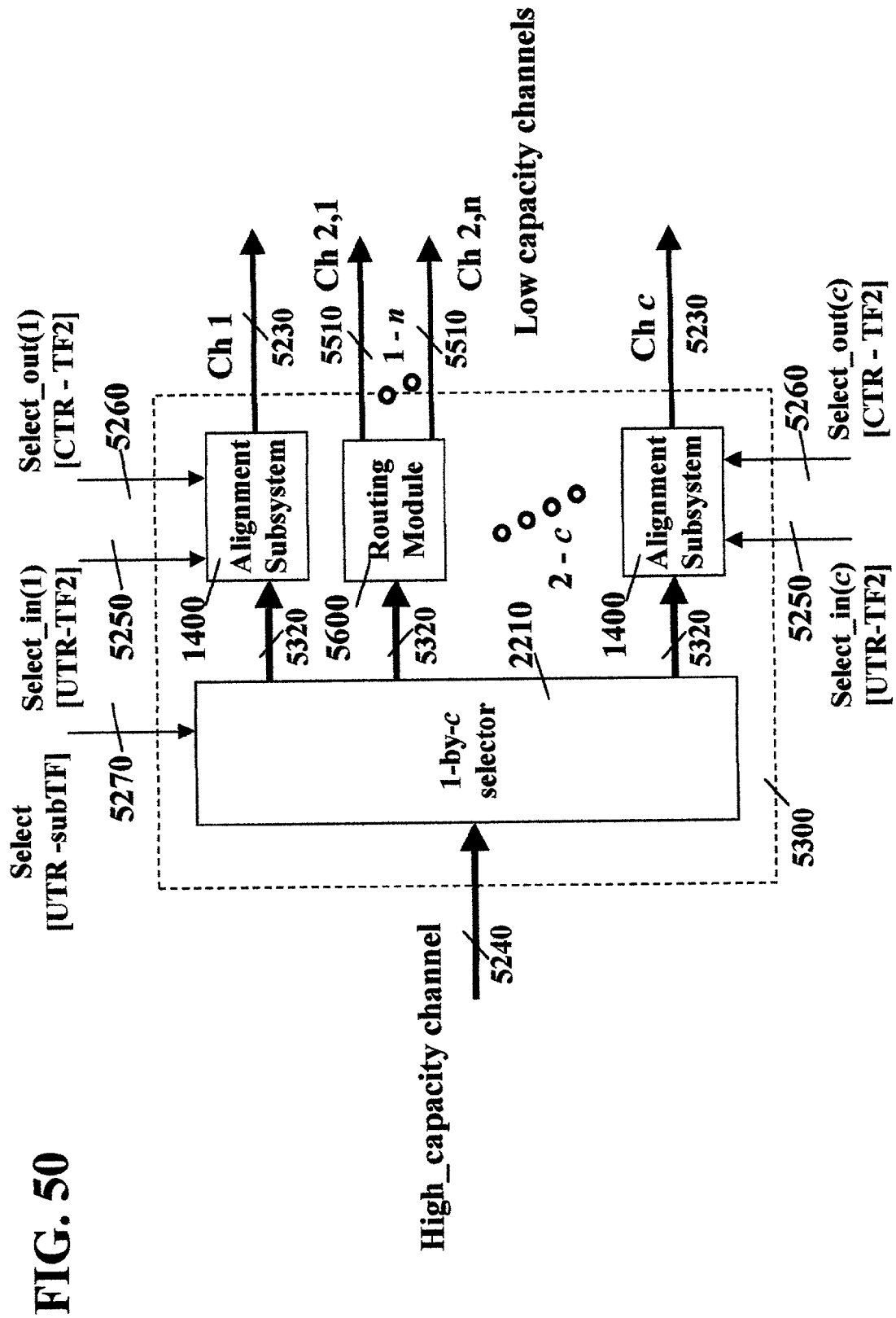
Figure 51:
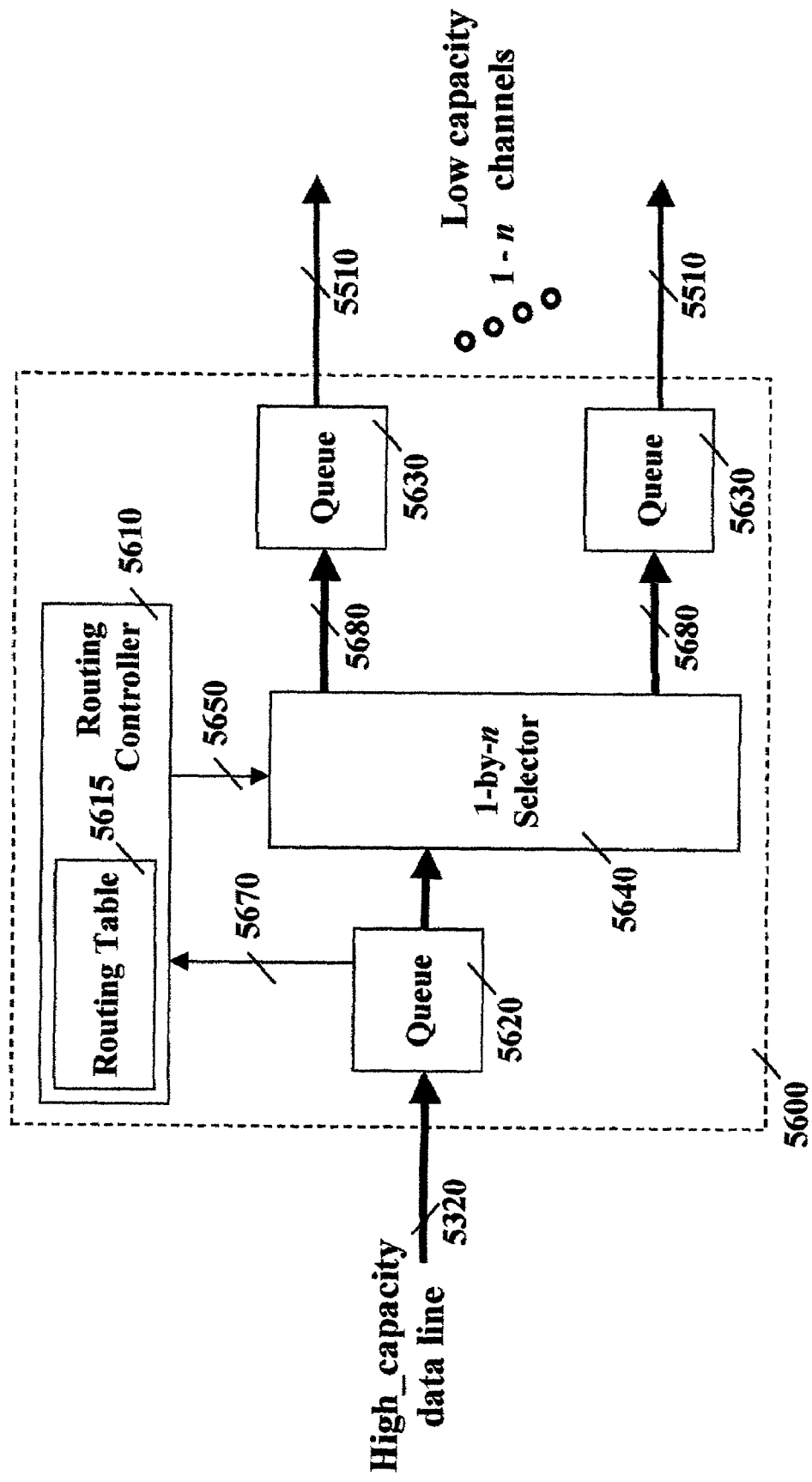
Figure 52:
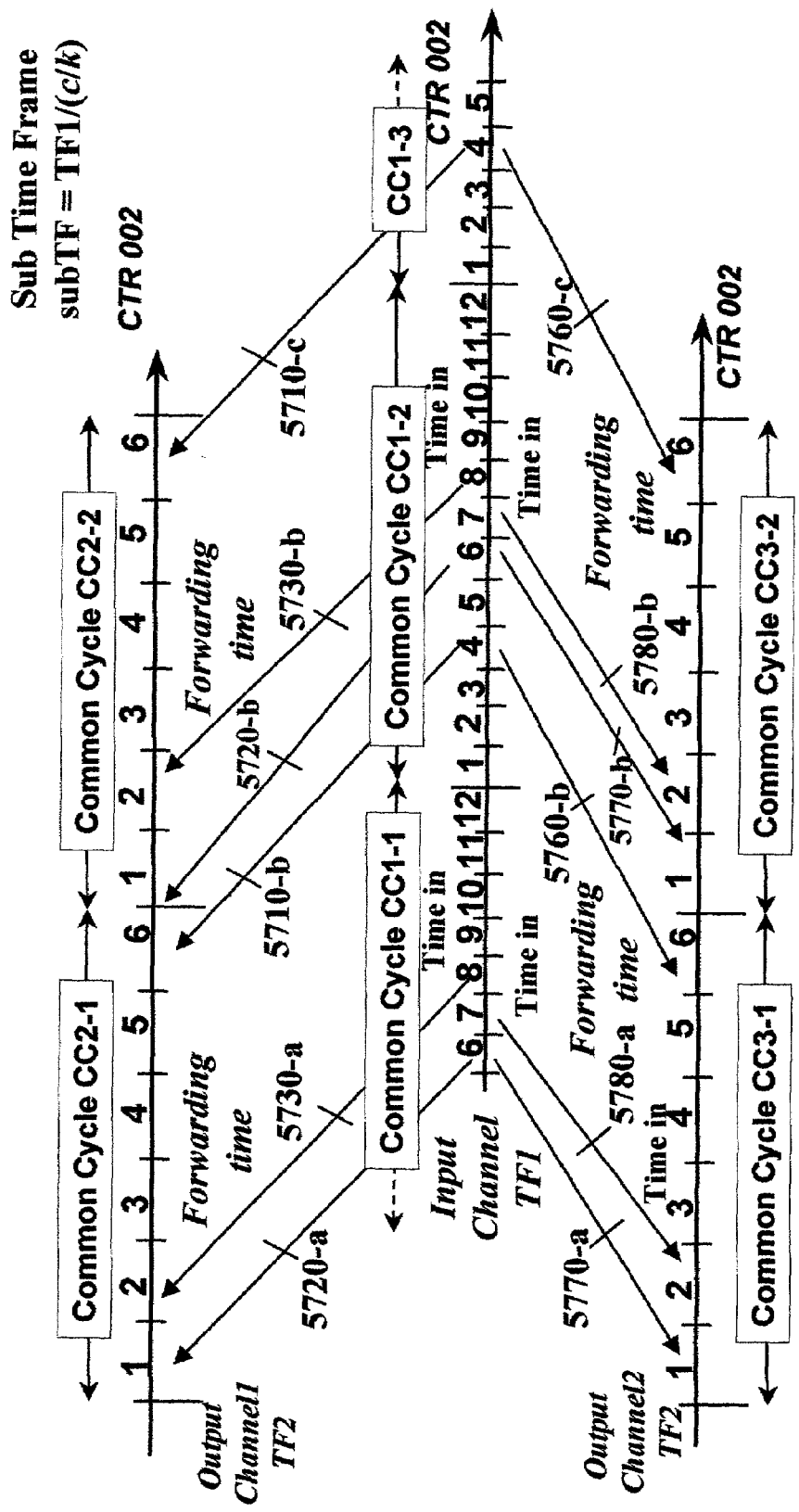
Figure 53:
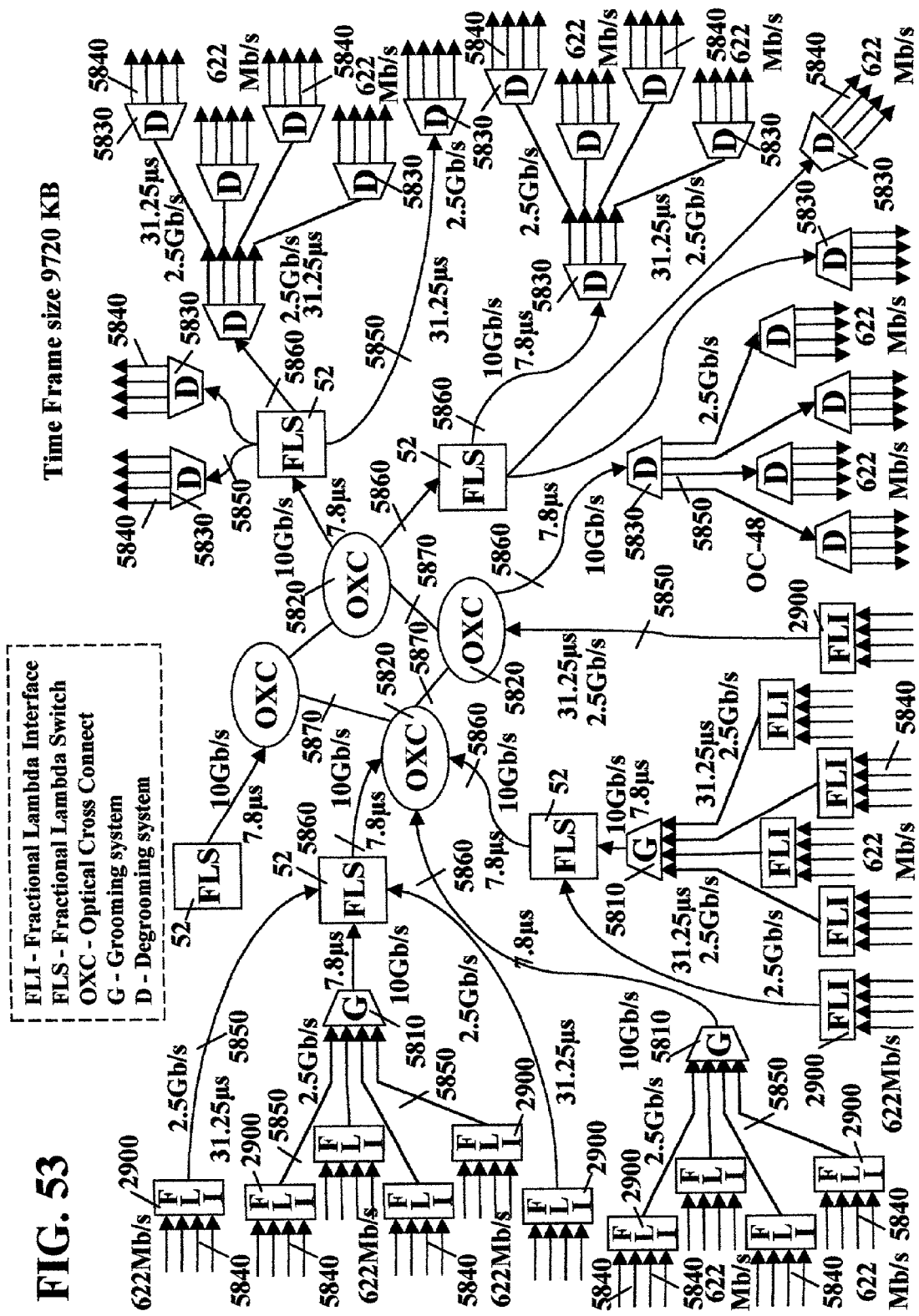
Figure 54:
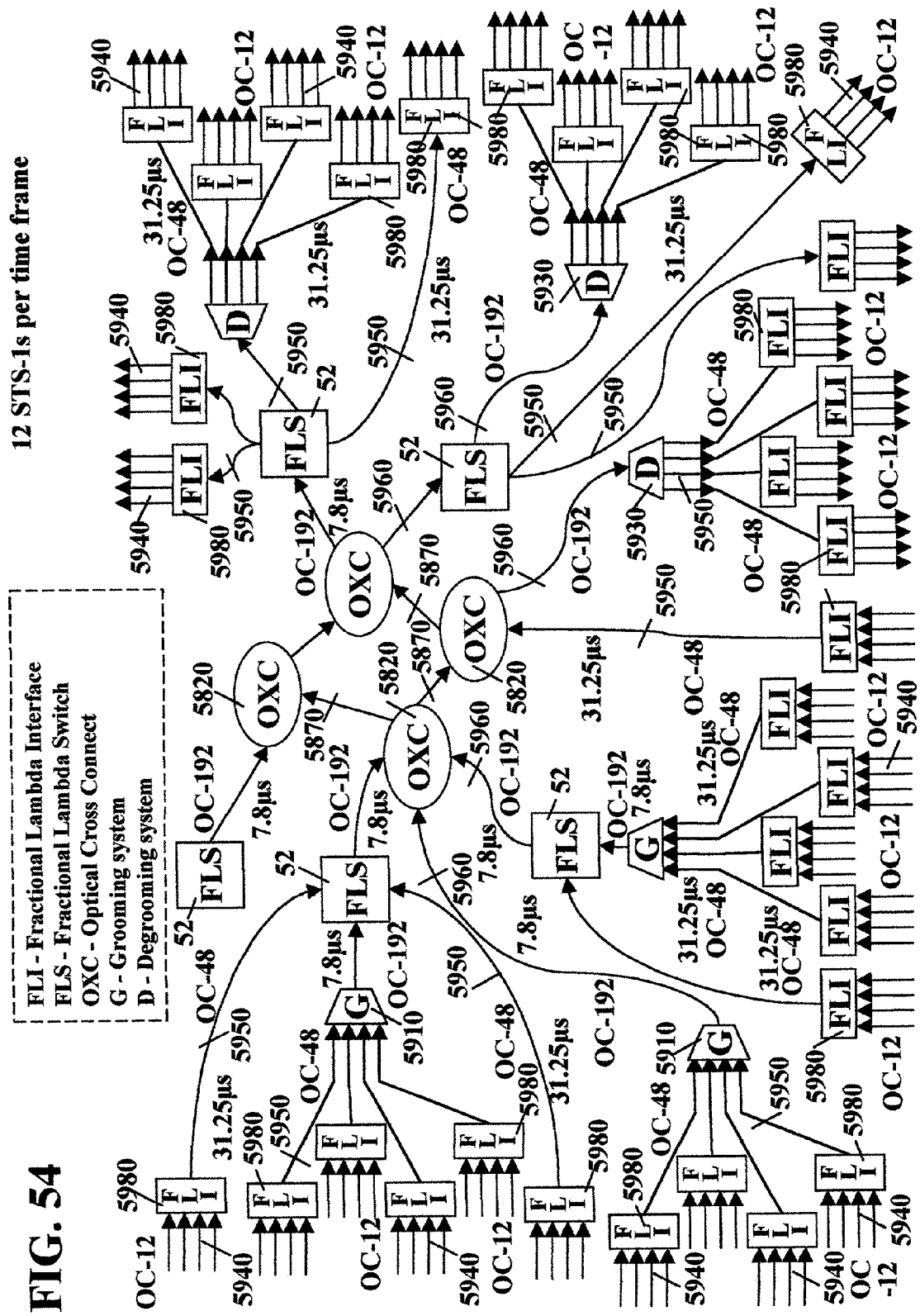
Figure 55:
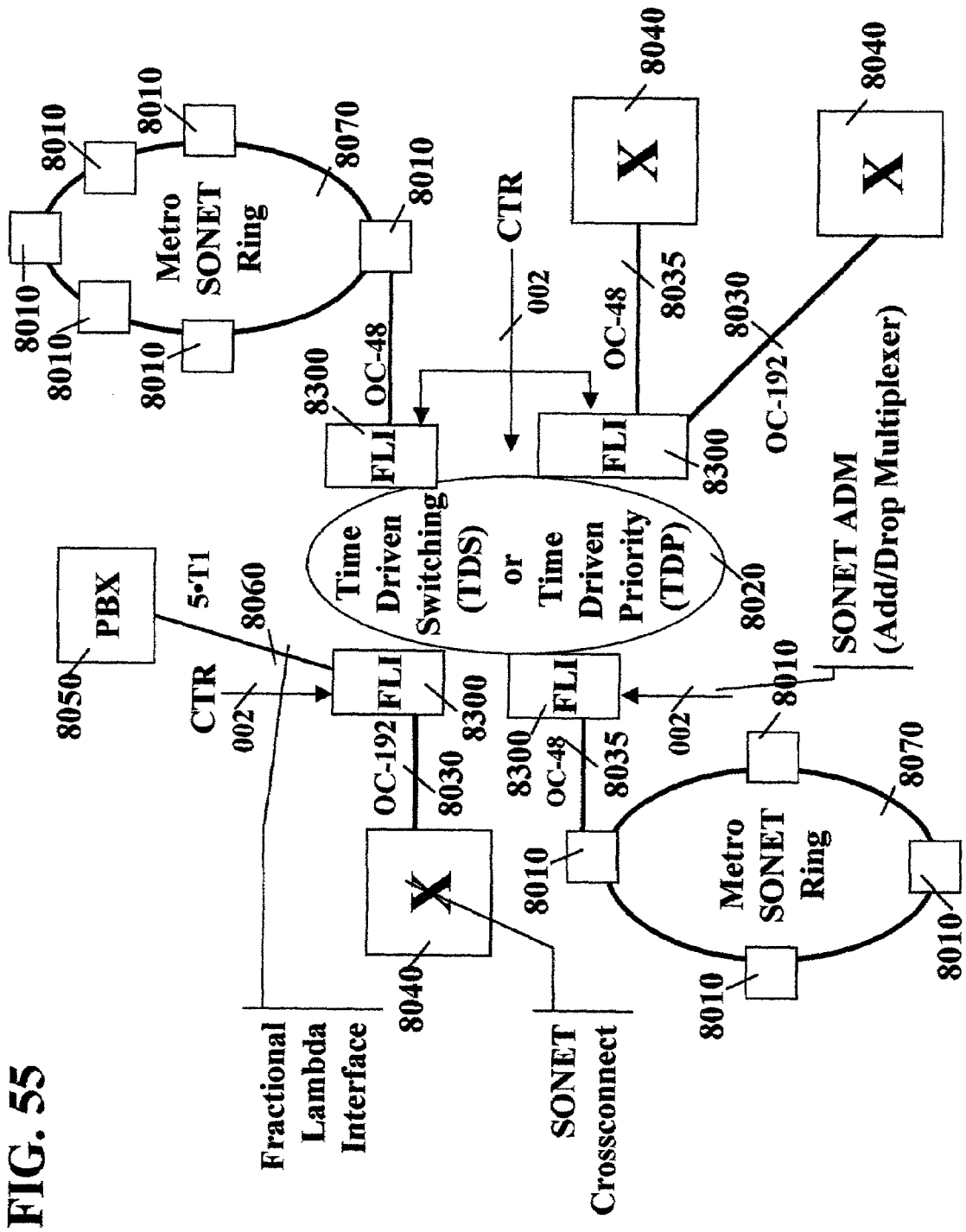
Figures 58A, 58B:
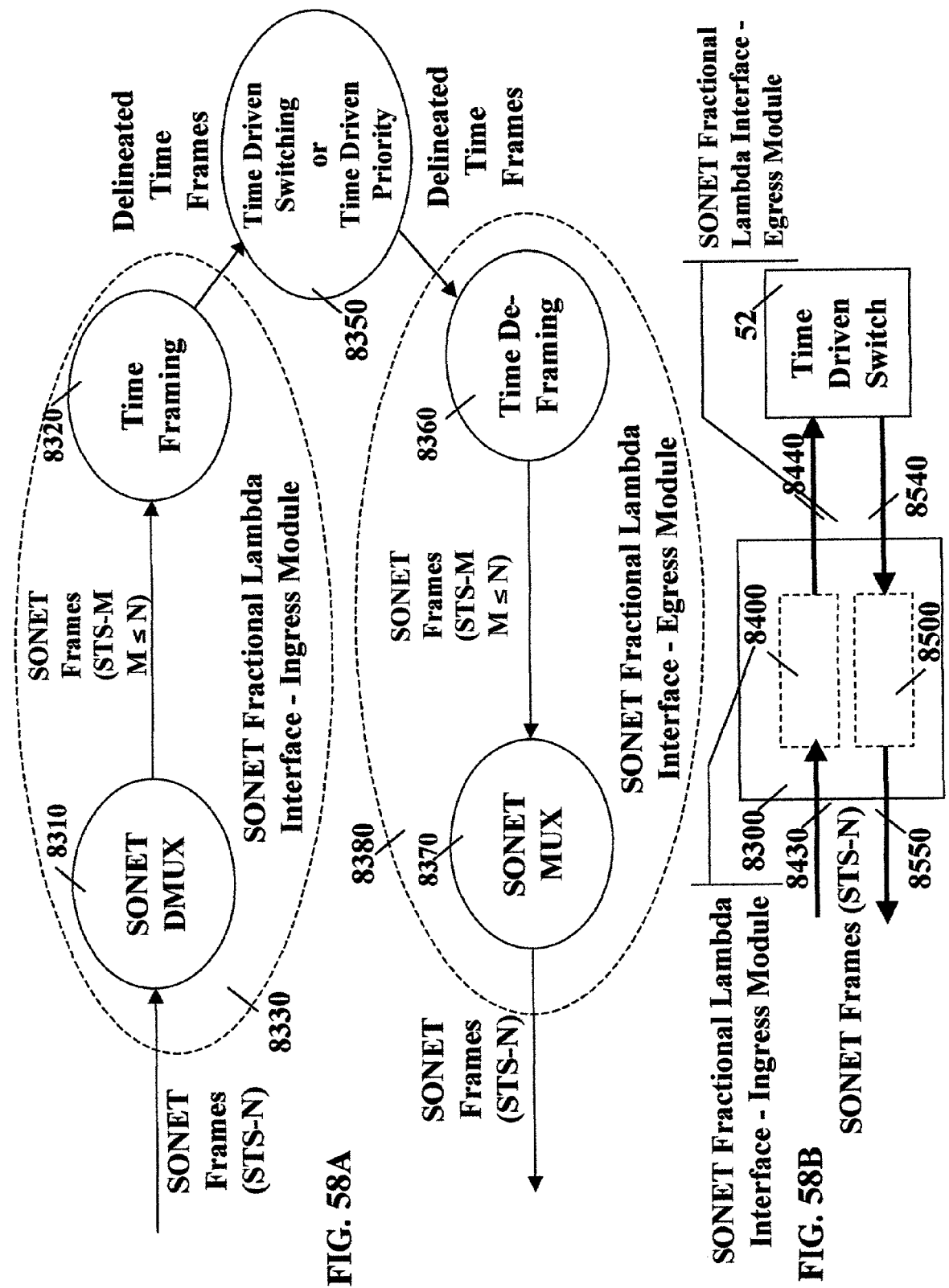
Figure 59:
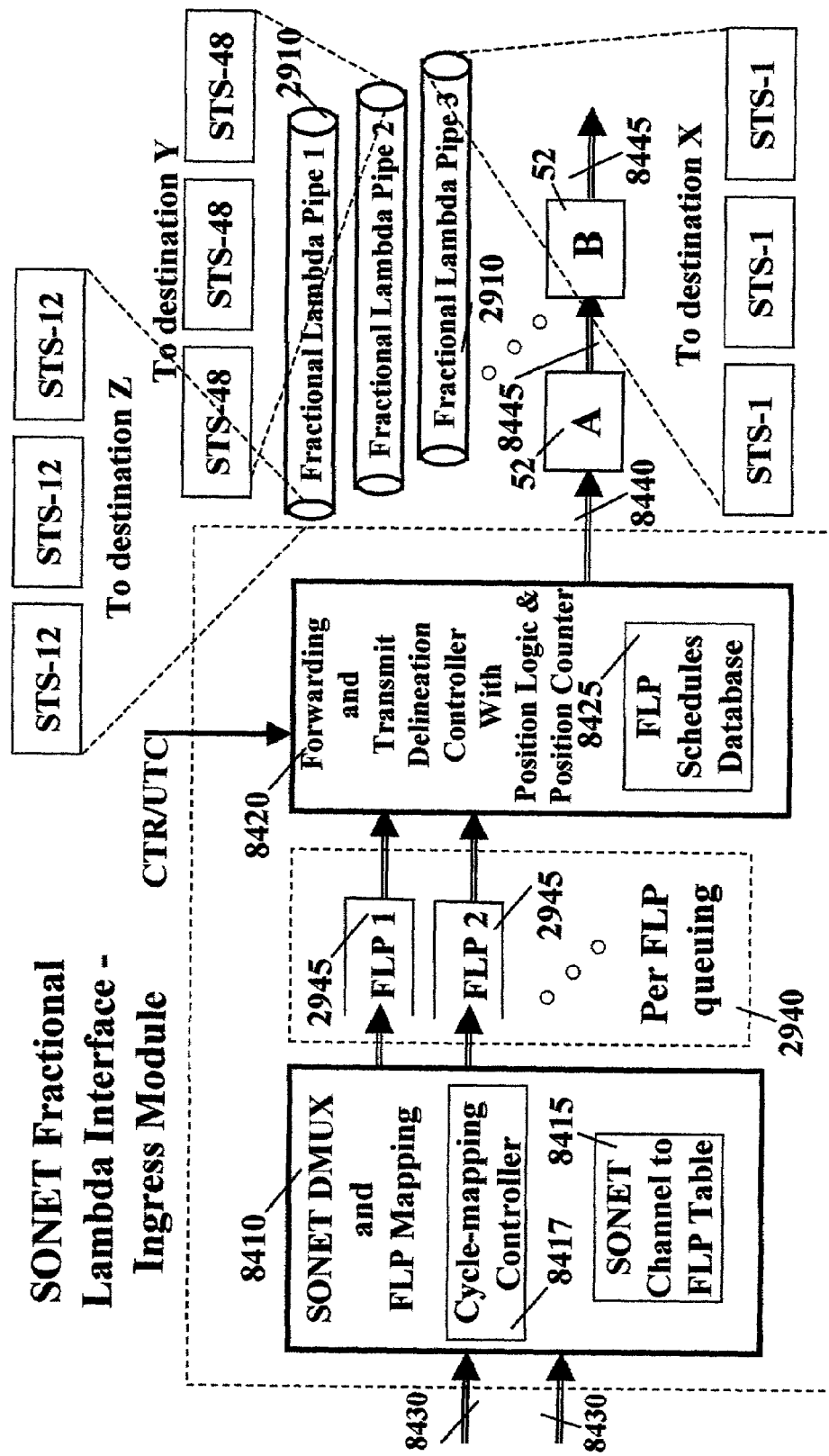
Figure 60:
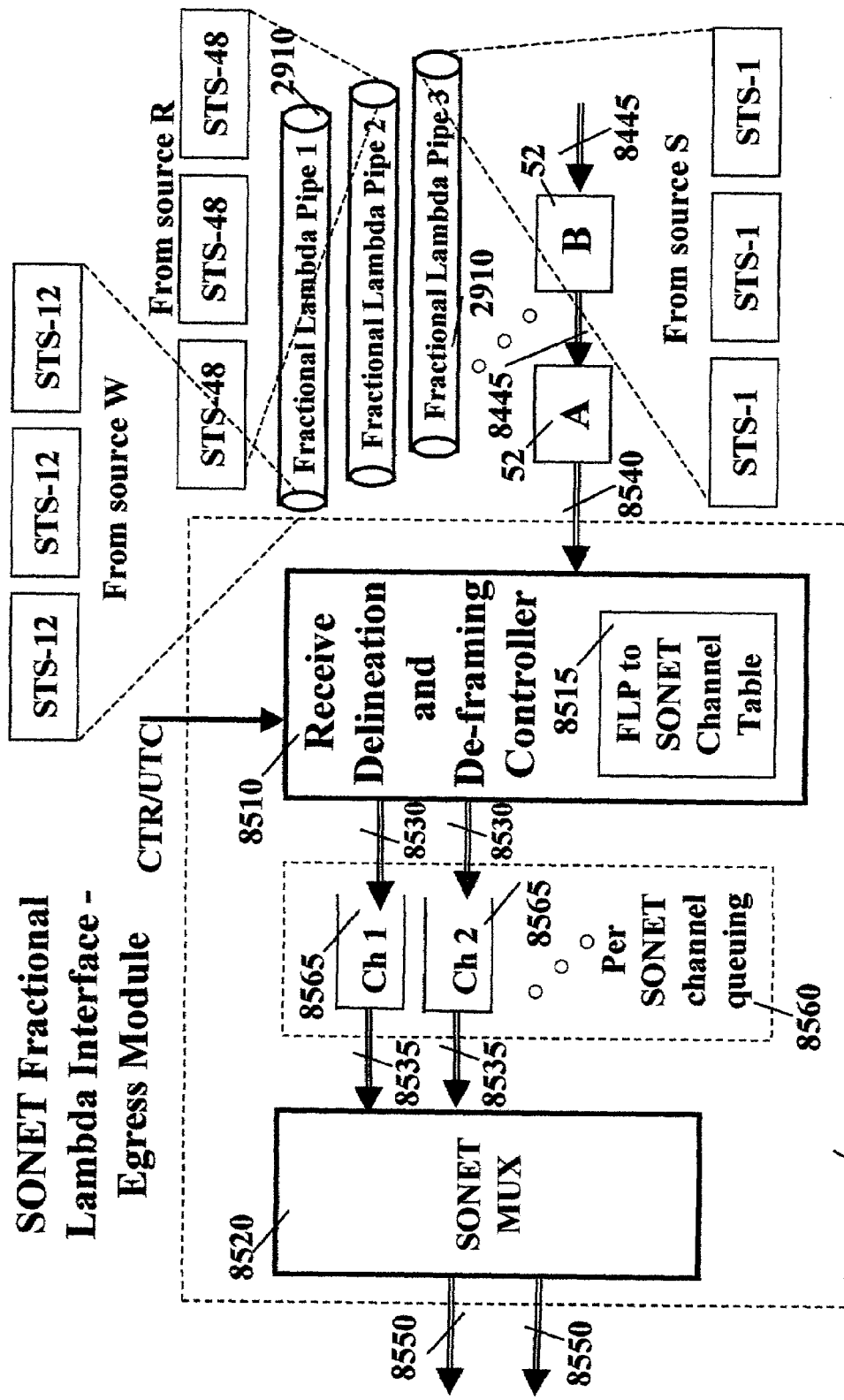
Figure 61:
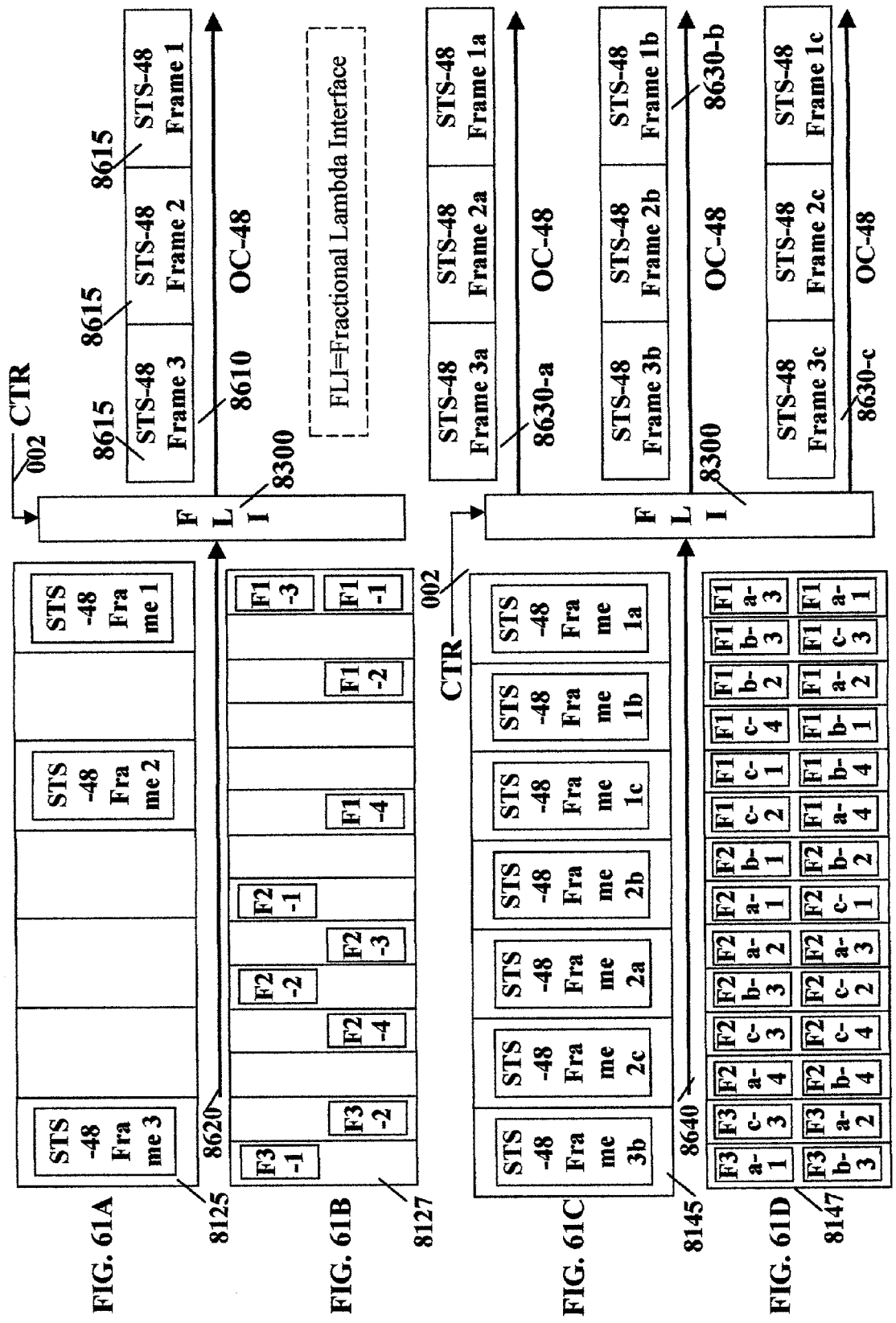
Figure 62:
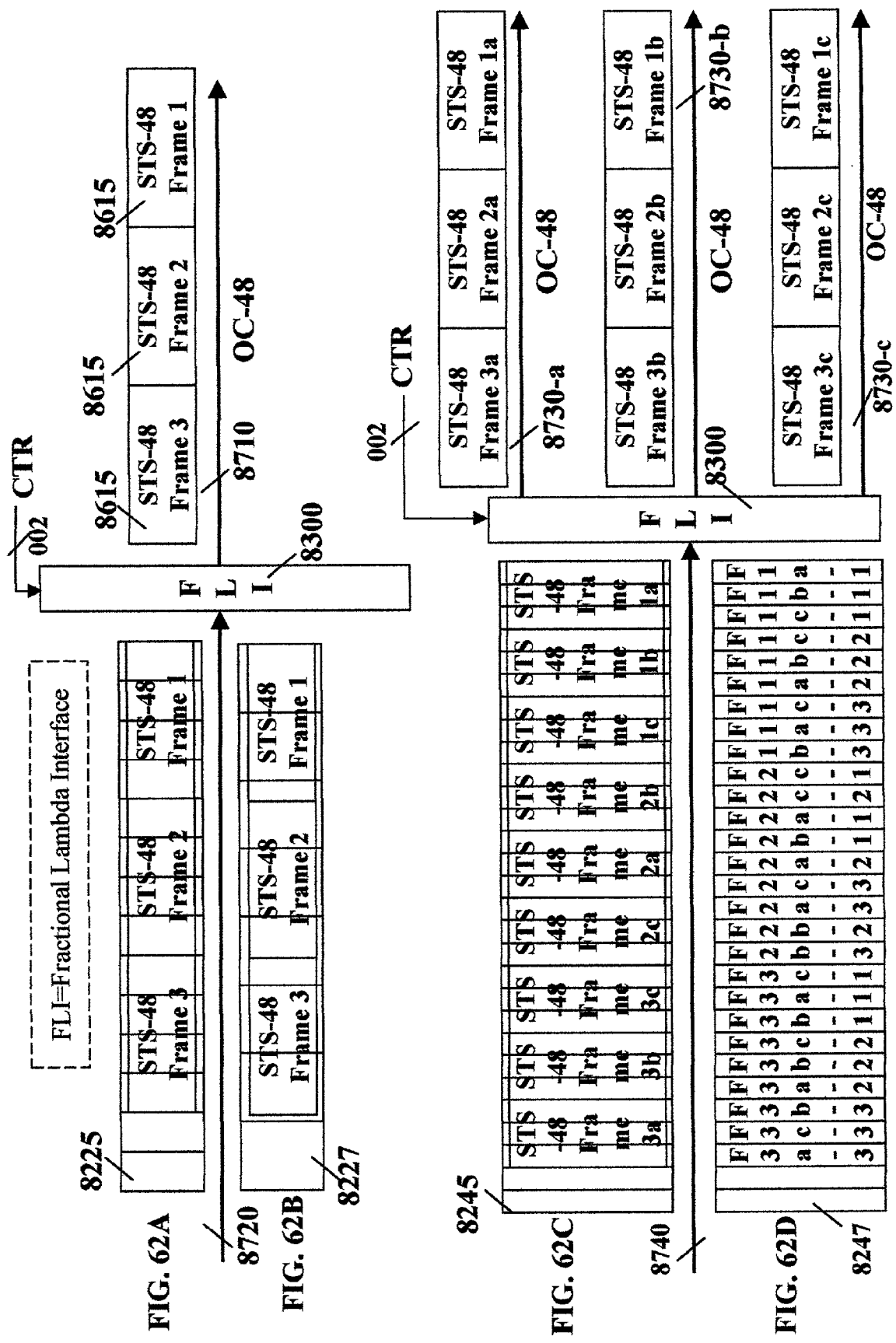
Figure 63:
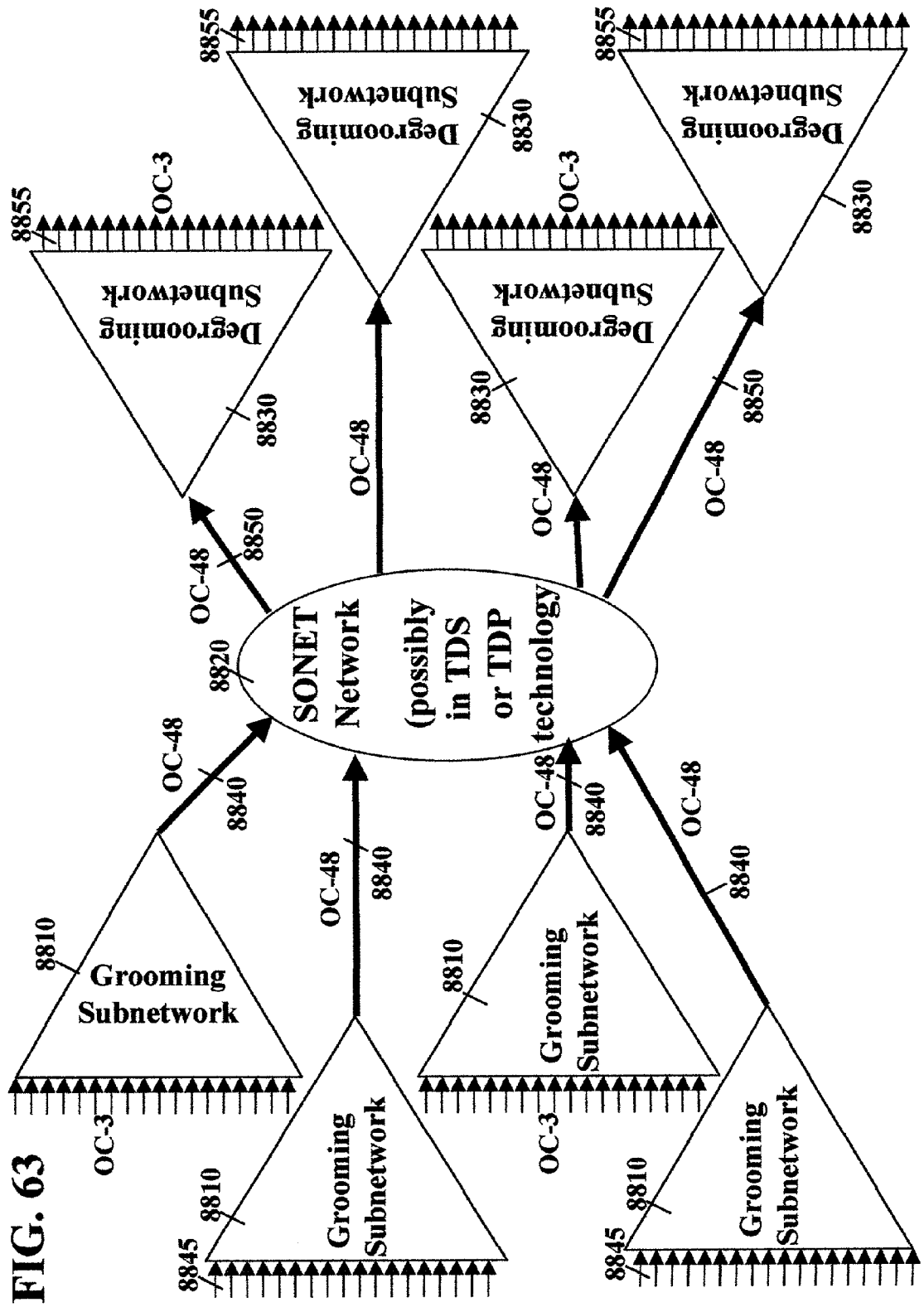
Figures 64A, 64B:
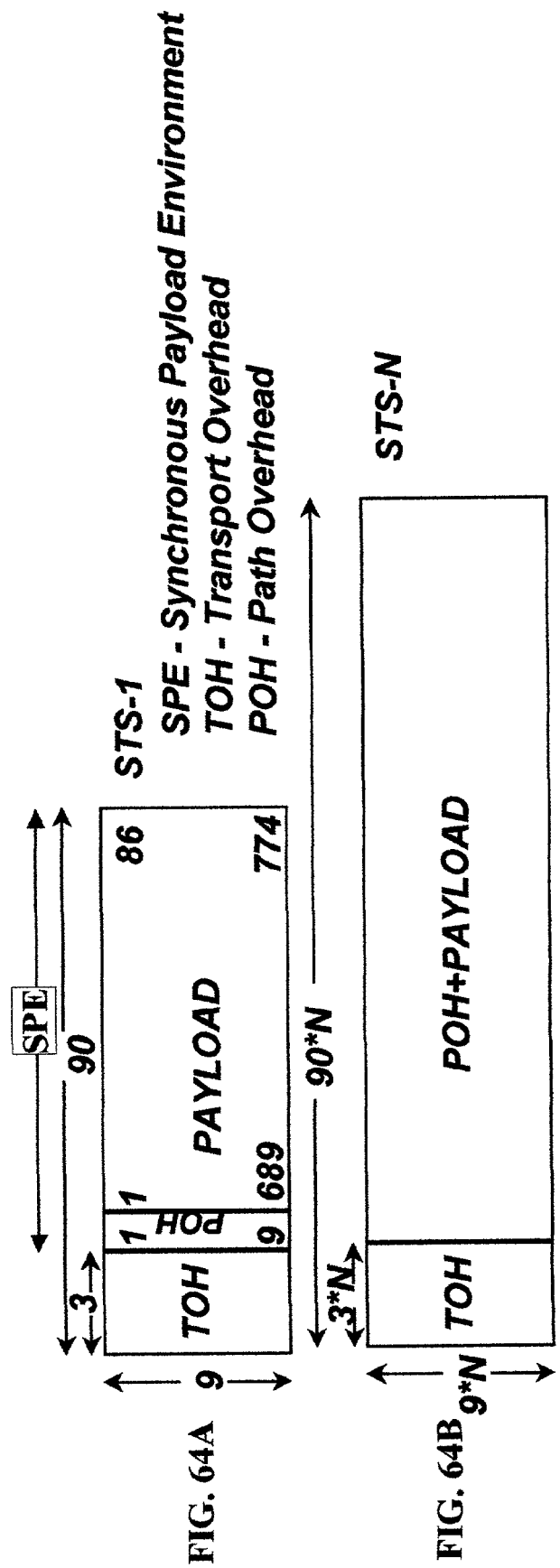
Figure 65:
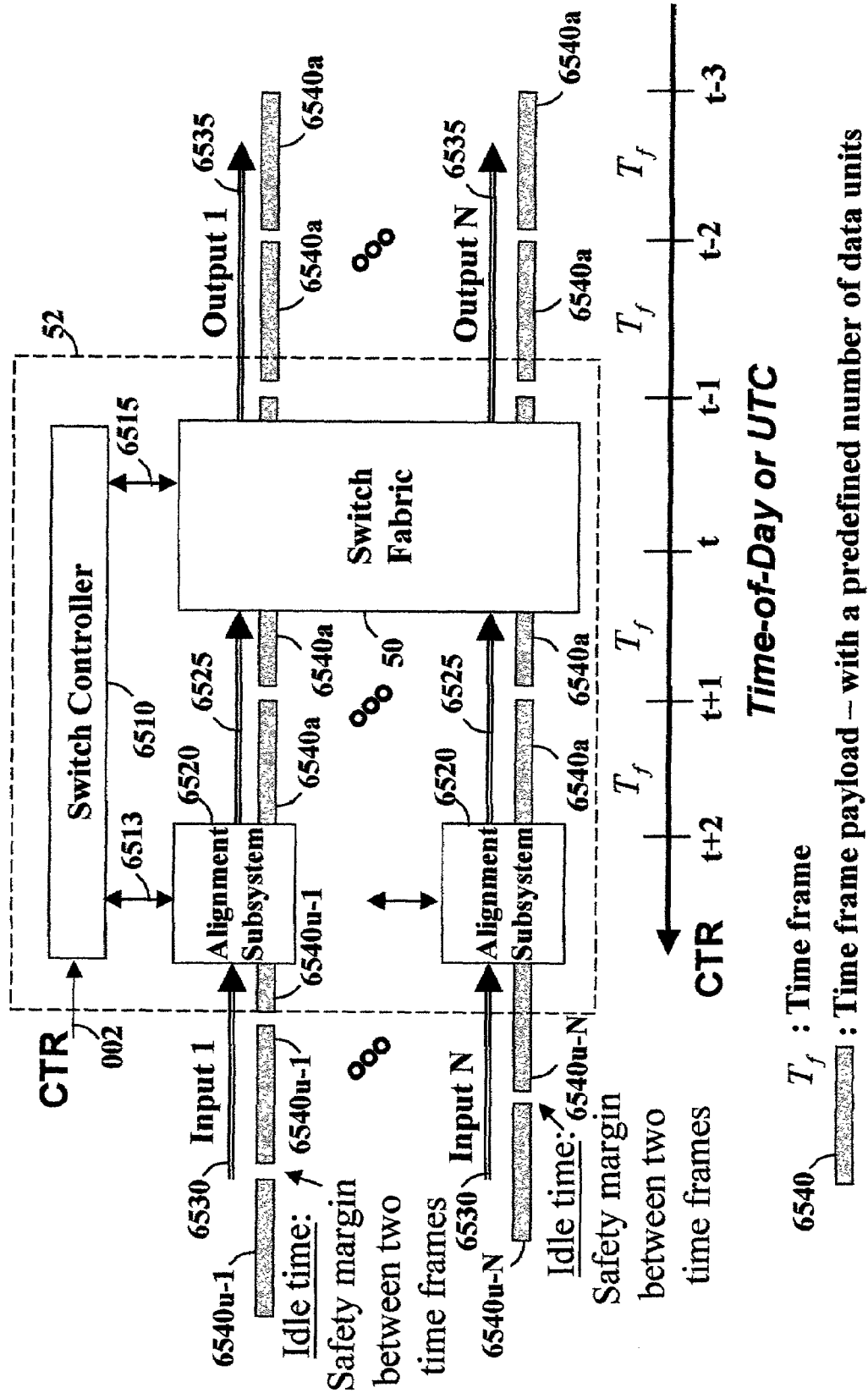

FIG. 33 contains a table providing the time frame size and the time frame frequency for various configurations each one characterized by a specific time frame duration and channel capacity. The size of an 80 microsecond time frame on a gigabit Ethernet (GE) channel is used as a measurement unit for the time frame size;

FIG. 34 contains a table providing the time frame size and the time frame frequency for various configurations each one characterized by a specific time frame duration and channel capacity. The size of a 62.5 microsecond time frame on a gigabit Ethernet (GE) channel is used as a measurement unit for the time frame size;

FIG. 35 is a timing diagram of the alignment subsystem operation responsive to CTR and the serial link unique time reference (UTR);

FIG. 36 is a possible connection of optical WDM channels to a 16 channel input port and the block diagram of the input port;

FIG. 37 is a connection of optical WDM channels to a 16 channel output port providing regeneration of the signal on each channel;

FIG. 38A is a 2-by-2 optical switching block providing a straight connection;

FIG. 38B is a 2-by-2 optical switching block providing a cross connection;

FIG. 38C is a possible realization of an 8-by-8 optical switch fabric based on a Banyan network of 2-by-2 optical switching blocks;

FIG. 39 shows a grooming and degrooming scenario in which data units collected from low capacity access links are aggregated for transmission over a single high capacity channel through a high capacity backbone and then de-aggregated or degroomed over a plurality of low capacity access links to reach their respective destinations;

FIG. 40 shows a grooming scenario in which multiple low capacity channels (OC-3, 155 Mb/s) are aggregated in a single high capacity channel (OC-768, 40 Gb/s);

FIG. 41 shows a pictorial representation of a grooming operation according to the disclosed invention wherein data units arriving during one time frame over a plurality of low capacity input channels are forwarded over one high capacity output channel during a plurality of shorter time frames;

FIG. 42 shows a functional architecture of the grooming system comprising a grooming module and a grooming controller responsive to the Common Time Reference (CTR 002) and the Unique Time References (UTRs) of each input channel;

FIG. 43 shows a block diagram of the grooming module comprising a plurality of alignment subsystems, each responsive to the Common Time Reference (CTR 002) and the Unique Time Reference (UTR) of the input channel coupled to the alignment subsystem;

FIG. 44 contains three timing diagrams wherein two timing diagrams are related to two (low capacity) input channels of a grooming system and one timing diagram is related to one (high capacity) output channel of the same grooming system; wherein solid arrows show the relationship between the time frames in which data units are received over the input channels and the time frames in which the same data units are transmitted over the output channel; wherein such relationship cyclically repeats during each time cycle, wherein the time cycles of each channel have the same duration;

FIG. 45 shows a degrooming scenario in which multiple low capacity channels (OC-3, 155 Mb/s) are derived from a single high capacity channel (OC-768, 40 Gb/s);

FIG. 46 shows a pictorial representation of a degrooming operation according to the disclosed invention wherein data units arriving over a single high capacity input channel are forwarded over a plurality of low capacity input channels;

FIG. 47 shows the functional architecture of a degrooming system comprising a degrooming module a degrooming controller responsive to both the Common Time Reference (CTR 002) and the Unique Time Reference (UTR) of a high capacity input channel;

FIG. 48 shows a block diagram of a degrooming module comprising a plurality of alignment subsystems, each responsive to both the Common Time Reference (CTR 002) and the Unique Time Reference (UTR) of an input channel;

FIG. 49 shows a block diagram of a degrooming module comprising one alignment subsystem and a plurality of rate matching buffers, each responsive to the Common Time Reference (CTR 002) and a Unique Time Reference (UTR) of an input channel;

FIG. 50 shows a block diagram of the degrooming module comprising at least one of a plurality of alignment subsystems, each responsive to both the Common Time Reference (CTR 002) and the Unique Time Reference (UTR) of an input channel, and at least one of a plurality of routing modules; wherein a routing module has one input channel and a plurality of output channels over which it routes data units received from an input channel;

FIG. 51 is a schematic diagram of the routing module, comprising a routing table, a plurality of queues, and a routing controller that determines to which output port an incoming data unit should be switched;

FIG. 52 contains three timing diagrams wherein one timing diagram is coupled with one (high capacity) input channel of a grooming system and two timing diagrams are coupled to two (low capacity) output channels of the same grooming system, wherein solid arrows show the relationship between the time frames in which data units are received over the input channel and the time frames in which the same data units are transmitted over the corresponding output channels; wherein such relationship cyclically repeats during each cycle, wherein the cycles of each channel have the same duration;

FIG. 53 depicts a network scenario in which grooming and degrooming with common time reference is deployed to aggregate packet traffic to be switched by fractional lambda switches (FLSs) and optical cross connects (OXCs);

FIG. 54 depicts a network scenario in which grooming and degrooming with common time reference is deployed to aggregate SONET traffic to be switched by fractional lambda switches (FLSs) and optical cross connects (OXCs);

FIG. 55 shows a scenario in which a time driven switching network, also called fractional lambda switching network, provides transport for SONET/SDH channels thus offering SONET connectivity among SONET cross-connects, SONET Add/Drop Multiplexers, and SONET equipment, such as PBXs, wherein fractional lambda interfaces are deployed at the interface between the SONET devices and the time driven switching network;

FIG. 56 shows four possible scenarios of time framing and multiplexing of SONET STS-48 frames received from a SONET network and forwarded on a time driven switching network;

FIG. 56A exemplifies the time framing of whole STS-48 frames—one STS-48 frame for each time frame;

FIG. 56B exemplifies the time framing of STS-12 frames de-multiplexed from the original STS-48 frames—one or more STS-12 frames for each time frame;

FIG. 56C shows the multiplexing of entire STS-48 frames time framed in different time frames;

FIG. 56D shows the multiplexing of STS-12 frames de-multiplexed from the original STS-48 frame;

FIG. 57 shows four possible scenarios of time framing and multiplexing of SONET STS-48 frames received from a SONET network and forwarded over a time driven switching network;

FIG. 57A exemplifies the time framing of a fraction of an STS-48 frames—one STS-48 frame is time framed over a plurality of consecutive time frames;

FIG. 57B exemplifies the time framing of a fraction of an STS-48 frames—one STS-48 frame is time framed over a plurality of consecutive time frames, wherein the same time frame possibly contains fractions from a plurality of STS-48 frames;

FIG. 57C shows the multiplexing of entire STS-48 frames time framed in different time frames, wherein each STS-48 frame is time framed over a plurality of consecutive time frames;

FIG. 57D shows the multiplexing of fractions of STS-48 frames time framed in a plurality of non-consecutive time frames, wherein fractions of different STS-48 frames can be time framed in consecutive time frames;

FIG. 58A shows a diagram of the functions to be performed in order to provide SONET/SDH services over a time driven switched network, i.e., in order to carry STS-N frames over a time driven switched network and reconstruct the original OC-N channel at the egress of the time driven switching network;

FIG. 58B is the high level architecture of a fractional lambda interface used to provide SONET services;

FIG. 59 shows the architecture of the ingress module of a fractional lambda interface for mapping SONET channels onto fractional lambda pipes;

FIG. 60 shows the architecture of the egress module of a fractional lambda interface for mapping fractional lambda pipes onto SONET channels;

FIG. 61 shows four possible scenarios of time de-framing of SONET STS-48 frames received from a time driven switching network and forwarded on a SONET network;

FIG. 62 shows four possible scenarios of time de-framing of SONET STS-48 frames received from a time driven switching network and forwarded on a SONET network;

FIG. 63 depicts a scenario wherein grooming with CTR is used to gather over high capacity channels data units received from low capacity channels, wherein SONET switching is used to switch (and possibly multiplex and de-multiplex) high capacity channels, and degrooming with CTR is used to divide over low capacity channels data units transported over high capacity channels;

FIG. 64A depicts the structure of a SONET (Synchronous Optical NETwork) frame used for transmission at about 50 Mb/s (STS-1 channel;

FIG. 64B depicts the structure of a SONET (Synchronous Optical NETwork) frame used for transmission integer multiple N of STS-1—which is STS-N;

FIG. 65 is a pictorial representation of the alignment principle wherein unaligned time frames on all the inputs are aligned to the common time reference prior to being switched.

DETAILED DESCRIPTION OF THE PREFERRED EMBODIMENT

While this invention is susceptible of embodiment in many different forms, there is shown in the drawings and will be described herein in detail, specific embodiments thereof with the understanding that the present disclosure is to be considered as an exemplification of the principles of the invention and is not intended to limit the invention to the specific embodiments illustrated.

The present invention relates to a system and method for switching and forwarding data units over a network with optical WDM (wavelength division multiplexing) links. The switches of the network maintain a common time reference (CTR), which is obtained either from an external source (such as GPS—Global Positioning System, or GLONASS, or Galileo) or is generated and distributed internally. The common time reference is used to define time intervals, which include super cycles, time cycles, time frames, sub-time frames, and other kinds of time intervals. The time intervals are arranged in both simple periodicity and complex periodicity (i.e., like seconds and minutes of a clock).

A data unit that arrives to an input port of a switch or a grooming or de-grooming system is switched to an output port based on either arrival time information and/or specific routing information in the data unit's header (e.g., IPv4 destination address in the Internet, VCI/VPI labels in ATM, MPLS-multi-protocol label switching-labels). Each switch along a route from a source to a destination forwards data units in periodic time intervals that are predefined using the common time reference.

A system is provided for managing data transfer of data units from a source to a destination. The transfer of the data units is provided during a predefined time interval, comprised of a plurality of predefined time frames. The system is further comprised of a plurality of switches. A common time reference signal is coupled to each of the switches, and a time assignment controller assigns selected predefined time frames for transfer into and out from each of the respective switches responsive to the common time reference signal.

Each communications channel may use a different time frame duration generated from the common time reference signal. Data units received during at least one of a plurality of time frames over at least one of a plurality of input channels can be transmitted during a single time frame over a single output channel. Data units received during a single time frame from an input link are transmitted during at least one of a plurality of time frames over at least one of a plurality of output links.

For each switch, there is a first predefined (optical) channel and first predefined time frame within which a respective data unit is transferred into the respective switch, and a second predefined (optical) channel and a second predefined time frame within which the respective data unit is forwarded out of the respective switch, wherein the first and second predefined time frames may have different durations. The time assignment provides consistently fixed time intervals between the input to and output from the fractional lambda pipe.

In a preferred embodiment, there is a predefined subset of the predefined time frames during which the data units are transferred in the switch, and for each of the respective switches, there is a predefined subset of the predefined time frames during which the data units are transferred out of the switch.

For each of the data units, there is an associated time of arrival to a respective input port. The time of arrival is associated with a particular predefined time frame. For each of the mappings by the routing controller, there is an associated mapping by a scheduling controller, which maps each of the data units between the time of arrival and forwarding time out. The forwarding time out is associated with a specified predefined time frame.

There is a fixed time difference between the time frames for the associated time of arrival and forwarding time out for each of the data units. A predefined interval is comprised of a fixed number of contiguous time frames comprising a time cycle. Data units that are forwarded over a given fractional lambda pipe are forwarded from an output port within a predefined subset of time frames in each time cycle.

The time frames associated with a particular switch within the fractional lambda pipe are associated with the same switch for all the time cycles, and are also associated with one of input into or output from the particular respective switch.

In one embodiment of the present invention, there is a constant fixed time between the input into and output from a respective one of the switches for each of the time frames within each of the time cycles. A fixed number of contiguous time cycles comprise a super cycle, which is periodic. Data units that are forwarded over a given fractional lambda pipe are forwarded from an output port within a predefined subset of time frames in each super cycle. Furthermore, the number of data units that can be forwarded in each of the predefined subsets of time frames within a super cycle for a given fractional lambda pipe is also predefined.

In the preferred embodiment, the common time reference signal is devised from the GPS (Global Positioning System), and is in accordance with the UTC (Coordinated Universal Time) standard. The UTC time signal does not have to be received directly from GPS. Such a signal can be received through various means, as long as the delay or time uncertainty associated with that UTC time signal does not exceed half a time frame.

In one embodiment, the super cycle duration is equal to one second as measured using the UTC (Coordinated Universal Time) standard. In an alternate embodiment the super cycle duration spans multiple UTC seconds. In another alternate embodiment the super cycle duration is a fraction of a UTC second. In a preferred embodiment, the super cycle duration is a small integer number of UTC seconds.

Data units can be Internet Protocol (IP) data packets, multi-protocol label switching (MPLS) data packets, Point-to-Point Protocol (PPP) frames, High-level Data Link Control (HDLC) frames, Frame Relay frames, fiber channel data units, asynchronous transfer mode (ATM) cells, or SONET/SDH frames.

In accordance with one aspect of the present invention, a system is provided for transferring data units across a data network while maintaining for reserved data traffic, constant bounded jitter (or delay uncertainty), and no congestion-induced loss of data units. Such properties are essential for many multimedia applications, such as telephony and video teleconferencing.

Figure 1:
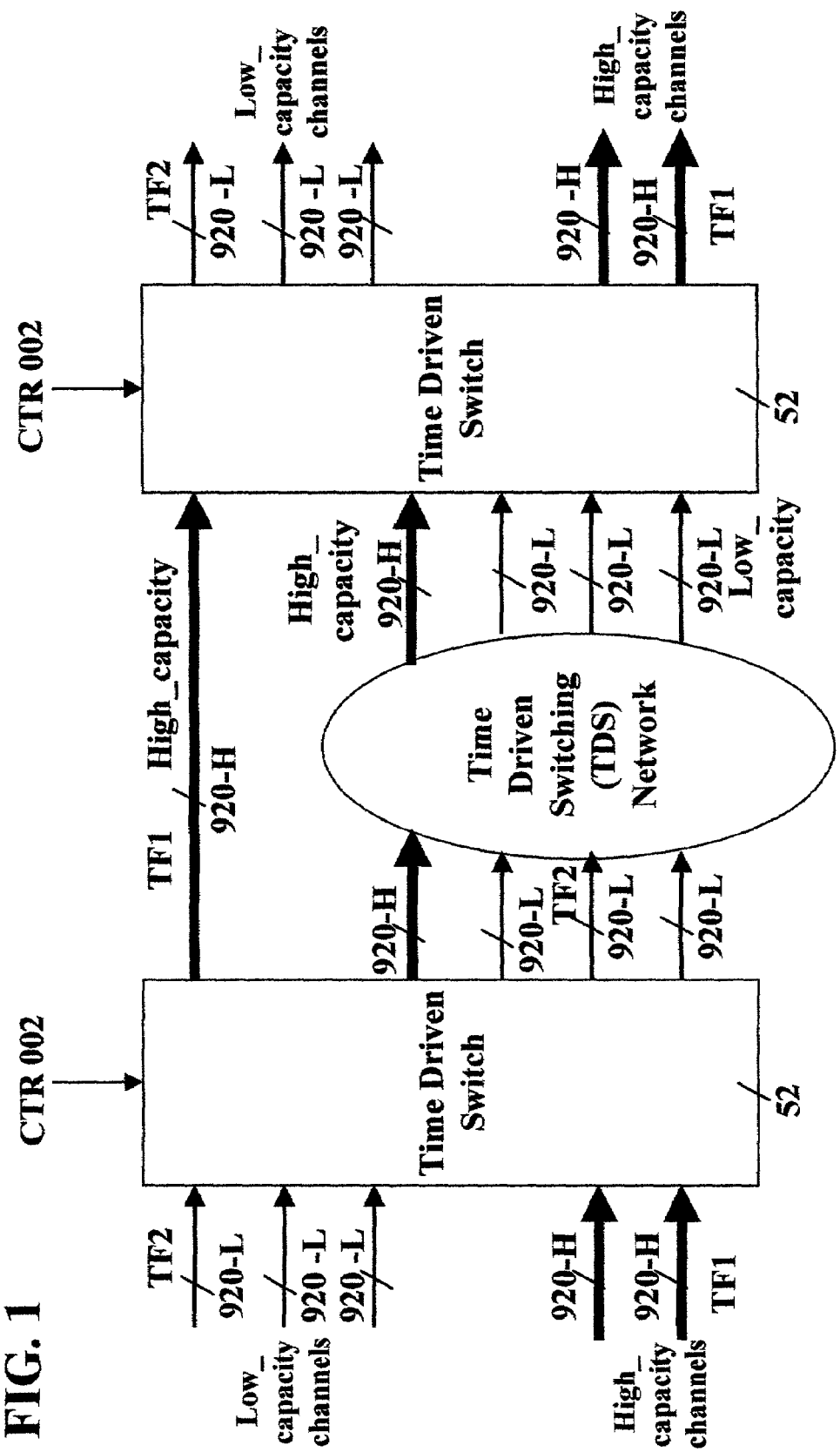
FIG. 1 shows two switching systems interconnected with links of different speeds, operating according to the present invention.

In accordance with one aspect of an illustrated implementation of the present invention, as shown in FIG. 1, two or more switching systems 52 can be connected through one or more links comprising a plurality of channels having at least one of a plurality of transmission capacities. Each switching system is responsive to a common time reference (CTR) signal 002 which can be implemented, among other ways, by using the timing signal provided by the global positioning system (GPS) or other positioning systems such as GLONASS and Galileo. The switching systems move data units received at input ports to selected output ports according to the time driven switching operating principles.

Time Frames and Time Cycles

FIG. 2 is an illustration of a common time reference (CTR) that is aligned to UTC. Consecutive time frames are grouped into time cycles. FIG. 2A and FIG. 2B provide examples of the common time reference (CTR) organized according to time frames of two different durations. As shown in the example illustrated in FIG. 2A, there are 800 time frames in each time cycle, where each time frame lasts 12.5 microseconds. For illustration purposes, the time frames within a time cycle are numbered 1 through 800. According to the example shown in FIG. 2B, there are 100 time frames in each time cycle, where each time frame lasts 125 microseconds. For illustration purposes, the time frames within a time cycle are numbered 1 through 100.

Time frames having a different duration can be used for transmission over channels with a different capacity. FIG. 2A provides an example in which 15.325 microseconds time frames are coupled to OC-192 (2.4 Gb/s) channels, while FIG. 2B exemplifies the coupling of 125 microseconds time frames with OC-3 (155 Mb/s) channels. In FIG. 2 the ratio c between the transmission speed of a high capacity channel and the transmission speed of a low capacity channel is defined. In the example in FIG. 2, c is 64.

As shown in FIG. 2, consecutive time cycles are grouped together into super cycles, and there are 100 time cycles in each super cycle. For illustration purposes, time cycles within a super cycle are numbered 0 through 99. Super cycles 0 and m are shown in FIG. 2. Time cycles of different durations can be coupled with channels that deploy time frames of different durations. Equivalently, super cycles comprised of a different number of time cycles can be coupled with different channels that deploy time frames having different durations.

FIG. 2 is illustrative of the relationship between time frames, time cycles, and super cycles; in alternate embodiments, the number of time frames within a time cycle may be different than 100 or 800, and the number of time cycles within a super cycle may be different than 100.

FIG. 2 illustrates how the common time reference signal can be aligned with the UTC (Coordinated Universal Time) standard. In this illustrated example, the duration of every super cycle is exactly one second as measured by the UTC standard. Moreover, as shown in FIG. 2, the beginning of each super cycle coincides with the beginning of a UTC second. Consequently, when leap seconds are inserted or deleted for UTC corrections (due to changes in the earth's rotation period), the cycle and super cycle periodic scheduling will not be affected. The time frames, time cycles, and super cycles are each associated in the same manner with all respective switches within a fractional lambda pipe at all times.

In the embodiment illustrated in FIG. 2, the super cycle duration is equal to one second as measured using the UTC (Coordinated Universal Time) standard. In an alternate embodiment the super cycle duration spans multiple UTC seconds. In another alternate embodiment the super cycle duration is a fraction of a UTC second. In another embodiment, the super cycle duration is a small integer number of UTC seconds. A time frame may be further divided into time slots in the preferred embodiment, not illustrated in FIG. 2.

FIG. 32, FIG. 33, and FIG. 34 contain tables that show the impact of the time frame (TF) duration and channel capacity over the amount of information that can be transmitted during one time frame (TF size). FIG. 32 provides a SONET-centric view by considering link capacities and time frame durations that result in integer number of SONET frames per time frame. FIG. 33 and FIG. 34 provide a Gigabit Ethernet-centric view by referring TF sizes to a selected unit TF size over a Gigabit Ethernet (GE) channel.

In FIG. 32, FIG. 33, and FIG. 34, the first two columns of the tables contain the capacity of the channel both in Mb/s and, where applicable, in terms of position in the SONET hierarchy; the third column contains the TF duration in microseconds.

In FIG. 32 the fourth and fifth columns provide the TF size resulting from the channel capacity and TF duration corresponding to each row—and contained in the first three columns. In the rows corresponding to SONET channels, the TF size shown in the fourth column includes the SONET overhead, while the one in the fifth column refers to SONET payload bytes only. The sixth column expresses the TF size as number of SONET STS-1 Synchronous Payload Environments (SPEs) that can be transmitted during one time frame. Finally, the seventh column provides the number of time frames per second resulting from the TF duration corresponding to the given row.

The two tables in FIG. 33 and FIG. 34 give a Gigabit Ethernet-centric view of the impact of TF duration on TF size. The fourth and fifth columns of the two tables provide the TF size resulting from the channel capacity and TF duration corresponding to the row—and contained in the first three columns. The fourth column provides the TF size in bytes, while the fifth provides a relative measure based on the size of a selected TF on a GE channel. The first row of each table contains the characteristics of the TF used as a reference in the corresponding table. FIG. 33 uses a TF of 80 microseconds as the basis for comparing the alternative TF durations on channels with a plurality of capacities. FIG. 34 uses a TF of 62.5 microseconds as the basis for comparing the alternative TF durations on channels with a plurality of capacities.

Fractional Lambda Interface

A time driven switch 52, also called fractional lambda switch, in FIG. 1 is capable of switching the data units received through a selected input optical channel to at least one of a plurality of output optical channels (also called wavelength or lambdas) coupled to at least one of a plurality of optical fibers (also called optical links). As shown in FIG. 31, data units that time driven switches are required to switch in the same way (from the same input channel to the same output channel) are associated with a Fractional Lambda Pipe (FLP) 2910 in FIG. 31. Data units belonging to a plurality of protocols can be carried on the same optical link (i.e., switched by one switching system). Data units belonging to different protocols are associated with different FLPs.

FIG. 31 shows 3 Fractional Lambda Pipes (FLPs) defined across the time driven switches A and B. FLP 1 carries Gigabit Ethernet (GE) frames that have to be delivered to destination Z, FLP 2 carries IP packets to destination Y, and FLP 3 carries Fiber Channel (FC) data units to destination X. A deterministic quality of service is guaranteed by reserving resources to each FLP. In the context of time driven switching, also called fractional lambda switching, resources are reserved to an FLP by requiring and being granted exclusive access to an output channel during at least one of a plurality of time frames or time frame fractions.

A Fractional Lambda Interface (2900 in FIG. 31) at the boundary of a sub-network that is not deploying time driven switching is responsible for mapping incoming data units on fractional lambda pipes (FLPs). The mapping is based on either control information carried in the data units' header—in case of packet switching-or the data units' arrival time-in case of circuit switching.

FIG. 31 shows the block diagram of the preferred embodiment of fractional lambda interface 2900. A Packet Scheduling Controller 2930 processes data units (for example asynchronous packets or SONET frames) arriving from at least one of a plurality of input channels 2931. Based on information contained in the packet header—such as an MPLS label, or the destination address in an IP packet, or the VCI(VPI in an ATM cell, or other header fields—or the time position of a SONET STS-N frame in a multiplexed STS-M frame, where M>N, the Packet Scheduling Controller 2930 identifies the fractional lambda pipe 2910 to which the data unit belongs. The relevant header information is used for example, as a lookup key, to retrieve fractional lambda pipe information from a pre-computed table.

Once processed by the Packet Scheduling Controller 2930 in FIG. 31, data units are stored in a per fractional lambda pipe (FLP) queuing system 2940. The per fractional lambda pipe (FLP) queuing system 2940 comprises a multiplicity of queues 2945. Each queue is associated with one fractional lambda pipe. The Forwarding Controller 2920 retrieves the data units contained in a specific queue 2945 during each of the time frames reserved to the associated fractional lambda pipe 2910.

Another implementation of a fractional lambda interface features a per time frame queuing system that contains one queue for each time frame in the time cycle. For each data unit, the Packet Scheduling Controller 2930 in FIG. 31 uses the control information associated with the data unit as a key to a fractional lambda pipe schedules table to retrieve the pointers to the queue in which the data unit should be stored. Multiple ways exist according to which the Packet Scheduling Controller 2930 can choose the specific queue in which to store a data unit. One possible implementation consists in choosing the first queue that will be served (i.e., the one associated with the next time frame to come which is reserved for the fractional lambda pipe 2910 to which the data unit belongs).

At each time frame, the Forwarding Controller 2920 in FIG. 31 retrieves and forwards on the line 2932 towards a time driven switch 52 data units stored in the queue associated with the fractional lambda pipe 2910 to which the given time frame has been reserved. The current time frame is identified in accordance with the Common Time Reference 002.

At the beginning of a new time frame the Forwarding Controller 2920 in FIG. 31 may change the queue 2945 from which data units are retrieved. The new queue 2945 is identified by consulting the FLP schedules database 2925, which contains among other information, the fractional lambda pipe to which each time frame had been reserved.

Each of the per-fractional lambda pipe queues 2945 can be logically organized in a plurality of sub-queues. When retrieving data units from each of the queues 2945, the Forwarding Controller 2920 can apply a variety of scheduling algorithms, such as FIFO, simple priority, round robin, weighted fair queuing, to the plurality of sub-queues. The order in which data units are retrieved from the various sub-queues (i.e., the relative priority of the sub-queues) depends on the adopted queue management policy.

With reference to the preferred embodiment comprising a per FLP queuing system 2940, all the data units that happen to be remaining in a queue 2945 by the end of a time frame will be served during the upcoming time frames reserved to the fractional lambda pipe 2910 associated with the given queue 2945.

The fractional lambda interface 2900 can have multiple lower capacity input lines 2931 that are aggregated on the same higher speed output line 2932. In other words, data units are received from multiple input lines 2931, sorted in the queues 2945 of the same per-FLP queuing system 2940, from which the Forwarding Controller 2920 retrieves data units for transmission on the output channel 2932.

The Forwarding Controller 2920 can be comprised of a plurality of Forwarding Controllers, each one associated with at least one of the output channels 2932. There can be a plurality of sets of queues 2940, each set comprising at least one queue 2945, wherein each set 2940 is associated with one of the Forwarding Controllers 2920.

The Forwarding Controller 2920 in FIG. 31 can retrieve data units from more than one queue 2945 and forward them on more than one output channel 2932. In this case the FLP Schedules database 2925 provides for each selected time frame, the FLP 2910, to which the selected time frame has been reserved on each of the output channels 2932. Thus, each time frame can be reserved to zero (not reserved) FLPs, to one FLP, to as many FLPs 2910 as the number of output channels 2932, or a number of FLPs larger than the number of output channels 2932, in the case where more than one FLP share the same time frame on the same channel 2932.

The Fractional Lambda Interface 2900 in FIG. 31 can comprise a plurality of Forwarding Controller Modules 2920 each associated with at least one of a plurality of asynchronous data units streams (packet streams) or synchronous streams (circuit switched channels).

Switching with Pipeline Forwarding with a Plurality of Time Frame Durations and a Plurality of Channel Capacities One of the aspects of the disclosed invention is related to the capability of forwarding, over the same output channel during the same time frame, data units received during at least one of a plurality of time frames over at least one of a multiplicity of incoming channels. This operation is known as multiplexing and takes place at least at one of two different levels.

Multiplexing can be done at the channel capacity level by aggregating data units from a plurality of low capacity channels on a single high capacity channel. In a possible scenario of channel capacity level multiplexing, the sum of the capacity of the incoming channels equals the capacity of the output channel.

Multiplexing can be done at the time frame level by transmitting, during the same time frame, data units received during the same time frame on a plurality of input channels. In another scenario, time frame level multiplexing is realized by transmitting, during the same time frame, data units received during a plurality of time frames on a single input channel. In another scenario, time frame level multiplexing is realized by transmitting, during the same time frame, data units received during a plurality of time frames over a plurality of input channels. In a possible scenario of time frame level multiplexing, the sum of the time frame durations employed at the incoming channels equals the duration of the time frame employed at the output channel.

Multiplexing at the channel capacity level or at both the channel capacity and time frame level is called grooming. Grooming refers in general to the capability of aggregating data units received on a plurality of low capacity channels over a single higher capacity channel.

Data units received by a time driven switch 52 in FIG. 1 over one of its input channels during a first time frame are forwarded by the time driven switch over a predefined one of its output channels during a predefined second time frame, wherein the second time frame is either the one immediately following the first one, such that this operation is called immediate forwarding, or the second time frame is another one of the time frames following the first time frame, such that this operation is called non-immediate forwarding. If the first time frame in which the data units are received is predefined, the second time frame is consequently predefined. This in turn makes the time frame, in which the data units will be received by a downstream time driven switch 52, predefined.

For example, in FIG. 31 once the time frame during which the Fractional Lambda Interface transmits on its output channel 2932 data units belonging to a FLP is known, given the type of forwarding (immediate or non-immediate) performed by the time driven switches A and B on the path of the FLP™, the time frame during which the data units will be forwarded on each of the communications channels 2933 and 2934 will be uniquely determined.

In other words the time frames, in which data units belonging to a given FLP are transmitted over each of the traversed links, are strictly coupled. Once a time frame used on any one of the communications links traversed by the FLP is determined, each corresponding one of the time frames used on all the other links traversed by the FLP is univocally determined, given the type of forwarding (immediate or non-immediate) performed by the time driven switches traversed by the FLP.

In order to properly reserve switching capacity in the time driven switches 52 (A and B in the example shown in FIG. 31) and transmission capacity over the communications channels (2932, 2933, and 2934 in the example shown in FIG. 31) traversed by an FLP, a scheduling problem has to be solved for finding the number of time frames required to provide the desired capacity to the FLP, wherein the chosen time frames are not already used for switching and transmitting data units belonging to another FLP on any of the traversed switches 52 and communications channels, wherein each chosen time frame on each one of the links traversed by the FLP is properly coupled to the corresponding time frame chosen on the other communications links traversed by the FLP, given the type of forwarding (immediate or non-immediate) performed by the time driven switches traversed by the FLP.

The Pipeline Forwarding (PF) Principle

In the method shown in FIG. 3, the content of the whole time frame is switched in the same way—namely, all the data units in the time frame are switched to the same output port. Consequently, there is no need to use time slots within time frames. FIG. 3 shows an example of time frame (IF) switching and forwarding through a sequence of the switches: Switch A, Switch B, and Switch C. According to this specific example, the content of a TF that was forwarded from Switch A at time frame 2 will reach Switch B at time frame 5; it is then switched to the output port and forwarded at time frame 6, and will reach Switch C at time frame 9. The above method of time frame switching is extremely useful in reducing the switching complexity of communications systems with very high transmission rates (e.g., OC-48, OC-192, OC-768) and/or a plurality of wavelengths (e.g., WDM channels and subcarrier multiplexing—SCM—channels).

The Two Phases Operation

Figures 4A, 4B:
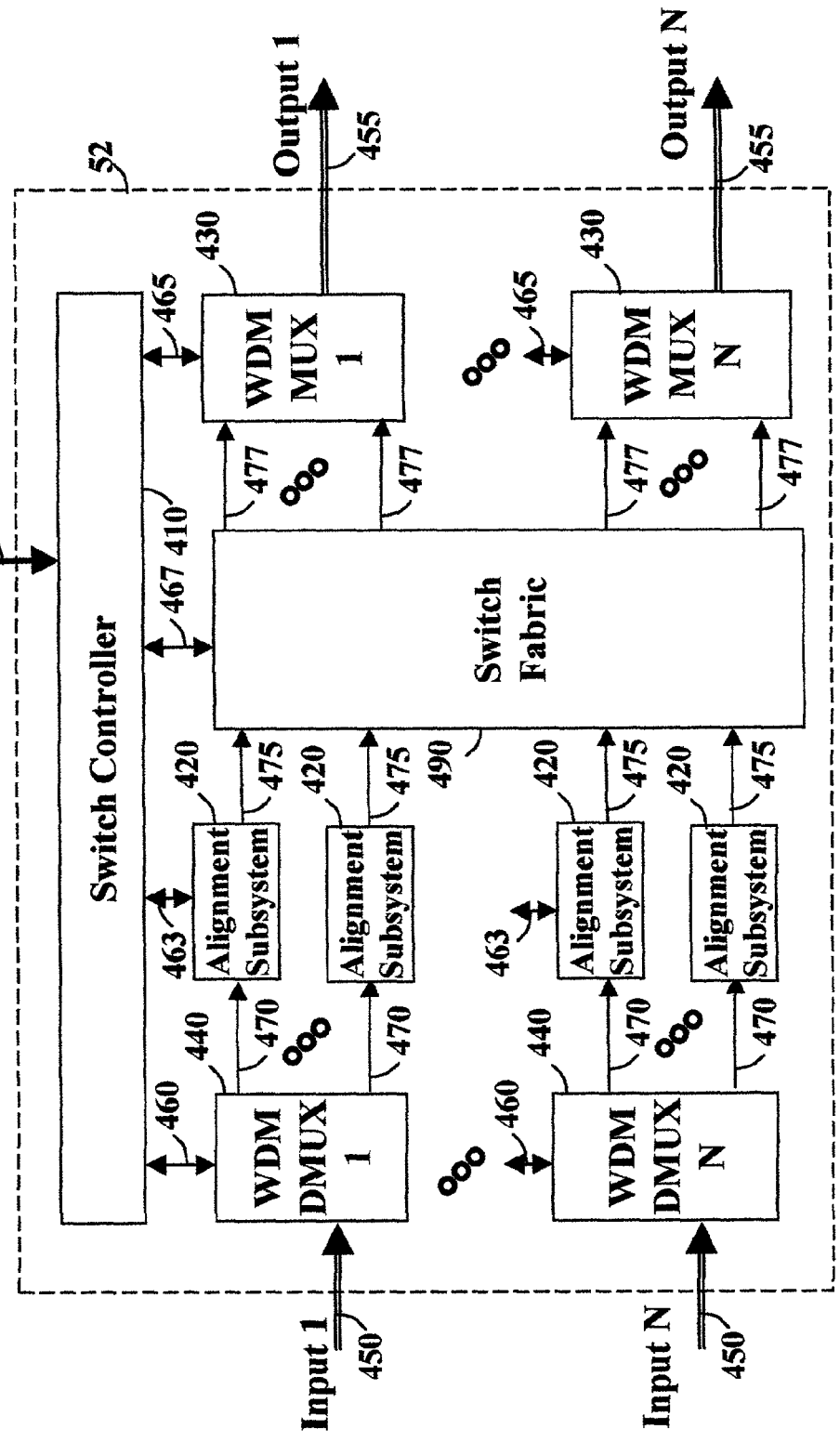
FIG. 4A shows an optical switching system with the following basic components: a plurality of WDM DMUXes (de-multiplexers), a plurality of either electronic or optical alignment subsystem, an either electronic or optical switch fabric, a plurality of WDM MUXes (multiplexers).
FIG. 4B shows a two phase forwarding method illustrated across an either electronic or optical switching system, where phase 1 is for Receiving & Alignment and phase 2 is for Transmission & Switching (across the optical fabric)

In a (all-optical) time driven switch, pipeline forwarding (PF) is realized in two operational phases, as shown in FIG. 4B. Data units belonging to a whole time frame received from each of the optical channels 470 during the first phase, Phase 1, are switched through the switch fabric 490 in the second phase, Phase 2. In a possible embodiment, if Phase 1 begins in time frame t, Phase 2 takes place in time frame t+1. In another embodiment, if Phase 1 ends in time frame t, Phase 2 takes place in time frame t+1. The 2 phase operation ensures that data units received from the various optical channels are aligned with the CTR before being switched. Phase 2 can be performed during either the time frame immediately following Phase 1, during time frame t+1—immediate forwarding operation, or at a later time frame—non-immediate forwarding operation.

Alignment serves to align the beginning and end of each time frame on each optical channel with the beginning and end of the CTR time frames. The alignment is needed since the propagation delay on optical links between switches 52 is not an integer number of time frames. The alignment subsystem 420 shown as part of the fractional lambda switch in FIG. 4A operates on one of the wavelengths carried by each optical fiber 450, and is part of Phase 1 of PF. The alignment subsystem is based on a plurality of queues guaranteeing that the overall delay experienced through the optical fiber 450 and the alignment subsystem 420 is an integer number of time frames. As a result, when data units—that have left the switch 52 at the transmitting end of a fiber 455 aligned with the CTR—exit the alignment subsystem 420 at the receiving end are again aligned with respect to CTR. Various embodiments of the alignment subsystem 420 will be presented in the reminder of this disclosure.

The alignment principle is exemplified in FIG. 65. Time frames received on the input links 6530 are not aligned with the CTR. Each time frame contains a payload 6540; an idle time acts as a safety margin separating the payloads 6540 of adjacent time frames. The payloads 6540*u* of the time frames on the input links 6530 are not aligned with the CTR. Time frame payloads received from different input links 6530 are not necessarily aligned among themselves (see for example 6540*u*-1 and 6540*u*-N in FIG. 65).

An alignment subsystem 6520 coupled with each input 6530 delays incoming, unaligned time frame payloads 6540*u* such that time frame payloads 6540*a* are aligned upon exiting the alignment subsystem 6520. Time frame payloads 6540*a* on all the inputs 6525 of the switch fabric 50 are aligned to the CTR. Time frame payloads 6540 switched to the outputs 6535 are all aligned to the CTR.

The ratio between the switch reconfiguration time (i.e., the idle time between time frames) and the time frame duration represents the switching overhead. In order to keep the switching overhead acceptable, the time frame duration must be significantly larger than the switch reconfiguration time. On the other hand, the time cycle size (i.e., the number of time frames in each time cycle) determines the minimum capacity that can be allocated to an FLP. The channel capacity, time frame duration, and time cycle size determine the maximum access time to the FLP, (i.e., the maximum delay a data unit experiences before entering an FLP while waiting for the first time frame allocated to its FLP).

Time Frame Switching with Different Time Frame Durations

Figure 5:
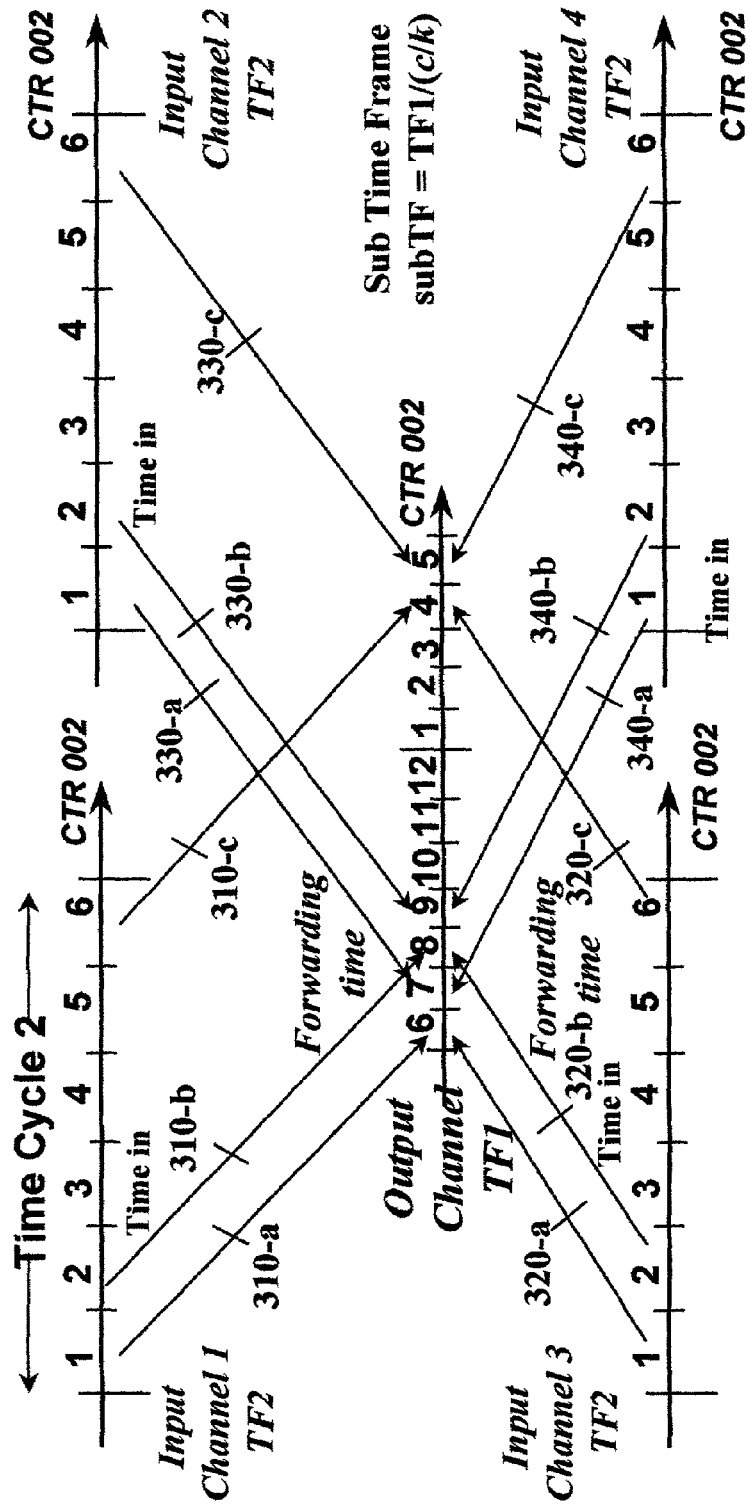
FIG. 5 contains five timing diagrams, wherein four of the timing diagrams are related to four (low capacity) input channels of an optical switching system and one timing diagram is related to one (high capacity) output channel of the same optical switching system, wherein solid arrows show the relationship between the time frames in which data units are received over the input channels and the time frames in which the same data units are transmitted over the corresponding output link.

FIG. 5 shows one possible way of combining the data units received during selected time frames over four low capacity input channels and transmitting them over a higher capacity output channel. FIG. 5 contains five timing diagrams-four associated to Input Channel 1 to 4, and one associated to the Output Channel—representing the time frame and time cycle structure deployed on the associated channel. On Input Channels 1 to 4, a time frame (TF) of duration TF2 is deployed, while the time frame duration on the Output Channel is TF1.

The TFs on the input channels are grouped in time cycles comprising SC2_length=6 time frames; the TFs on the output channel are grouped in time cycles comprising SC1_length=12 time frames. In the example provided in FIG. 5, both time cycles have the same duration of 1 UTC second; however, in other instances the duration of the time cycles can be different. The ratio between the time frame duration TF2 deployed on low capacity channels and the time frame duration TF1 deployed on the high capacity channel is k=TF2/TF1=2. A sample implementation could use TF1=31.625 microseconds and TF2=62.5 microseconds. The ratio of capacities between the high capacity channel and the low capacity channel is c=4. A sample implementation could comprise a SONET OC-192 (about 10 Gb/s) high capacity output channel and SONET OC-48 (about 2.5 Gb/s) low capacity input channels. A SubTF (sub-time frame) is defined as the fraction of the larger time frame duration TF1 given by subTF=TF1/(c/k)=TF1/2.

Figure 6:
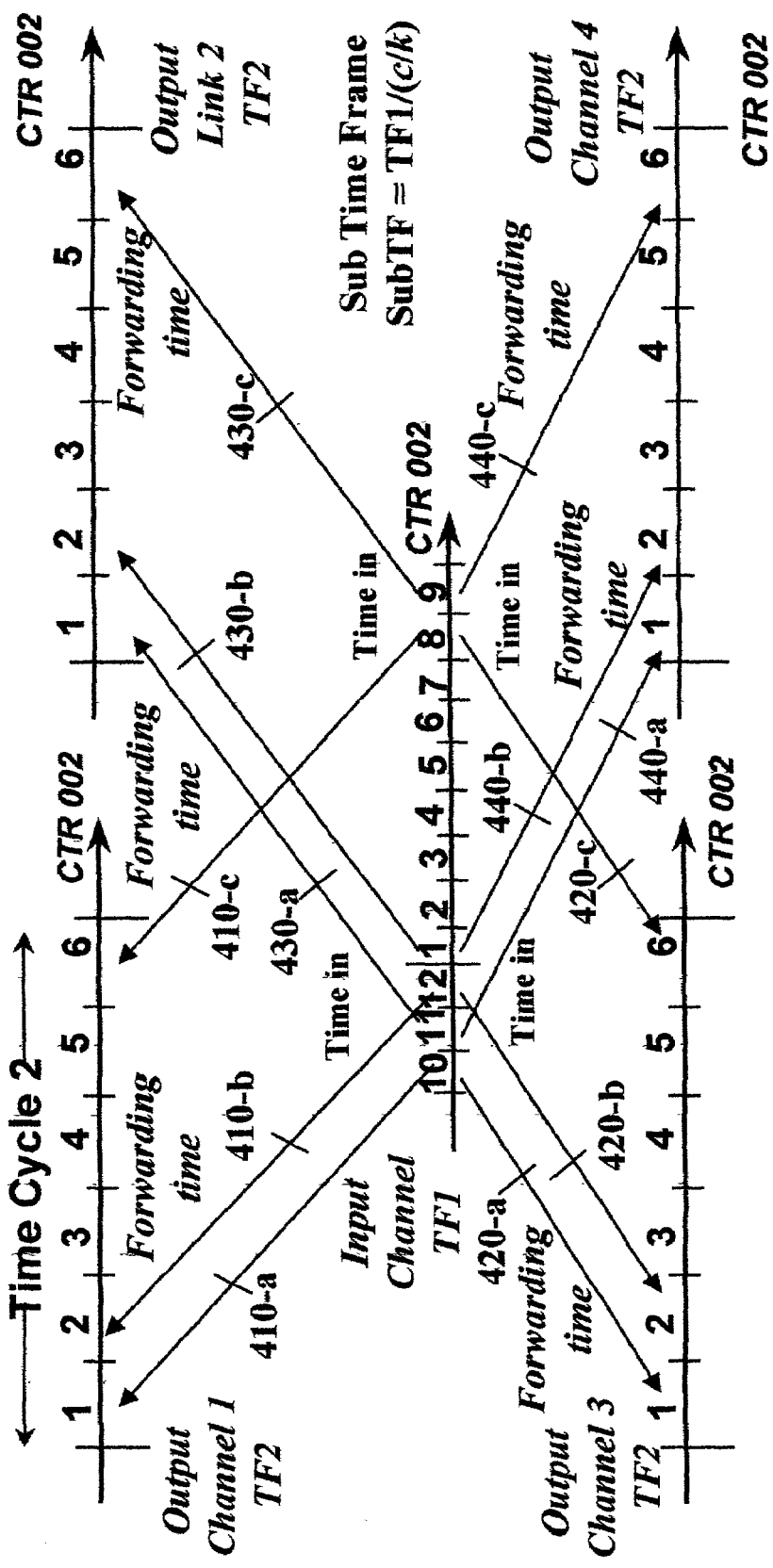
FIG. 6 contains five timing diagrams wherein one timing diagram is related to one (high capacity) input channel of an optical switching system and four timing diagrams are related to four (low capacity) output channels of the same optical switching system, wherein solid arrows show the relationship between the time frames in which data units are received over the input channel and the time frames in which the same data units are transmitted over the corresponding four output channels.
Figure 7:
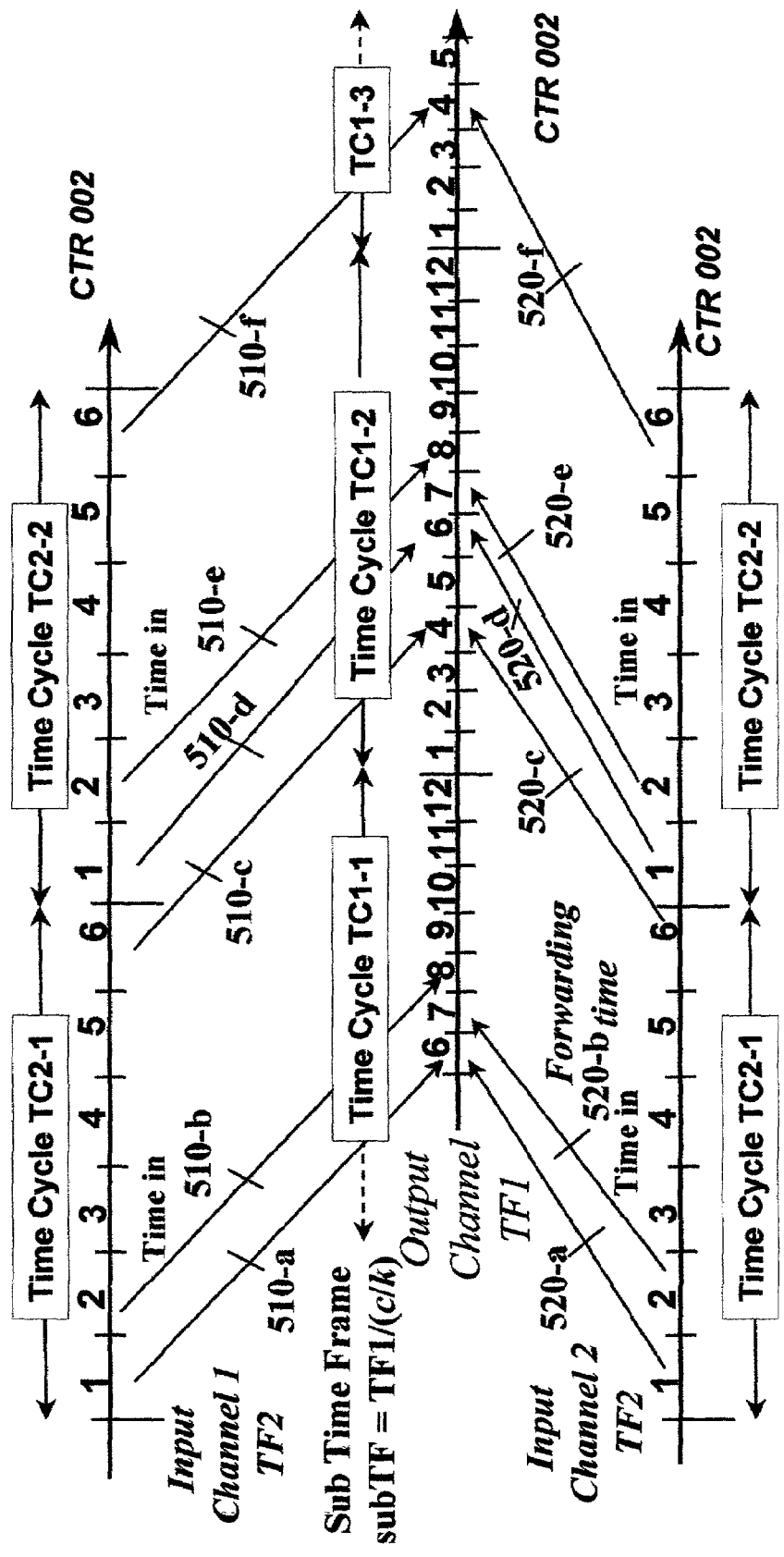
FIG. 7 contains three timing diagrams wherein two timing diagrams are related to two (low capacity) input channels of a switching system and one timing diagram is related to one (high capacity) output channel of the same switching system, wherein solid arrows show the relationship between the time frames in which data units are received over the input channels and the time frames in which the same data units are transmitted over the corresponding output channel, wherein such relationship cyclically repeats during each time cycle.
Figure 8:
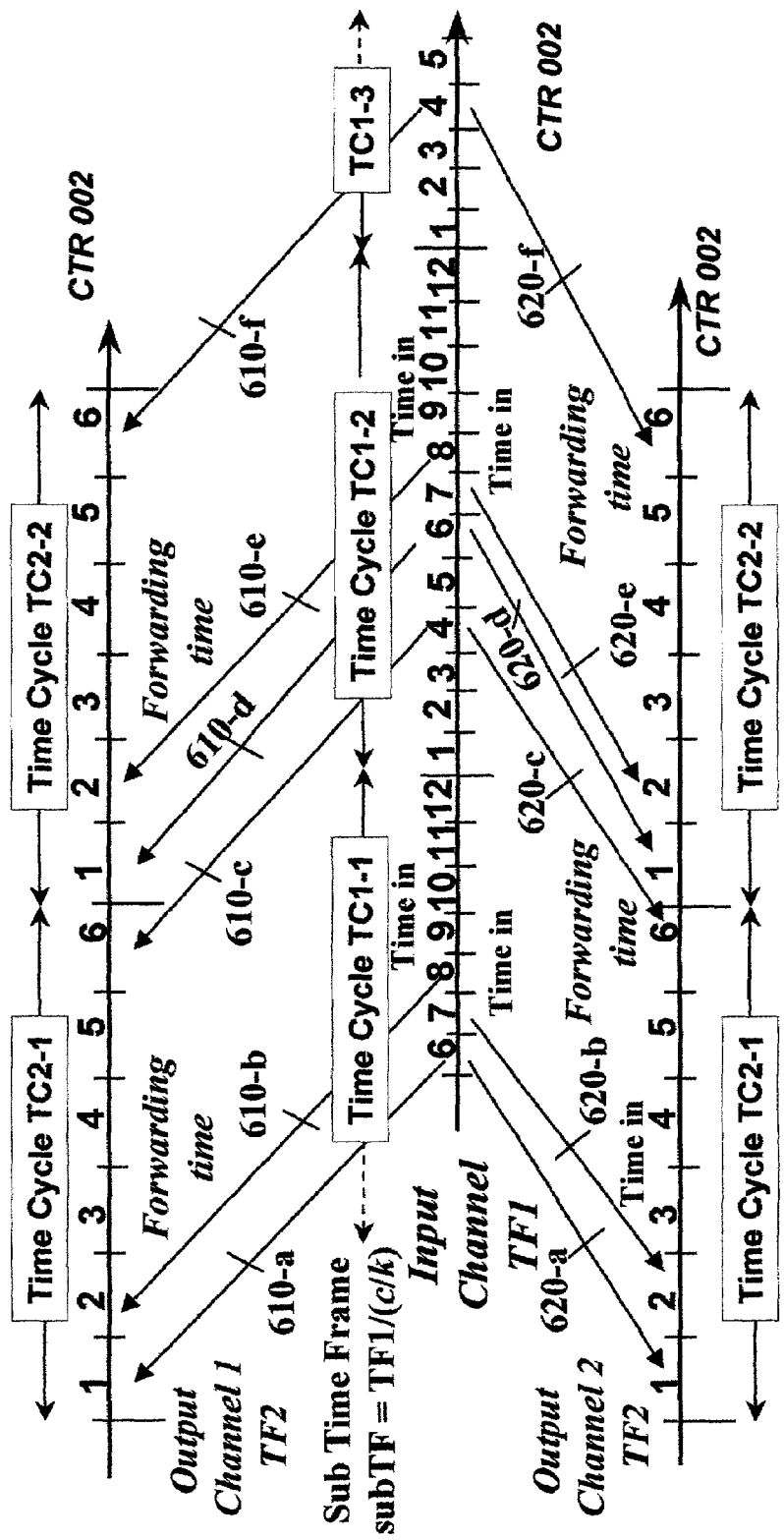
FIG. 8 contains three timing diagrams wherein one timing diagram is related to one (high capacity) input channel of a switching system and two timing diagrams are related to two (low capacity) output channels of the same switching system, wherein solid arrows show the relationship between the time frames in which data units are received over the input channel and the time frames in which the same data units are transmitted over the corresponding output channels, wherein such relationship cyclically repeats during each time cycle.

The examples depicted in FIG. 6, FIG. 7, and FIG. 8 are based on the same sample values used in FIG. 5 for the time frame duration on low capacity channels (TF2), the time frame duration on high capacity channels (TF1), the time cycle length on both low capacity and high capacity channels (SC2_length and SC1_length), and the capacity of both kinds of channels.

The arrows in FIG. 5 show the relation between the time frames during which data units are received on the input channels and the corresponding time frames in which the data units are transmitted over the output channel. As shown by arrows 310-a and 320-a, the data units received during time frame 1 on both Input Channel 1 and Input Channel 3 are transmitted on the Output Channel during time frame 6. As shown by arrows 330-a and 340-a, the data units received during time frame 1 on both Input Channel 2 and Input Channel 4 are transmitted on the Output Channel during time frame 7.

FIG. 7 shows another example of multiplexing in which data units received over 2 low capacity input channels are transmitted over a single high capacity output channel. The timing diagrams and arrows 510-a to 510-f and arrows 520-a to 520-f show that the same relationship exists between input time frames in time cycles TC2-1 and TC2-2 coupled with both Input Channel 1 and Input Channel 2 and output time frames in time cycles TC1-1, TC1-2, and TC1-3 coupled with the Output Channel. In general, the relationship between input time frames and output time frames is repeated cyclically over each time cycle TC2 and TC1. In other instances the relationship can be repeated over a different reoccurring time interval, for example over a super cycle or integer multiple of a time cycle, or over an integer multiple of a super cycle.

Another aspect of the disclosed invention is related to the capability of forwarding over multiple output channels data units received during at least one of a plurality of time frames over a single input channel This operation is known as de-multiplexing or de-grooming, and takes place at least at one of two different levels.

De-multiplexing can be done at the channel capacity level by de-aggregating data units from one high capacity channel onto a plurality of low capacity channels. In a possible scenario of channel capacity based de-multiplexing, the sum of capacities of the output channels equals the capacity of the input channel.

De-multiplexing can be done at the time frame level by transmitting the data units received from a single input channel during one time frame over a plurality of output channels. In another scenario, time frame level de-multiplexing is realized by transmitting the data units received from a single input channel during a plurality of time frames over a single output channel. In another scenario, time frame level de-multiplexing is realized by transmitting the data units received from a single input channel during a plurality of time frames over a plurality of output channels. In another possible scenario of time frame level de-multiplexing, the sum of the time frame durations employed on the output channels equals the duration of the time frame employed on the input channel.

De-multiplexing at the channel capacity level or at both the channel capacity and time frame level is called degrooming. Degrooming refers generally to the capability of dividing data units received from a single higher capacity channel onto a plurality of low capacity channels.

FIG. 6 shows one possible way in which data units received over a high capacity input channel during selected time frames can be distributed during respective selected time frames for transmission over four lower capacity output channels.

The arrows in FIG. 6 show the relation between the time frames during which data units are received on the input channel and the corresponding time frames in which the data units are transmitted over the output channels. As shown by arrows 410-a and 420-a, the data units received during time frame 10 on the Input Channel are transmitted during time frame 1 of time cycle 2, partly on Output Channel 1 and partly on Output Channel 3. As shown by arrows 430-a and 440-a, the data units received during time frame 11 on the Input Channel are transmitted during time frame 2 of time cycle 2, partly on Output Channel 2 and partly on Output Channel 4.

FIG. 8 shows another example of de-multiplexing, in which data units received over a single high capacity input channel are transmitted over 2 low capacity output channels. The timing diagrams and the arrows 610-a to 610-f and 620-a to 620-f show that the same relationship exists between input time frames in time cycles TC1-1, TC1-2, and TC1-3 coupled with the Input Channel, and output time frames in time cycles TC2-1 and TC2-2 coupled with both Input Channel 1 and Input Channel 2. In general the relationship between input time frames and output time frames is repeated cyclically over each time cycle TC2 and TC1. In other instances the relationship can be repeated over a different cycle, for example over a super cycle or an integer multiple of the time cycle, or over an integer multiple of the super cycle.

Figure 9:
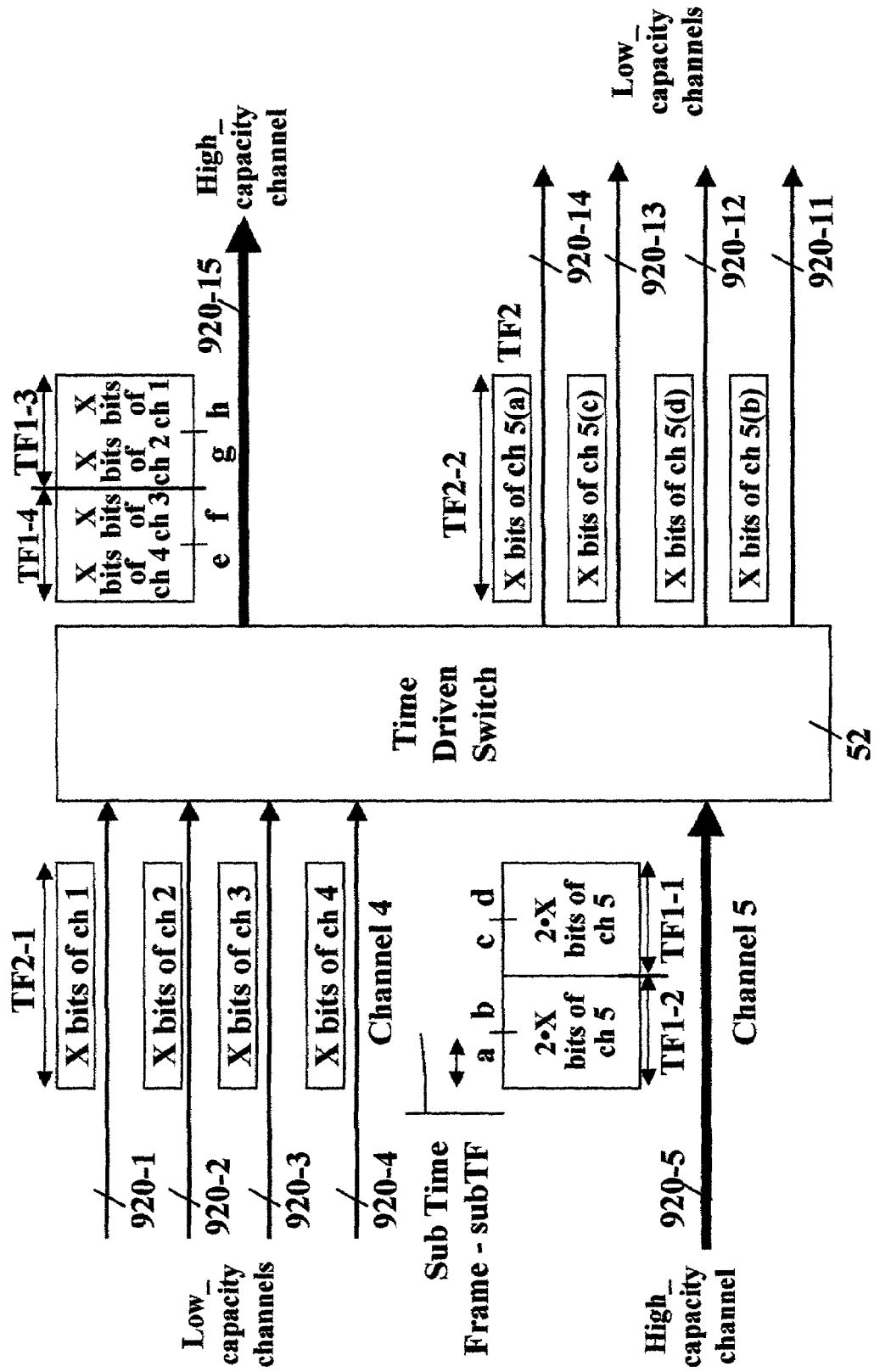
Figure 10:
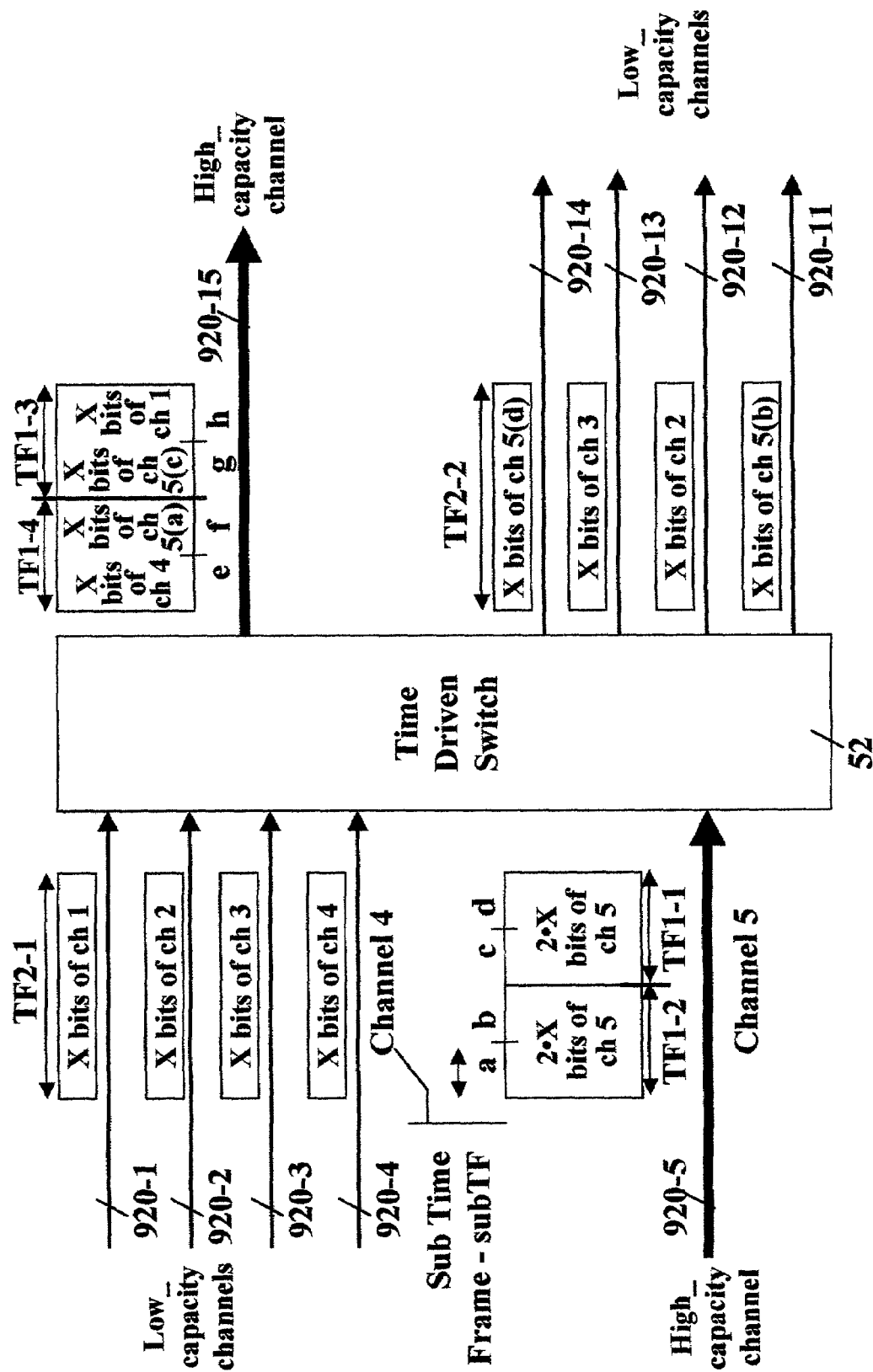

FIG. 9, FIG. 10, and FIG. 11 provide a logical view of the operation of a time driven switch 52 equipped with channels with different capacities. The switching systems depicted in FIG. 9, FIG. 10, and FIG. 11 have channels of two different capacities: four low capacity input channels 920-1 through 920-4 and four low capacity output channels 920-11 through 920-14, all eight of capacity: Low_capacity; and one high capacity input channel 920-5 and one high capacity output channel 920-15, both of capacity: High_capacity. For example the four low capacity channels could be OC-48 SONET channels (Low_capacity=2.4 Gb/s) and high capacity channels could be OC-192 SONET channels (High_capacity=9.6 Gb/s). Channels 1 920-1 though 4 920-4 and channels 11 920-11 through 14 920-14 are low capacity channels; channels 5 920-5 and 15 920-15 are high capacity channels. Time frames of duration TF2 are deployed on low capacity channels; time frames of duration TY1 are employed on high capacity channels. Sample durations are TF1=12.5 microseconds and TF2=25 microseconds, yielding k=TF1/TF2=2. Time driven switches could be equipped with channels having more than two different capacities and employing more than two different time frame durations. The principles underlying the switching system operation and the multiplexing and de-multiplexing of data units are not conceptually different from the ones exemplified in FIG. 9, FIG. 10, and FIG. 11.

FIG. 9, FIG. 10, and FIG. 11 are examples of how data units received on a mixture of low capacity and high capacity channels can be forwarded by a time driven switch over a mixture high capacity and low capacity channels, wherein data units from separate input channels could be aggregated on the same output channel and data units on the same input channel can be separated for transmission over a plurality of output channels.

In the example in FIG. 9, data units received during a predefined time frame TF2-1 of duration TF2 on the low capacity input channels 920-1 to 920-4 are transmitted on the high capacity output channel 920-15. The data units received on channel 1 920-1, comprising X bits, are transmitted on the output channel 920-15 during a first predefined sub-time frame h—having duration subTF—of a first predefined time frame TF1-3 of duration TF1. The X bits of data units received on channel 2 9202 are forwarded over the output channel 920-15 during the second sub-time frame g of the first predefined time frame TF1-3. Data units received during the predefined time frame TF2-1 on input channels 3 920-3 and 4 920-4 are transmitted on the output channel 920-15 during specific predefined sub-time frames f and e, respectively, within a second predefined time frame TF1-4.

The mapping between a specific time frame on a specific input channel and a specific sub-time frame on an output channel is repeated cyclically, for example over each time cycle, or each super cycle, or a multiple thereof. The specific time frame and sub-time frame therein upon which an incoming time frame and input channel are mapped can be fixed or changed in each cyclical mapping. Each time frame in a time cycle or super cycle can have a different mapping. The same mapping can be used for more than one time frame in the same cycle or super cycle.

Data units can be identified as belonging to different time frames and sub-time frames by means of delimiters introduced during the transmission operation. Explicit delimiters can be realized by one of a plurality of different methods. There can be a different delimiter control word to signal the beginning of a new time frame (i.e., a time frame delimiter—TFD), sub-time frame, time cycle (i.e., a time cycle delimiter—TCD) and super cycle (i.e., a super cycle delimiter—SCD). The explicit delimiter signaling can be realized by the SONET/SDH path overhead field that was design to carry control, signaling and management information. An implicit delimiter can be obtained form the CTR signal while taking into account the propagation delay on the respective input link. An alternative way of implementing an implicit delimiter is by counting the number of bytes from an explicit delimiter.

Alternatively, time frame delineation can be based on time frame delimiter in the optical signal carried on the communications link coupled to input i. A possible embodiment of time frame delimiter consists of dedicating one of the wavelengths of the communications link for transmission of the delimiter.

Data units can also be identified as belonging to different time frames and sub-time frames by means of their time of arrival or time of transmission, or by counting the amount of data received since the end of the previous time frame or sub-time frame.

The sub-time delimiter can comprise a time frame identifier implemented, for example, according to one of the methods outlined above. The time frame identifier identifies the sub-time frame within its time frame or the time frame within its time cycle.

The time frame identifier can carry control information regarding the data units belonging to the corresponding time frame or sub-time frame. For example, when the bits transmitted during a time frame have been received either over a plurality of input channels or during a plurality of time frames, the time frame identifier can identify at least one of the input channels over which the bits had been received and the time frame during which the bits had been received. In the example shown in FIG. 9, the first selected sub-time frame h of the first time frame TF1-3 during which the X bits received from Channel 1 920-1 are transmitted, has an identifier uniquely identifying at least one of the sub-time frames h of the first selected time frame TF1-3 during which the X bits are transmitted, the channel 920-1 on which the X bits had been received, and the time frame TF2-1 during which the X bits had been received from the input channel 1 920-1.

In a possible embodiment, time frame identifiers are constructed hierarchically to carry information about the time frames during which the corresponding data units were received in each time driven switch that has aggregated (or groomed) such data units. Time frame and input channel information is added by each aggregating (or grooming) time driven switch, and removed by each de-aggregating (or degrooming) time driven switch.

In the example in FIG. 9, the data units received during two predefined time frames, TF1-1 and TF1-2 of duration TF1 on the high capacity input channel 5 920-5, are transmitted on the low capacity output channels 920-11 through 920-14. The data units, comprising 2X bits, received on channel 5 920-5 during time frame TF1-1 are transmitted on the output channels 920-12 and 920-13 during a predefined time frame TF2-2 of duration TF2. The X bits of data units received on channel 5 920-5 during a first predefined sub-time frame d—having duration subTF—of the first predefined time frame TF1-1 are forwarded over the output channel 920-12. The X bits of data units received during the second sub-time frame c of the first predefined time frame TF1-1 are transmitted over output link 920-13 during the same time frame TF2-2. The data units received during the predefined sub-time frames b and a within the time frame TF1-2 on input channel 5 920-5 are transmitted on the output channels 920-11 and 920-14 respectively, during the predefined time frame TF2-2.

In the example depicted in FIG. 10, the data units received during a predefined time frame TF2-1 of duration TF2 on the low capacity input channels 920-1 and 920-4 are transmitted on the high capacity output channel 920-15; the data units received on the low capacity input channels 920-2 and 920-3 during the predefined time frame TF2-1 are transmitted over the low capacity channels 920-12 and 920-13, respectively, during a fifth predefined time frame TF2-2 of duration TF2. The data units, comprising X bits, received on channel 1 920-1 are transmitted on the output channel 920-15 during a first predefined sub-time frame h of duration subTF within a first predefined time frame TF1-3 of duration TF1. The X bits of data units received on channel 4 920-4 are forwarded over the output channel 920-15 during a first sub-time frame e of a second predefined time frame TF1-4.

In the example in FIG. 10, the data units received during two predefined time frames TF1-1 and TF1-2 of duration TF1 on the high capacity input channel 5 920-5 are transmitted partly over the high capacity output channel 15 920-15 and partly on the low capacity output channels 920-11 and 920-14. The data units received on channel 5 920-5 during a third predefined time frame TF1-1, comprising 2.X bits, are transmitted partly on the low capacity output channel 920-14 during a fifth predefined time frame TF2-2 of duration TF2, and partly on the high capacity output channel 920-15 during a predefined sub-time frame of duration subTF within the first predefined time frame TF1-3. The X bits of data units received on channel 5 920-5 during a first predefined sub-time frame d of duration subTF within the first predefined time frame TF1-1 are forwarded over the output channel 920-14. The X bits of data units received during a second sub-time frame c of the third predefined time frame TF1-i are transmitted over output link 920-15 during a predefined sub-time frame g of duration subTF within the first predefined time frame TF1-3.

The data units received during the predefined sub-time frames b and a within a fourth predefined time frame TF1-2 on input channel 5 920-5 are transmitted on the output channel 920-11 during the predefined time frame TF2-2 and on the output channel 920-15 during the predefined sub-time frame f within the second predefined time frame TW1-4 respectively.

In the example depicted in FIG. 11, the data units received during a predefined time frame TF2-1 of duration TF2 on the low capacity input channels 920-1 through 920-4 are transmitted over the low capacity channels 920-11 through 920-14 during a predefined time frame TF2-2 of duration TF2. The data units received on channel 1 920-1, comprising X bits, are transmitted on the output channel 920-14; the X bits of data units received on channel 2 920-2 are forwarded over the output channel 920-12; the data units received on channel 3 920-3, comprising X bits, are transmitted on the output channel 920-13; the X bits of data units received on channel 4 920-4 are forwarded over the output channel 920-11.

In the example in FIG. 11, the data units received during two predefined time frames TF1-1 and TF1-2 of duration TF1 on the high capacity input channel 5 920-5 are transmitted over the high capacity output channel 15 920-15 during two predefined time frames TF1-3 and TF1-4, respectively. The data units received on channel 5 920-5 during time frame TF1-1 and time frame TF1-2 are organized into different sub-time frames. The X bits of data units received on channel 5 920-5 during a first predefined sub-time frame d of duration subTF within the first predefined time frame TF1-1 are forwarded over the output channel 920-15 during a first predefined sub-time frame h of duration subTF. The X bits of data units received during a second sub-time frame c of the first predefined time frame TF1-1 are transmitted over output link 920-15 during a predefined sub-time frame g of duration subTF within a second predefined time frame TF1-3.

The data units received during predefined sub-time frames b and a within a third predefined time frame TF1-2 on input channel 5 920-5 are transmitted on the output channel 920-15 during the predefined sub-time frames f and e, respectively, within a fourth predefined time frame TF1-4.

Time Driven Switch

FIG. 12A is a schematic block diagram of one embodiment a of time driven switch. The time driven switch 52 receives a common time reference signal 002 and comprises at least one input port 900, at least one output port 1100, and a switch fabric 50 with a fabric controller 55. In the preferred embodiment, the common time reference 002 is obtained through a GPS receiver that receives a source of common time reference (e.g., UTC via GPS) via an antenna. The common time reference signal 002 is provided to all input ports 900, all output ports 1100, and the fabric Controller 55. GPS time receivers are available from a variety of manufacturers, such as, TrueTime, Inc. (Santa Rosa, Calif.). With such equipment, it is possible to maintain a local clock with accuracy of ±1 microsecond from the UTC (Coordinated Universal Time) standard everywhere around the globe. Each respective one of the input ports 900 is coupled to the switch fabric 50 with a fabric controller 55. Each respective one of the output ports 1100 is coupled to the switch fabric 50.

The time driven switch that is described in FIG. 12A operates according to the following switching principle:
From (any subTF of any Channel at any Input)
To (predefined subTF of any Channel at any Output)
Note that the predefined subTF is either in the next TF i.e., immediate forwarding or after two, three, or more TFs i.e., non-immediate forwarding.

The switch in FIG. 12A has 16 input ports 900 and 16 output ports 1100, wherein each port is connected to 16 channels 920. In a possible embodiment the channels 920 are optical channels derived from a Wavelength Division Multiplexing (WDM) de-multiplexer, as shown in FIG. 13 and FIG. 14. The input ports 9000 and output ports 1100 in FIG. 12A are coupled by a switch fabric 50 and the switching operation is controlled by a fabric controller 55. The fabric controller 55 determines the switching pattern through the switch fabric from the plurality of input optical channels 920 to the plurality of output optical channels 920.

FIG. 12B presents an example of two-phase switch operation:
Phase 1—Receiving & Alignment—in this phase the data units are received via the optical channels, and stored in an alignment subsystem and aligned with the CTR 002, which is discussed below. The alignment subsystem can be at least one of 1400 in FIG. 18 and 1500 in FIG. 19.
Phase 2—Switching & Transmitting—in this phase the content of a whole time frame or sub-time frame is switched to its respective output port 1100 and then transmitted over its respective optical channel 920 responsive to the CTR, which means that the switching of the content of a time frame or sub-time frame starts at the beginning of a time frame or a sub-time frame as determined by the CTR.

FIG. 12C presents an example of three-phase switch operation:
Phase 1—Receiving & Alignment—in this phase the data units are received via optical channels, stored in an alignment subsystem, and aligned with the CTR 002, which is discussed below. The alignment subsystem can be at least one of 1400 in FIG. 18 and 1500 in FIG. 19.
Phase 2—Switching—in this phase the content of a whole time frame or sub-time frame is switched to the output port 1100 connected to the channel 920 upon which the data units belonging to the time frame are to be transmitted. Switching is responsive to the CTR, which means that the transfer of a time frame or of a sub-time frame through the switch fabric starts at the beginning of a time frame or a sub-time frame as determined by the CTR.
Phase 3—Transmitting—in this phase the content of a whole time frame or sub-time frame is transmitted over the output channel 920 responsive to the CTR, which means that the transmission of the content of a time frame or sub-time frame starts at the beginning of a time frame or a sub-time frame as determined by the CTR.

Input from a channel 920 can come from either an output port 1100 of another time driven switch or a fractional lambda interface 2900 (see FIG. 31) that performs synchronizer/shaper functions, which consist of mapping asynchronous data units or synchronous data units into time frames. This kind of mapping is typically needed at the ingress of a time driven switching subnetwork.

The channels 920 interconnected to the input ports 900 can be received from an Optical WDM de-multiplexer 960, as shown in FIG. 13. The data units entering an input port through each input channel 920 are fed into an alignment subsystem. Consequently, each input port contains one alignment subsystem for each input channel. The alignment subsystem can be at least one of 1400 in FIG. 18 or 1500 in FIG. 19. In the embodiment presented in FIG. 13 and FIG. 14, the alignment subsystem is 1400, and its architecture is depicted in FIG. 18. Each alignment subsystem feeds an output line 940 exiting the respective input port 900 and being connected to one input of the switch fabric 50.

The optical de-multiplexer (DMUX) 960 in FIG. 13 receives in input one optical fiber 1230 with 16 WDM channels. In the embodiment described in FIG. 13, the DMUX 960 de-multiplexes each channel and forwards it to a different input port 900. Since the switching system shown in FIG. 12A has 16 input ports 900, the configuration presented in this embodiment requires 16 optical DMUXes 960, as shown in FIG. 14. As depicted in FIG. 13, channel 1 of optical DMUX i is connected to alignment subsystem i of input port 1; channel j of optical DMUX i is connected to alignment subsystem i of input port j; channel 16 of optical DMUX i is connected to alignment subsystem i of input port 16.

In the configuration proposed in this embodiment, one input port 900 receives input channels from 16 optical DMUXes, as shown in FIG. 14. Channel i of optical DMUX 1 is connected to alignment subsystem 1 of input port i; channel i of optical DMUXj is connected to alignment subsystem 1 of input port i; channel i of optical DMUX 16 is connected to alignment subsystem 16 of input port i.

In an alternative embodiment subcarrier multiplexing (SCM) is used to provide for multiple channels on each fiber. SCM de-multiplexers—instead of the WDM de-multiplexers 960 in FIG. 13 and in FIG. 14—separate the various optical channels on the fibers.

Each output port 1100 receives a plurality of input lines 1130 each one connected to a respective outlet of the switch fabric 50, as shown in FIG. 15 and FIG. 16. The channels 920 exiting the output ports 1100 are connected to an Optical WDM multiplexer (MUX) 1200, as shown in FIG. 15.

In the configuration proposed in this embodiment, one output port 1100 has 16 output channels 920-1 through 920-16 connected to respective 16 optical MUXes 1200-1 through 1200-16, as shown in FIG. 15. Line 1 of output port 1 is connected to channel 1 of optical MUX 1 1200-1; line i of output port 1 is connected to channel 1 of optical MUX i 1200-i; line 16 of output port 1 is connected to channel 1 of optical DMUX 16 1200-16.

The optical multiplexer (MUX) 1200 in FIG. 16 has 16 channels 920 connected as inputs and multiplexes them on a single optical fiber 1230 with 16 WDM channels. In the embodiment presented in FIG. 16, each channel of the MUX 1200 is connected to a different output port 1100. Since the switching system shown in FIG. 12A has 16 output ports 1100, the configuration presented in this embodiment requires 16 optical MUXes 1200, as shown in FIG. 15. As depicted in FIG. 16, channel 1 of optical MUX k is connected to line k of output port 11100-1; channel 1 of optical MUX k is connected to line k of output port I 1100-1; channel 16 of optical MUX k is connected to line k of output port 16 1100-16.

In an alternative embodiment subcarrier multiplexing (SCM) is used to provide for multiple channels on each fiber. SCM multiplexers—instead of the WDM multiplexers 1200 in FIG. 15—combine the various optical channels on the fibers 1230.

Time Driven Switch with Rate Matching Buffer (RMB)

FIG. 17 shows the high level architecture of one possible embodiment of a time driven switch with a plurality of input and output channels having different transmission capacity. The switching system of the example presented in FIG. 17 has the same input/output channel configuration as the switches presented in the examples contained in FIG. 9, FIG. 10 and FIG. 11, including the duration of time frames deployed on each channel. The total number of input (and output) channels is N. In the sample switch configuration presented in FIG. 10A, N=256; in the sample switch configuration presented in FIG. 17, N=5.

The architecture depicted in FIG. 17 is characterized by being based on a N-by-N switch fabric with an input/output transfer capacity equal to the transmission capacity High_capacity of the high capacity channels. In other words, the input lines 940-H and the output lines 1120-H of the switch fabric have transmission capacity High_capacity.

Low capacity input channels 920-1 through 920-4 are connected to a first type of alignment subsystem 1500, while the high capacity input channel 920-5 is connected to a second type of alignment subsystem 1400. Other configurations are also feasible. For example, a single type of alignment subsystem 1500 could be used for both low capacity and high capacity input channels 920.

The high capacity output channel 920-15 is connected directly to one of the output lines 1120-H of the switch fabric 50. Each of the low capacity output channels 920-11 through 920-14 is fed by a Rate Matching Buffer (RMB) 1600 which receives over one output line 1120-H data transferred through the switch fabric 50.

After the alignment subsystem has aligned the data units received on each input channel 920-1 through 920-5 with the common time reference, they can be transferred through the switch fabric. During each time frame all the data units received during one previous time frame are moved from a buffer in the alignment subsystem to the output lines 1120-H of the switch fabric 50.

With reference to the switch architecture presented in FIG. 17, data units that are to be routed over the high capacity channel 920-15 are immediately transmitted over the output channel 920-15. This switching and forwarding method is called 2 phase switching and forwarding and is illustrated in FIG. 12B.

With reference to the switch architecture presented in FIG. 17, data units that are to be routed over the low capacity channels 920-11 through 920-14 are buffered in a rate matching buffer (RMB) 1600 and forwarded in a following time frame, which can be the next time frame in a possible embodiment. This switching and forwarding method is called 3 phase switching and forwarding and it is illustrated in FIG. 12C.

There are a plurality of methods for transferring data units from input 940-H to output 1120-H through the switch fabric 50. In a first method, all the data units received on one of the input channels 920-1 through 920-5 during a first predefined time frame are transferred to the same output line 1120-H during a second predefined time frame, wherein the second predefined time frame follows the first predefined time frame. In a second method, the data units received during a first predefined time frame over one of the input channels 920-1 through 920-5 can be transferred to different output lines 1120-H, wherein data units received during the same sub-time frame of the first predefined time frame are transferred to the same output line 1120-H.

Data units to be transmitted on one of the low speed output channels 920-11 through 920-14 are stored in a Rate Matching Buffer (RMB) 1600 which they enter through a line 1120-H having capacity High_capacity, and are transmitted through the low capacity channel 920-11 through 920-14 coupled to the RMB at a lower rate Low_capacity.

FIG. 20 shows the block diagram of a Rate Matching Buffer 1600 receiving data units from one of the output lines 1120 of the switch fabric 50, and transmitting data units on one of the output channels 920 of the time driven switch 52. The data flows through input 1120 and through output 920 have different rates.

In the switch configuration presented in FIG. 17, the output lines 1120 from the switch fabric 50 have capacity High_capacity, while the output channels 920-11 through 920-14 have capacity Low_capacity, where High_capacity>Low_capacity. Thus, the RMBs 1600 deployed in this configuration receive data units in the queues at a rate higher than the rate at which data units are transmitted out of the queues.

The RMB 1600 depicted in FIG. 20 comprises two buffer queues 1650 which are deployed according to the following principles: During each time frame of duration TFi_j as deployed on channel j of link i associated to the RMB,

- each queue is associated to either the input 1120 or the output 920 of the RMB;
- the input line 1120 is associated to a respective one of the TF queues 1650;
- the output line 920 is associated to a respective one of the TF queues 1650.

In FIG. 20, a 1-to-2 de-multiplexer (DMUX) 1620 is responsible for coupling the input line 1120 with a respective one of the TF queues 1650 during each time frame TFi_j according to the principles listed above, responsive to the Select-RMB-in signal 1610 from the fabric controller 55, wherein the Select-RMB-in signal 1610 is aligned to the CTR 002.

In FIG. 20, a 2-to-1 multiplexer (MUX) 1640 is responsible for coupling the output line 920 with a respective one of the TF queues 1650 during each time frame TFi_j according to the principles listed above, responsive to the Select-RMB-out signal 1630 from the fabric controller 55, wherein the Select-RMB-in signal 1630 is aligned to the CTR 002.

Consequently during each time frame TFi_j, data units are received in the selected one of the TF queues 1650 at the rate of the input line 1120 and are transmitted out of another TF queue 1650 at the rate of the output line 920.

Another possible implementation of an RMB—not shown in FIG. 20—comprises a single buffer queue in which data units are concurrently stored while received from the input line 1120 at the rate of the line (for example High_capacity, in the switch configuration depicted in FIG. 17) and are retrieved and then transmitted on the output line 920 at the line rate (for example Low_capacity, in the configuration depicted in FIG. 17), where the rate at which data units are stored is different from the rate at which data units are retrieved. This alternative implementation with single buffer does not require data units to be stored in the RMB for a whole time frame, thus allowing for the implementation of 2 phase switching and forwarding (see FIG. 12B) on low capacity output channels. On the other hand, this alternative implementation requires at least one of a double access memory and a memory with access speedup (i.e., access speed higher than the rate of each of the input 1120 and output 920 data lines).

Unique Time Reference (UTR) and Alignment to CTR

The alignment subsystem 1400, in FIG. 18, receives data units over one input channel 920, possibly connected to a WDM optical DMUX 960, as shown in FIG. 13 and FIG. 14. The data units that exit from the alignment subsystem 1400 are transferred to the switch fabric 50 over its input lines 940.

Each of the incoming channels 920(j)—possibly being an optical channel multiplexed with other channels on a single fiber—on link (i) has a unique time reference UTR(j), as shown in FIG. 35, that is independent of the CTR 002, also shown in FIG. 35.

The UTR(j) is divided into super cycles, time cycles, TFs (time frames), and possibly sub-time frames of the same duration as the super cycles, time cycles, TFs, and possibly sub-time frames of the CTR used on channel (j). In the example in FIG. 18, all the channels of input link i have the same UTR-i. The TF duration on channel j of link i is TFi_j and the sub-tme frame duration is subTF. In the examples presented in this disclosure, the same sub-time frame (subTF) duration is deployed on all input channels 920 and for transfers through the switch fabric; a different subTF duration could be deployed on different channels and for transfers through the switch fabric. Each of the super cycles, time cycles, and TFs of the UTR-i possibly starts and ends at a time different than the respective start and end time of the super cycles, time cycles, and TFs of the CTR.

In FIG. 18, a plurality of buffer queues 1450 are part of each alignment subsystem 1400, wherein each of the respective buffer queues is associated, for each of the UFs, with a unique combination of one of the incoming optical channels and one of the outgoing optical channels. In an alternative implementation, each of the respective buffer queues 1450 is associated, for each of the subTFs, with a unique combination of one of the incoming optical channels and one of the outgoing optical channels.

Between successive super cycles, time cycles, TFs, and sub-time frames of the UTR-i there can be explicit or implicit delimiters. Explicit delimiters can be realized by one of a plurality of different methods. There can be a different delimiter control word to signal the beginning of a new time frame (i.e., a time frame delimiter—TFD), sub-time frame, time cycle (i.e., a time cycle delimiter—TCD) and super cycle (i.e., a super cycle delimiter—SCD). The explicit delimiter signaling can be realized by the SONET/SDH path overhead field that was design to carry control, signaling and management information. An implicit delimiter can be realized by measuring the UTR time with respect to the CTR. An alternative way of implementing an implicit delimiter is by counting the number of bytes from an explicit delimiter.

Alternatively, delimiters can be realized as an optical signal carried on the communications link coupled to input i. A possible embodiment of time frame delimiter consists of dedicating one of the wavelengths of the communications link for transmission of the delimiter.

For each of the (UTR-i) TFs, a mapping controller within the fabric controller 55 (see FIG. 12) logically maps selected incoming optical channels 920 to selected buffer queues 1450, and for each of the CTR TFs, logically maps selected ones of the plurality of buffer queues 1450 to selected outgoing channels 940.

In FIG. 18, the Select-in signal 1410 generated by the fabric controller 55 determines which of the buffers 1450 will receive data units from the channel 920 at every time frame TFi_j, as it is defined by the UTR-i, deployed on the input channel 920 associated to the alignment subsystem 1400. The selection process by the alignment subsystem 1400 is responsive to the Select-in signal 1410 received from the fabric controller 55. The Select-in signal 1410 is fed into a 1-to-3 DMUX (de-multiplexer) 1420 that selects one of 3 queue buffers in 1450: TF Queue 1, TF Queue 2, TF Queue 3. Prior to output, the buffer queues in the alignment subsystem 1400 for each time frame can be filled to an arbitrary level with data units arranged in an arbitrary order.

The alignment subsystem 1400 in FIG. 18 is comprised of a plurality of TF queues 1450, wherein each of the time frame queues comprises the means to determine whether the respective time frame queue 1450 is empty, wherein each of the time frame queues further comprises the means to determine whether the respective time frame queue is not empty. The empty (and not empty) signal 950 is provided to the fabric controller 55.

The fabric controller 55 further provides for the coupling of selected time frame queues 1450 to respective ones of the outgoing channels 940, for transfer of the respective stored data units during the respective CTR sub-time frames or CTR time frames TFi_j employed on the respective input channel 920 coupled to the alignment subsystem 1400. This operation is performed responsive to the Select-out signal 1430, as shown in FIG. 18.

For each of the TFs of the CTR, only one of the buffer queues 1450 is associated with the outgoing line 940. For each of the TFs of the UTR-i, only one of the buffer queues is associated with the incoming channel 920. In the preferred embodiment, the same buffer queue 1450 is never associated at the same time with both the incoming channel 920 and the outgoing line 940.

A timing diagram description of the alignment operation according to its preferred embodiment is provided in FIG. 35. The alignment operation follows the following principle:

TF Alignment of UTR-j to UTC—with three input queues
   Principle of Operation:
   The same queue is not used simultaneously for:
   1. Receiving data units from the serial link—responsive to the Select-in signal 1410 (in FIG. 18) received from the fabric controller 55 (see FIG. 12), and
   2. Forwarding data units to the switch—responsive to the Select-out signal 1430 (in FIG. 18) received from the fabric controller 55 (see FIG. 12).

In the timing diagram example of FIG. 35, it is shown that a TF queue (Th Queue 1, TF Queue 2, TF Queue 3—1450 in FIG. 18) is not written into and read from at the same time. In other words, the Select-in signal 1410 and the Select-out signal 1430 in FIG. 18 will not select the same TF queue at the same time.

The alignment subsystem 1400 can have more than three TF queues 1450—this can be used for the non-immediate forwarding method, which is as follows: in this method a data unit is delayed in the input port until there is an available time frame during which it can be switched to a selected one of the outgoing optical channels 920. In this method the delay is increased (i.e., more time frames may be needed to get from input to output). The non-immediate forwarding method adds flexibility to the scheduling process of fractional lambda pipes.

In an alternative embodiment, the alignment subsystem 1400 comprises only two buffers and an optical delay line. One buffer receives data from the corresponding input link, while data to be transferred through the switch fabric is retrieved from the other buffer. The delay line between the input link and the alignment subsystem ensures that the UTR of the corresponding link is aligned with the CTR. In other words, the time a data unit takes to travel from the alignment subsystem of the upstream time driven switch 52 to the alignment subsystem of the considered switch (including the propagation delay through the switch fabric, the fiber channel link connecting the two switches, and the optical delay line) is an integer multiple of a TF. In order to obtain the aforementioned overall delay, the delay element adds a link delay equal to the difference between a beginning of a CTR time frame and the beginning of a UTR-i time frame, where UTR-i is the UTR of link i comprising the channel coupled with the selected alignment subsystem.

The optical delay line can have programmable tap points possibly comprised of optical switches. The optical delay line can be external to the switch, internal, or integrated in the optical receiver.

FIG. 19 shows the architecture of another implementation of the alignment subsystem. The alignment subsystem 1500 receives data units over one input channel 920 possibly connected to a WDM optical DMUX 960, as shown in FIG. 13 and FIG. 14. The data units that exit from the alignment subsystem 1500 are transferred to the switch fabric 50 over its input lines 940.

Each of the incoming channels 920(j), possibly being an optical channel multiplexed with other channels on a single fiber-on link (i), has a unique time reference (UTR-i), as shown in FIG. 35, that is independent of the CTR 002, also shown in FIG. 35. In the example in FIG. 19, the TF duration deployed on channel 920j of link i is TFi_j. Time frames of the common time reference and the UTR-i are divided into sub-time frames of duration subTF. In the examples presented in this disclosure the same sub-time frame duration is deployed on all input channels 920 and for transfers through the switch fabric; a different sub-time frame duration could be deployed on different channels and for transfers through the switch fabric.

Between successive super cycles, time cycles, TFs and sub-time frames (subTFs) of the UTR-i there can be explicit or implicit delimiters. Explicit delimiters can be realized by one of a plurality of different methods. There can be a different delimiter control word to signal the beginning of a new time frame (i.e., a time frame delimiter—TFD)), sub-time frame, time cycle (i.e., a time cycle delimiter—TCD) and super cycle (i.e., a super cycle delimiter—SCD). The explicit delimiter signaling can be realized by the SONET/SDH path overhead field that was design to carry control, signaling and management information. An implicit delimiter can be realized by measuring the UTR time with respect to the CTR. An alternative way of implementing an implicit delimiter is by counting the number of bytes from an explicit delimiter.

Alternatively, delimiters can be realized as an optical signal carried on the communications link coupled to input i. A possible embodiment of time frame delimiter consists of dedicating one of the wavelengths of the communications link for transmission of the delimiter.

In FIG. 19, a plurality of buffer queues 1550 are part of each alignment subsystem 1500, wherein each of the respective buffer queues is associated, for each of the subTFs, with a unique combination of one of the incoming optical channels and one of the outgoing optical channels.

Figure 12:
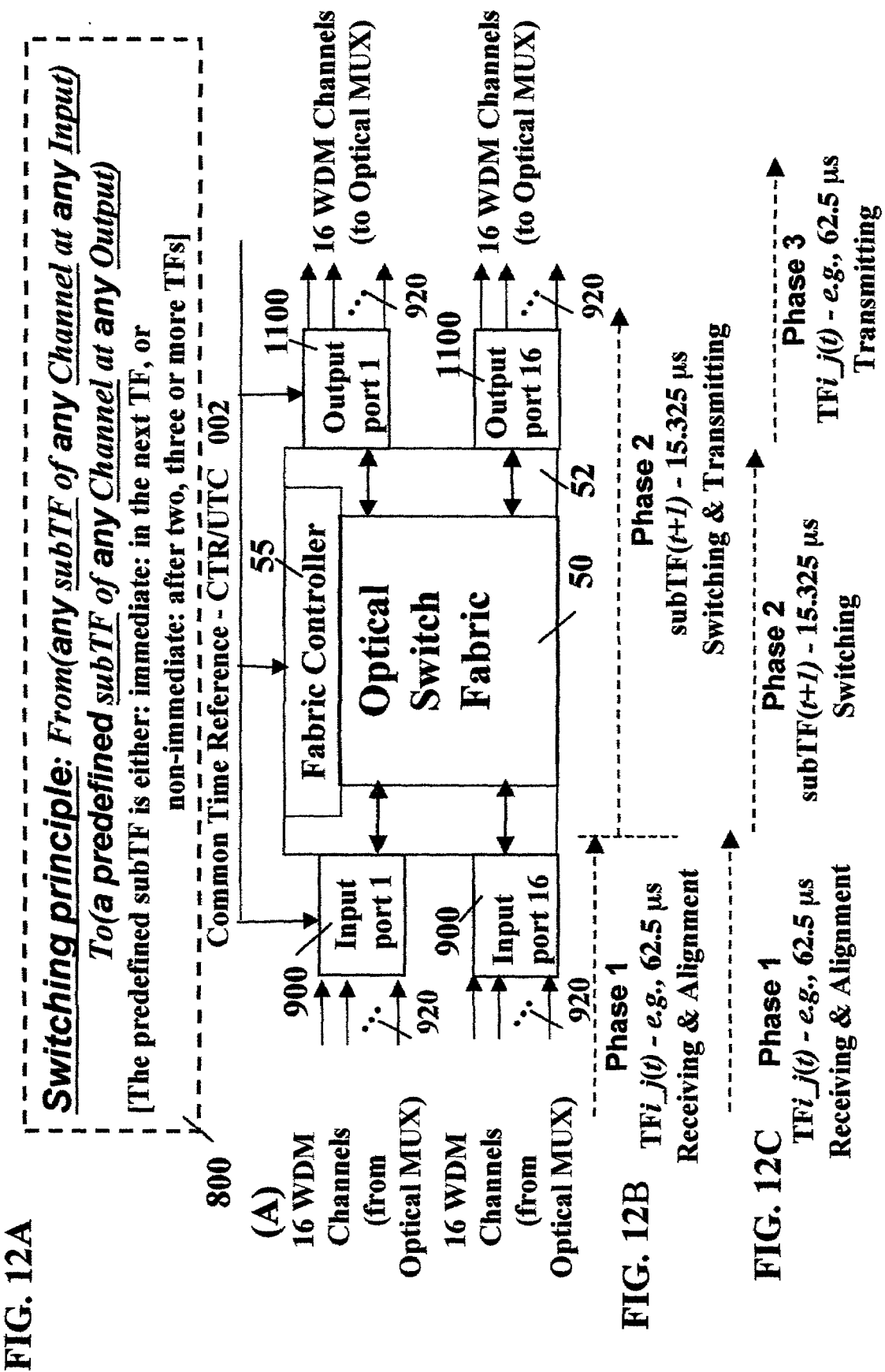

A mapping controller within the fabric controller 55, in FIG. 12 logically maps, for each of the (UTR-i) subTFs, selected incoming optical channels 920 to selected buffer queues 1550, in FIG. 19, and logically maps, for each of the CTR TFs, selected ones of the plurality of buffer queues 1550 to selected outgoing channels 940.

In FIG. 19, the Select-in signal 1410 generated by the fabric controller 55 (see FIG. 12) determines which of the buffers 1550 will receive data units from the channel 920 at every sub-time frame subTF as it is defined by the UTR-i. The selection process by the alignment subsystem 1500 is responsive to the Select-in signal 1410 received from the fabric controller 55. The Select-in signal 1410 is fed into a 1-to-3·Pi_j DMUX (de-multiplexer) 1420 that selects one of 3·Pi_j buffer queues 1550. Pi_j is the number of sub-time frames of duration subTF contained in one TF of duration TFi_j employed on the incoming channel 920. Prior to output, the buffer queues in the alignment subsystem 1500 for each time frame and sub-time frame can be filled to an arbitrary level with data units arranged in an arbitrary order.

The alignment subsystem 1500 in FIG. 19 is comprised of a plurality of TF queues 1550, wherein each of the sub-time frame queues comprises means to determine that the respective sub-time frame queue 1550 is empty, wherein each of the sub-time frame queues further comprises a means to determine that the respective sub-time frame queue is not empty. The empty (and not empty) signal 950 is provided to the fabric controller 55, in FIG. 12.

In FIG. 19, the mapping controller within the fabric controller 55 further provides for the coupling of selected sub-time frame queues 1550 to their respective ones of the outgoing channels 940, for transfer of the respective stored data units during the respective CTR sub-time frames. This operation is performed responsive to the Select-out signal 1430, as shown in FIG. 19.

During each of the subTFs of the CTR, only one of the buffer queues 1550 is associated with the outgoing line 940. For each of the subTFs of the UTR-i, only one of the buffer queues is associated with the incoming channel 920. The same buffer queue 1550 is never associated at the same time with both the incoming channel 920 and the outgoing line 940.

In FIG. 19, the alignment subsystem 1500 can have more than 3·Pi_j TF queues 1550—this can be used for the non-immediate forwarding method: in this method a data unit is delayed in the input port until there is an available sub-time frame for it so that it may be switched to the selected one of the outgoing optical channels 920. In this method, the delay is increased (i.e., more time frames may be needed to get from input to output). The non-immediate forwarding method adds flexibility to the scheduling process of fractional lambda pipes.

Switch fabric and Switch fabric Control

FIG. 21 shows a switch fabric 50 with a fabric controller (FC) 55. According to a possible embodiment, the fabric controller 55 operates in the following way:

S((i,j),(k,l),t)—is a switching matrix 3721 for every sub-time frame in each time cycle and super cycle, where the switching matrix defines which input i,j (for example, optical channel i of input fiber j) should be connected to output k,l (for example, optical channel k of output fiber 1) in sub-time frame t, where if S((ij),(k,l),t)=1 there is a connection, and if S((i,j),k,l),t)=0 there is no connection.

In FIG. 21 the switching matrices 3721 follow the following restrictions:

1. At every sub-time frame an input channel 940 can be connected to one or more output channels 1120 (multicast—MCST operation of 1-to-many is possible).
2. At every sub-time frame an output channel 1120 can be connected to at most one input channel 940.

The fabric controller 55 is responsive to UTC 002 and provides the Select-in signal 1410 and the Select-out signal 1430 to the alignment subsystems 1500 and 1400.

The switch fabric 50 can be realized in many ways. A well known but complex method is a crossbar that has a switching element for every possible input/output combination.

Various Configurations of Time Driven Switch

FIG. 22 shows the high level architecture of one possible embodiment, different from the one presented in FIG. 17, of a time driven switch with a plurality of input 920-1 through 920-5 and output channels 920-11 through 920-15 having different transmission capacity. The switching system of the example presented in FIG. 22 has the same configuration of input/output channels as the one presented in the examples contained in FIG. 9, FIG. 10 and FIG. 11, including the duration of time frames deployed on each channel 920-1 through 920-15. The total number of input (and output) channels is N. In the sample switch configuration presented in FIG. 12A, N=256; in the sample switch configuration presented in FIG. 22 N=5.

The architecture depicted in FIG. 22 is characterized by being based on an M-by-M switch fabric, where M<N, with an input/output transfer capacity equal to the transmission capacity High_capacity of the high capacity channels. In other words, the input lines 940-H and the output lines 1120-H of the switch fabric have a transmission capacity High_capacity. In the switch configuration example shown in FIG. 22, N=5 and M=2.

In FIG. 22, low capacity input channels 920-1 through 920-4 are connected to an alignment and multiplexing (MUX) module 2100, while the high capacity input channel 920-5 is connected to an alignment subsystem 1400.

In FIG. 22, the high capacity output channel 920-15 is connected directly to one of the output lines 1120-H of the switch fabric 50. The low capacity output channels 920-11 through 920-14 are fed by a Rate Matching Buffer (RMB) and de-multiplexer (DMUX) 2200 which receives data transferred through the switch fabric 50 over one output line 1120-H.

In FIG. 22, after the alignment subsystems 1400 and 2100 have aligned data units received on each input channel 920-1 through 920-5 with the common time reference, aligned data units can be transferred through the switch fabric 50.

Data units that are to be routed over the high capacity channel 920-15 are immediately transmitted over the output channel 920-15. This switching and forwarding method is called 2 phase switching and forwarding, and is illustrated in FIG. 12B.

As shown in FIG. 22, data units that are to be routed over the low capacity channels 92011 through 920-14 are buffered in a rate matching buffer (RMB) 1600 and forwarded in a following time frame, which in a possible embodiment, can be the time frame following the one in which they have been stored. This switching and forwarding method is called 3 phase switching and forwarding and is illustrated in FIG. 12C.

There are a plurality of methods for transferring data units from input 940-H to output 1120-H of the switch fabric 50. In a first method, all the data units received on one of the input channels 920-1 through 920-5 during one selected time frame are transferred to the same output line 1120-H. In a second method, data units received during a first selected time frame over one of the input channels 920-1 through 920-5 can be transferred to different output lines 1120-H, wherein data units received during the same sub-time frame of the first selected time frame are transferred to the same output line 1120-H.

The alignment and MUX module 2100 in FIG. 23 aligns data units received on the low capacity input channels 920-1 through 920-4 with the common time reference 002, and then multiplexes them on a single high capacity line 940-H coupled to the switch fabric 50.

A possible implementation of the alignment and MUX module 2100 is shown in FIG. 23. An array of Alignment Subsystems 1400 receives data units from the low capacity input channels 920-1 through 920-4. After having been aligned to the CTR 002 within the alignment subsystem, data units received over different input channels in a first selected time frame are sent to the switch fabric 50 over a single high capacity line 940-H. Data units to be transferred through the switch fabric 50 during each predefined sub-time frame are retrieved from the respective alignment subsystem 1400 through the data lines 2120. The specific one of the alignment subsystems 1400 from which data units are to be retrieved for transfer to the switch fabric 50 through the data line 940-H is selected, during each sub-time frame, by a c-by-1 selector 2110 responsive to the Select-I signal 2130 from the fabric controller 55.

The sample implementation of alignment and MUX module 2100 in FIG. 23 has c low capacity input channels. The same architecture with c=4 can be used in the implementation of the alignment and MUX module 2100 deployed in the sample time driven switch 52 architecture shown in FIG. 22, wherein the alignment and MUX module 2100 operates between four low capacity channels 920-1 through 920-4 and a high capacity data line 940-H.

An alternative implementation of the alignment and MUX module 2100 comprises a buffer queue between the c-by-1 selector 2110 and the data line 940-H. Such a buffer queue (not shown in the block diagram depicted in FIG. 23) decouples the transmission of data units on lines 2120 and through the c-by-1 selector 2110 from the transmission on the output data line 940-H to the switch fabric 50.

As shown in FIG. 22, data units that are to be transmitted on one of the low capacity output channels 920-11 through 920-14 are stored in a Rate Matching Buffer (RMB) and de-multiplexer (DMUX) module 2200 which they enter through a data line 1120-H having capacity High_capacity, and are then transmitted at a lower rate Low_capacity through the low capacity channels coupled to the RMB and DMUX module 2200.

FIG. 24 shows a possible embodiment of the RMB and DMUX module 2200 comprising a 1-by-c selector 2210 and a plurality of Rate Matching buffers (RMBs) 1600. The 1-by-c selector 2210, responsive to the Select-O signal 2230, directs the data units received on the data line 1120-H from the switch fabric 50 to a selected one of the RMBs 1600.

In FIG. 24, each RMB 1600 receives data units from a respective one of the outputs 2220 of the 1-by-c selector 2210 at a the high rate High_capacity. Data units are retrieved from each RMB 1600 for transmission on one of the respective low capacity output channels 920-11 through 920-14 at the low data rate Low_capacity.

FIG. 24 shows the sample implementation of an RMB and DMUX module 2200 with c low capacity input channels. The same architecture with c=4 can be used in the implementation of the RMB and DMUX module 2200 deployed in the sample time driven switch 52 architecture shown in FIG. 22, wherein the RMB and DMUX module 2200 operates between one high capacity data line 1120-H and four low capacity channels 920-11 through 920-14.

FIG. 25 shows the high level architecture of one possible embodiment, different from the ones presented in FIG. 17 and FIG. 22, of a time driven switch 52 with a plurality of input 920-1 through 920-5 and output channels 920-11 through 920-15 having different transmission capacities. The switching system of the example presented in FIG. 25 has the same configuration of input/output channels as the one presented in the examples contained in FIG. 9, FIG. 10 and FIG. 11, including the duration of time frames deployed on each channel 920-1 through 920-15. The total number of input (and output) channels is N. In the sample switch configuration presented in FIG. 12A, N=256; in the sample switch configuration presented in FIG. 25 N=5.

The architecture depicted in FIG. 25 is characterized by being based on a L-by-L switch fabric 50, where L>N, with an input/output transfer capacity equal to the transmission capacity Low_capacity of the low capacity channels 920-1 through 920-4 and 920-11 through 920-14. In other words, the input lines 940-L and the output lines 1120-L of the switch fabric have a transmission capacity Low_capacity. In the example switch configuration shown in FIG. 25, N=5 and L=8.

In FIG. 25, low capacity input channels 920-1 through 920-4 are connected to alignment subsystems 1400, such that there is one alignment subsystem 1400 for each respective one of the input channels 920-1 through 920-4, while the high capacity input channel 920-5 is connected to an alignment and DMUX (de-multiplexing) module 2400.

In FIG. 25, each one of the plurality of low capacity output channels 920-11 through 920-14 are connected directly to a respective one of the output lines 1120-L of the switch fabric 50. The high capacity output channel 920-15 is fed by a Rate Matching Buffer (RMB) and multiplexer (MUX) 2500 which receives data units transferred through the switch fabric 50 over a plurality of output lines 1120-H.

In the sample configuration shown in FIG. 25, each high capacity input channel 920-5 is de-multiplexed over four low capacity lines 940-L connected to the switch fabric 50. Four low capacity output lines 1120-L from the switch fabric 50 are then multiplexed over a single high capacity output channel 920-15. In other words, data units received over the high capacity input channel 920-5 are transferred to the high capacity output channel 920-15 through four parallel low capacity input/output connections through the switch fabric 50.

More in general, each high capacity input channel is de-multiplexed over c low capacity lines connected to the switch fabric 50. The c low capacity output lines from the switch fabric 50 are then multiplexed over a single high capacity output channel. In other words, data units received over each high capacity input channel during separate sub-time frames within the same time frame, or within different time frames, are transferred to the respective one of the high capacity output channels through c parallel low capacity input(output connections through the switch fabric 50.

With reference to the embodiment shown in FIG. 25, after the alignment subsystems 1400 and 2400 have aligned with the common time reference data units received on each input channel 920-1 through 920-5, aligned data units can be transferred through the switch fabric 50.

Data units that are to be routed over any one of the plurality of low capacity channels 920-11 through 920-14 are immediately transmitted over the respective one of the low capacity output channels 920-11 through 920-14. This switching and forwarding method is called "2 phase switching and forwarding", and is illustrated in FIG. 12B.

Data units that are to be routed over the high capacity channel 920-15 are buffered in a rate matching buffer (RMB) and MUX (multiplexer) 2500 during a first time frame and forwarded in a second time frame, wherein, in a possible embodiment, the second time frame can directly follow the first time frame. This switching and forwarding method is called "3 phase switching and forwarding", and is illustrated in FIG. 12C.

There are a plurality of methods for transferring data units from input 940-L to output 1120-L of the switch fabric 50. In a first method, all the data units received on one of the input channels 920-1 through 920-5during a selected time frame are transferred to the same output line 1120-L. In a second method, data units received during a selected time frame over one of the input channels 920-1 through 920-5 are transferred to different output lines 1120-L, wherein data units received during the same sub-time frame of the selected time frame are transferred to the same output line 1120-L.

The alignment and DMUX module 2400 de-multiplexes the data units received on the high capacity input channel 920-5 over a plurality of Alignment Subsystems 1400, wherein each Alignment Subsystem 1400 aligns the received data units to the common time reference 002 before transmitting them on a respective one of a plurality of low capacity input lines 940-L of the switch fabric 50.

A possible implementation of the alignment and DMUX module 2400 is shown in FIG. 26. The 1-by-c selector 2210, responsive to the Select-I signal 2130, directs the data units received from the input channel 920-5 to a selected one of a plurality of Alignment Subsystems 1400.

In FIG. 26, each Alignment Subsystem 1400 handles data units received from the high capacity channel 920-5 during a predefined sub-time frame of a first time frame. Data units are received by each Alignment Subsystem 1400 through a respective one of the data lines 2410 from the 1-by-c selector 2210.

After having been aligned to the CTR 002 within the alignment subsystem 1400 depicted in FIG. 26, data units received from the high capacity input channels during a respective sub-time frame of a first selected time frame are sent to the switch fabric 50 over a respective one of a plurality of low capacity lines 940-L during a second selected time frame, wherein the second selected time frame follows the first selected time frame during each sub-time frame, the 1-by-c selector 2210 selects, responsive to the Select-I signal 2130 from the fabric controller 55 (see FIG. 12A) a respective one of the alignment subsystems 1400 in which data units are to be transferred through a respective one of the data lines 2140.

FIG. 26 shows the sample implementation of an alignment and DMUX module 2400 with c low capacity output lines 940-L. The same architecture with c=4 can be used in the implementation of the alignment and DMUX module 2400 deployed in the sample time driven switch 52 architecture shown in FIG. 25, wherein the alignment and DMUX module 2400 operates between one high capacity input channel 920-5 and four low capacity data lines 940-L.

According to the switch architecture in FIG. 25, data units that are to be transmitted on a high capacity output channel, such as 920-15, are stored in a Rate Matching Buffer (RMB) and multiplexer (MUX) module 2500, which they enter through a plurality of output lines 1120-L having capacity Low_capacity and are transmitted at a higher rate High_capacity through the high capacity channel 920-15 coupled to the RMB and MUX module 2500.

FIG. 27 shows a possible embodiment of the RMB and MUX module 2500 comprising a plurality of Rate Matching buffers (RMBs) 1600 and a c-by-1 selector 2110. Each RMB 1600 receives data units from a respective one of the output lines 1120-L of the switch fabric 52 at the low rate Low_capacity. Data units are retrieved from each RMB 1600 for transmission on a single high capacity channel (such as 920-15) through high capacity data lines 2510 connected to the c-by-1 selector 2110.

During each sub-time frame, the c-by-1 selector 2110 in FIG. 27, responsive to the Select-O signal 2230, retrieves data units from a selected one of the RMBs 1600 through a respective one of the plurality of the data lines 2510. Data units that are retrieved from one of the RMBs 1600 during a sub-time frame comprised in a first time frame were stored in the respective RMB 1600 during a second time frame, wherein the second time frame preceded the first one. In a possible embodiment, the first time frame mentioned above immediately follows the second time frame mentioned above.

FIG. 27 shows the sample implementation of an RMB and MUX module 2500 with c low capacity input lines 1120-L and one high capacity output channel. The same architecture with c=4 can be used in the implementation of the RMB and MUX module 2500 deployed in the sample time driven switch 52 architecture shown in FIG. 25, wherein the RMB and MUX module 2500 operates between four low capacity data lines 1120-L and one high capacity output channel 920-15.

FIG. 28 shows the high level architecture of one possible embodiment of a time driven switch 52 with a plurality of high capacity input channels 920-5 through 920-9 and output channels 920-15 through 920-19 having transmission capacity High_capacity. The functional diagram shown in FIG. 28 refers to a configuration in which all the input channels 920-5 through 920-9 and output channels 920-15 through 920-19 have the same capacity High_capacity and deploy the same time frame duration TF1. However, the same architecture and the same operating principles can be used for configurations having input/output channels with a plurality of different transmission capacities and time frame durations.

The total number of input (and output) channels is N. In the sample switch configuration presented in FIG. 12A, N=256; in the sample switch configuration presented in FIG. 28, N=5. The architecture depicted in FIG. 28 is characterized by being based on a L-by-L switch fabric 50, where L>N, with an input/output transfer capacity equal to the transmission capacity Low_capacity of the low capacity channels. In other words, the input lines 940-L and the output lines 1120-L of the switch fabric 50 have a transmission capacity Low_capacity. In the example switch configuration shown in FIG. 28, N=5 and L=20.

The five high capacity input channels 920-5 through 920-9 are connected to an alignment and DMUX (de-multiplexing) module 2700. The five high capacity output channels 920-15 through 920-19 are fed by a MUX (multiplexer) 2800, possibly providing data unit buffering, which receives data units transferred through the switch fabric 50 over a plurality of output lines 1120-L.

In the sample configuration shown in FIG. 28, each one of the plurality of high capacity input channels 920-5 through 920-9 is de-multiplexed over four low capacity lines 940-L connected to the switch fabric 50. Four low capacity output lines 1120-L from the switch fabric 50 are then multiplexed over each one of the plurality of high capacity output channels 920-15 through 920-19. In other words, data units received over each one of the high capacity input channels 920-5 through 920-9 are transferred to a selected one of the high capacity output channels 920-15 through 920-19 over four parallel low capacity input/output connections through the switch fabric 50.

More generally, in FIG. 28 each high capacity input channel is de-multiplexed over c low capacity lines connected to the switch fabric 50. The c low capacity output lines from the switch fabric 50 are then multiplexed over a single high capacity output channel. In other words, data units received over each high capacity input channel are transferred to the respective one of the high capacity output channels through c parallel low capacity input/output connections through the switch fabric 50. The de-multiplexing and multiplexing within the Alignment and DMUX 2700 and MUX 2800 modules, respectively, operate at least at one of the word, byte, and bit levels.

With reference to the embodiment shown in FIG. 28, after the alignment and DMUX subsystems 2700 have aligned with the common time reference the data units received on each input channel 920-5 through 920-9, aligned data units can be transferred through the switch fabric 50.

Data units that are to be routed over any one of the high capacity channels 92015 through 920-19 are multiplexed at least at one of the word, byte, and bit levels by the MUX module 2800. This switching and forwarding method is called "2 phase switching and forwarding", and is illustrated in FIG. 12B.

In an alternative embodiment, the data units that are to be routed over any one of the high capacity channels 920-15 through 920-19 are first buffered within the MUX module 2800 during a first time frame and then forwarded during a second time frame, wherein, in a possible embodiment, the second time frame can be the one following the first time frame. This switching and forwarding method is called 3 phase switching and forwarding and is illustrated in FIG. 12C.

There is a plurality of methods for transferring data units from the input channels 920-5 through 920-9 to the output channels 920-15 through 920-19 of the switching system 52 depicted in FIG. 28. In a first method, all the data units received from one of the input channels 920-5 through 920-9 during a selected time frame are transferred to the same output line 1120-L. In a second method, data units received during a selected time frame from one of the input channels 920-5 through 920-9 can be transferred to different output lines 1120-L, wherein data units received during the same sub-time frame of the selected time frame are transferred to the same output line 1120-L.

The alignment and DMUX module 2700, in FIG. 28, aligns with the common time reference 002 the received data units before de-multiplexing them at the word, byte, or bit level and transmitting them to the switch fabric 50 on a plurality of low capacity data lines 940-L.

A possible implementation of the alignment and DMUX module 2700 is shown in FIG. 29. An Alignment Subsystem 1400 receives data units from an high capacity input channel 920-H. After having been aligned to the CTR 002 within the alignment subsystem 1400, data units received over a single input channel 920-H in a selected time frame are sent to the switch fabric 50 over a plurality of low capacity lines 940-L. Data units to be transferred through the switch fabric 50 are coupled to a specific one of the data lines 940-L by a 1-by-c selector 2710 that divides, at least at one of the word, byte, and bit levels, the data units retrieved from the alignment subsystem 1400 through data line 2720 over a plurality of data lines 940-L responsive to the Select-I signal 2130 from the fabric controller 55.

FIG. 29 shows the sample implementation of an alignment and DMUX module 2700 with c low capacity data lines 940-L. The same architecture with c=4 can be used in the implementation of the alignment and DMUX module 2700 deployed in the sample time driven switch 52 architecture shown in FIG. 28, wherein the alignment and DMUX module 2700 operates between one of a plurality of high capacity data channels 920-5 through 920-9 and four low capacity data lines 940-L.

According to the switch architecture depicted in FIG. 28, data units that are to be transmitted on each one of the plurality of high capacity output channels 920-15 through 920-19 after having been transferred through the switch fabric 50 over a plurality of input/output connections are multiplexed over a single output channel by the multiplexer (MUX) module 2800, which they enter through a plurality of output lines 1120-L having capacity Low_capacity, and are transmitted at a higher rate High_capacity through the high capacity channel coupled to the MUX module 2800.

FIG. 30 shows a possible embodiment of the MUX module 2800 comprising a c-by-1 selector 2810. The c-by-1 selector 2810, responsive to the Select-O signal 2230 from the fabric controller 55 (see FIG. 12A) multiplexes data units received from the plurality of data lines 1120-L operating at least at one of the word, byte, and bit levels. The switching and forwarding method resulting from the deployment of the described embodiment of MUX module 2800 is called "2 phase switching and forwarding", and is illustrated in FIG. 12B.

In an alternative embodiment, the MUX module 2800 comprises a plurality of Rate Marching Buffers (RMBs) 1600—not shown in FIG. 30—where each one of the RMBs 1600 is between a respective one of the plurality of data lines 1120-L and the respective one of the inputs of the a c-by-1 selector 2810. Each RMB 1600 receives data units from its respective one of the data lines 1120-L. Data units that are retrieved from one of the RMBs 1600 during a first time frame are stored in the respective RMB 1600 during a second time frame, wherein the second time frame preceded the first one. In a possible embodiment, the first time frame mentioned above immediately follows the second time frame mentioned above. The switching and forwarding method resulting from the deployment of the described alternative embodiment of MUX module 2800 is called "3 phase switching and forwarding" and is illustrated in FIG. 12C.

FIG. 30 shows the sample implementation of a MUX module 2800 with c low capacity input lines 1120-L and one high capacity output channel 920-H. The same architecture where c=4 can be used in the implementation of the MUX module 2800 deployed in the sample time driven switch 52 architecture shown in FIG. 28, wherein the MUX module 2800 operates between four low capacity data lines 1120-L and a selected one of a plurality of high capacity output channels 920-15 through 920-19.

Optical Time Driven Switch

FIG. 12 depicts the block diagram of a time driven switching system 52 based on an optical switch fabric 50. FIG. 36, FIG. 37, and FIG. 38 further detail such architecture. FIG. 35 shows how received data units are aligned to the CTR as they are received from each input channel 920 (in FIG. 36) and then transmitted through the optical switch fabric 50, shown in FIG. 38, during the CTR time frame during which they had been scheduled. FIG. 37 depicts the connections between each output port 3500 and a plurality of WDM multiplexers 1200-1 through 1200-16 used to multiplex multiple wavelengths on the same output fiber 1230. FIG. 38 shows a possible implementation of the optical switch fabric 50 consisting of a Banyan interconnection of elementary optical switching blocks 4900.

The optical switch fabric 50 in FIG. 12 and FIG. 38 can be realized in many ways. A well-known but complex method is a crossbar. The crossbar has a switching element for every possible input/output pair. Consequently, the total number of switching elements required to realize the crossbar is the number of inputs (N) times the number of outputs (M). There are many other ways to realize the switch fabric 50 with fewer switching elements, such as a generalized multi-stage cube network, a Clos network, a Benes network, an Omega network, a Delta network, a multi-stage shuffle exchange network, a perfect shuffle, a Banyan network, and a combination of de-multiplexers, multiplexers, and optical gates.

In FIG. 37, each optical output port 3500 receives a plurality of input lines 3510, where each one is connected to a respective outlet of the switch fabric 50. The channels 920 exiting the output ports 3500 can be connected to an Optical WDM multiplexer (MUX) 1200, as shown in FIG. 37.

In the configuration proposed in this embodiment, one output port 3500 has 16 output channels 920-1 through 920-16 connected to respective 16 optical MUXes 1200-1 through 1200-16, as shown in FIG. 37. Line 1 of output port 1 is connected to channel 1 of optical MUX 1 1200-1; line i of output port 1 is connected to channel 1 of optical MUX i 1200-i; line 16 of output port 1 is connected to channel 1 of optical DMUX 16.

Grooming and Degrooming

Communications networks are engineered to support different amounts of traffic in different areas of the network. Usually network users (individuals or organizations) access the network through dedicated low capacity channels. Traffic generated by multiple users is aggregated over higher capacity channels that span metropolitan and regional areas. Traffic generated in metropolitan and regional areas is aggregated over higher capacity channels that span national and continental areas.

Dually, traffic flowing among and across continents through very high capacity channels needs to be sorted and directed towards the proper destination over the lower speed national, regional, and eventually metropolitan channels.

Methods for (i) switching data units among channels with different capacity, (ii) aggregating data flows from a plurality of low capacity channels to a single high capacity channel (grooming), and (iii) de-aggregating data flows from a single high capacity channel to a plurality of low capacity channels (degrooming) are instrumental in properly and flexibly engineering communications networks.

The Switching Methods with Common Time Reference and Plurality of Time Frame Durations described above in the present disclosure fulfill (i). The Time-based Grooming Methods with Common Time Reference described in the following fulfill (ii), while Time-based Degrooming Methods with Common Time Reference that will be described below in the present disclosure fulfill (iii).

Grooming is a process of multiplexing where the number of inputs is (much) larger than the number of outputs, possibly one, while degrooming is a process of de-multiplexing where the number of inputs is (much) smaller, possibly one, than the number of outputs.

Grooming takes place at least at one of two different levels: the channel capacity level—also called inter-time frame grooming—and the time frame level—also called intra-time frame grooming. When operating at the channel capacity level data units from a plurality of low capacity channels are aggregated on a single high capacity channel. In a possible scenario of channel capacity level multiplexing, the sum of the capacity of the incoming channels equals the capacity of the output channel. Data units received during a single time frame on a plurality of input channels are transmitted on the high capacity output channel during separate, possibly consecutive time frames. When operating at the time frame level, data units received during multiple time frames on at least one of a plurality of input channels, are transmitted on a high capacity channel during a single time frame.

Grooming can be done at both the channel capacity and time frame level in one of the following ways:
  by transmitting during the same time frame data units that were received during the same time frame from a plurality of input channels;
  by transmitting during the same time frame data units that were received during a plurality of time frames from a single input channel;
  by transmitting during the same time frame data units that were received during a plurality of time frames from a plurality of input channels.

In a possible scenario of combined channel capacity and time frame level grooming, the time frame duration employed on the incoming channels equals the duration of the time frame employed on the output channel, wherein the size of the time frame employed on the output channel equals the sum of the time frame sizes employed on the incoming channels, wherein the time frame size is the amount of information that can be sent during a time frame over a given communications channel.

Time-based Grooming and Degrooming Methods with CTR

The common time reference (CTR) is partitioned into successive time frames (TFs), as shown in FIG. 2A and FIG. 2B. Contiguous time frames are grouped into time cycles and contiguous time cycles are grouped into contiguous super cycles, wherein one super cycle is equal to and temporally aligned with one UTC second, as shown in FIG. 2A. Each time frame may be sub-divided into a plurality of sub-time frames (subTF). Pipeline forwarding (PF) of time frames through a sequence of grooming, switching, and degrooming systems, as shown in FIG. is realized by pre-scheduling the forwarding time of data units contained in each time frame and/or sub-time frame. Thus, no processing of in-band information, e.g.: packet header, is necessary once data units belonging to each time frame enter a network with CTR.

Data units on the low capacity input channels of the grooming and degrooming devices depicted in FIG. 40 and FIG. 45, respectively, are organized in time frames that are not aligned to the CTR, due to the propagation delay on the various channels. Thus, data units received on each channel are first aligned with the CTR and then switched and multiplexed (or de-multiplexed and switched) onto the output channels. The result of the alignment operation is that the beginning and end of each time frame after alignment occurs at the same time as the beginning and end of the CTR time frames.

The time frame duration and its size (the number of bits that can be transmitted during one time frame) over the output channels may be different from the duration and size used over the input channels. In the most general case, time frame duration might not be the same on all the input channels. However, without loss of generality, in order to keep the following description simple it is assumed that the same time frame duration is used over all input channels and all output channels.

Grooming Deployment

FIG. 39 shows a typical grooming and degrooming scenario in which data units collected from low capacity access links 3920 are aggregated within a grooming subnetwork 4000 for transmission over a single high capacity channel

3940. The data units transmitted over the high capacity channel 3940 are fed into a high capacity backbone 3910 and routed to an exit point, where they exit the backbone 3910 over a high capacity channel 3950. A degrooming subnetwork 5000 sorts the data units transmitted through the high capacity channel 3950 over a plurality of low capacity output links 3930 through which the data units reach their intended destinations.

The present patent discloses grooming and degrooming methods with a common time reference (CTR), which can be deployed respectively within the grooming subnetwork 4000 and degrooming subnetwork 5000. In a possible deployment, the high capacity backbone 3910 is an all-optical network comprised at least one of optical switches, lambda routers, and optical cross connects. In an alternative deployment, the high capacity backbone 3910 is realized using circuit switching, such as SONET/SDH. In an alternative deployment, the high capacity backbone 3910 is realized using at least one of time driven switching (TDS)—also known as fractional lambda switching—technology, and time driven priority. The high capacity backbone 3910 can also be realized deploying asynchronous packet switching, such as MPLS (Multi-Protocol Label Switching), IP (Internet Protocol), ATM (Asynchronous Transfer Mode), and Frame Relay. Any combination of the aforementioned technologies can be used for the implementation of the high capacity backbone 3910.

In the sample configuration shown in FIG. 39, the grooming 4000 and degrooming 5000 subnetworks are based on the SONET (Synchronous Optical NETwork) hierarchy, wherein data units carried by a plurality of OC-3 (155 Mb/s) channels 3920 are aggregated for transmission over a single OC-768 (40 Mb/s) channel 3940, and the data units carried over a single OC-768 (40 Mb/s) channel 3950 are de-aggregated for transmission over a plurality of OC-3 (155 Mb/s) channels 3930.

A possible realization of the grooming subnetwork 4000 is provided in FIG. 40, while FIG. 50 shows a possible realization of the degrooming subnetwork 5000.

FIG. 40 shows a typical grooming scenario based on channels of the SONET (Synchronous Optical NETwork) hierarchy. Data units transmitted through a plurality of OC-3 (155 Mb/s) channels are aggregated and transmitted over a single OC-768 (40 Mb/s) channel.

The aggregation, or grooming architecture shown in FIG. 40 is based on grooming systems 4200-*a* through 4200-*d*.

At the periphery of the network, a plurality of grooming systems 4200-*a* aggregate data flows from 4 OC-3 channels 4020 over a single OC-12 channel 4010 (622 Mb/s). In a real world scenario, the network shown in FIG. 40 could be the network of a service provider offering access to a plurality of customers. The local area networks of the customers are connected to a Time Driven Switch or a Time Driven Priority switch 4060, which forwards their traffic on a respective one of the OC-3 links 4020. The traffic generated by each of a plurality of groups of four customers is aggregated in the provider's point of presence (POP) closest to the customers on a single OC-12 channel 4010, and carried towards a metropolitan aggregation point where a grooming system 4200-*b* further aggregates traffic carried by OC-12 channels 4010 and generated by a plurality of users dispersed in the metropolitan area. Notice that the span of the links carrying the OC-12 channels 4010 can be between a few meters (when the grooming systems 4200-*a* and 4200-*b* are co-located within the same central office) and a few kilometers.

In FIG. 40, each one of the plurality of grooming systems 4200-*b*, aggregates traffic received over four OC-12 channels 4010 for transmission over a single OC-48 (2.5 Gb/s) channel 4030. In a real world example, a service provider could use this architecture to gather traffic from customers located in various metropolitan areas geographically close and connected through OC-12 channels 4010 and transfer the aggregated data flows to a regional aggregation point over a plurality of OC-48 channels 4030.

In the regional aggregation points, in FIG. 40, each one of a plurality of grooming systems 4200-*c* aggregates the data units received over four OC-48 channels 4030 for transmission over a single OC-192 (10 Mb/s) channel 4040. The OC-192 channel 4040 is used to carry the traffic to a continental concentration point where a grooming system 4200-*d* aggregates the traffic from four OC-192 channels 4040 for transmission over an intercontinental backbone of OC-768 (40 Gb/s) channels 4050 and Time Driven Switches or Time Driven Priority switches 4060.

The grooming architecture depicted in FIG. 40 allows all the traffic generated by all the customers of the service provider to be aggregated on a single OC-768 channel 4050 that is fed in a switching system 4060 operating according to either Time Driven Switching or Time Driven Priority.

Grooming Methods

Grooming can be performed according to at least one of two methods.

(1) Intra-time frame grooming. The time frame duration on the output channel is the same as on the input channel; however, the time frame size on the output channel is larger than on the input channel. For example, if the output channel capacity is N times larger than the input channel capacity, time frames on the output channel are N times larger than are those on the input channel. Multiplexing is achieved by combining N time frames worth of data units received from all the input channels during the same time frame on the output channel. Data units received from different input channels are multiplexed in the same time frame within separate sub-time frames.

(2) Inter-time frame grooming. The time frame size on the output channel is the same as on the input channels; however, due to the higher capacity of the output channel, the time frame duration is proportionally shorter. For example, if the output channel capacity is N times larger than the input channel capacity, time frames on the output channel are N times shorter than are those on the input channels. Multiplexing is achieved by interleaving time frames of data units received from the various input channels Channel 1 through Channel 4 on the output channel 4110, as shown in FIG. 41. In the example depicted in FIG. 41 the output channel 4110 capacity is four times the capacity of the input channels (e.g., the output channel is an OC-192 channel, while each input channels is an OC-48 channel).

Grooming that combines the above two methods, shown in FIG. 41A, is such that grooming is obtained by interleaving time frames containing data units from different input channels (inter-time frame grooming), each time frame being composed of two sub-time frames (intra-time frame grooming).

FIG. 46 shows how degrooming is performed. Data units are received on a high capacity input channel Channel5 during each time frame. When intra-time frame degrooming is performed, after data units received from the input channel Channel5 during a first time frame have been aligned, they are transmitted during a second time frame of duration TF2 on multiple output channels Channel1 through Channel4, wherein data units received during the same sub-time frame of the first time frame are transmitted over the same channel, wherein data units received during different sub-time frames of the first time frame are transmitted over different output channels.

When inter-time frame degrooming is performed, as shown in FIG. 46B, data units received during multiple consecutive time frames 5130 through 5137 of duration TF3 from a high capacity input channel Channel5 are transmitted during one selected time frame of duration TF2 over multiple lower capacity output channels Channel1 through Channel4. Finally, as shown in FIG. 46A, a combination of the two degrooming methods, inter-frame degrooming and intra-frame degrooming, can be deployed as well.

The time frame duration to be deployed on each communications channel should be chosen wisely according to the channel capacity. In fact, a small time frame size is not desirable because the grooming and degrooming system operation is simpler and more efficient if any data unit transmitted on the channels fits within a single time frame—and even simpler and more efficient if a few data units are contained in each time frame. On the other hand, time frames that are too large are undesirable as well since in order to align received data units with the CTR, all the data units received in a time frame need to be buffered. Consequently, the larger the time frames, the larger the amount of memory needed to perform CTR alignment.

In summary, short time frames result in high speed control within each grooming and degrooming system, while long time frames result in longer alignment times and consequently longer delay introduced by each grooming and degrooming system.

FIG. 32 shows a possible set of choices for the duration of time frames to be deployed over channels with capacities as defined by the SONET transmission hierarchy, with choices for Gigabit Ethernet (GE) and 10 Gigabit Ethernet (10 GE) channels given as well. For example, when the time frame duration of 62.5 microseconds is used on an STS-12 channel, and a time frame duration of 31.25 microseconds is used on an STS-48 channel, the time frame on the latter channel contains twice the amount of data units as the time frame on the former channel. In other words, an intra-time frame multiplexing of two lower level time frames can be done on the STS-48 channel.

Grooming Realization

FIG. 41 shows a schematic description of the operation of a grooming system 4200. The grooming system 4200 in FIG. 41 has four low capacity input channels and one high capacity output channel. Multiplexing over the output channel of data units received from the four input channels can be done at least at two levels: (i) the channel capacity level—also called inter-time frame grooming—and (ii) the channel capacity and time frame level. FIG. 41A shows an example of multiplexing (or grooming) at both the channel capacity level (inter-time frame grooming) and time frame level (intra-time frame grooming); FIG. 41B shows an example of multiplexing (or grooming) at the channel capacity level, or inter-time frame grooming.

In the configuration shown in FIG. 41, time frames of duration TF2 are deployed on the four input channels Channel1 through Channel4 that have capacity Low_capacity. Consequently time frames have size X bits. A different time frame duration and possibly time frame size is used on the output channel 4110 that has capacity High_capacity. In a sample configuration, Low_capacity could be 2.5 Gb/s (OC-48) and High_capacity could be 10 Gb/s (OC-192), with TF2=25 microseconds and TF1=12.5 microseconds. In this scenario the size of the time frames TF1 is double than the size of the time frames TF2. FIG. 41A depicts such a configuration, which could be the configuration of a grooming system 4200-c in FIG. 40.

All the input channels Channel1 through Channel4 and the output channel 4110 have a common cycle that is divided into a plurality of time frames. As shown in FIG. 44, that depicts the common cycle of two input channels and one output channel, the time frame duration and the number of time frames of each common cycle can be different on each channel. However, the duration of the common cycle is the same on every channel.

In a possible embodiment, the common cycles on all the channels are aligned with the common time reference. In another possible implementation, the common cycles on different channels are not aligned to the common time reference, but they are aligned among themselves. In another embodiment, common cycles of different channels are not necessarily aligned among themselves and are not necessarily aligned with the CTR.

In the sample configuration shown in FIG. 44, the capacity of the output channel (e.g., OC-192—10 Gb/s) is four times the capacity of the two input channels (e.g., OC-48—2.5 Gb/s). The two input channels deploy time frames having the same duration TF2, which is in turn double the duration TF1 of the time frames deployed on the output channel.

Operation of the grooming system requires a subset of the time frames of all the inputs to be mapped on each time frame of the common cycle of the output channel. This is shown in FIG. 44 by the arrows 4410-a through 4480-b. For example, arrow 4410-a and arrow 4460-a show that time frame 1 of the common cycle CC2-1 of input channel Channel1 and time frame 1 of the common cycle CC3-1 of input channel Channel2, respectively, are mapped on time frame 6 of the common cycle CC1-1 of the output channel. This mapping means that all data units received from both input channel Channel1 and input channel Channel2 during time frame 1 of their respective common cycles CC2-1 and CC3-1 are transmitted on the output channel during time frame 6 of the corresponding common cycle CC1-1.

In FIG. 44, the mapping of time frames of the input channels' common cycles onto the output channel common cycles repeats itself over each common cycle. For example, arrows 4410-b and 4460-b show that the mapping of time frame 1 of common cycle CC2-1 and CC3-1 onto time frame 6 of common cycle CC1-1 indicated by arrows 4410-a and 4460-a respectively, is repeated also in the subsequent common cycles CC2-2, CC3-2, and CC1-2.

In the sample configuration depicted in FIG. 41A, the size (i.e., the amount of bits that can be transmitted) of the time frames TF1 deployed on the output channel is double (2.X bits) the size of the time frames TF2 deployed on the four input channels (X bits). In FIG. 41, the grooming system 4200 receives X bits from each of the four input channels during a first selected time frame of duration TF2.

As shown in FIG. 41, during a second selected time frame 4120 of duration TF1, the grooming system 4200 transmits the X bits received, during the first selected time frame, from Channel1 and the X bits received, during the first selected time frame, from Channel2 over the output channel 4110, wherein the second selected time frame follows the first selected time frame.

In a possible embodiment, in FIG. 41A, the X bits received from Channel1 can be transmitted during a first selected sub-time frame of the second time frame 4120 of duration subTF=TF1/2, and the X bits received from Channel2 can be transmitted during a first selected sub-time frame of the second time frame 4120 of duration subTF=TF1/2.

The two sub-time frames of time frame 4120 can be delineated by a sub-time frame delimiter that can be either an implicit one or an explicit one. Explicit delimiters can be realized by one of a plurality of different methods. There can be a different delimiter control word to signal the beginning of a new time frame (i.e., a time frame delimiter—TFD), sub-time frame, time cycle (i.e., a time cycle delimiter—TCD) and super cycle (i.e., a super cycle delimiter—SCD). The explicit delimiter signaling can be realized by the SONET/SDH path overhead field that was design to carry control, signaling and management information. An implicit delimiter can be realized by measuring the UTR time with respect to the CTR. An alternative way of implementing an implicit delimiter is by counting the number of bytes from an explicit delimiter.

Alternatively, delimiters can be realized as an optical signal carried on the communications link coupled to input i. A possible embodiment of time frame delimiter consists of dedicating one of the wavelengths of the communications link for transmission of the delimiter.

The sub-time frame delimiter can comprise a time frame identifier that identifies the sub-time frame within its time frame or the time frame within its time cycle. The time frame identifier can carry control information regarding the data units belonging to the corresponding time frame or sub-time frame. For example, when the bits transmitted during a time frame had been received either by a previous grooming system over a plurality of input channels or during a plurality of time frames, the time frame identifier can identify at least one of the input channels over which the bits were received and the time frame during which the bits were received. In the example shown in FIG. 41A, the first selected sub-time frame of the second time frame 4120 during which the X bits received from Channel1 are transmitted has an identifier uniquely identifying at least one of the sub-time frames of the second time frame 4120 during which the X bits are transmitted, the channel Channel1 on which the X bits had been received, and the first selected time frame during which the X bits had been received from the input channel Channel1.

In a possible embodiment, time frame identifiers are constructed hierarchically to carry information about the time frames during which the corresponding data units where received in each grooming system they had traversed.

In an alternative embodiment, X bits received from Channel1 can be transmitted during a plurality of sub-time frames of the second time frame 4120 multiplexed with the X bits received from Channel2 that are transmitted during a plurality of distinct sub-time frames of the second time frame 4120. The sub-time frames of the second time frame 4120 can be delineated by a sub-time frame delimiter that can be either an implicit one or an explicit one implemented according to the methods described above in this disclosure.

In a third alternative embodiment, the X bits received from Channel1 and the X bits received from Channel2 are multiplexed and transmitted during the second time frame 4120.

During a third selected time frame 4125 of duration TF1, the grooming system 4200 transmits the X bits received, during the first selected time frame, from Channel3 and the X bits received, during the first selected time frame, from Channel4 over the output channel 4110, wherein the third selected time frame 4125 follows the first selected time frame. The X bits received from Channel3 and the X bits received from Channel4 during the first selected time frame can be transmitted on the output channel during the third selected time frame 4125 during either two separate sub-time frames, during a plurality of distinct multiplexed sub-time frames, or multiplexed during the time frame 4125, similarly to what was described above for the transmission of the X bits received from Channel1 and Channel2.

In a possible configuration, the third selected time frame 4125 follows the second selected time frame 4120, as shown in the example depicted in FIG. 41A. In an alternative configuration, the second selected time frame 4120 follows the third selected time frame 4125.

In a possible configuration, the second time frame 4120 is adjacent to the third time frame 4125, as shown in the example depicted in FIG. 41A. In an alternative configuration, the second time frame 4120 is not adjacent to the third time frame 4125.

In the sample configuration depicted in FIG. 41B, the size (i.e., the number of bits that can be received) of the time frames TF3 deployed on the output channel is the same as the size (i.e., the number of bits that can be transmitted) of the time frames TF2 deployed on the four input channels (X bits). The grooming system 4200 receives X bits from each of the four input channels during a first selected time frame of duration TF2.

During a second selected time frame 4130 of duration TF3, as depicted in FIG. 41B, the grooming system 4200 transmits the X bits received from Channel1 over the output channel 4110, wherein the second selected time frame 4130 follows the first selected time frame.

During a third selected time frame 4133 of duration TF3, the grooming system 4200 transmits the X bits received from Channel2 over the output channel 4110, as depicted in FIG. 41B, wherein the third selected time frame 4133 follows the first selected time frame.

During a fourth selected time frame 4137 of duration TF3, the grooming system 4200 transmits the X bits received from Channel3 over the output channel 4110, wherein the fourth selected time frame 4137 follows the first selected time frame.

During a fifth selected time frame 4135 of duration TF3, the grooming system 4200 transmits the X bits received from Channel4 over the output channel 4110, wherein the fifth selected time frame 4135 follows the first selected time frame.

In a possible configuration, as depicted in FIG. 41B, the fifth selected time frame 4135 follows the fourth selected time frame 4137, that in turn follows the third selected time frame 4133, that in turn follows the second selected time frame 4130, as shown in the example depicted in FIG. 41A. In alternative configurations, the four time frames 4130 through 4137 follow each other in any other possible order.

In a possible configuration, the four time frames 4130 through 4137 are adjacent, as shown in the example depicted in FIG. 41A. In an alternative configuration, the four time frames 4130 through 4137 are not all adjacent to at least one of the others. In a possible configuration, each of the four time frames 4130 through 4137 is not adjacent to any one of the others.

FIG. 42 depicts the architecture of a possible embodiment of a Grooming system 4200 comprising a Grooming Controller 4220 and a Grooming Module 4300 between a plurality of low capacity input channels 4230 and a higher capacity output channel 4240. In the sample configuration shown in FIG. 42, the grooming system 4200 has c input channels at capacity Low_capacity and one output channel at capacity High_capacity, where High_capacity=c·Low_capacity.

In FIG. 42, the grooming module 4300 aggregates data units received on the input channels 4230 for transmission over the output channel 4240 responsive to the control signals 4250, 4260, and 4270 from the grooming controller 4220. The grooming controller 4220 generates the control signals for the grooming module 4300 responsive to the common time reference (CTR) 002 received through an external control line 4280, and responsive to the unique time reference (UTR) coupled with each input channel 4230. The grooming controller 4220 devises such UTR by using the time frame and sub-time frame delimiters included in the data stream according one of the methods described above in the present disclosure.

In FIG. 42, The control signals sent from the grooming controller 4220 to the grooming module 4300 comprise a Select_in signal 4250 for each one of the plurality of input channels 4230, a Select_out signal 4260 for each one of the plurality of input channels 4230, and a Select signal 4270.

Each Select_in signal 4250 is aligned with the UTR coupled to the corresponding input channel 4230 and has a period equal to the time frame duration TF2 deployed on the corresponding input channel 4230.

Each Select_out signal 4260 is aligned with the CTR and has a period equal to the time frame duration TF2 deployed on the corresponding input channel 4230.

The Select signal 4270 is aligned with the CTR and has a period equal to the sub-time frame duration subTF deployed on the output channel 4240.

The grooming systems 4200-a through 4200-d deployed in the grooming scenario presented in FIG. 40 can be implemented using the architecture shown in FIG. 42, where c=4. For example, the Grooming systems 4200-c can be implemented with the architecture shown in FIG. 42, where Low_capacity=2.5 Gb/s (OC-48 4030) and High_capacity=10 Gb/s (OC-192 4040).

A possible implementation of the grooming module 4300 is shown in FIG. 43. An array of alignment subsystems 1400 receives data units from the low capacity input channels 4230. After having been aligned to the CTR 002 within the alignment subsystem, the data units received over different input channels in a previous time frame are sent to the high capacity output channel 4240. Data units to be transmitted over the high capacity output channel 4240 during each predefined sub-time frame are retrieved from their respective alignment subsystem 1400 through the data lines 4320. The specific one of the alignment subsystems 1400 from which data units are to be retrieved to be transmitted over the high capacity output channel 4240 is selected by a c-by-1 selector 2110 in each sub-time frame responsive to the Select signal 4270 from the grooming controller 4220.

FIG. 43 shows the sample implementation of a grooming module 4300 with c low capacity input channels 4230. The same architecture with c=4 can be used in the implementation of the grooming module 4300 comprised within the grooming systems 4200 deployed in the sample grooming scenario presented in FIG. 40. For example, the grooming module 4300 within one of the grooming systems 4200-b operates between four input channels 4230 having capacity Low_capacity=622 Mb/s (OC-12 4010) and an output channel 4240 having capacity High_capacity=2.5 Gb/s (OC-48 4030).

An alternative implementation of the grooming module 4300 comprises a buffer queue between the c-by-1 selector 2110 and the output channel 4240. Such buffer queue—not shown in the block diagram depicted in FIG. 43—decouples the transmission of data units on lines 4320 and through the c-by-1 selector 2110 from the transmission on the output channel 4240.

Degrooming Deployment

FIG. 45 shows a typical degrooming scenario based on channels of the SONET (Synchronous Optical NETwork) hierarchy. Data units transmitted through a single OC-768 (40 Mb/s) channel are de-aggregated and transmitted over a plurality of OC-3 (155 Mb/s) channels. The de-aggregation, or degrooming, architecture shown in FIG. 45 is based on degrooming systems 5200-a through 5200-d.

The traffic carried over an OC-768 (40 Gb/s) channel 4050 is divided by a degrooming system 5200-a over four separate OC-192 (10 Gb/s) channels 4040. In a real world scenario, the network shown in FIG. 45 could be the network of a service provider offering access to a plurality of customers. The traffic in the intercontinental backbone of the network is handled by Time Driven Switches or Time Driven Priority switches 4060 that forward backbone traffic directed to a given continental area over an OC-768 channel 4050. Traffic from the intercontinental backbone is divided over four OC-192 (10 Gb/s) channels 4040 to be carried to four distinct continental de-aggregation points.

In FIG. 45, each one of the degrooming systems 5200-b in the continental de-aggregation points divides the traffic received over its respective OC-192 channel 4040 over four distinct OC-48 (2.5 Gb/s) channels 4030 which are connected to respective regional de-aggregation points.

In FIG. 45, each one of the degrooming systems 5200-c divides the traffic received over a respective one OC-48 channel 4030 over four distinct OC-12 (622 Mb/s) channels 4010. In a real world example, a service provider could use this architecture to divide the traffic received at a regional aggregation point through an OC-48 channel 4030 and addressed to customers located in various metropolitan areas geographically close and connected through OC-12 channels 4010 to the regional aggregation point.

In FIG. 45, each of the degrooming systems 5200-d in the Point of Presence (POP) of the provider within metropolitan areas receives traffic through an OC-12 channel 4010 and divides it over four OC-3 (155 Mb/s) channels 4020, each one connected to a respective customer. The local area networks of the customers are connected to a Time Driven Switch or a Time Driven Priority switch 4060 which receives their traffic through a respective one of the OC-3 links 4020.

The degrooming architecture depicted in FIG. 45 allows all the traffic addressed to all the customers of the service provider to be routed by a switching system 4060 operating according to either Time Driven Switching or Time Driven Priority on a single OC-768 channel 4050. The traffic is further divided over lower capacity channels until it reaches the intended customer over its respective OC-3 channel 4020.

Degrooming Realization

FIG. 46 shows a schematic description of the operation of a degrooming system 5200. The degrooming system 5200 in FIG. 46 has one high capacity input channel and four low capacity output channels. De-multiplexing of data units received from the input channel over the four output channels during transmission can be done at least at two levels: (i) the channel capacity level—also called inter-time frame degrooming—and (ii) the channel capacity and time frame level. FIG. 46A shows an example of de-multiplexing (or degrooming) at both the channel capacity and time frame level; FIG. 46B shows an example of de-multiplexing (or degrooming) at the channel capacity level—also called inter-time frame degrooming.

In FIG. 46, time frames of duration TF2 are deployed on the four output channels Channel1 through Channel4 that have capacity Low_capacity. Consequently time frames have size X bits. A different time frame duration and possibly time frame size is used on the input Channel5 that has capacity High_capacity. In a sample configuration, Low_capacity could be 2.5 Gb/s (OC-48) and High_capacity could be 10 Gb/s (OC-192), with TF2=25 microseconds and TF1=12.5 microseconds. In this scenario the size of the time frames TF1 is double the size of the time frames TF2. FIG. 46A depicts such a configuration which could be the configuration of a degrooming system 5200-b in FIG. 45.

The input channel Channel5 and all the output channels (Channel1 through Channel4) have a common cycle that is divided in a plurality of time frames. As shown in FIG. 52 that depicts the common cycle of two output channels and one input channel, the time frame duration and the number of time frames of each common cycle can be different on each channel. However, the duration of the common cycle is the same on every channel.

In the sample configuration shown in FIG. 52, the capacity of the input channel (e.g., OC-192—10 Gb/s) is four times the capacity of the two output channels (e.g., OC-48—2.5 Gb/s). The two output channels deploy time frames having the same duration TF2; such duration is in turn double the duration TF1 of the time frames deployed on the input channel.

Operation of the degrooming system requires each time frame of the common cycle of the input channel to be mapped onto a subset of the time frames of all the outputs. This is shown in FIG. 52 by the arrows 5720-a through 5760-c. For example, arrow 5720-a and arrow 5770-a show that time frame 6 of the common cycle of the input channel is mapped on time frame 1 of the common cycle of output channel Channel1 and time frame 1 of the common cycle of output channel Channel2, respectively. This mapping means that some of the data units received from the input channel during time frame 6 of the corresponding common cycle CC1-1 are transmitted on output channel Channel1 during time frame 1 of the respective common cycle CC2-1; and the remaining data units received from the input channel during time frame 6 of the corresponding common cycle CC1-1 are transmitted on output channel Channel2 during time frame 1 of the respective common cycle CC3-1.

In FIG. 52, The mapping of time frames of the input channel's common cycles onto the output channels' common cycles repeats over each common cycle. For example, arrow 5720-b and 5770-b show that the mapping of time frame 6 of common cycle CC1-1 onto time frame 1 of common cycles CC2-1 and CC3-1 indicated by arrows 5720-a and 5770-a, respectively, is repeated also in the subsequent common cycles CC1-2, CC2-2, and CC3-2.

In the sample configuration depicted in FIG. 46A, the size of the time frames TF1 deployed on the input channel Channel5 is double (2·X bits) the size of the time frames TF2 deployed on the four output channels (X bits). The degrooming system 5200 receives 2·X bits from the input channel Channel5 during a first selected time frame 5120 of duration TF1 and another 2·X bits from the input channel Channel5 during a second selected time frame 5125 of duration TF1.

According to the configuration presented in FIG. 46, during a third selected time frame of duration TF2, the degrooming system 5200 transmits over the output channels Channel1 through Channel4 the 4·X bits received from the from the input channel Channel5 during the first selected time frame 5120 and the second selected time frame 5125, wherein the third selected time frame follows the first 5120 and the second 5125 selected time frames.

In a possible embodiment, the X bits received from Channel5 during a first selected sub-time frame d of the first time frame 5120 of duration subTF=TF1/2 are transmitted on a predefined output channel Channel3, as shown in the example in FIG. 47. The X bits received from Channel5 during a second selected sub-time frame c of the first time frame 5120 of duration subTF=TF1/2 are transmitted on a predefined output channel Channel2.

In FIG. 46, the two sub-time frames c and d of the first selected time frame 5120 can be delineated by a sub-time frame delimiter that can be either an implicit one or an explicit one implemented according to the methods described later in this disclosure. The sub-time delimiter may comprise a time frame identifier implemented according to the methods described later in this disclosure. The time frame identifier identifies the sub-time frame within its time frame or the time frame within its time cycle.

The time frame identifier can carry control information regarding the data units belonging to the corresponding time frame or sub-time frame. For example, when the bits received during a time frame had been previously aggregated by a grooming system after having been received either over a plurality of input channels or during a plurality of time frames, the time frame identifier can identify at least one of the input channels over which the bits were received and the time frame during which the bits were received.

In a possible embodiment, a degrooming system 5200 selects the output channel and the time frame during which data units are to be transmitted over the selected output channel responsive to the control information contained in the identifier of time frame or sub-time frame during which the data units were received. In the example shown in FIG. 46A, the first selected sub-time frame d of the first time frame 5120 during which X bits are received from the input channel Channel5 has an identifier uniquely associated to the X bits. Responsive to such an identifier, the degrooming system 5200 forwards the respective X bits over the output channel Channel3 during the third selected time frame. In other words, the output channel Channel3 and the third selected time frame are chosen responsive to the identifier of sub-time frame d of time frame 5120.

In a possible embodiment, time frame identifiers are constructed hierarchically to carry information about the time frames during which the corresponding data units were received in each grooming system they had traversed.

In an alternative embodiment, X bits transmitted on Channel3 can be received from Channel5 during a plurality of sub-time frames of the first time frame 5120 multiplexed with the X bits transmitted on Channel2 that are received from Channel5 during a plurality of distinct sub-time frames of the first time frame 5120. The sub-time frames of time frame 5120 can be delineated by a sub-time frame delimiter that can be either an implicit one or an explicit one. Explicit delimiters can be realized by one of a plurality of different methods. There can be a different delimiter control word to signal the beginning of a new time frame (Le., a time frame delimiter—TFD), sub-time frame, time cycle (i.e., a time cycle delimiter—TCD) and super cycle (i.e., a super cycle delimiter—SCD). The explicit delimiter signaling can be realized by the SONET/SDH path overhead field that was design to carry control, signaling and management information. An implicit delimiter can be realized by measuring the UTR time with respect to the CTR. An alternative way of implementing an implicit delimiter is by counting the number of bytes from an explicit delimiter.

Alternatively, delimiters can be realized as an optical signal carried on the communications link coupled to input i. A possible embodiment of time frame delimiter consists of dedicating one of the wavelengths of the communications link for transmission of the delimiter.

In a third alternative embodiment, the X bits transmitted on Channel3 and the X bits transmitted on Channel2 are multiplexed and received from Channel5 during the first time frame 5120.

The 2·X bits received from Channel5 during a the second selected time frame 5125 of duration TF1 are transmitted by the degrooming system 5200 on two predefined output channels Channel4 and Channel1 during the third selected time frame of duration TF2, as shown in the example in FIG. 47. The 2·X bits transmitted over Channel4 and Channel1 can be received from Channel5 either during two separate sub-time frames, during a plurality of distinct multiplexed sub-time frames, or multiplexed during the time frame 5125, similarly to what was described above for the reception of the 2·X bits received from Channel5.

In a possible configuration, the second selected time frame 5125 follows the first selected time frame 5120, as shown in the example depicted in FIG. 46A. In an alternative configuration, the first selected time frame 5120 follows the second selected time frame 5125.

In a possible configuration, the first selected time frame 5120 is adjacent to the second time frame 5125, as shown in the example depicted in FIG. 46A. In an alternative configuration, the first time frame 5120 is not adjacent to the second time frame 5125.

In the sample configuration depicted in FIG. 46B, the size of the time frames TF1 deployed on the input channel Channel5 is the same as the size of the time frames TF2 deployed on the four output channels (X bits). The degrooming system 5200 receives 4·X bits from the input channel Channel5 during four-selected time frames 5130 through 5137 of duration TF3.

During a fifth selected time frame of duration TF2, the degrooming system 5200 transmits the X bits received, during the first selected time frame 5130, from the input channel Channel5 over the output channel Channel1, wherein the fifth selected time frame of duration TF2 follows the first selected time frame 5130.

During a fifth selected time frame of duration TF2, the degrooming system 5200 transmits the X bits received, during the second selected time frame 5133, from the input channel Channel5 over the output channel Channel4, wherein the fifth selected time frame of duration TF2 follows the second selected time frame 5133.

During a fifth selected time frame of duration TF2, the degrooming system 5200 transmits the X bits received, during the third selected time frame 5137, from the input channel Channel5 over the output channel Channel2, wherein the fifth selected time frame of duration TF2 follows the third selected time frame 5137.

During a fifth selected time frame of duration TF2, the degrooming system 5200 transmits the X bits received, during the fourth selected time frame 5135, from the input channel Channel5 over the output channel Channel1, wherein the fifth selected time frame of duration TF2 follows the fourth selected time frame 5135.

In a possible configuration, the fourth selected time frame 5135 follows the third selected time frame 5137, that in turn follows the second selected time frame 5133, which in turn follows the first selected time frame 5130, as shown in the example depicted in FIG. 46A. In alternative configurations, the four time frames 5130 through 5137 follow each other in any other possible order.

In a possible configuration, the four time frames 5130 through 5137 are adjacent, as shown in the example depicted in FIG. 46A. In an alternative configuration, the four time frames 5130 through 5137 are not all adjacent to at least one of the others. In a possible configuration, each of the four time frames 5130 through 5137 is not adjacent to any one of the others.

FIG. 47 depicts the architecture of a possible embodiment of a degrooming system 5200 comprising a Degrooming Controller 5220 and a Degrooming Module 5300 between a high capacity input channel 5240 and a plurality of lower capacity output channels 5230. In the sample configuration shown in FIG. 47, the degrooming system 5200 has c output channels at capacity Low_capacity and one input channel at capacity High_capacity, where High_capacity=c·Low_capacity.

The degrooming module 5300 de-aggregates data units received from the input channel 5240 for transmission over the output channels 5230 responsive to the control signals 5250, 5260, and 5270 from the degrooming controller 5220. The degrooming controller 5220 generates the control signals for the degrooming module 5300 responsive to the common time reference (CTR) 002 received through an external control line 5280 and responsive to the unique time reference (UTR) coupled with the input channel 5240. The degrooming controller 5220 devises the UTR by means of at least one of the time frame delimiters and sub-time frame delimiters embedded in the flow of data according to at least one of the methods described later in the present disclosure.

The control signals sent from the degrooming controller 5220 to the degrooming module 5300 comprise a Select_in signal 5250 for each one of the plurality of output channels 5230, a Select_out signal 5260 for each one of the plurality of output channels 5230, and a Select signal 5270.

Each Select_in signal 5250 is aligned to the UTR coupled with the input channel 5240 and has a period equal to the time frame duration TF2 deployed on the corresponding output channel 5230.

Each Select_out signal 5260 is aligned to the CTR and has a period equal to the time frame duration TF2 deployed on the corresponding output channel 5230.

The Select signal 5270 is aligned to the UTR devised from the input channel 5240 and has a period equal to the sub-time frame duration subTF deployed on the input channel 5240.

The degrooming systems 5200-*a* through 5200-*d* deployed in the degrooming scenario presented in FIG. 45 can be implemented using the architecture shown in FIG. 47, where c=4. For example, the Degrooming systems 5200-*b* can be implemented with the architecture shown in FIG. 47, where Low_capacity=2.5 Gb/s (OC-48 4030) and High_capacity=10 Gb/s (OC-192 4040).

A possible implementation of the degrooming module 5300 is shown in FIG. 48. The 1-by-c selector 2210, responsive to the Select signal 5270, directs the data units received on the input channel 5240 on a selected one of a plurality of Alignment Subsystems 1400.

In FIG. 48, each Alignment Subsystem 1400 handles data units received from the high capacity channel 5240 during a specific sub-time frame of a first time frame. Data units are received by each Alignment Subsystem 1400 through a respective one of the data lines 5320 from the 1-by-c selector 2210.

With reference to the grooming module 5300 architecture depicted in FIG. 48, after having been aligned to the CTR 002 within the alignment subsystem 1400, the data units received over the high capacity input line 5320 during a respective sub-time frame of a previous first time frame are transmitted over the corresponding low capacity output channel 5230 during a following second time frame. The specific one of the alignment subsystems 1400 in which data units are to be transferred through a respective one of the data lines 5320 is selected by the 1-by-c selector 2210 in each sub-time frame responsive to the Select signal 5270 from the degrooming controller 5220.

FIG. 48 shows the sample implementation of a degrooming module 5300 with c low capacity input channels 5230. The same architecture with c=4 can be used in the implementation of the degrooming module 5300 comprised within the degrooming systems 5200 deployed in the sample grooming scenario presented in FIG. 45. For example, the degrooming module 5300 within one of the degrooming systems 5200-c operates between four output channels 5230 having capacity Low_capacity=622 Mb/s (OC-12 4010) and an input channel 5240 having capacity High_capacity=2.5 Gb/s (OC-48 4030).

An alternative implementation of the degrooming module 5300 is shown in FIG. 49. The degrooming module 5300 implementation shown in FIG. 49 comprises an alignment subsystem 1500, a 1-by-c selector 2210, and a plurality of Rate Matching buffers (RMBs) 1600. A degrooming controller 5420 receives the CTR from a control line 5280 and generates the control signals Select-in 5450, Select-out 5460, Select 5270, Select-RMB-in 5480, and Select-RMB-out 5490 for the degrooming module 5300. The Select-in signal 5450 is aligned with the UTR of the input channel 5240, while the other control signals 5460, 5270, 5480, and 5490 are aligned with the CTR.

In FIG. 49, the Alignment Subsystem 1500 receives data units from the input channel 5240 and aligns them to the CTR responsive to the Select-in 5450 and Select-out 5460 signals from the degrooming controller 5420. Data units received from the input channel 5240 during different sub-time frames of duration subTF are stored in the alignment subsystem 1500 in different per-sub-time frame buffers. The Select-in signal 5450, that is aligned to the UTR of the input channel 5240 and has period subTF, selects the per-sub-time frame buffer in which incoming data units are to be stored. The Select-out signal 5460, aligned to the CTR and has period subTF, selects the per-sub-time frame buffer from which data units are to be retrieved for transmission over the data line 5415.

The 1-by-c selector 2210, responsive to the Select signal 5270, directs the data units received from the data line 5415 from the alignment subsystem 1500 on a selected one of the RMBs 1600.

In FIG. 49 each RMB 1600, responsive to the Select-RMB-in 5480 and Select-RMB-out 5490 signals from the degrooming controller 5420, receives data units from a respective one of the outputs 5410 of the 1-by-c selector 2210 at a the high rate High_capacity. Data units are retrieved from each RMB 1600 for transmission on the respective one of the low capacity output channels 5230 at the low data rate Low_capacity.

Another alternative implementation of the degrooming module 5300 is shown in FIG. 50. The embodiment of degrooming module 5300 shown in FIG. 50 comprises a plurality of alignment subsystems 1400, at least one of a plurality of routing modules 5600, and a 1-by-c selector 2210. The embodiment of degrooming module 5300 depicted in FIG. 50 combines synchronous (time-based) degrooming with asynchronous (routing-based) degrooming.

In FIG. 50, each Alignment Subsystem 1400 and each routing module 5600 handle data units received during a specific sub-time frame of a first time frame from the high capacity channel 5240. Data units are received by each Alignment Subsystem 1400 and each routing module 5600 through a respective one of the data lines 5320 from the 1-by-c selector 2210.

In the embodiment shown in FIG. 50, after having been aligned to the CTR 002 within the alignment subsystem 1400, the data units received over the high capacity input line 5320 during a respective sub-time frame of a first time frame are transmitted over the corresponding low capacity output channel 5230 during a second time frame, wherein the second time frame follows the first time frame. The specific one of the alignment subsystems 1400 in which data units are to be transferred through a respective one of the data lines 5320 is selected by the 1-by-c selector 2210 in each sub-time frame responsive to the Select signal 5270 from the degrooming controller 5220.

In the embodiment shown in FIG. 50, the data units received by each of the routing modules 5600 over the high capacity input line 5320 during a respective sub-time frame of a first selected time frame are transmitted over at least one of a plurality of output channels 5510 at a non previously selected time following the first selected time frame. The specific one of the routing modules 5600 in which data units are to be transferred through a respective one of the data lines 5320 is selected by the 1-by-c selector 2210 in each sub-time frame responsive to the Select signal 5270 from the degrooming controller 5220.

The routing module 5600 is equipped with at least one output channel 5510. In one possible implementation, each of the n output channels 5510 has capacity Low_capacity/n. In a possible alternative implementation, each of the output channels 5510 has capacity Low_capacity. In an alternative implementation, each of the output channels 5510 has capacity High_capacity. In an alternative embodiment, output channels 5510 have different capacities, including but not limited to, Low_capacity, High_capacity, and a fraction or multiple thereof.

FIG. 51 shows the architecture of a possible embodiment of the routing module 5600 comprising one input queue 5620, a 1-by-n selector 5640, a plurality of output queues 5630, and a routing controller 5610. Data units received from the high capacity data line 5320 are stored in the input queue 5620 while waiting for the routing controller 5610 to process them. Based on the control information associated to the data unit at the head of the input queue 5620, the routing controller 5610 determines the output channel 5510 on which said data unit is to be transmitted. In a possible embodiment, the routing controller 5610 retrieves the control information associated with the data units in the input queue 5620 through a data line 5670 and looks up the retrieved control information in a routing table 5615. The selected routing table entry identifies the output channel 5510 on which the corresponding data unit is to be transmitted. The routing controller 5610 selects the corresponding output 5680 of the selector 5640 and the processed data unit is stored in the corresponding output queue 5630 until the corresponding output channel 5510 is available for transmission.

In a possible implementation data units are packets and the control information is contained in the packet's header. In a possible embodiment, packets are IP (Internet Protocol)

packets and the control information processed by the routing controller 5610, as in FIG. 51, is the destination address contained in the respective field of the IP header. In another embodiment, data units are ATM (Asynchronous Transfer Mode) cells and the control information is at least one of the VPI (Virtual Path Identifier) and VCI (Virtual Connection Identifier) in the cell header.

Grooming and Degrooming Deployment in a Data Network

FIG. 53 shows a network scenario in which data units, such as IP packets or ATM cells, transported asynchronously over 622 Mb/s channels 5840 are mapped onto their respective fractional lambda pipes (FLPs) and then time-based groomed over 2.5 Gb/s 5850 and 10 Gb/s channels 5860. FLPs carrying packet flows are switched by a plurality of fractional lambda switches (FLS) 52 connected by 10 Gb/s channels 5860 through an optical backbone implemented by optical cross connects (OXC) 5820 interconnected by fiber links 5870.

FIG. 53 also shows that data units transported across the optical backbone and switched by fractional lambda switches (FLS) 52 over 192 Gb/s 5860 and 2.5 Gb/s channels 5850 are then degroomed for transmission over 622 Mb/s channels 5840.

Fractional lambda interfaces (FLIs) 2900 receive asynchronous packets from four 622 Mb/s channels 5840 and forward them on multiple fractional lambda pipes (FLPs) responsive to the common time reference (CTR) over 2.5 Gb/s channels 5850. A time frame duration of 31.25 microseconds is deployed on 2.5 Gb/s channels 5850, i.e., 9,720 Kbytes of data units can be transmitted on each channel 5850 during one time frame.

In FIG. 53, grooming systems (G) 5810 receive traffic from four 2.5 Gb/s channels 5850, each channel carrying at least one of a plurality of FLPs. Each grooming system 5810 aggregates FLPs from all of its four input channels 5850 over an output 10 Gb/s channel 5860. A time frame duration of 7.8125 microseconds is deployed on 10 Gb/s channels 5860, i.e., 9,720 Kbytes of data units can be transmitted on each channel 5860 during one time frame.

A plurality of FLSs 52 switch traffic received through FLPs on 2.5 Gb/s channels 5850 from FLIs 2900 and on 10 Gb/s channels 5860 from grooming devices 5810, possibly forwarding part of said traffic over 10 Gb/s channels 5860 across an optical backbone implemented by OXCs 5820 and optical links 5870. The traffic switched by FLSs 52 is eventually forwarded over 2.5 Gb/s channels 5850 and 10 Gb/s channels 5860 feeding degrooming systems 5830.

FLPs entering a degrooming system (D) 5830 through a 10 Gb/s channel 5860 are distributed across four 2.5 Gb/s output channels 5850. Data units carried over FLPs entering a degrooming system (D) 5830 through a 2.5 Gb/s channel 5850 are forwarded over four 622 Mb/s output channels 5840. The choice of the output channel on which data units received by a degrooming system 5830 during each time frame are to be routed is determined by the schedule associated with the FLP to which the time frame is reserved. Such schedule repeats periodically every time cycle or super cycle.

The network scenario shown in FIG. 53 provides a very flexible and scalable way of aggregating traffic from a plurality of low capacity channels (622 Mb/s 5840 in the given example) for transport over higher capacity channels (10 Gb/s 5860 in the given example) towards the destination where packet flows are again spread over a multiplicity of low capacity channels 5840.

The flexibility of the solution stems from FLIs 2900 organizing the data units incoming over each low speed channel 5840 in a plurality of FLPs. FLPs are then aggregated over higher capacity channels (5850 and 5860 in the example of FIG. 53). FLSs 52 are capable of switching each single FLP carried over high capacity channels towards a possibly different destination. Thus, data units belonging to a given FLP can reach the respective destination through very high capacity optical links 5870 and OXCs 5820. Near the destination, FLPs carried over the same high capacity channel (5860 and 5850 in the example of FIG. 53) are separated so that the data units belonging to each FLP can be forwarded on the low capacity channel 5840 through which the destination is reachable.

The scalability of the solution stems from the combined very low complexity of FLIs 2900, time-driven grooming systems 5810, time-driven degrooming systems 5830, and time-driven switches 52. In order to cope with the limited space requirements, FLIs 2900, grooming systems 5810, and degrooming systems 5830 can be built with high port densities and many layers of grooming 5810 and degrooming 5830 systems may be installed in the network. Due to the scalability of the solution, configurations in which 1 Mb/s access channels, such as TDSL connections, can be groomed to 10 Gb/s channels, wherein each 10 Gb/s channel carries traffic from 10,000 access channels, with lower cost and space requirement than currently deployed header-processing-based or circuit-switching-based grooming solutions. Moreover, a layer of FLSs 52 enables data units from individual ingress access channels to be switched to their respective destination egress access channels.

A simple and scalable solution for the transport of groomed traffic towards its intended destination comprises a layer of FLSs 52 interconnected through an optical backbone implemented with OXCs 5820 interconnected by optical links 5870. The layer of FLSs can comprise a single level of FLSs 52, wherein each FLS 52 is connected to either FLIs 2900, or grooming systems 5810, or degrooming systems 5830.

Deployment of Grooming and Degrooming of SONET Channels with CTR

FIG. 54 shows a network scenario in which Synchronous Optical Network/Synchronous Digital Hierarchy (SONET/SDH) tributaries, e.g., OC-1, multiplexed on OC-12 channels 5940 are mapped on their respective fractional lambda pipes (FLPs) and then time-based groomed over OC-48 5950 and OC-192 channels 5960. FLPs are switched by a plurality of fractional lambda switches (FLS) 52 connected by OC-192 channels 5960 through an optical backbone implemented by optical cross connects (OXC) 5820 interconnected by fiber links 5870.

FIG. 54 also shows that SONET channels transported across the optical backbone and switched by TDSs 52 over 192 Gb/s 5960 and OC-48 channels 5950 are then degroomed for being transmitted over OC-12 channels 5940.

In the configuration shown in FIG. 54, each fractional lambda interface (FLI) 5980 de-multiplexes SONET tributary channels from four OC-12 channels 5940 and maps each tributary onto a respective fractional lambda pipe (FLP) responsive to the common time reference (CTR) over OC-48 channels 5950. A time frame duration of 31.25 microseconds is deployed on OC-48 channels 5950, i.e., 12 STS-1 SONET frames can be transmitted on each channel 5950 during one time frame.

Grooming systems 5910 receive traffic from four OC-48 channels 5950, each channel carrying at least one of a plurality of FLPs. Each grooming system 5910 aggregates the FLPs from all its four input channels over an output OC-192 channel 5960. A time frame duration of 7.8125 microseconds is deployed on OC-192 channels 5960, i.e., 12 STS-1 SONET frames can be transmitted on each channel 5960 during one time frame.

A plurality of FLSs 52 switch traffic, i.e., SONET channels such as, OC-1 and OC-3, received through FLPs on OC-48 channels 5950 from FLIs 5980 and on OC-192 channels 5960 from grooming devices 5910, possibly routing part of said SONET channels over OC-192 channels 5960 across an optical backbone implemented by OXCs 5820 and optical links 5870. SONET channels switched by FLSs 52 are eventually forwarded over OC-48 channels 5950 and OC-192 channels 5960 feeding degrooming systems 5930.

FLPs entering a degrooming system 5930 through an OC-192 channel 5960 are distributed across four OC-48 output channels 5950. The choice of the output channel 5950 on which SONET frames received by a degrooming system 5930 during each selected time frame are to be routed is determined by the schedule associated with the FLP the selected time frame is reserved to and repeats periodically every time cycle or super cycle.

SONET channels, e.g., OC-1 and OC-3, belonging to FLPs entering an FLI 5980 through an OC-48 channel 5950 are routed over four OC-12 output channels 5940, where all the tributaries are multiplexed according to the SONET standard to yield the output OC-12 signal. The choice of the output channel on which SONET frames received by an FLI 5980 during each selected time frame are to be routed is determined by the schedule associated with the FLP the selected time frame is reserved to and repeats periodically every time cycle or super cycle.

The network scenario shown in FIG. 54 provides a very flexible and scalable way of aggregating SONET tributaries—a special case of a tributary being the whole channel—from a plurality of low capacity channels (OC-12 5940 in the given example) for transport over higher capacity channels (OC-192 5960 in the given example) towards the destination where SONET tributaries are again multiplexed to yield a multiplicity of low capacity channels (OC-12 5940 in the given example).

The flexibility of the solution stems from FLIs 5980 organizing the SONET tributaries of each low speed channel 5940 in a plurality of FLPs. FLPs are then aggregated over higher capacity channels (5950 and 5960 in the example of FIG. 54). FLSs 52 are capable of switching each single FLP carried over high capacity channels towards a possibly different destination. Thus, a SONET channel belonging to a given FLP can reach the respective destination through very high capacity optical links 5870 and OXCs 5820. Near the destination, FLPs carried over the same high capacity channel (5960 and 5950 in the example of FIG. 54) are separated so that the SONET channel belonging to each FLP can be multiplexed within the low capacity channel 5940 through which the destination is reachable.

The scalability of the solution stems from the very low combined complexity of FLIs 5980, time-driven grooming systems 5910, time-driven degrooming systems 5930, and time-driven switches 52. The limited space requirements allow for realization of FLIs 5980, grooming 5910 and degrooming 5930 systems with high port densities and for installation of many layers of grooming 5910 and degrooming 5930 systems in the network. Due to the scalability of the solution, there may be configurations in which T1 (1.5 Mb/s) access channels can be groomed to OC-192 channels, wherein each OC-192 channels carries traffic from 4,032 access channels, with lower cost and lower space requirement than currently deployed header-processing-based or circuit-switching-based grooming solutions. Moreover, a layer of TDSs 52 enables individual ingress T1 channels to be switched towards their respective destination egress access channels.

A simple and scalable solution for the transport of groomed traffic towards its intended destination comprises a layer of TDSs 52 interconnected through an optical backbone implemented with OXCs 5820 interconnected by optical links 5870. The layer of TDS can comprise a single level of TDSs 52, wherein each TDS 52 is connected to either FLIs 5980, or grooming systems 5910, or degrooming systems 5930.

SONET Switching with Common Time Reference

Time driven switching can be used to implement very high capacity switching systems for SONET/SDH (Synchronous Optical NETwork/Synchronous Digital Hierarchy) channels. FIG. 55 shows a scenario where at least one of a time driven switching network i.e., a network composed of a plurality of time driven switches interconnected in an arbitrary topology by communications links and a time driven priority network [C-S Li, Y. Ofek and M. Yung, "Time-driven Priority Flow Control for Real-time Heterogeneous Internetworking," IEEE INFOCOM'96, April 1996.] is deployed to provide SONET/SDH services. A SONET channel, also called path, can be created across native SONET equipment (such as SONET cross connects 8040 and SONET add/drop multiplexers 8010) and the time driven switches used to realize a time driven switching subnetwork 8020.

SONET frames, whose structure is depicted in FIG. 64, can be exploited to embed control information in the flow of data units. FIG. 64A is the structure of a STS-1 (Synchronous Transport Signal) frame used for transmission on channels at speed 51.84 Mb/s, and FIG. 64B shows the structure of an STS-N frame used for transmission on channels at speed N·51.84 Mb/s. The STS-1 frame is organized in rows and columns; the frame is transmitted on a serial communications channel, e.g., 920 in FIG. 1, by rows. The STS-1 frame is composed of 9 lines of 90 bytes. The first 3 bytes of every row carry control information called Transport Overhead TOH. The control information in the Transport Overhead TOH is used by the network elements at the end points of sections (repeaters) and lines (add-drop multiplexers). The remaining 87 bytes on each row are transported between the end points of a communication.

Data traveling end to end is not put in the STS-1 frame simply starting from column 3 of row 1. Instead, data is inserted in what is called a SONET Payload Environment SPE that can start at any position within the rightmost 87 columns of the STS-1 frame. The SPE is said to float within the payload of the STS-1 frame. Two of the bytes in the TOH, called bytes H1 and H2, are a pointer to the position of the SPE within the STS-1 frame.

The SPE, comprising 9 rows of 87 bytes, is further divided in a payload part PAYLOAD and an overhead part, called Path Overhead POH that consists of the first byte of each row—first column. User data traveling on a communications channel defined over a SONET network are carried within the PAYLOAD part. The STS-N frame, shown in FIG. 64B, is obtained by byte interleaving N STS-1 frames. As a result, the first 3·N columns of an STS-N frame contain the transport overhead TOH, while the remaining N·87 columns contain N SPEs, each one possibly floating independently. An STS-N frame (with N≧1) is transmitted in 125 microseconds, resulting in a transmission speed of N·51.84 Mb/s.

As shown in FIG. 55, native SONET devices access the services of the time driven switching subnetwork 8020 through a fractional lambda interface 8300. In the ingress direction, the fractional lambda interface 8300 provides time framing and synchronization with the CTR (common time reference) of STS-N frames prior to transmission within the time driven switching or time driven priority subnetwork 8020. In the egress direction the fractional lambda interface 8300 provides time de-framing and synchronization to the SONET network time reference of STS-N frames prior to transmission within a SONET subnetwork. Native SONET devices, for example, SONET cross-connects 8040, and SONET Add/Drop Multiplexers 8010, that are part of SONET rings 8070 in FIG. 55, and SONET CPE (customer premise equipment; for example PBXs 8050, in FIG. 55) are connected to fractional lambda interfaces 8300 through SONET channels (for example, OC-48 8035, OC-192 8030) in the scenario shown in FIG. 55, and fractional channels (e.g., 5 bundled, or concatenated, T1 channels 8060) in the sample scenario shown in FIG. 55. Since the fractional lambda interfaces 8300 deployed in this scenario are used to provide SONET services, they are also called SONET fractional lambda interfaces (or SONET FLI) in the reminder of this document.

In a sample scenario, with reference to FIG. 55, a SONET channel created through a SONET cross-connect 8040 is routed over a link connected to a respective SONET fractional lambda interface 8300, switched through the TDS subnetwork 8020 towards an egress point and through the corresponding fractional lambda interface 8300 over a link connected to a SONET Add/Drop multiplexer 8010 that inserts the channel over a SONET metropolitan ring 8070.

The time driven switching network 8020 operates as a SONET Network Element (NE) providing section level termination. In an alternative embodiment, the TDS network 8020 is transparent to the SONET equipment. In another alternative embodiment, the TDS network 8020 acts as a SONET user providing path level termination.

A SONET channel entering the TDS subnetwork 8020 through a fractional lambda interface 8300 can be switched to a single egress point, or its component SONET subchannels can be switched to different egress points. For example, a whole OC-192 8030 channel entering the TDS subnetwork can be switched to an egress point to which native SONET equipment is connected through an OC-192 8030 or higher capacity SONET channel. Alternatively, an OC-192 8030 channel entering the TDS subnetwork can be de-multiplexed in its four OC-48 components channel and each component channel can be switched separately to a plurality of egress points to which native SONET equipment is connected via an OC-48 8035, OC-192 8030, or higher capacity SONET channel. If the original OC-48 channel exits the networks through an egress point connected to an OC-192 8030 or higher capacity channel, the egress fractional lambda interface 8300 is responsible for multiplexing the OC-48 channel 8035 with others within the outgoing SONET channel.

Multiple SONET channels entering the TDS subnetwork 8020 through a selected fractional lambda interface 8300 multiplexed over the same access link—for example using WDM (Wavelength Division Multiplexing)—can be switched to a single egress point or to different egress points.

Time Framing of SONET Frames

FIG. 56, FIG. 57, FIG. 61, and FIG. 62 show a schematic description of the time framing and multiplexing operations as performed by alternative embodiments of a fractional lambda interface 8300 providing SONET services.

FIG. 56A and FIG. 56B show a fractional lambda interface (FI) 8300 with one OC-48 (2.5 Gb/s) input channel 8110 and one output channel 8120 that has a capacity about three times the capacity of the respective OC-48 input channel 8110. FIG. 57A and FIG. 57B show a fractional lambda interface (FLI) 8300 with one OC-48 (2.5 Gb/s) input channel 8210 and one output channel 8220 that has about the same capacity as the respective OC-48 input channel 8210.

FIG. 56C, FIG. 56D, FIG. 57C, and FIG. 57D show a fractional lambda interface (FLI) 8300 with three OC-48 (2.5 Gb/s) input channels 8130 and 8230, and one output channel 8140 and 8240, respectively, that has a capacity about three times the capacity of each of the respective OC-48 input channels 8130 and 8230.

FIG. 61A and FIG. 61B show a fractional lambda interface (FLI) 8300 with one OC-48 (2.5 Gb/s) output channel 8610 and one input channel 8620 that has a capacity about three times that of the respective OC-48 output channel 8610. FIG. 62A and FIG. 62B show a fractional lambda interface (FLI) 8300 with one OC-48 (2.5 Gb/s) output channel 8710 and one input channel 8720 that has about the same capacity as the respective OC-48 output channel 8710.

FIG. 61C, FIG. 61D, FIG. 62C, and FIG. 62D show a fractional lambda interface (FLI) 8300 with three OC-48 (2.5 Gb/s) output channels 8630 and 8730 and one input channel 8640 and 8740, respectively, that has a capacity about three times that of the respective OC-48 output channels 8630 and 8730.

FIG. 56A shows a scenario in which each STS-48 frame 8115 received on the OC-48 input channel 8110 is transmitted over the output channel 8120 during a single time frame 8125.

Given the capacity of the output channel 8120 (three times the capacity of the input channel 8110) and the duration of time frames 8125 on the output channel 8120, one STS-48 frame is transmitted over the output channel 8120 on average every three time frames.

In a possible embodiment, the whole STS-48 frame 8115 received on the input channel 8110 is transmitted on the output channel 8120. In an alternative embodiment, only the Synchronous Payload Environment (see FIG. 64) is transmitted over the output channel 8120.

The mapping between the STS-48 frames and the time frames during which they are transmitted on the output channel 8120 in FIG. 56 repeats every time cycle or super cycle.

The time frames 8125 on the output channel 8120 are delineated according to at least one of the methods presented earlier in this disclosure.

In a possible embodiment, time frame delineation on the output channel 8120 is provided at the network layer (as defined within the ISO OSI layered model)—for example, carrying control information for time frame delineation within the Internet Protocol (IP) payload or header. Each STS-48 frame transmitted on the output channel 8120 is encapsulated in an IP packet.

In an alternative embodiment, time frame delineation is provided at the data link layer—for example, carrying control information for time frame delineation within the Point-to-Point Protocol (PPP) payload or header. Each STS-48 frame transmitted on the output channel 8120 is encapsulated in a PPP packet.

In another alternative embodiment, time frame delineation is provided at the physical layer—for example, carrying control information for time frame delineation within the SONET frame. In a possible implementation, the SPE of the STS-48 frames 8115 received on the input channel 8110 are aligned to the common time reference (CTR) when transmitted on the output channel 8120. On the output channel 8120 and within the TDS network, the bytes H1 and H2 in the transport overhead TOH, which point to the position of the SPE within the STS frame, can be used as a time frame delimiter D-frame. In this implementation, the beginning of a time frame, sub-time frame, control time frame, or time cycle—depending on the delimiter being implemented—must coincide with the beginning of the SPE. In other words, the SPE must be aligned with the common time reference (CTR) employed on the output channel 8120 and within the TDS network.

If time frame delineation is provided at the physical layer using a digital wrapper—for example by carrying control information for time frame delineation within the digital wrapper—the STS-48 frames 8115 or their SPEs are encapsulated in the payload of the digital wrapper.

FIG. 61A shows how the STS-48 frames 8615, time framed and transmitted according to the embodiment presented in FIG. 56A, are time de-framed and forwarded on a SONET channel 8610. In the scenario depicted in FIG. 61A each STS-48 frame received from the input channel 8620 during a single time frame 8125 is transmitted over the output channel 8610 according to the SONET standard. Given the capacity of the input channel 8820 (three times the capacity of the output channel 8610) and the duration of time frames 8125 on the input channel 8620, one STS-48 frame is received from the input channel 8620 on average every three time frames.

In a possible embodiment of the system presented in FIG. 61, whole STS-48 frames are received from the input channel 8620 and transmitted on the output channel 8610. In an alternative embodiment, only the Synchronous Payload Environment (see FIG. 64) are received from the input channel 8620 and a corresponding complete STS-48 frame 8615 must be constructed prior to transmission over the output channel 8610.

The pattern of time frames during which STS-48 frames are received on the input channel 8620 in FIG. 61 repeats every time cycle or super cycle. The time frames 8125 on the input channel 8620 are delineated according to at least one of the methods presented earlier in this disclosure.

FIG. 56B shows a scenario in which each STS-48 frame i 8115 received on the OC-48 channel 8110 is de-multiplexed in its four STS-12 tributaries Fi-1, Fi-2, Fi-3, and Fi-4. Each STS-12 tributary frame is transmitted over the output channel 8120 during a single time frame 8127. Given the capacity of the output channel 8120 (three times the capacity of the input channel 8110) and the duration of time frames 8127 on the output channel 8120, the four tributary STS-12 frames composing one STS-48 frame are transmitted over the output channel 8120 during selected ones of six consecutive time frames 8127.

In the example shown in FIG. 56B, the first STS-48 frame Frame 1 received on the input channel 8110 is de-multiplexed in its four STS-12 tributaries F1-1, F1-2, F1-3, and F1-4. Frames F1-1 and F1-3 are transmitted over the output channel 8120 during a selected first time frame 8127. Frame F1-2 is transmitted during a second selected time frame 8127, while F1-4 is transmitted during a third selected time frame, wherein the third selected time frame follows the second one, and the second selected time frame follows the first one, wherein the three selected time frame are not consecutive. In an alternative embodiment, at least two of the three selected time frames are consecutive.

In a possible embodiment, the mapping between the STS-12 frames and the time frame during which they are transmitted on the output channel 8120 repeats every time cycle or super cycle.

As shown in FIG. 56B, more than one STS-12 frame can be transmitted during the same time frame 8127. In a possible implementation SONET frames are transmitted in an arbitrary order during the relative time frame. In another possible implementation, each SONET frame is transmitted in a separate pre-defined sub-time frame. The time frames 8127 and sub-time frames (containing different STS-12 frames) on the output channel 8120 are delineated according to at least one of the methods presented earlier in this disclosure.

In a possible embodiment, whole STS-12 frames are transmitted on the output channel 8120. In an alternative embodiment, only the Synchronous Payload Environment (see FIG. 64) of each STS-12 frame is transmitted over the output channel 8120.

In a possible embodiment, selected STS-12 frames are transmitted during the same time frame 8127. For example, STS-12 frames belonging to concatenated STS-12 channels can be sent during the same time frame 8127, possibly without having been previously byte de-multiplexed.

FIG. 61B shows how STS-48 frames 8615 de-multiplexed, time framed, and transmitted according to the embodiment presented in FIG. 56B are later time de-framed, multiplexed, and forwarded on a SONET channel 8610 by a FLI 8300. In the scenario depicted in FIG. 61B, each of the four STS-12 tributaries of an STS-48 frame 8615 is received from the input channel 8620 during a single time frame 8127. The four STS-12 tributaries of each STS-48 frame 8615 are multiplexed according to the SONET standard to obtain the corresponding STS-48 frame. Given the capacity of the input channel 8620 (three times the capacity of the output channel 8610) and the duration of time frames 8127 on the input channel 8620, the four tributary STS-12 frames composing one STS-48 frame 8615 are received from the input channel 8620 during selected ones of six consecutive time frames 8127.

In the example shown in FIG. 61B, a first STS-48 frame Frame 1 was previously de-multiplexed in its four STS-12 tributaries: F1-1, F1-2, F1-3, and F1-4. Frames F1-1 and F1-3 are received from the input channel 8620 during a selected first time frame 8127. Frame F1-2 is received during a second selected time frame 8127, while F1-4 is received during a third selected time frame, wherein the third selected time frame follows the second one, and the second selected time frame follows the first one, wherein the three selected time frames are not consecutive. In an alternative embodiment, at least two of the three selected time frames are consecutive.

Once the four tributaries F1-1, F1-2, F1-3, and F1-4 being part of one STS-48 frame have been received, they are multiplexed according to the SONET standard to compose the original STS-48 frame that is subsequently transmitted on the SONET OC-48 output channel 8610.

In a possible embodiment, the mapping between the tributary STS-12 frames belonging to a given STS-48 frame and the time frame during which they are received on the input channel 8620 repeats every time cycle or super cycle.

More than one STS-12 frame can be received during the same time frame 8127. In a possible implementation SONET frames are received in an arbitrary order during the relative time frame. In another possible implementation, each SONET frame is received in a separate pre-defined sub-time frame. The time frames 8127 and sub-time frames (containing different STS-12 frames) on the input channel 8620 are delineated according to at least one of the methods presented earlier in this disclosure.

In a possible embodiment, whole STS-12 frames are received from the input channel 8620. In an alternative embodiment, only the Synchronous Payload Environment (see FIG. 64) of each STS-12 frame is received over the input channel 8620, in which case the fractional lambda interface 8300 is responsible for reconstructing the whole STS-12 frame before multiplexing the tributaries in the original STS-48 frame.

In a possible embodiment, selected STS-12 frames are received during the same time frame 8127. For example, STS-12 frames belonging to concatenated STS-12 channels can be received during the same time frame 8127, possibly without having been previously byte de-multiplexed.

FIG. 56C shows a scenario in which each STS-48 frame received on the OC-48 input channels 8130-*a* through 8130-*c* is transmitted over the output channel 8140 during a single time frame 8145. Given the capacity of the output channel 8140 (three times the capacity of each input channel 8130-*a* through 8130-*c*) and the duration of time frames 8145 on the output channel 8140, one STS-48 frame from a selected one of the input channels 8130-*a* through 8130-*c* is transmitted over the output channel 8140 on average every three time frames.

STS-48 frames from different input channels 8130-*a* through 8130-*c* are multiplexed at the time frame level, i.e., the STS-48 SONET frames are transmitted during different consecutive time frames. In the presented embodiment, the mapping between each of the STS-48 frames from the plurality of input channels and the respective time frame during which it is transmitted on the output channel 8140 repeats every time cycle or super cycle.

In the sample scenario shown in FIG. 56C, an STS-48 frame Frame1*a* received from a selected input channel 8130-*a* is transmitted on the output channel 8140 during a first selected time frame 8145. An STS-48 frame Frame1*b* received from another selected input channel 8130-*b* is transmitted during a second selected time frame 8145, wherein the second selected time frame immediately follows the first selected time frame. An STS-48 frame Frame1*c* received from another selected input channel 8130-*c* is transmitted during a third selected time frame 8145, wherein the third selected time frame immediately follows the second selected time frame.

FIG. 61C shows a scenario in which each STS-48 frame to be forwarded on the OC-48 output channels 8630-*a* through 8630-*c* is received from the input channel 8640 during a single time frame 8145. This scenario takes place when STS-48 frames were previously time framed and transmitted over a TDS network according to the method depicted in FIG. 56C. Given the capacity of the input channel 8640 in FIG. 61C (three times the capacity of each output channel 8630-*a* through 8630-*c*) and the duration of time frames 8145 on the input channel 8640, one STS-48 frame is received from the input channel 8640 on average every three time frames.

STS-48 frames destined for the different output channels 8630-*a* through 8630-*c* are multiplexed over the input channel 8640 at the time frame level, i.e., the SONET STS-48 frames are received during different consecutive time frames. In a possible implementation, the mapping between the time frame during which each of the STS-48 frames is received from the input channel 8640 and the output channel 8630-*a* through 8630-*c* on which the STS-48 frame is to be transmitted repeats every time cycle or super cycle.

In the sample scenario shown in FIG. 61C, an STS-48 frame Frame1*a* to be transmitted on a selected output channel 8630-*a* is received from the input channel 8640 during a first selected time frame 8145. An STS-48 frame Frame1*b* to be transmitted on another selected output channel 8630-*b* is received during a second selected time frame 8145, wherein the second selected time frame immediately follows the first selected time frame. An STS-48 frame Frame 1*c* to be transmitted on another selected output channel 8630-*c* is received during a third selected time frame 8145, wherein the third selected time frame immediately follows the second selected time frame. In an alternative embodiment, at least one of the first selected time frame, the second selected time frame, and the third selected time frame is does not immediately follow the other.

FIG. 56D shows a scenario in which each STS-48 frame received on the OC-48 input channels 8130-*a* through 8130-*c* is de-multiplexed in its four STS-12 tributaries. Each STS-12 tributary frame from the plurality of input channels 8130-*a* through 8130-*c* is transmitted over the output channel 8140 during a single time frame 8147. Given the capacity of the output channel 8140 (three times the capacity of each input channel 8130-*a* through 8130-*c*) and the duration of time frames 8147 on the output channel 8140, the four tributary STS-12 frames composing one STS-48 frame are transmitted over the output channel 8140 during selected ones of six consecutive time frames 8147.

In the example shown in FIG. 56D, the first STS-48 frame Frame 1*a* received on a first input channel 8130-*a* is de-multiplexed in its four STS-12 tributaries F1*a*-1, F1*a*-2, F1*a*-3, and F1*a*-4; the first STS-48 frame Frame 1 *b* received on a second input channel 8130-*b* is de-multiplexed in its four STS-12 tributaries F1*b*-1, F1*b*-2, F1*b*-3, and F1*b*-4; the first STS-48 frame Frame1*c* received on a third input channel 8130-*c* is de-multiplexed in its four STS-12 tributaries F1*c*-1, F1*c*-2, F1*c*-3, and F1*c*-4.

Frames F1*a*-l and F1*a*-3 are transmitted over the output channel 8140 during a first selected time frame 8147. Frame F1*a*-2 is transmitted during a second selected time frame 8147, while F1*a*-4 is transmitted during a third selected time frame, wherein the third selected time frame follows the second one, and the second selected time frame follows the first one, wherein the three selected time frames are not consecutive. In another possible configuration, at least two of the three selected time frames are consecutive.

STS-12 frames F1*b*-3 and F1*c*-3 are transmitted in a fourth selected time frame 8147 that follows the first selected time frame, precedes the second selected time frame, and is adjacent to both of the first selected time frame and the second selected time frame. STS-12 frame F1*b*-2 is transmitted on the output channel 8140 during the second selected time frame, together with frame F1*a*-2.

In a possible embodiment, the mapping between the STS-12 frames and the time frame during which they are transmitted on the output channel 8140 repeats every time cycle or super cycle.

As shown in FIG. 56D, more than one STS-12 frame can be transmitted during the same time frame 8147. In a possible implementation, multiple SONET frames are transmitted in an arbitrary order during the respective time frame. In another possible implementation, each SONET frame is transmitted in a separate pre-defined sub-time frame. The time frames 8147 and sub-time frames (containing different STS-12 frames) on the output channel 8140 are delineated deploying delimiters implemented according to at least one of the methods presented earlier in this disclosure.

In a possible embodiment, whole STS-12 frames are transmitted on the output channel 8140. In an alternative embodiment, only the Synchronous Payload Environment (see FIG. 64) of each STS-12 frame is transmitted over the output channel 8140.

In a possible embodiment, selected STS-12 frames are transmitted during the same time frame 8147. For example, STS-12 frames belonging to concatenated STS-12 channels can be sent during the same time frame 8147, possibly without having been previously byte de-multiplexed.

FIG. 61D shows a scenario in which each STS-48 frame to be transmitted on the OC-48 output channels 8630-*a* through 8630-*c* was previously de-multiplexed in its four STS-12 tributaries according to the method depicted in FIG. 56D. Each STS-12 tributary frame is received from the input channel 8640 in FIG. 61D during a single time frame 8147. Given the capacity of the input channel 8640 (three times the capacity of each output channel 8630-*a* through 8630-*c*) and the duration of time frames 8147 on the input channel 8640, the four tributary STS-12 frames composing one STS-48 frame are received from the input channel 8640 during selected ones of six consecutive time frames 8147.

In the example shown in FIG. 61D, the first STS-48 frame Frame 1*a* transmitted on a first output channel 8630-*a* had been previously de-multiplexed in its four STS-12 tributaries F1*a*-1, F1*a*-2, F1*a*-3, and F1*a*-4; the first STS-48 frame Frame 1*b* to be transmitted on a second output channel 8630-*b* had been previously de-multiplexed in its four STS-12 tributaries F1*b*-1, F1*b*-2, F1*b*-3, and F1*b*-4; the first STS-48 frame Frame 1*c* to be transmitted on a third output channel 8630-*c* had been previously de-multiplexed in its four STS-12 tributaries F1*c*-1, F1*c*-2, F1*c*-3, and F1*c*-4.

Frames F1*a*-1 and F1*a*-3 are received from the input channel 8640 during a selected first time frame 8147. Frame F1*a*-2 is received during a second selected time frame 8127, while F1*a*-4 is received during a third selected time frame, wherein the third selected time frame follows the second one, and the second selected time frame follows the first one, wherein the three selected time frame are not consecutive. In an alternative configuration, the three selected time frame are consecutive.

STS-12 frames F1*b*-3 and F1*c*-3 are received in a fourth selected time frame 8147 that follows the first selected time frame, precedes the second selected time frame, and is adjacent to both of the first selected time frame and the second selected time frame. STS-12 frame F1*b*-2 is received from the input channel 8640 during the second selected time frame, together with frame F1*a*-2.

In the preferred embodiment, the mapping between the tributary STS-12 frames and the time frame during which they are received on the input channel 8640 repeats every time cycle or super cycle.

More than one STS-12 frame can be received during the same time frame 8147. In a possible implementation, multiple SONET frames are received in an arbitrary order during their respective time frame. In another possible implementation, each SONET frame is received in a separate pre-defined sub-time frame oft the respective time frame. The time frames 8147 and sub-time frames (containing different STS-12 frames) on the input channel 8640 are delineated by means of delimiters implemented according to at least one of the methods presented earlier in this disclosure.

In a possible embodiment, whole STS-12 frames are received from the input channel 8640. In an alternative embodiment, only the Synchronous Payload Environment (see FIG. 64) of each STS-12 frame is received over the input channel 8640, in which case the fractional lambda interface 8300 is responsible for reconstructing the whole STS-12 frame before multiplexing the tributaries in the original STS-48 frame.

In a possible embodiment, selected STS-12 frames are received during the same time frame 8147. For example, STS-12 frames belonging to concatenated STS-12 channels can be received during the same time frame 8147, possibly without having been previously byte de-multiplexed.

FIG. 57A shows a scenario in which each STS-48 frame 8115 received on the OC-48 input channel 8210 is transmitted over the output channel 8220 during a plurality of time frames 8225. Given the capacity of the output channel 8220 (the same as the input channel 8210) and the duration of time frames 8225 on the output channel 8220, one STS-48 frame is transmitted over the output channel 8220 during four time frames 8225.

Each STS-48 frame 8115 is divided into four parts, which will be called "fractions" in the following, where each part is transmitted during a selected time frame 8225. In the embodiment presented in FIG. 57A, one single STS-48 fraction is transmitted during each time frame 8225. The time frames 8225 on the output channel 8220 are delineated by means of delimiters implemented according to at least one of the methods presented earlier in this disclosure. In the preferred embodiment, the mapping between the fractions of STS-48 frames and the time frames 8225 during which they are transmitted on the output channel 8220 repeats every time cycle or super cycle.

In the example shown in FIG. 57A, the first STS-48 frame Frame 1 received on the input channel 8210 is divided into four fractions. The first fraction is transmitted over the output channel 8220 during a selected first time frame 8225, the second fraction is transmitted during a second selected time frame 8225, the third fraction is transmitted during a third selected time frame 8225, and the fourth fraction is transmitted during a fourth selected time frame 8225; wherein the fourth selected time frame immediately follows the third one, the third selected time frame immediately follows the second one, and the second selected time frame immediately follows the first one, wherein the four selected time frame are consecutive. In an alternative configuration, the first selected time frame, the second selected time frame, the third selected time frame, and the fourth selected time frame follow each other in a different order than the one above.

In a possible embodiment, fractions of whole STS-48 frames 8115 received on the input channel 8210 are transmitted on the output channel 8220. In an alternative embodiment, only fractions of the Synchronous Payload Environment (see FIG. 64) are transmitted over the output channel 8220.

FIG. 62A shows how STS-48 frames 8615 time framed and transmitted according to the embodiment presented in FIG. 57A are time de-framed and forwarded on a SONET channel 8710. FIG. 62A shows a scenario in which each STS-48 frame 8615 to be transmitted on the OC-48 output channel 8710 is received from the input channel 8720 during a plurality of time frames 8225. Given the capacity of the input channel 8720 (the same as the output channel 8710) and the duration of time frames 8225 on the input channel 8720, one STS-48 frame is received from the input channel 8720 during four time frames.

Each STS-48 frame 8615 was previously divided into four parts, which we call "fractions", where each part is received during a selected time frame 8225. In the embodiment presented in FIG. 62A, one single STS-48 fraction is received during each time frame 8225. The time frames 8225 on the input channel 8720 are delineated by means of delimiters implemented according to at least one of the methods presented earlier in this disclosure. In the preferred embodiment, the mapping between the fractions of STS-48 frames and the time frames during which they are transmitted on the output channel 8720 repeats every time cycle or super cycle.

In the example shown in FIG. 62A, the first STS-48 frame Frame 1 to be transmitted on the output channel 8710 was previously divided into four fractions. The first fraction is received over the output channel 8720 during a first selected time frame 8225, the second fraction is received during a second selected time frame 8225, the third fraction is received during a third selected time frame 8225, and the fourth fraction is received during a fourth selected time frame 8225, wherein the fourth selected time frame immediately follows the third one, the third selected time frame immediately follows the second one, and the second selected time frame immediately follows the first one; wherein the four selected time frames are consecutive.

In a possible embodiment, fractions of whole STS-48 frames 8615 to be transmitted on the output channel 8710 are received from the input channel 8720. In an alternative embodiment, only fractions of the Synchronous Payload Environment (see FIG. 64) are received from the input channel 8720.

FIG. 57B shows a scenario in which each STS-48 frame 8115 received from the OC-48 channel 8210 is transmitted over the output channel 8220 during a plurality of time frames 8227, wherein the number of time frames during which a single STS-48 frame is transmitted can vary. Given the capacity of the output channel 8220 (the same as the input channel 8210) and the duration of time frames 8227 on the output channel 8220, one STS-48 frame is transmitted over the output channel 8220 during either three or four time frames.

Each STS-48 frame 8115 is divided into a plurality of parts and each part is transmitted on the output channel 8220 during a selected time frame 8227. In the embodiment presented in FIG. 57B, fractions from one or two different STS-48 frames are transmitted during each time frame 8227. The time frames 8227 on the output channel 8220 are delineated by means of delimiters implemented according to at least one of the methods presented earlier in this disclosure. In the preferred embodiment, the mapping between each selected fraction of STS-48 frames and the respective time frame during which the selected fraction is transmitted on the output channel 8220 repeats every time cycle or super cycle.

In a possible embodiment, fractions of the entire STS-48 frames 8115 received on the input channel 8210 are transmitted on the output channel 8220. In an alternative embodiment, fractions of only the Synchronous Payload Environment (see FIG. 64) are transmitted over the output channel 8220.

In the configuration shown in FIG. 57B, fractions of the same STS-48 frame can be of different size. The transmission of a fraction of an STS-48 frame can require either a whole time frame 8227, or part of it. When transmission of an STS-48 frame fraction is completed before the end of a selected time frame 8227, a fraction from another STS-48 frame can be transmitted during the reminder of the same selected time frame 8227. Each SONET frame fraction is transmitted in a separate pre-defined sub-time frame. The time frames 8227 and sub-time frames (containing fractions from different STS-48 frames) on the output channel 8220 are delineated by means of delimiters implemented according to at least one of the methods presented earlier in this disclosure.

In the example shown in FIG. 57B, the first STS-48 frame Frame 1 received on the input channel 8210 is divided into three fractions. The first fraction is transmitted over the output channel 8220 during a selected first time frame 8227, the second fraction is transmitted during a second selected time frame 8227, while the third fraction is transmitted during a third selected time frame, wherein the third selected time frame immediately follows the second one, the second selected time frame immediately follows the first one, and the three selected time frame are consecutive. In an alternative embodiment, at least two of the three selected time frames are not consecutive.

Since, as shown in FIG. 57B, the third selected time frame is not completely filled up, i.e., the transmission of the third fraction of the STS-48 frame Frame1 does not require a whole time frame 8227, a fraction from the next received STS-48 frame Frame2 is transmitted during the third selected time frame 8227. The other two fractions of frame Frame2 are transmitted during the two time frames 8227 following the third selected time frame 8227.

FIG. 62B shows how STS-48 frames 8615 time framed and transmitted according to the embodiment presented in FIG. 57B are time de-framed and forwarded on a SONET channel 8710. As shown in FIG. 62B, each STS-48 frame 8615 to be transmitted on the OC-48 channel 8710 is received from the input channel 8720 during a plurality of time frames 8227, wherein the number of time frames during which a single STS-48 frame is received is not necessarily fixed. Given the capacity of the input channel 8720 (the same as the output channel 8710) and the duration of time frames 8227 on the input channel 8720, one STS-48 frame 8615 is received from the input channel 8720 during either three or four time frames.

Each STS-48 frame 8615 had been divided into a plurality of parts, each of which will be called a "fraction", and each part is received during a selected time frame 8227. In the embodiment presented in FIG. 62B, fractions from one or two different STS-48 frames 8615 are received during each time frame 8227. The time frames 8227 on the input channel 8720 are delineated by means of delimiters implemented according to at least one of the methods presented earlier in this disclosure. In the preferred embodiment, the mapping between the fractions of STS-48 frames 8615 and the time frames during which they are received from the input channel 8720 repeats every time cycle or super cycle.

In a possible embodiment, fractions of the entire STS-48 frames 8615 to be transmitted on the output channel 8710 are received from the input channel 8720. In an alternative embodiment, fractions of the Synchronous Payload Environment (see FIG. 64) are received from the input channel 8720.

Fractions of the same STS-48 frame 8615 can be of different size. An STS-48 frame fraction can be received during either a whole time frame 8227 or part of it. When reception of an STS-48 frame fraction is completed before the end of a selected time frame 8227, a fraction from another STS-48 frame can be received during the reminder of the same selected time frame 8227. In a possible embodiment, each SONET frame fraction is transmitted in a separate predefined sub-time frame. The time frames 8227 and sub-time frames (containing fractions from different STS-48 frames) on the input channel 8720 are delineated by means of delimiters implemented according to at least one of the methods described earlier in this disclosure.

In the example shown in FIG. 62B, the first STS-48 frame Frame 1 to be transmitted on the output channel 8710 is divided into three fractions. The first fraction is received from the input channel 8720 during a first selected time frame 8227, the second fraction is received during a second selected time frame 8227, while the third fraction is received during a third selected time frame, wherein the third selected time frame immediately follows the second one, the second selected time frame immediately follows the first one, and the three selected time frame are consecutive. In an alternative embodiment, at least two of the three selected time frames are not consecutive.

Since the third selected time frame is not completely filled up, i.e., the reception of the third fraction of the STS-48 frame Frame1 does not require a whole time frame 8227, a fraction from the STS-48 frame Frame2 to be transmitted next is received during the third selected time frame 8227. The other two fractions of frame Frame2 are received during the two time frames 8227 following the third selected time frame 8227.

FIG. 57C shows a scenario in which each STS-48 frame received on the OC-48 input channels 8230-*a* through 8230-*c* is transmitted over the output channel 8240 during a plurality of time frames 8245. Given the capacity of the output channel 8240 (three times the capacity of each input channel 8230-*a* through 8230-*c*) and the duration of time frames 8245 on the output channel 8240, one STS-48 frame from a selected one of the input channels 8230-*a* through 8230-*c* is transmitted over the output channel 8240 during three selected time frames 8245 every nine time frames. During each time frame 8245 bits from a single STS-48 frame are transmitted.

In the configuration shown in FIG. 57C, STS-48 frames from different input channels 8230-*a* through 8230-*c* are multiplexed at the time frame level, i.e., transmitted during different consecutive time frames. In the preferred embodiment, the mapping between the STS-48 frames from the plurality of input channels and the time frame during which they are transmitted on the output channel 8240 repeats every time cycle or super cycle.

In the sample scenario shown in FIG. 57C, an STS-48 frame Frame1*a* received from a first selected input channel 8230-*a* is divided into three fractions. The three fractions are transmitted on the output channel 8240 during a first set of three selected time frames 8245, with one fraction in each time frame 8245. The fraction from a single STS-48 frame is transmitted during one time frame 8245.

An STS-48 frame Frame1*b* received from a second selected input channel 8230-*b* is divided into three fractions. The three fractions of frame Frame1*b* are transmitted on the output channel 8240 during a second set of three selected time frames 8245, with one fraction in each time frame 8245, wherein the second set of selected time frames immediately follows the first set.

An STS-48 frame Frame1c received from a third selected input channel 8230-*c* is divided in three fractions. The three fractions of frame Frame1c are transmitted on the output channel 8240 during a third set of three selected time frames 8245, one fraction in each time frame 8245, wherein the third set of selected time frames immediately follows the second set.

In a possible embodiment, fractions of entire STS-48 frames are transmitted on the output channel 8240. In an alternative embodiment, fractions of only the Synchronous Payload Environment (see FIG. 64) of each STS-48 frame are transmitted over the output channel 8240.

FIG. 62C shows a scenario in which each STS-48 frame to be transmitted on the OC-48 output channels 8730-*a* through 8730-*c* is received from the input channel 8740 during a plurality of time frames 8245. This scenario takes place when STS-48 frames had previously been time framed and transmitted over at least one of a TDS network and a TDP network according to the method depicted in FIG. 57C. Given the capacity of the input channel 8740 (three times the capacity of each output channel 8730-*a* through 8730-*c*) and the duration of time frames 8245 on the input channel 8740, one STS-48 frame to be transmitted on a selected one of the output channels 8730-*a* through 8730-*c* is received from the input channel 8740 during three selected time frames 8245 every nine time frames. During each time frame 8245 bits from a single STS-48 frame are received.

STS-48 frames destined for different output channels 8730-*a* through 8730-*c* are multiplexed on the input channel 8740 at the time frame level, i.e., they are received during different consecutive time frames. In the preferred embodiment, the mapping between the STS-48 frames destined for each output channel 8730-*a* through 8730-*c* and the time frame during which they are received from the input channel 8740 repeats every time cycle or super cycle.

In the sample scenario shown in FIG. 62C, an STS-48 frame Frame1*a* to be transmitted on a first selected output channel 8730-*a* was previously divided into three fractions. The three fractions are received from the input channel 8740 during a first set of three selected time frames 8245, one fraction in each time frame 8245. During each time frame 8245 a fraction from a single STS-48 frame is received.

An STS-48 frame Frame1*b* to be transmitted on a second selected output channel 8730-*b* is divided into three fractions. The three fractions of frame Frame1*b* are received from the input channel 8740 during a second set of three selected time frames 8245, with one fraction in each time frame 8245, wherein the second set of selected time frames immediately follows the first set.

An STS-48 frame Frame1c to be transmitted on a third selected output channel 8730-*c* is divided into three fractions. The three fractions of frame Frame1c are received from the input channel 8740 during a third set of three selected time frames 8245, with one fraction in each time frame 8245, wherein the third set of selected time frames immediately follows the second set.

In a possible embodiment, fractions of entire STS-48 frames are received from the input channel 8740. In an alternative embodiment, fractions of only the Synchronous Payload Environment (see FIG. 64) of each STS-48 frame are received from the input channel 8740.

FIG. 57D shows a scenario in which each STS-48 frame received on the OC-48 input channels 8230-*a* through 8230-*c* is divided into three fractions. Each STS-48 frame fraction from any of the plurality of input channels 8230-*a* through 8230-*c* is transmitted over the output channel 8240 during a single time frame 8247. Given the capacity of the output channel 8240 (three times the capacity of each input channel 8230-*a* through 8230-*c*) and the duration of time frames 8247 on the output channel 8240, the three fractions of one STS-48 frame are transmitted over the output channel 8240 during three selected ones of nine consecutive time frames 8247.

Each fraction is transmitted during a single time frame 8247 and a single fraction of a single STS-48 frame is transmitted during each time frame. Fractions of STS-48 frames received on different input channels 8230-*a* through 8230-*c* are multiplexed at the time frame level on the output channel 8240. In other words, fractions of different STS-48 frames can be transmitted during adjacent time frames 8247.

In the example shown in FIG. 57D, the first STS-48 frame Frame 1*a* received on a first input channel 8230-*a* is divided into three fractions F1*a*-l, F1*a*-2, and F1*a*-3; the first STS-48 frame Frame 1*b* received on a second input channel 8230-*b* is divided into three fractions F1*b*-1, F1*b*-2, and F1*b*-3; the first STS-48 frame Frame 1*c* received on a third input channel 8230-*c* is divided into three fractions F1*c*-l, F1*c*-2, and F1*c*-3.

Fraction F1*a*-1 is transmitted during a first selected time frame 8247, fraction F1*b*-1 is transmitted during a second selected time frame 8247, fraction F1*c*-1 is transmitted during a third selected time frame 8247, wherein the third selected time frame follows the second one, and the second selected time frame follows the first one, wherein the three selected time frame are consecutive. In an alternative embodiment the three selected time frames follow each other in a different order than the one above. In an alternative configuration, at least 2 of the three selected time frame are not consecutive.

Fractions F1*a*-1, F1*a*-2, and F1*a*-3 are transmitted during three selected time frames 8247, wherein the selected time frames are not consecutive and fractions of STS-48 frames received on the second input channel 8230-*b* and third input channel 8230-*c* are transmitted during the time frames between the three selected time frames.

In the preferred embodiment, the mapping between fractions of STS-48 frames and the time frame during which they are transmitted on the output channel 8240 repeats every time cycle or super cycle.

In another possible embodiment, fractions of more than one STS-48 frame can be transmitted during the same time frame 8247. In a possible implementation, different fractions are transmitted in an arbitrary order during their respective time frame. In another possible implementation, each STS-48 frame fraction is transmitted in a separate pre-defined sub-time frame. The time frames 8247 and sub-time frames (containing fractions of different STS-48 frames) on the output channel 8240 are delineated by means of delimiters implemented according to at least one of the methods presented earlier in this disclosure. In a possible embodiment, STS-48 frames are divided into fractions of different sizes.

In a possible embodiment, fractions of entire STS-48 frames are transmitted on the output channel 8240. In an alternative embodiment, fractions of only the Synchronous Payload Environment (see FIG. 64) of each STS-48 frame are transmitted over the output channel 8240.

FIG. 62D shows a scenario in which each STS-48 frame to be transmitted on the OC-48 output channels 8730-*a* through 8730-*c* has been previously divided into three fractions. This scenario takes place when STS-48 frames have been time framed and transmitted over at least one of a TDS network and a TDP network according to the method depicted in FIG. 57D. As shown in FIG. 62D, each STS-48 frame fraction destined to any of the plurality of output channels 8730-*a* through 8730-*c* is received from the input channel 8740 during a single time frame 8247. Given the capacity of the input channel 8740 (three times the capacity of each output channel 8730-*a* through 8730-*c*) and the duration of time frames 8247 on the input channel 8740, the three fractions of one STS-48 frame are received from the output channel 8740 during three selected ones of nine consecutive time frames 8247.

Each fraction is received during a single time frame 8247, and a single fraction of a single STS-48 frame is received during each time frame. Fractions of STS-48 frames destined for different output channels 8730-*a* through 8730-*c* are multiplexed at the time frame level on the input channel 8740. In other words, fractions of different STS-48 frames can be received during adjacent time frames 8247.

In the example shown in FIG. 62D, the first STS-48 frame Frame 1*a* to be transmitted on a first selected output channel 8730-*a* was previously divided into three fractions F1*a*-1, F1*a*-2, and F1*a*-3; the first STS-48 frame Frame 1*b* to be transmitted on a second selected output channel 8730-*b* was previously divided into three fractions F1*b*-1, F1*b*-2, and F1*b*-3; the first STS-48 frame Frame 1*c* to be transmitted on a third selected output channel 8730-*c* was previously divided into three fractions F1*c*-1, F1*c*-2, and F1*c*-3.

Fraction F1*a*-1 is received during a first selected time frame 8247, fraction F1*b*-1 is received during a second selected time frame 8227, fraction F1*c*-1 is received during a third selected time frame 8227, wherein the third selected time frame follows the second one, and the second selected time frame follows the first one, wherein the three selected time frame are consecutive. In an alternative configuration, the three selected time frames follow each other in a different order than the one above. In an alternative embodiment, at least two of the three selected time frame are not consecutive.

In the scenario depicted in FIG. 82D, fractions F1*a*-1, F1*a*-2, and F1*a*-3 are received during three selected time frames 8247, wherein the selected time frames are not consecutive and fractions of STS-48 frames to be transmitted on output channels 8730-*b* and 8730-*c* are received during the time frames between the three selected ones.

In the preferred embodiment, the mapping between fractions of STS-48 frames and the time frame during which they are received from the input channel 8740 repeats every time cycle or super cycle.

In another possible embodiment, fractions of more than one STS-48 frame can be received during the same time frame 8247. In a possible implementation, different fractions are received in an arbitrary order during the relative time frame. In another possible implementation, each STS-48 frame fraction is received in a separate pre-defined sub-time frame. The time frames 8247 and sub-time frames (containing fractions of different STS-48 frames) on the input channel 8740 are delineated by means of delimiters implemented according to at least one of the methods presented earlier in this disclosure. In a possible embodiment, STS-48 frames are divided into fractions of different sizes.

In a possible embodiment, fractions of entire STS-48 frames are received from the input channel 8740. In an alternative embodiment, fractions of the Synchronous Payload Environment (see FIG. 64) of each STS-48 frame are received from the input channel 8740.

SONET Fractional Lambda Interface

FIG. 58A shows a high level functional description of the transmission and switching of SONET frames over time driven switching networks or time driven priority networks. An STS-N SONET frame undergoes a number of manipulations 8330 prior to entering a time driven switching network or a time driven priority network and another set of manipulations 8380 prior to exiting the network. Each set of manipulations is performed by a fractional lambda interface 8300 that is installed at the boundary between a time driven switching network—or a time driven priority network—and a SONET network.

Since the set of manipulations 8330 to be performed on an STS-N frame prior to entering a time driven switching network is different from the set of manipulations 8380 to be performed on an STS-N frame prior to exiting the time driven switching network, the fractional lambda interface for SONET (or SONET FLI) is functionally comprised of two modules, as shown in FIG. 58B. An ingress module 8400 performs the manipulations required prior to entering the time driven switching network, while the egress module 8500 performs the manipulations required prior to exiting the time driven switching network.

As shown in FIG. 58B, the SONET fractional lambda interface 8300 is connected to at least one SONET device from which it receives STS-N frames through at least one input channel 8430 and to which it transmits STS-N frames through at least one output channel 8550. The SONET FLI is also connected to at least one time driven switch 52 to which it sends data units through at least one output channel 8440 and from which it receives data units through at least one input channel 8540.

STS-N frames are received from the SONET network through input channel 8430 by the ingress module 8400 of the FLI 8300. The ingress module 8400 performs ingress manipulations 8330 on the received STS-N frames and transmits them to a connected time driven switch 52 through the output channel 8440.

The egress module 8500 of the FLI 8300 receives data units from a time driven switch 52 through the input channel 8540 and performs egress manipulations 8380 required to devise corresponding STS-N frames that are transmitted to the connected SONET network through the output channel 8550.

As shown in FIG. 58A, an STS-N frame undergoing ingress manipulations 8330 is first de-multiplexed 8310 in its STS-M tributaries, where M<=N. In an alternative embodiment, de-multiplexing of incoming STS-N frames is not performed, and following processing is performed on STS-M frames where M=N. In an alternative embodiment, the SONET de-multiplexing function 8330 is replaced by another de-multiplexing—or segmentation—function, which divides each incoming STS-N frame into a plurality of parts, or fractions, that are transmitted separately through the time driven switching network. The resulting fractions can have fixed size or variable size.

The STS-M frames to be transmitted on the TDS network are time framed 8320. In other words, each STS-M frame is transmitted on a channel 8440 to a time driven switch 52, as shown in FIG. 58B, during a selected time frame or sub-time frame, wherein the selected time frame or sub-time frame is delineated by means of delimiters implemented according to at least one of the time frame delineation methods described before in this disclosure. In the preferred embodiment, the mapping between an STS-M frame and the time frame or sub-time frame during which it is transmitted towards a time driven switch 52 on channel 8440 is repeated cyclically each time cycle or super cycle.

In a possible embodiment, control information can be associated to each STS-M frame or fraction thereof, being time framed 8320 and transmitted on a channel 8440 to a time driven switch 52, as shown in FIG. 58B, during a selected time frame or sub-time frame. Said control information is used to at least route the STS-M frame through the time driven switching or time driven priority network 8250 in FIG. 58A.

The time framed STS-M frames (i.e., the STS-M frames transmitted during selected time frames or sub-time frames) are switched and routed towards their destination 8350 according to at least one of the time driven switching principles of operation and the time driven priority principles of operation.

STS-M frames (or fractions thereof) exiting the time driven switching network (i.e., received by the egress module 8500 of a SONET fractional lambda interface 8500) are time de-framed 8360. In other words, the original STS-M frame (or fraction thereof) is obtained after having possibly stripped out at least one of the delimiter of the time frame during which it was transmitted, the delimiter of the sub-time frame during which it was transmitted, and the associated control information and after having possibly reassembled a plurality of fractions.

A plurality of STS-M frames are multiplexed 8370 according to the SONET standard and the original STS-N frame is transmitted to the piece of SONET equipment to which the STS-N frame is to be routed. The piece of SONET equipment is connected to the egress module 8500 of the fractional lambda interface 8300 through channel 8550 shown in FIG. 58B.

In another embodiment, STS-M frames received through the time driven switching network do not need to be multiplexed in order to build higher order STS-N frames (i.e., M=N in the example shown in FIG. 58A) and the SONET MUX function 8370 is not performed. In an alternative embodiment, a plurality of fractions are composed to build the original STS-N frame that is then transmitted to the piece of SONET equipment to which the STS-N frame is to be routed.

FIG. 59 depicts the functional block diagram of the ingress module 8400 of a SONET FLI 8300, comprising a SONET DMUX and FLP mapping module 8410, a per FLP queuing system 2940, and a Forwarding and Transmit Delineation Controller with position logic and position counter 8420. The ingress module 8400 of a SONET FLI 8300 performs the functions 8330 represented in FIG. 58A.

The SONET STS-N frames received through at least one of a plurality of input channels 8430 depicted in FIG. 59 are processed by a module 8410 that performs SONET de-multiplexing (DMUX) and maps each de-multiplexed tributary STS-M frame onto a selected fractional lambda pipe (FLP) 2910, responsive to a Cycle-mapping Controller 8417. In a possible embodiment, the mapping performed by the Cycle-mapping Controller 8417 is based on a table 8415 providing the mapping between each SONET OC-M tributary channel and a corresponding FLP.

In an alternative embodiment, the STS-N frames are divided into fractions and a table provides the mapping between each STS-N frame fraction and the corresponding FLP.

Based on the mapping information, the SONET DMUX and FLP mapping module 8410 stores the STS-M frames (or STS-N fractions) in the proper FLP queue 2945.

The Forwarding and Transmit Delineation Controller 8420 retrieves data units (STS-M frames or STS-N fractions) from the Per FLP queuing system 2940 and transmits them over at least one of a plurality of output channels 8440 towards an time driven switch 52. Upon transmission on the output channel 8440, the Forwarding and Transmit Delineation controller 8420 delineates time frames by means of delimiters implemented according to at least one of the methods previously described in this disclosure.

The selected one of the FLP queues 2945 from which data units are retrieved during each time frame by the Forwarding and Transmit Delineation controller 8420 is determined based on the content of an FLP schedules database 8425 that contains information regarding reservation of transmission resources to FLPs 2910 during each time frame.

Data units (STS-M tributary frames or STS-N fractions) transmitted over an FLP traverse the time driven switching network (i.e., are switched and routed through a plurality of time driven switches 52 and communications channels 8445) and reach the egress point of the TDS network configured for the corresponding FLP 2910.

In an alternative embodiment, data units (STS-M tributary frames or STS-N fractions) transmitted over a pipe—also called synchronous virtual pipe (SVP)—traverse the time driven priority network (i.e., are switched and routed through a plurality of time driven priority switches 52 and communications channels 8445 in FIG. 59) and reach the egress point of the TDP network configured for the corresponding FLP 2910.

At the TDS network egress point an FLP 2910 is terminated on an FLI 8300. The data units exiting the FLP 2910 are processed by the egress module 8500 of the FLI 8300. FIG. 60 depicts the functional block diagram of a possible implementation of the egress module 8500 of an FLI 8300, comprising a Receive Delineation and De-Framing Controller 8510, a Per SONET channel queuing system 8560, and a SONET multiplexer 8520. The egress module 8500 of a SONET FLI 8300 performs the functions 8380 represented in FIG. 58A.

Data units that have traveled through the network of time driven switches 52 and communications channels 8445 over an FLP 2910 are fed into the egress module 8500 of the FLI 8300 through at least one of a plurality of input channels 8540.

Data units received through an input channel 8540 are first processed by the Receive Delineation and De-framing controller 8510. The Receive Delineation and De-framing controller 8510 utilizes delimiters embedded in the data stream according to at least one of the methods presented above in this disclosure, to identify time frame boundaries and uniquely associate data units (STS-M frames of STS-N fractions) with the time frame to which they belong. Time frame delineation is based on delimiters implemented according to at least one of the methods described earlier in this disclosure.

The Receive Delineation and de-framing controller 8510 is responsible for stripping the delineation information from the data stream (i.e., to perform time de-framing) and to map each data unit received onto the corresponding SONET channel. The mapping is based on the content of the FLP to SONET channel table 8515. In fact, the time frame or sub-time frame to which a data unit belongs univocally associates the data unit with the FLP on which it traveled through the TDS network. The FLP to SONET channel table 8515 associates the time frame or sub-time frame (and, ultimately, the corresponding FLP 2910) to the SONET channel to which the received data unit belongs.

Before transmitting the mapped data unit on the proper output line 8530, the Receive Delineation and de-framing controller 8510 stores the data unit in the per SONET channel queue 8565 corresponding to the SONET channel to which it belongs.

As shown in FIG. 60, a SONET multiplexer 8520 retrieves tributary STS-M frames from the per SONET Channel queuing system 8560 and multiplexes them in STS-N frames (where $N \geq M$) to be transmitted to a piece of SONET equipment connected to at least one of a plurality of output channels 8550.

In an alternative embodiment, fractions of SONET frames are received over the input channels 8540 of the egress module 8500 of the FLI 8300. The Receive Delineation and Deframing controller 8510 devises time frame delineation information and stores each SONET frame fraction in the channel queue 8565 corresponding to the FLP 2910 over which the SONET frame fraction was received. SONET frame fractions are retrieved from the per SONET channel queuing system 8560 and are composed to obtain the original STS-N frame to be transmitted to a piece of SONET equipment connected to at least one of a plurality of output channels 8550 shown in FIG. 60.

Data carried over high capacity SONET channels can be gathered through a grooming network deploying CTR-based grooming. FIG. 63 shows a scenario in which a CTR-based grooming network 8810 is used to gather data units transmitted over low capacity channels 8845 (e.g., OC-3 at 155 Mb/s) for transmission over a high capacity channel 8840 (e.g., OC-48 at 2.4 Gb/s). A SONET network 8820 transports the high capacity channels 8840 to an egress point where the high capacity channels 8850 enter a CTR-based degrooming subnetwork 8830 which divides the data units carried by its corresponding high capacity channel 8850 over a plurality of low capacity channels 8855 through which the intended destination for the respective data units can be reached.

The SONET network can perform at least one of SONET switching, SONET multiplexing, and SONET de-multiplexing. In a possible embodiment, SONET switching is implemented by using at least one of time driven switching (TDS) technology and time driven priority technology, as described above in this disclosure.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications that fall within the scope of the claims.

What is claimed is:

1. A grooming system, comprising a plurality of input channels, and at least one output channel, the system comprising:

a Common Time Reference (CTR), divided into a plurality of contiguous time frames (TFs), wherein the time frames have a plurality of predefined time durations;
wherein each of the input channels are associated with respective time frames grouped according to a respective common time cycle;
wherein the at least one output channel is associated with respective time frames grouped according to a respective common time cycle;
wherein each of the time frames provides for transfer of a plurality of data units;
first means for mapping the time frames from the respective subset of the time frames associated with the respective ones of the input channels for each of the plurality of the data units;
second means for mapping each of the time frames associated with the at least one output channel, from a respective subset of the time frames for respective ones of the input channels, to provide a defined delay between the respective time frames associated with the transfer of each of the data units from the respective input channel, to the respective at least one output channel.

2. The system as in claim 1, wherein the common cycles have a common duration.

3. The system as in claim 1, wherein the common cycles for each of the channels are time offset relative to the respective common cycles for the other ones of the channels.

4. The system as in claim 1, wherein the common cycles for each of the channels are aligned relative to the CTR.

5. The system as in claim 1, wherein the common cycles for each of the channels are time offset relative to the CTR.

6. The system as in claim 1, wherein the mapping reoccurs periodically for each of the common cycles.

7. The system as in claim 1, wherein each of the time frames for the output channel is comprised of at least one sub-time frame;
wherein each of the input channel time frames is mapped into a respective one of the output channel sub-time frames.

8. The system as in claim 1, wherein each of the time frames for the input channels and the output channels is comprised of at least one sub-time frame;
wherein each of the input channel sub-time frames is mapped into a respective one of the output channel sub-time frames.

9. The system as in claim 1, wherein the data units from each of the plurality of the input channels for the respective subset are combined in a predefined order with the data units from other ones of the plurality of the input channels for the respective subset.

10. The system as in claim 1, wherein the data units are at least one of a byte, a word, a packet, and an ATM cell.

11. The system as in claim 1, wherein a time stamp is associated with selected ones of the time frames, and
wherein the time stamps are derived responsive to the CTR.

12. The system as in claim 1, wherein each one of the input channels and the output channels is at least one of an optical channel, a wavelength division multiplexing channel, a fiber channel, and a SONET optical channel: OC-1 to OC-192.

13. The system as in claim 1, wherein the second means for mapping combines at least one of the following: two time frames of selected ones of the input channels into one time frame of a selected one of the output channels, four time frames of selected ones of the input channels into one time frame of a selected one of the output channels, eight time frames of selected ones of the input channels into one time frame of a selected one of the output channels, and sixteen time frames of selected ones of the input channels into one time frame of a selected one of the output channels.

14. The system as in claim 1, wherein the second means for mapping combines at least one of the following: selected parts of two time frames of selected ones of the input channels into one time frame of a selected one of the output channels, selected parts of four time frames of selected ones of the input channels into one time frame of a selected one of the output channels, selected parts of eight time frames of selected ones of the input channels into one time frame of a selected one of the output channels, and selected parts of sixteen time frames of selected ones of the input channels into one time frame of a selected one of the output channels.

15. A grooming system, comprising:
a plurality of grooming subsystems, each grooming subsystem comprising:
at least one output channel and a plurality of input channels each associated with a plurality of channel bit rates,
a Common Time Reference (CTR), divided into a plurality of contiguous time Frames (TFs), wherein the time frames have a plurality of predefined time durations;
means for mapping a scheduling of transfer of data units from a respective subset of the time frames for the respective ones of the input channels to a respective one of the time frames for each of the output channels to provide a defined time delay between transfer of each of the respective data units from the respective input channel to the respective output channel, wherein the time frames for each of the input channels from the plurality of grooming subsystems are grouped according to a respective common cycle; wherein the time frames for each of the output channels from the plurality of grooming subsystems are grouped according to a respective common cycle of a plurality of common cycles; and wherein all the common cycles have a common duration and are associated with respective ones of the input channels and the output channels from the plurality of grooming subsystems.

16. The system as in claim 15, wherein the common cycles for each of the channels are time offset relative to the respective common cycles for the other ones of the channels.

17. The system as in claim 15, wherein the output channels from a first plurality of the grooming subsystems are coupled to the input channels of a first separate one of the grooming subsystems, to provide a first grooming output.

18. The system as in claim 17, wherein the output channels from a second plurality of the grooming subsystems are coupled to the input channels of a second separate one of the grooming subsystems, to provide a second grooming output;
wherein the system is further comprised of a third grooming subsystem, wherein the first and second grooming outputs are coupled to the input channels of the third grooming subsystem.

19. The system as in claim 15, wherein each one of the input channels and the output channels is at least one of an optical channel, a wavelength division multiplexing channel, a fiber channel, a SONET optical channel: OC-1 to OC-192.

20. A grooming subsystem, comprising:
a plurality of input channels, and at least one output channel;
a Common Time Reference (CTR), divided into a plurality of contiguous time frames (TFs), wherein the time frames have a plurality of predefined time durations;
wherein each of the time frames is associated with a predefined number of plurality of data units; and
means for mapping for each of the time frames of each of the output channels a predefined subset of the data units from a respective subset of the time frames for a respective subset of the input channels to provide a defined delay between transfer of each of the data units from the respective input channel to the respective output channel.

21. The system as in claim 20,
wherein the mapping of the data units for the time frames of the input channels into the respective time frame of the respective output channel is done in a predefined order.

22. A degrooming system, comprising:
a plurality of degrooming subsystems, each degrooming subsystem comprising a plurality of output channels, and at least one input channel;
a Common Time Reference (CTR), divided into a plurality of contiguous time frames (TFs), wherein the time frames have a plurality of predefined time durations; and wherein each of the time frames provides a plurality of data units;

first means for mapping a scheduling of transfer of selected ones of the data units for each respective one of the time frames, from a respective input channel to at least one time frame associated with the at least one of the output channels from at least one of the plurality of degrooming subsystems;

second means for mapping a scheduling for transfer of data units for each respective one of the time frames from the respective input channel to at least one time frame of at least one of the output channels from the plurality of degrooming subsystems, to provide a defined delay between the transfer of each respective data unit from the respective input channel to the respective output channel;

wherein the time frames for each of the output channels from the plurality of degrooming subsystems are grouped according to a respective common cycle;

wherein the time frames for each of the input channels from the plurality of degrooming subsystems are grouped according to a respective common cycle.

23. The system as in claim 22, wherein the common cycles for each of the channels are time offset relative to the respective common cycles for the other ones of the channels.

24. The system as in claim 22, wherein the mapping reoccurs periodically for each of the common cycles.

25. The system as in claim 22, wherein each of the time frames for the input channel is comprised of at least one sub-time frame;

wherein said input channel sub-time frame is mapped into at least one of the output channel time frames.

26. The system as in claim 22, wherein each of the time frames for the output channels and each of the time frames for the input channels is comprised of at least one sub-time frame;

wherein said input channel sub-time frame is mapped into said output channel sub-time frame.

27. The system as in claim 22, wherein the mapping of the time frames for the respective ones of the output channels is provided from a respective subset of the input channels; and wherein each of the time frames of the output channels receives a subset of data units from the input channel.

28. The system as in claim 22, wherein the data units are at least one of a byte, a word, a packet, an ATM cell.

29. The system as in claim 22, wherein delimiters are provided between data units.

30. The system as in claim 22, wherein delimiters are provided between time frames.

31. The system as in claim 22, wherein a time stamp is associated with selected ones of the time frames, and wherein the time stamp is derived responsive to the CTR.

32. The system as in claim 22, wherein each of the input channels and output channels is at least one of an optical channel, a wavelength division multiplexing channel, a fiber channel, and a SONET optical channel: OC-1 to OC-192.

33. A grooming method, for use in scheduling transfer of data units with a switching system comprising a plurality of input channels, and at least one of a plurality of output channels, the method comprising:

providing a Common Time Reference (CTR);

dividing the CTR into a plurality of contiguous time frames (TFs), wherein the time frames have a plurality of predefined time durations, wherein a plurality of data units can be transferred within each of the time frames;

mapping a scheduling of transfer of respective selected ones of the data units for each of the input channels, into selected ones of the time frames from a respective subset of the time frames for each respective ones of the input channels; and mapping a scheduling of transfer of the respective selected data units into respective selected ones of the time frames for each of the output channels, from each of the respective subset of the time frames for the respective ones of the input channels, to provide a defined delay between the transfer of the respective data unit from the respective input channel to the respective output channel.

34. The method as in claim 33, wherein the common cycles have a common duration.

35. The method as in claim 33, wherein the common cycles for each of the channels are time offset relative to the respective common cycles for the other ones of the channels.

36. The method as in claim 33, wherein the common cycles for each of the channels are aligned relative to the CTR.

37. The method as in claim 33, wherein the common cycles for each of the channels are time offset relative to the CTR.

38. The method as in claim 33, further comprising:
providing the mapping for each of the common cycles on a periodically reoccurring basis.

39. The method as in claim 33, wherein each of the time frames for the output channel is comprised of at least one sub-time frame, the method further comprising:
mapping each of the input channel time frames into a respective one of the output channel sub-time frames.

40. The method as in claim 33, wherein each of the time frames for the input channels and the output channels is comprised of at least one sub-time frame, the method further comprising:
mapping each of the input channel sub-time frames into a respective one of the output channel sub-time frames.

41. The method as in claim 33, the method further comprising:
mapping the time frames for respective ones of the input channels provided for each of the data units from a respective subset of the input channels to the respective output channel.

42. The method as in claim 41, further comprising:
combining the data units from each of the plurality of the input channels for the respective subset in a predefined order with the data units from other ones of the plurality of the input channels for the respective subset.

43. A grooming method for use with a switching system, comprising a plurality of input channels, and at least one output channel, the method comprising:

providing a Common Time Reference (CTR);

dividing the CTR into a plurality of contiguous time frames (TFs), wherein the time frames have a plurality of predefined time durations, wherein each of the time frames can provide for communications of a predefined number of plurality of data units; and mapping for each of the time frames of each of the output channels a predefined subset of the data units from a respective subset of the time frames for a respective subset of the input channels, to provide a defined delay between the transfer of each respective one of the plurality of data units from the respective input channel to the respective output channel, wherein the time frames for each of the input channels from the plurality of grooming subsystems are grouped according to a respective common cycle; wherein the time frames for each of the output channels from the plurality of grooming subsystems are grouped according to a respective common cycle of a plurality of common cycles; and wherein all the common cycles have a common duration and are associated with respective ones of the input channels and the output channels from the plurality of grooming subsystems.

44. The method as in claim 43, wherein the data units are at least one of a byte, a word, a packet, an ATM cell.

45. A degrooming method, for use in providing for transfer of a plurality of data units, with a switching system comprised of a plurality of output channels, and at least one input channel, the method comprising:
providing a Common Time Reference (CTR),
dividing the CTR into a plurality of contiguous time frames (TFs), wherein the time frames have a plurality of predefined time durations;
mapping for each respective one of the time frames from the respective input channel, to at least one time frame associated with at least one of the output channels to provide a defined delay between the transfer of the respective data unit from the respective input channel to the respective output channel;
grouping the time frames for each of the output channels and the at least one input channel; and
associating each of the groupings of time frames with a respective common time cycle of a plurality of time cycles, wherein the time frames for each of the input channels are grouped according to a respective common cycle.

46. The method as in claim 45, wherein the common cycles for each of the channels are time offset relative to the respective common cycles for the other ones of the channels.

47. The method as in claim 45, wherein the mapping reoccurs for each of the common cycles on a periodically reoccurring basis.

48. The method as in claim 45, wherein each of the time frames for the input channel is comprised of at least one sub-time frame, the method further comprising:
mapping each of the input channel sub-time frames into at least one of the output channel time frames.

49. The method as in claim 45, wherein each of the time frames for the output channels and the input channels is comprised of at least one sub-time frame, the method further comprising:
mapping each of the input channel sub-time frames is mapped into one of the output channel sub-time frames.

50. The method as in claim 45, wherein each of the time frames provides a plurality of data units, the method further comprising:
mapping the time frames for the respective ones of the output channels from a respective subset of the input channels; and
receiving for each of the time frames of the output channels a subset of data units from the input channel.

51. The system as in claim 1, further comprising:
a degrooming subsystem comprising:
a plurality of degrooming subsystems, each degrooming subsystem comprising a plurality of output channels, and at least one input channel;
a Common Time Reference (CTR), divided into a plurality of contiguous time frames (TFs), wherein the time frames have a plurality of predefined time durations; and
wherein each of the time frames is associated with transfer of up to a plurality of data units;
first means for mapping a scheduling of transfer of selected ones of the data units for each respective one of the time frames from a respective input channel to at least one time frame associated with at least one of the output channels from at least one of the plurality of degrooming subsystems;
second means for mapping a scheduling for transfer of respective selected ones of the data units for each respective one of the time frames from the respective input channel to at least one time frame of at least one of the output channels from the plurality of degrooming subsystems, to provide a defined delay between the transfer of the respective data unit from the respective input channel to the respective output channel;
wherein the time frames for each of the output channels from the plurality of degrooming subsystems are grouped according to a respective common cycle;
wherein the time frames for each of the input channels from the plurality of degrooming subsystems are grouped according to a respective common cycle.

52. The system as in claim 1, wherein each of the input channels has at least one of a plurality of associated bit rates.

53. The system as in claim 1, further comprising:
a plurality of switches interconnected by selected ones of the plurality of input channels and the plurality of output channels,
wherein the CTR is coupled to the plurality of switches,
wherein the first means for mapping is associated with a first switch,
wherein the second means for mapping is associated with a second switch;
wherein the defined delay is between the transfer of a respective data unit between the first switch and the second switch.

54. The system as in claim 20, wherein the data units are each at least one of a byte, a word, a packet, and an ATM cell.

55. The system as in claim 20, wherein there are a plurality of grooming subsystems each comprised of a plurality of input channels and a plurality of output channels.

56. The system as in claim 55, wherein the means for mapping is associated with a first grooming subsystem, the system further comprising:
second means for mapping associated with a second grooming subsystem, for mapping for each of the time frames of each of the output channels, a predefined subset of the data units from a respective subset of time frames for a respective subset of input channels, to provide a defined delay between the transfer of the respective data unit from the respective input channel to the respective output channel.

57. The system as in claim 20, further comprising:
second mapping means for associating each of the time frames of each of the output channels with a predefined subset of the data units from a respective subset of the time frames for a respective subset of the input channels, to provide a defined delay between the transfer of the respective data unit from the respective input channel to the respective output channel.

58. The system as in claim 31, wherein the first means for mapping is associated with a first degrooming subsystem, wherein the second means for mapping is associated with a second degrooming subsystem.

59. The method as in claim 33, further comprising:
grouping the time frames for each of the output channels and the input channels associated according to a respective common cycle; and
associating each of the common cycles with respective ones of plurality of input channels and said at least one of a plurality of the output channels.

60. The method as in claim 43, further comprising:
mapping for each of the time frames of each of the output channels, a second predefined subset of the data units from a respective subset of the time frames for a respective subset of the input channels, to provide a defined delay between the transfer of the respective data unit from the respective input channel to the respective output channel.

61. The method as in claim 45, further comprising:
mapping for each respective one of the time frames from a respective second input channel to at least one time frame of at least one of the output channels, to provide a defined delay between the transfer of the respective data unit from the respective input channel to the respective output channel.

\* \* \* \* \*